US012169376B2

(12) United States Patent
Hirayama et al.

(10) Patent No.: US 12,169,376 B2
(45) Date of Patent: Dec. 17, 2024

(54) TONER CARTRIDGE AND IMAGE FORMING APPARATUS

(71) Applicant: CANON KABUSHIKI KAISHA, Tokyo (JP)

(72) Inventors: Akinobu Hirayama, Shizuoka (JP); Toshiki Fujino, Kanagawa (JP); Teruhiko Sasaki, Shizuoka (JP); Tachio Kawai, Tokyo (JP); Daisuke Abe, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/233,381

(22) Filed: Aug. 14, 2023

(65) Prior Publication Data

US 2023/0384711 A1 Nov. 30, 2023

Related U.S. Application Data

(63) Continuation of application No. PCT/JP2022/012487, filed on Mar. 11, 2022.

(30) Foreign Application Priority Data

Mar. 16, 2021 (JP) ................................ 2021-042969
Mar. 16, 2021 (JP) ................................ 2021-042970

(51) Int. Cl.
*G03G 15/08* (2006.01)
*G03G 21/20* (2006.01)

(52) U.S. Cl.
CPC ....... *G03G 15/0868* (2013.01); *G03G 15/087* (2013.01); *G03G 21/206* (2013.01); *G03G 2215/0663* (2013.01)

(58) Field of Classification Search
CPC .......... G03G 15/0875; G03G 15/0877; G03G 15/0879; G03G 21/1832; G03G 21/206;
(Continued)

(56) References Cited

U.S. PATENT DOCUMENTS 3,685,485 A * 8/1972 Kutsuwada ........ G03G 15/0898 399/93
6,993,264 B2 1/2006 Oguma et al.
(Continued)

FOREIGN PATENT DOCUMENTS

JP H08-211723 A 8/1996
JP 2010-256893 A 11/2010
(Continued)

OTHER PUBLICATIONS

International Search Report and Written Opinion for International Patent Application No. PCT/JP2022/012487.
(Continued)

*Primary Examiner* — Carla J Therrien
(74) *Attorney, Agent, or Firm* — Venable LLP

(57) ABSTRACT

A toner cartridge includes a casing accommodating toner and provided with a toner discharge opening, a fan, a closing member capable of shifting between a closed position and an open position for opening a passage. The toner cartridge also includes a drive receiving member for receiving a driving force from outside of the toner cartridge and for transmitting the driving force toward the fan and the closing member by rotation thereof. The closing member periodically moves between the closed position and the open position by receiving the driving force.

37 Claims, 86 Drawing Sheets

(58) Field of Classification Search
CPC ....... G03G 2215/066; G03G 2215/068; G03G 2215/0685
See application file for complete search history.

(56) References Cited

U.S. PATENT DOCUMENTS

| | | | | |
|---|---|---|---|---|
| 7,130,560 | B2 | 10/2006 | Kawai et al. | |
| 7,162,176 | B2 | 1/2007 | Oguma et al. | |
| 7,194,220 | B2 | 3/2007 | Sasaki et al. | |
| 7,203,442 | B2 | 4/2007 | Matsubara et al. | |
| 7,242,885 | B2 | 7/2007 | Abe et al. | |
| 7,257,353 | B2 | 8/2007 | Kawai et al. | |
| 7,310,489 | B2 | 12/2007 | Kawai | |
| 7,315,706 | B2 | 1/2008 | Oguma et al. | |
| 7,457,569 | B2 | 11/2008 | Kawai | |
| 7,555,249 | B2 | 6/2009 | Kawai | |
| 7,720,412 | B2 | 5/2010 | Anan et al. | |
| 7,848,684 | B2 | 12/2010 | Kawai | |
| 8,045,899 | B2 | 10/2011 | Kawai | |
| 8,121,517 | B2 | 2/2012 | Asanuma et al. | |
| 8,135,304 | B2 | 3/2012 | Abe et al. | |
| 8,139,972 | B2 | 3/2012 | Abe et al. | |
| 8,180,262 | B2 | 5/2012 | Kawai | |
| 8,249,485 | B2 | 8/2012 | Horikawa et al. | |
| 8,270,876 | B2 | 9/2012 | Morioka et al. | |
| 8,369,744 | B2 | 2/2013 | Asanuma et al. | |
| 8,472,840 | B2 | 6/2013 | Abe et al. | |
| 8,494,409 | B2 | 7/2013 | Kawai et al. | |
| 8,515,306 | B2 | 8/2013 | Kawai et al. | |
| 8,688,004 | B2 | 4/2014 | Asanuma et al. | |
| 8,755,713 | B2 | 6/2014 | Kawai et al. | |
| 8,879,954 | B2 | 11/2014 | Nonaka et al. | |
| 9,128,417 | B2 | 9/2015 | Yamasaki et al. | |
| 9,285,765 | B2 | 3/2016 | Anan et al. | |
| 9,377,716 | B2 | 6/2016 | Yamasaki et al. | |
| 9,423,767 | B2 | 8/2016 | Fujino et al. | |
| 9,708,116 | B2 | 7/2017 | Koishi et al. | |
| 10,427,867 | B2 | 10/2019 | Koishi et al. | |
| 10,444,702 | B2 | 10/2019 | Sato et al. | |
| 10,474,096 | B2 | 11/2019 | Hirayama et al. | |
| 10,558,165 | B2 | 2/2020 | Hirayama et al. | |
| 10,671,013 | B2 | 6/2020 | Uesugi et al. | |
| 10,739,721 | B2 | 8/2020 | Hirayama et al. | |
| 10,761,479 | B2 | 9/2020 | Hirayama et al. | |
| 10,831,150 | B2 | 11/2020 | Hirayama et al. | |
| 10,877,434 | B2 | 12/2020 | Sato et al. | |
| 10,921,749 | B2 | 2/2021 | Abe | |
| 10,948,872 | B2 | 3/2021 | Ogawa et al. | |
| 10,955,795 | B2 | 3/2021 | Hirayama et al. | |
| 10,962,926 | B2 | 3/2021 | Hirayama | |
| 10,969,733 | B2 | 4/2021 | Hirayama et al. | |
| 10,969,734 | B2 | 4/2021 | Hirayama et al. | |
| 10,983,475 | B2 | 4/2021 | Sueshige et al. | |
| 10,996,620 | B2 | 5/2021 | Komatsu et al. | |
| 11,036,179 | B2 | 6/2021 | Hirayama et al. | |
| 11,042,117 | B2 | 6/2021 | Hirayama et al. | |
| 11,067,942 | B2 | 7/2021 | Uesugi et al. | |
| 11,204,582 | B2 | 12/2021 | Hirayama et al. | |
| 11,327,432 | B2 | 5/2022 | Komatsu et al. | |
| 11,327,435 | B2 | 5/2022 | Abe | |
| 11,353,821 | B2 | 6/2022 | Hirayama et al. | |
| 11,378,909 | B2 | 7/2022 | Sueshige et al. | |
| 11,378,914 | B2 | 7/2022 | Ogawa et al. | |
| 11,392,082 | B2 | 7/2022 | Nishida et al. | |
| 11,409,227 | B2 | 8/2022 | Uesugi et al. | |
| 11,567,447 | B2 | 1/2023 | Komatsu et al. | |
| 11,573,525 | B2 | 2/2023 | Åbe | |
| 11,592,766 | B2 | 2/2023 | Ozaki et al. | |
| 11,662,673 | B2 | 5/2023 | Ozaki et al. | |
| 11,774,906 | B2 | 10/2023 | Abe | |
| 2009/0169266 | A1* | 7/2009 | Uehara .............. | G03G 15/0879 399/258 |
| 2012/0014713 | A1 | 1/2012 | Murakami et al. | |
| 2012/0014722 | A1 | 1/2012 | Okino et al. | |
| 2015/0110526 | A1* | 4/2015 | Tanaka ............... | G03G 15/0874 399/262 |
| 2020/0301352 | A1 | 9/2020 | Matsumaru et al. | |
| 2022/0050404 | A1* | 2/2022 | Asanuma ........... | G03G 21/1878 |
| 2022/0050417 | A1 | 2/2022 | Nishida et al. | |
| 2022/0236691 | A1 | 7/2022 | Hirayama et al. | |
| 2022/0283535 | A1 | 9/2022 | Sueshige et al. | |
| 2023/0032591 | A1 | 2/2023 | Murakami et al. | |
| 2023/0074264 | A1 | 3/2023 | Fujino et al. | |
| 2023/0075423 | A1 | 3/2023 | Fujino et al. | |
| 2023/0135180 | A1 | 5/2023 | Komatsu et al. | |
| 2023/0176496 | A1 | 6/2023 | Fujino et al. | |
| 2023/0176519 | A1 | 6/2023 | Fujino et al. | |
| 2023/0205114 | A1 | 6/2023 | Ozaki et al. | |
| 2023/0229108 | A1 | 7/2023 | Matsumaru et al. | |

FOREIGN PATENT DOCUMENTS

| | | | |
|---|---|---|---|
| JP | 2010-256894 | A | 11/2010 |
| JP | 2015-132924 | A | 7/2015 |
| JP | 2021-026015 | A | 2/2021 |

OTHER PUBLICATIONS

Co-pending U.S. Appl. No. 18/232,939, filed Aug. 11, 2023.
Co-pending U.S. Appl. No. 18/237,469, filed Aug. 24, 2023.
Co-pending U.S. Appl. No. 18/376,899, filed Oct. 5, 2023.

* cited by examiner (a)

(b)

(a)

(b)

(a)

(b)

(a)

(b)

(a)

(b)

(c)

(a)

(b)

(a)

(b)

TONER CARTRIDGE AND IMAGE FORMING APPARATUS

TECHNICAL FIELD

The present invention relates to an image forming apparatus used to form an image on a recording material and a toner cartridge usable with the image forming apparatus.

BACKGROUND OF INVENTION

Generally, in an electrophotographic image forming apparatus, a structure is known in which in order to supply toner (developer) in response to consumption during image forming operation, a developer supplying container containing toner is dismountably provided in the image forming apparatus main assembly.

Conventionally, there has been proposed a method of providing a pump in a developer supply container and using the pump to supply toner from the developer supply container to the main assembly of the image forming apparatus (see Japanese Patent Application Laid-Open No. 2010-256894). Also, a method for appropriately operating a pump provided in a developer supply container has been proposed (see Japanese Patent Application Laid-Open No. 2010-256893).

SUMMARY OF THE INVENTION

Problem to be Solved

The present invention provides a further development of the conventional structure.

Means for Solving the Problem

The Specification discloses a toner cartridge comprising: a casing accommodating toner and provided with a toner discharge opening through which the accommodated toner is capable of being discharged; a fan configured to feed air by rotation thereof; a closing member capable of shifting between a closing position for closing a passage for the air fed by the fan and an opening position for opening the passage; and a drive receiving member configured to receive a driving force from an outside to transmit the driving force toward the fan and the closing member by rotation thereof, wherein the closing member is configured to be periodically shifted between the closing position and the opening position.

The Specification also discloses a toner cartridge comprising: a casing accommodating toner and provided with a toner discharge opening through which the accommodated toner is capable of being discharged; a fan for feeding air by rotation thereof; a feeding portion, rotatably supported in the casing, for feeding the toner; a toner blocking member capable of shifting between a toner blocking position for closing a feeding passage for the toner fed by the feeding portion and the toner releasing position for opening the feeding passage; a drive receiving member configured to receive a driving force from an outside to transmit the driving force toward the fan and the toner blocking member by rotation thereof, wherein the to the blocking member is configured to be periodically shifted between the toner blocking position and the toner releasing position.

The Specification also discloses a toner cartridge comprising: a casing accommodating toner and provided with a toner discharge opening through which the accommodated toner is capable of being discharged; a gas cylinder capable of spewing gas; and a drive receiving member configured to receive a driving force from an outside and to transmit the driving force toward the gas cylinder by rotation thereof, wherein the gas cylinder is configured to periodically spew the gas by receiving the driving force.

The Specification also discloses a toner cartridge comprising: an accommodation chamber for accommodating toner; a toner discharge opening through which the toner accommodated in the accommodation chamber is discharged; a gas feeding portion configured to feed gas; a duct configured to lead the gas fed by the gas feeding portion, wherein the duct is provided with a gas discharge opening through which the gas fed by the gas feeding portion is capable of discharging, at a position adjacent to the toner discharge opening.

The Specification also discloses a toner cartridge comprising: an accommodation chamber for accommodating toner; a toner discharge opening through which the toner accommodated in the accommodation chamber is discharged; a gas feeding portion configured to feed gas; a gas discharge opening which is provided adjacent to the toner discharge opening and through which the gas fed by the gas feeding portion is capable of being discharge; a drive receiving member configured to receive a driving force from an outside and transmit the driving force toward the gas feeding portion by rotation thereof, wherein a gas flow path from the gas feeding portion to the gas discharge opening and a toner feeding path from the accommodation chamber to the toner discharge opening are substantially separate from each other.

Effect of Invention

According to the present invention, the prior art can be developed.

Figure 5:
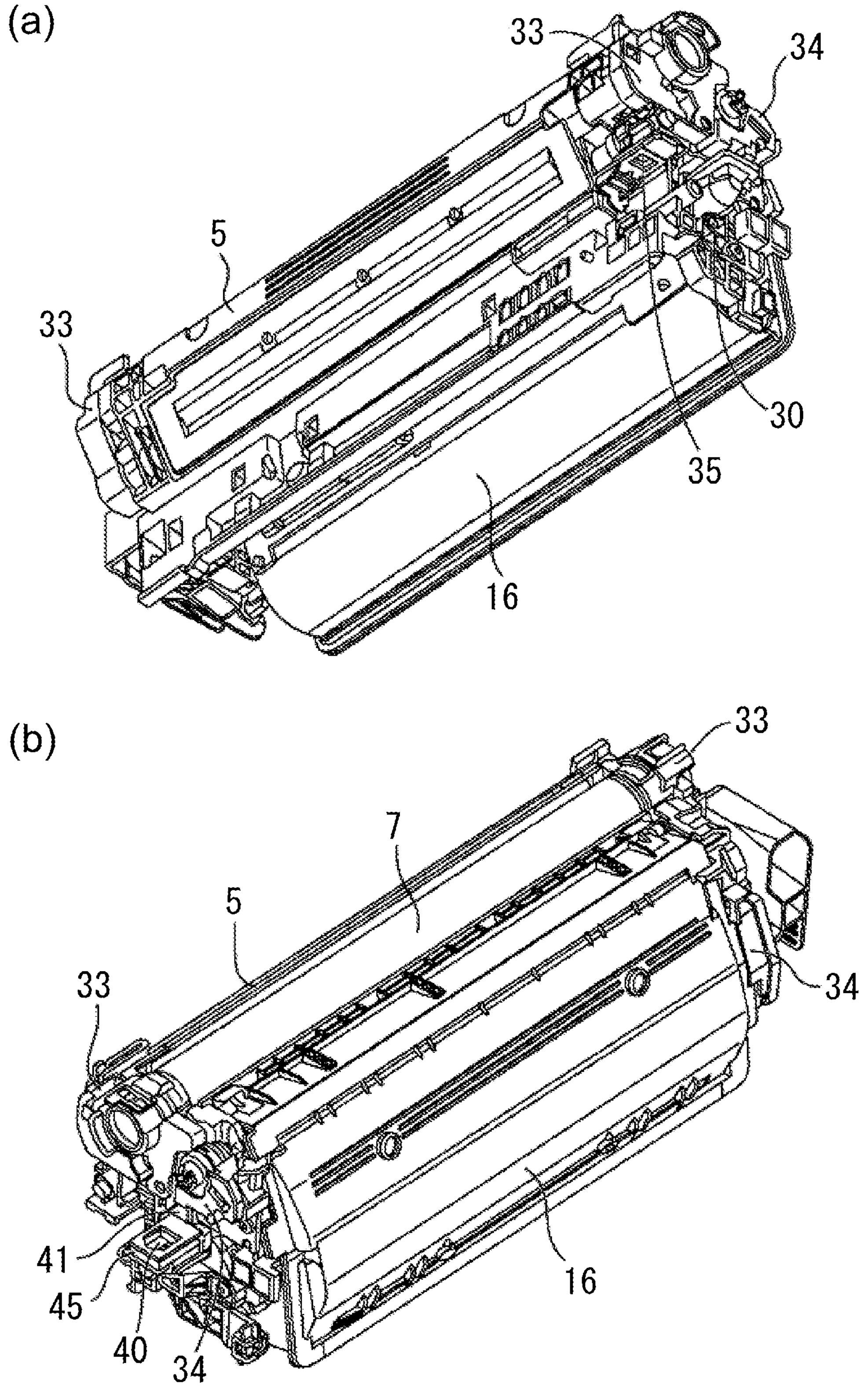

Part (a) of FIG. 5 is an overall perspective view of the process cartridge as viewed from a rear side, and part (b) of FIG. 5 is another overall perspective view of the process cartridge as viewed from a rear side.

Figure 6:
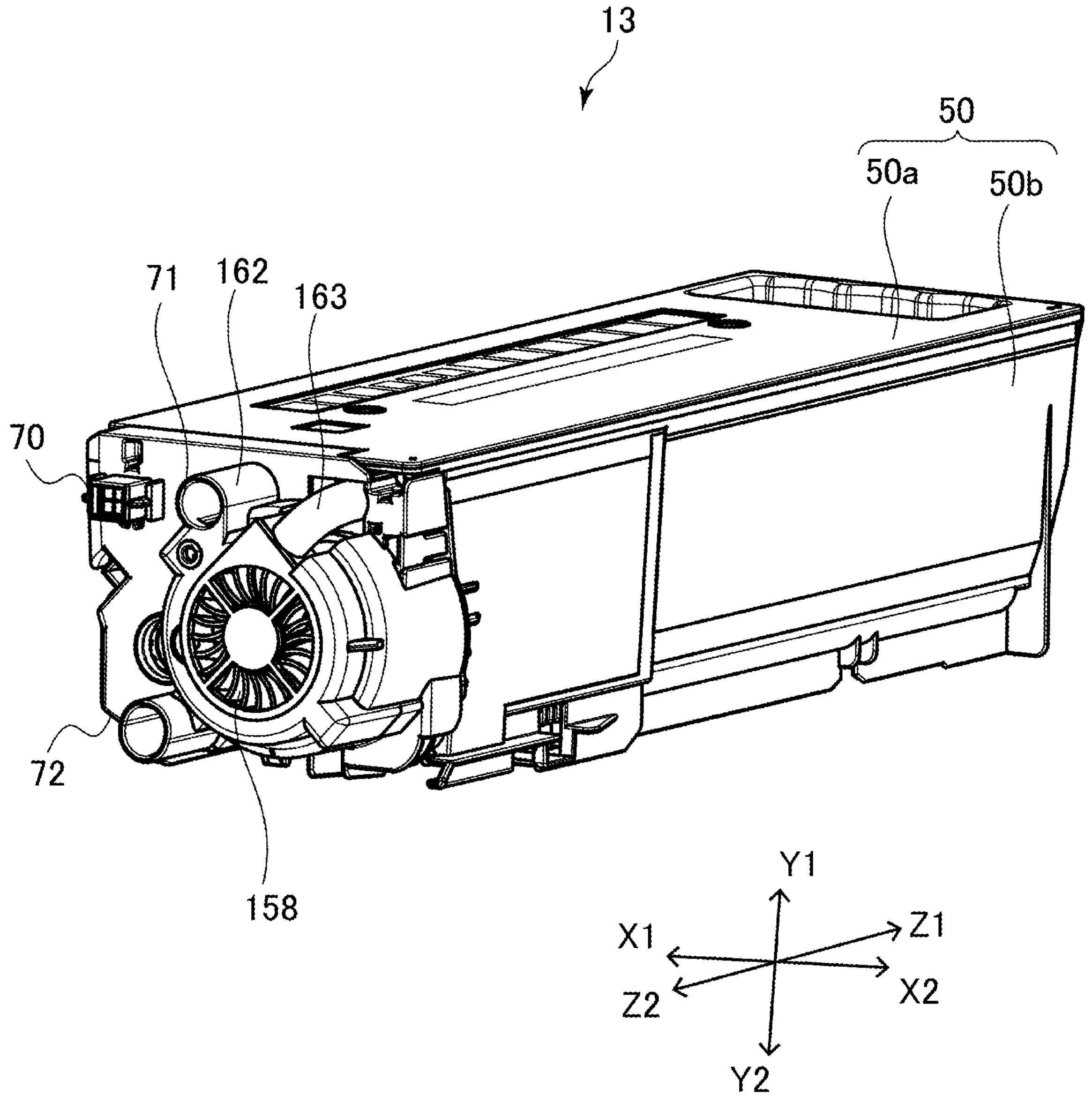

FIG. 6 is a perspective view illustrating a toner cartridge.

Figure 7:
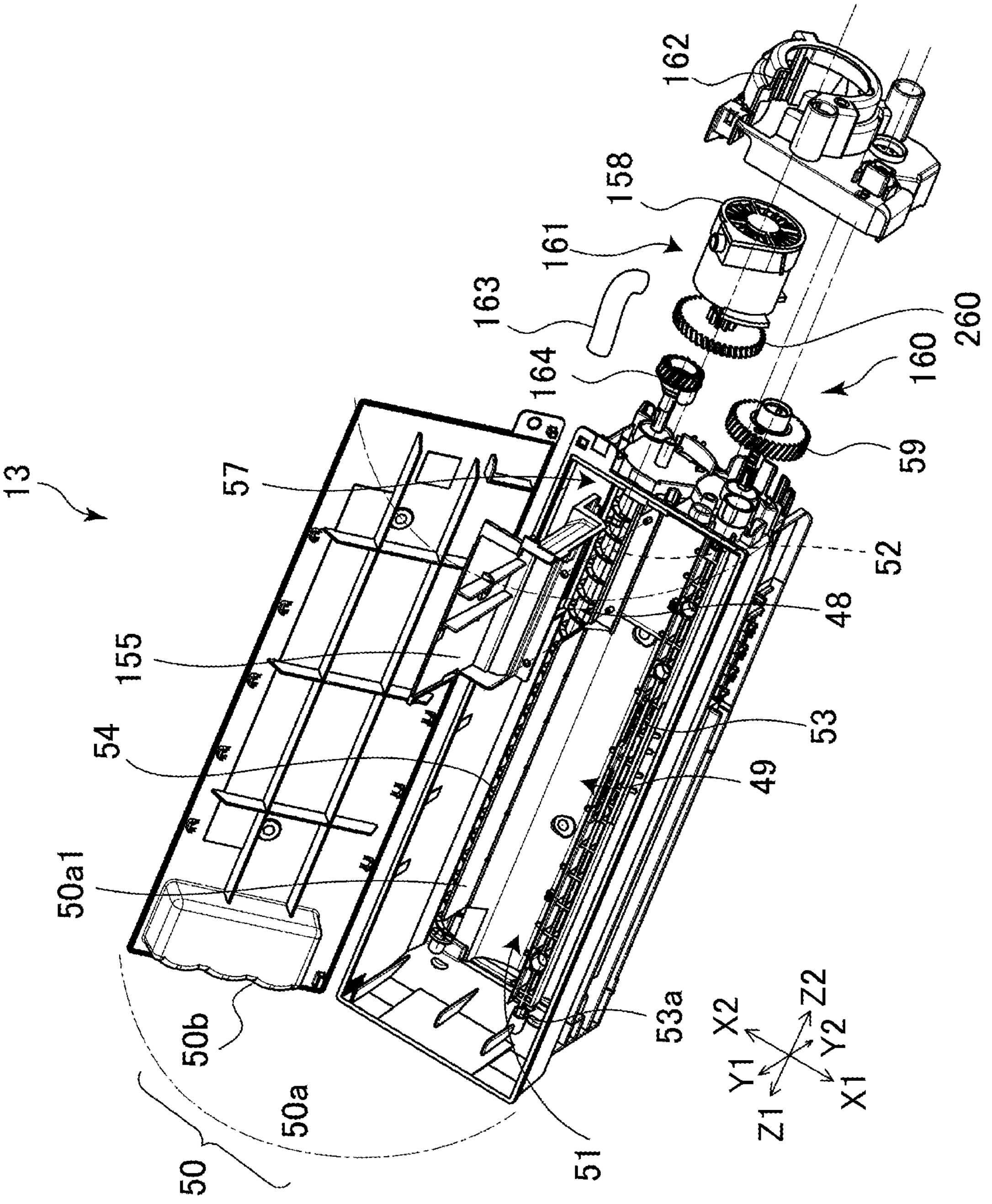

FIG. 7 is an exploded perspective view of the toner cartridge.

Figure 8:
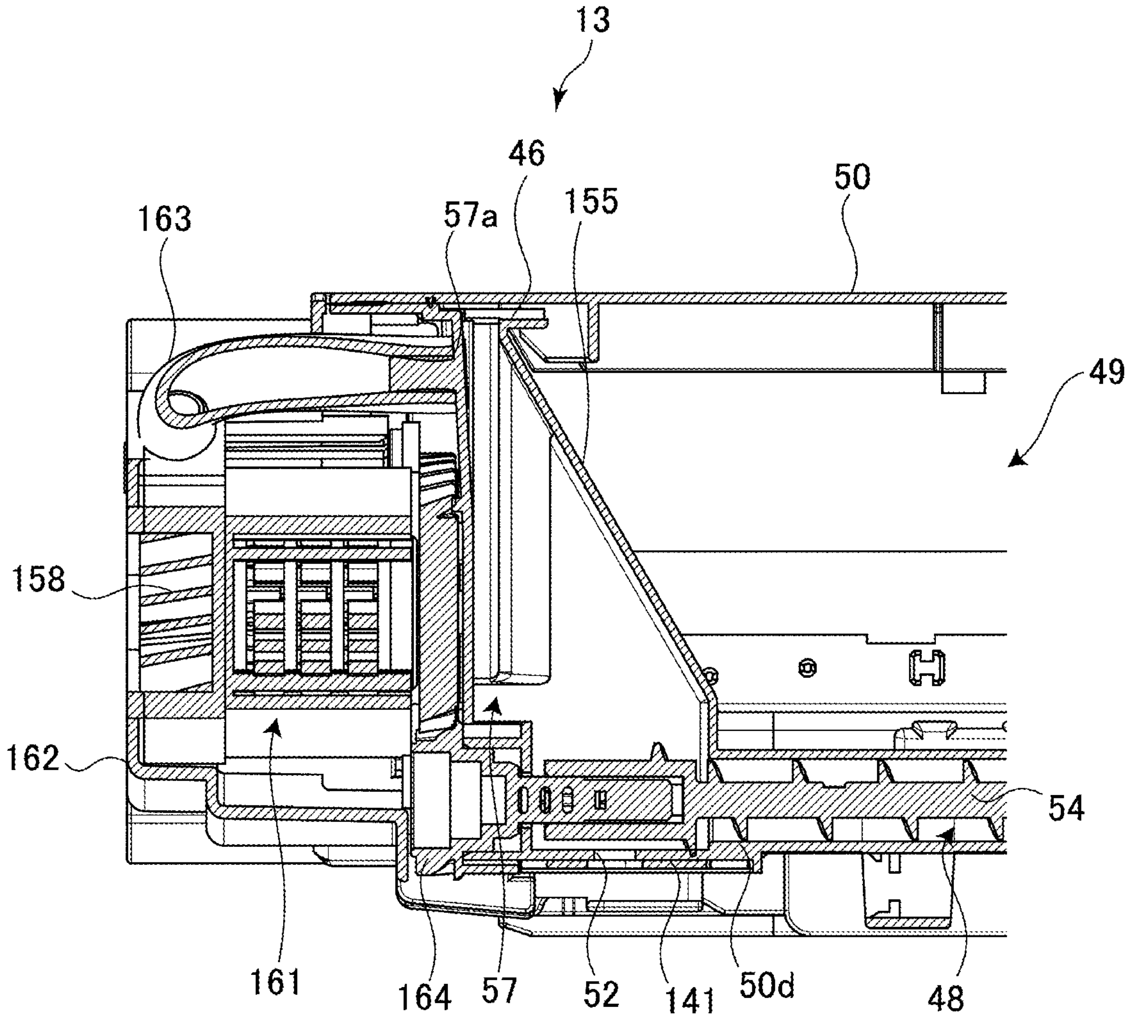

FIG. 8 is a sectional view illustrating a toner discharge chamber of the toner cartridge.

Figure 9:
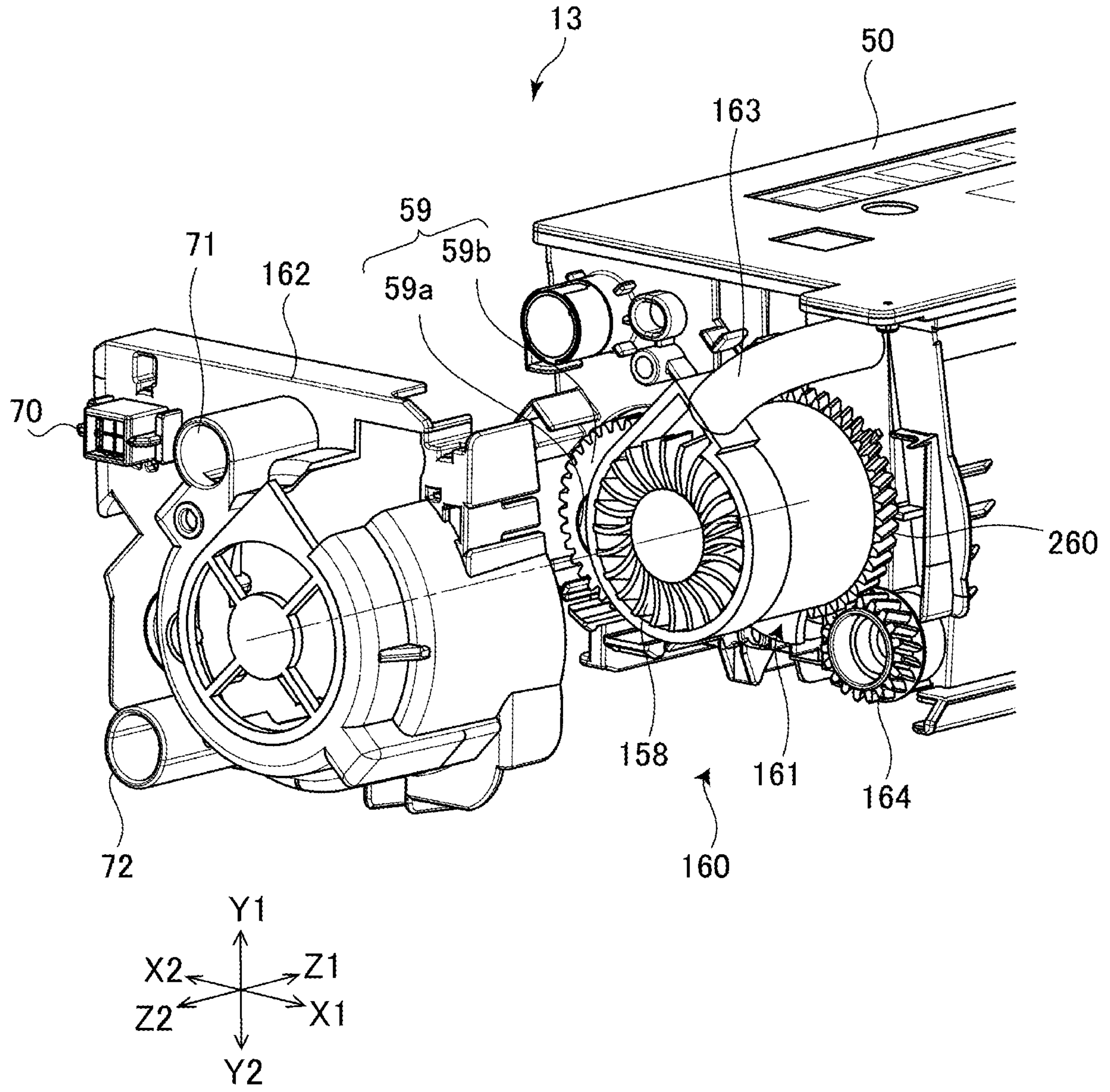

FIG. 9 is a perspective view illustrating a rear end of the toner cartridge.

Figure 10:
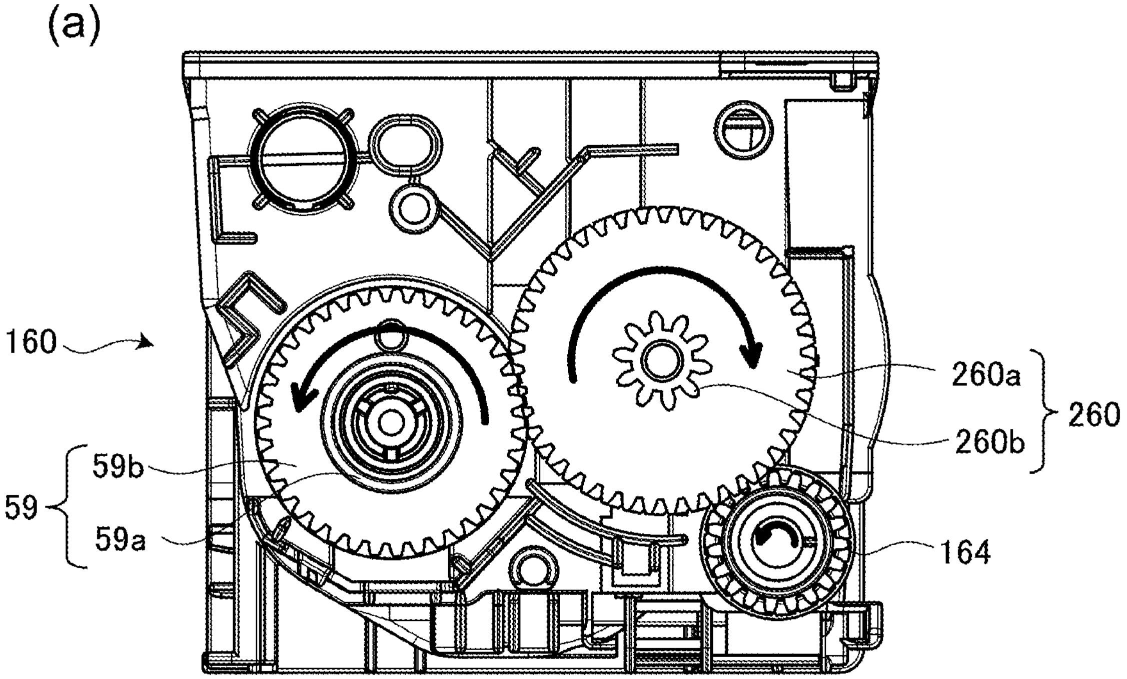
Figure 10:
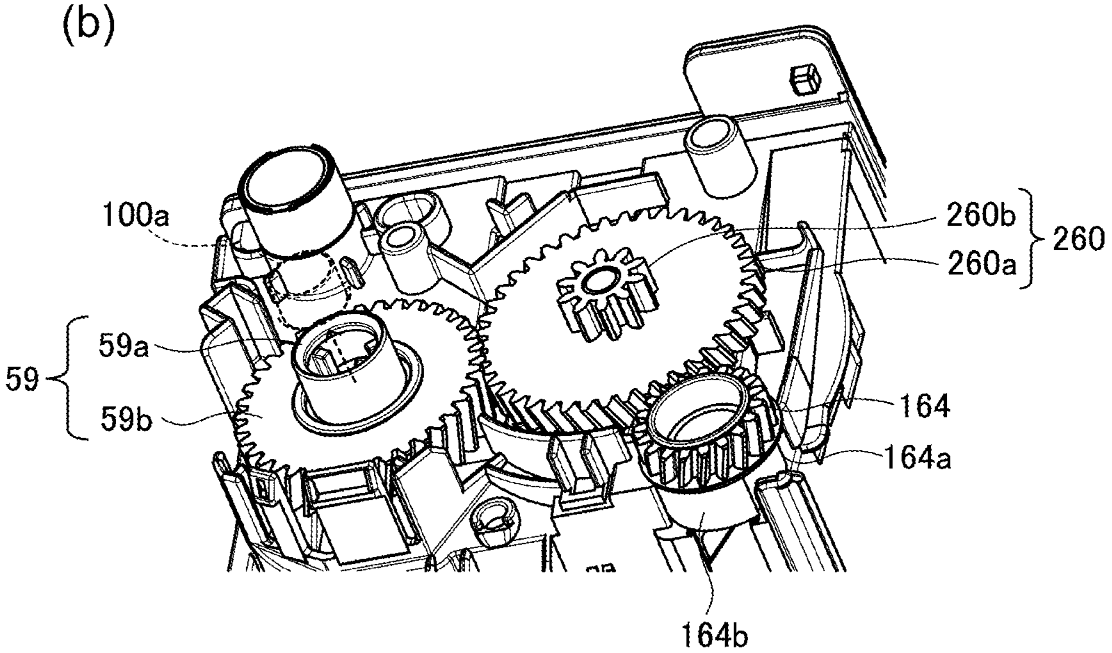

Part (a) of FIG. 10 is a front view illustrating a drive train, and part (b) of FIG. 10 is a perspective view of the drive train.

Figure 11:
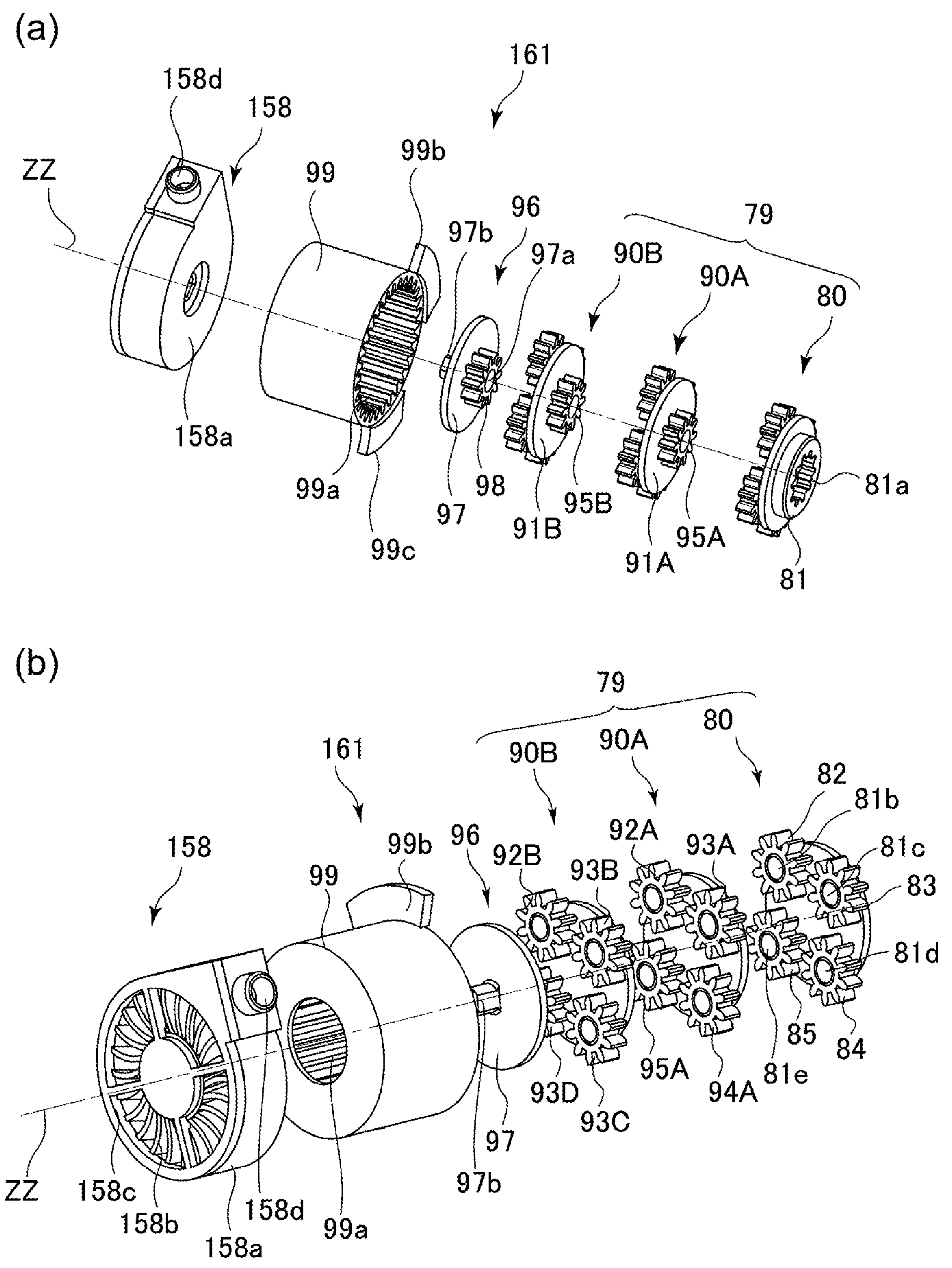

Part (a) of FIG. 11 is a perspective view illustrating an acceleration mechanism, and part (b) of FIG. 11 is another perspective view of the acceleration mechanism.

Figure 12:
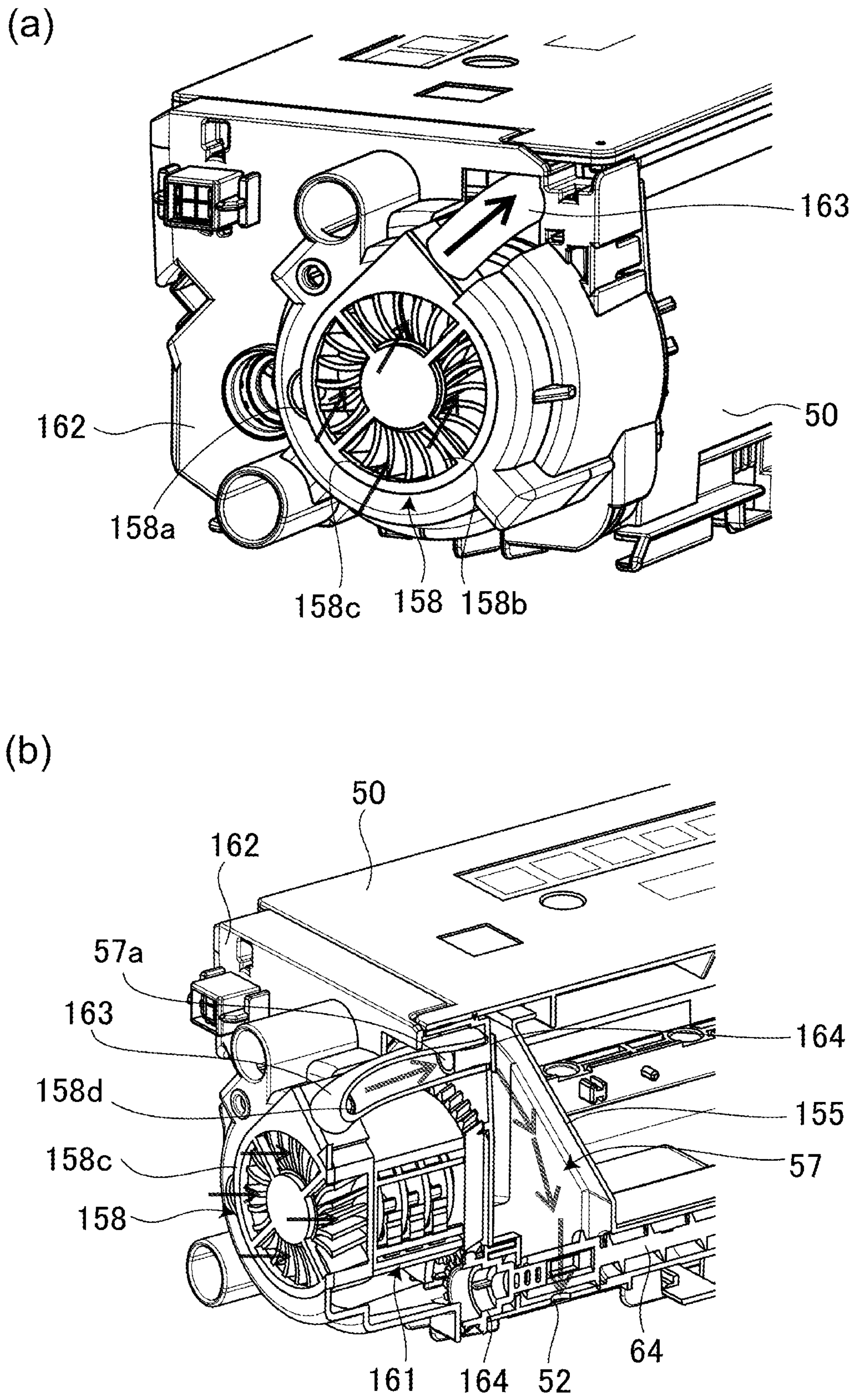

Part (a) of FIG. 12 is a perspective view illustrating flow of air fed by a fan, and part (b) of FIG. 12 is a partial cross-sectional perspective view illustrating the flow of air fed by the fan.

Figure 13:
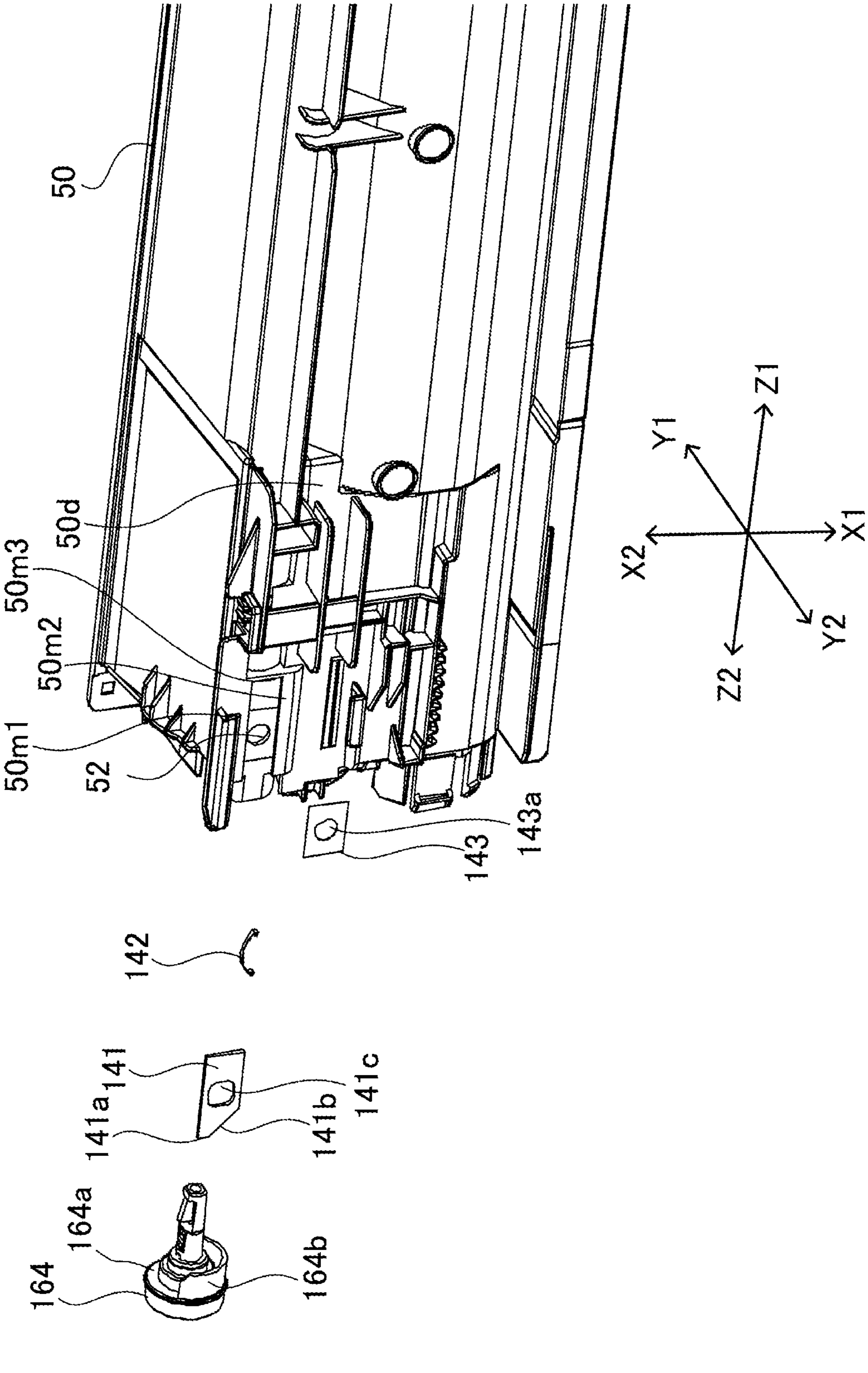

FIG. 13 is an exploded perspective view illustrating a slide shutter and peripheral structures thereof.

Figure 14:
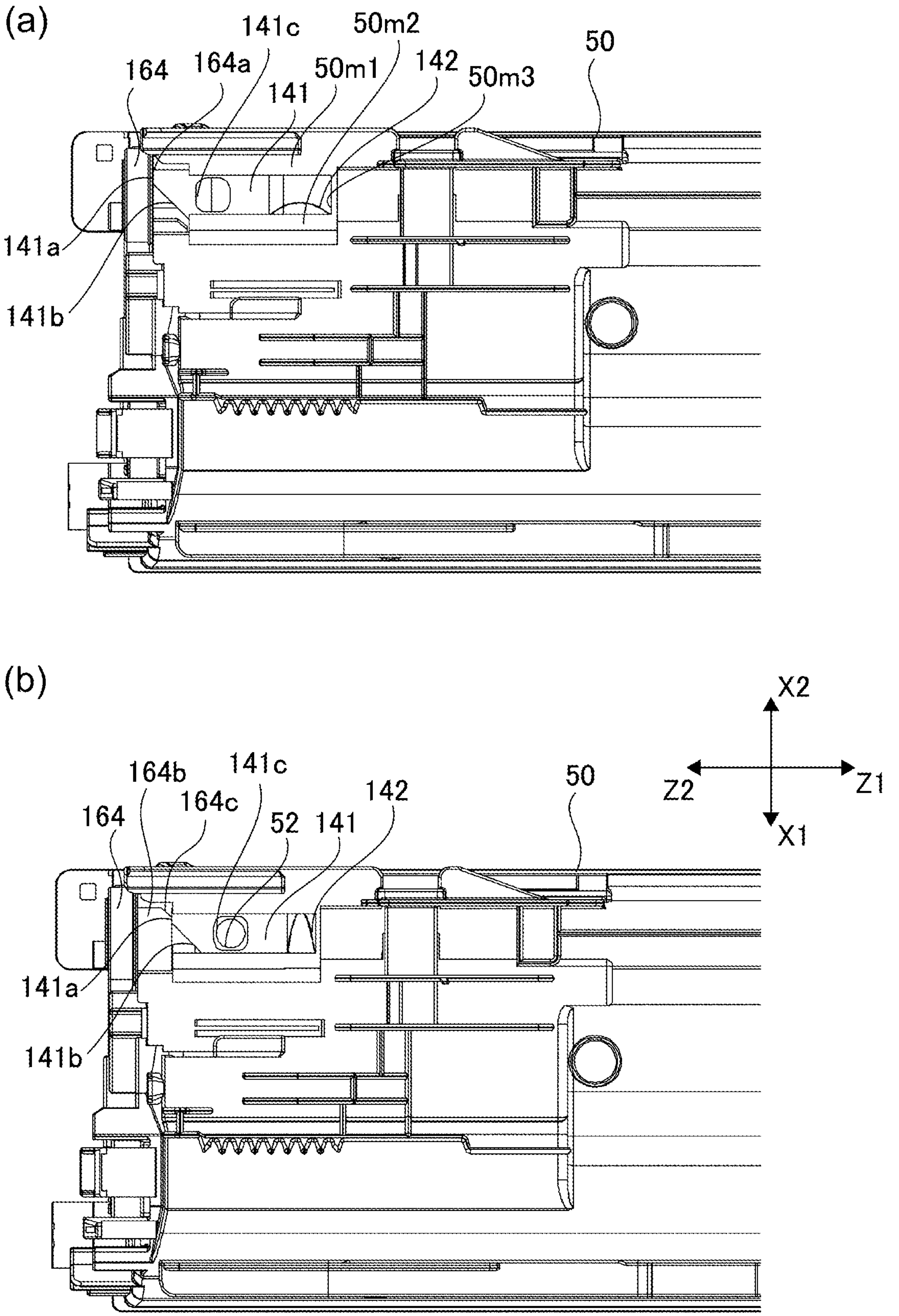

Part (a) of FIG. 14 is a bottom view of the toner cartridge, and part (b) of FIG. 14 is a bottom view of the toner cartridge.

Figure 15:
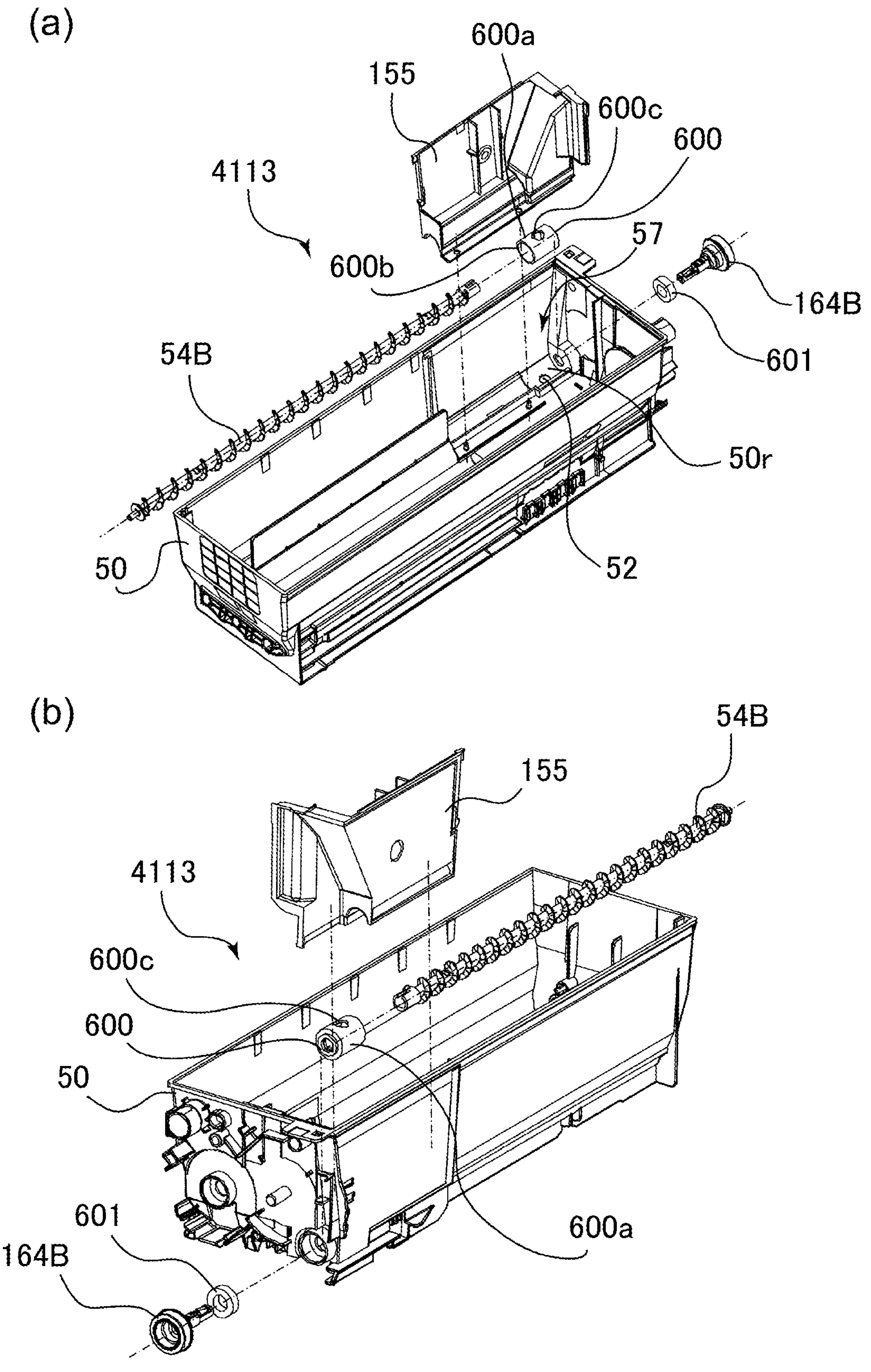

Part (a) of FIG. 15 is an exploded perspective view of a toner cartridge according to Embodiment 2, and part (b) of FIG. 15 is another exploded perspective view of the toner cartridge according to Embodiment 2.

Figure 16:
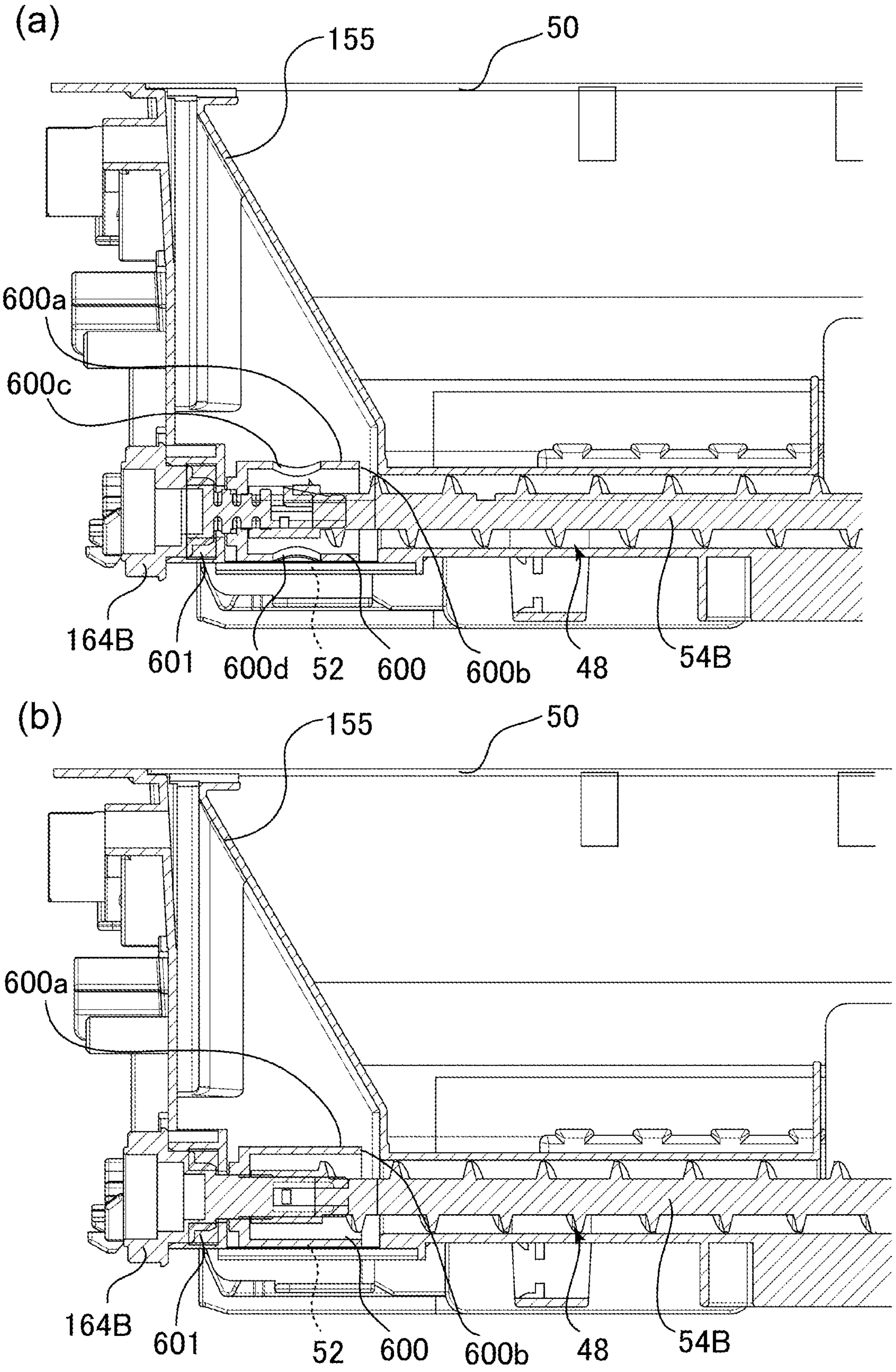

Part (a) of FIG. 16 is a sectional view illustrating a rotational shutter at an opening position, and part (b) of FIG. 16 is a sectional view illustrating the rotary shutter at a closing position.

Figure 17:
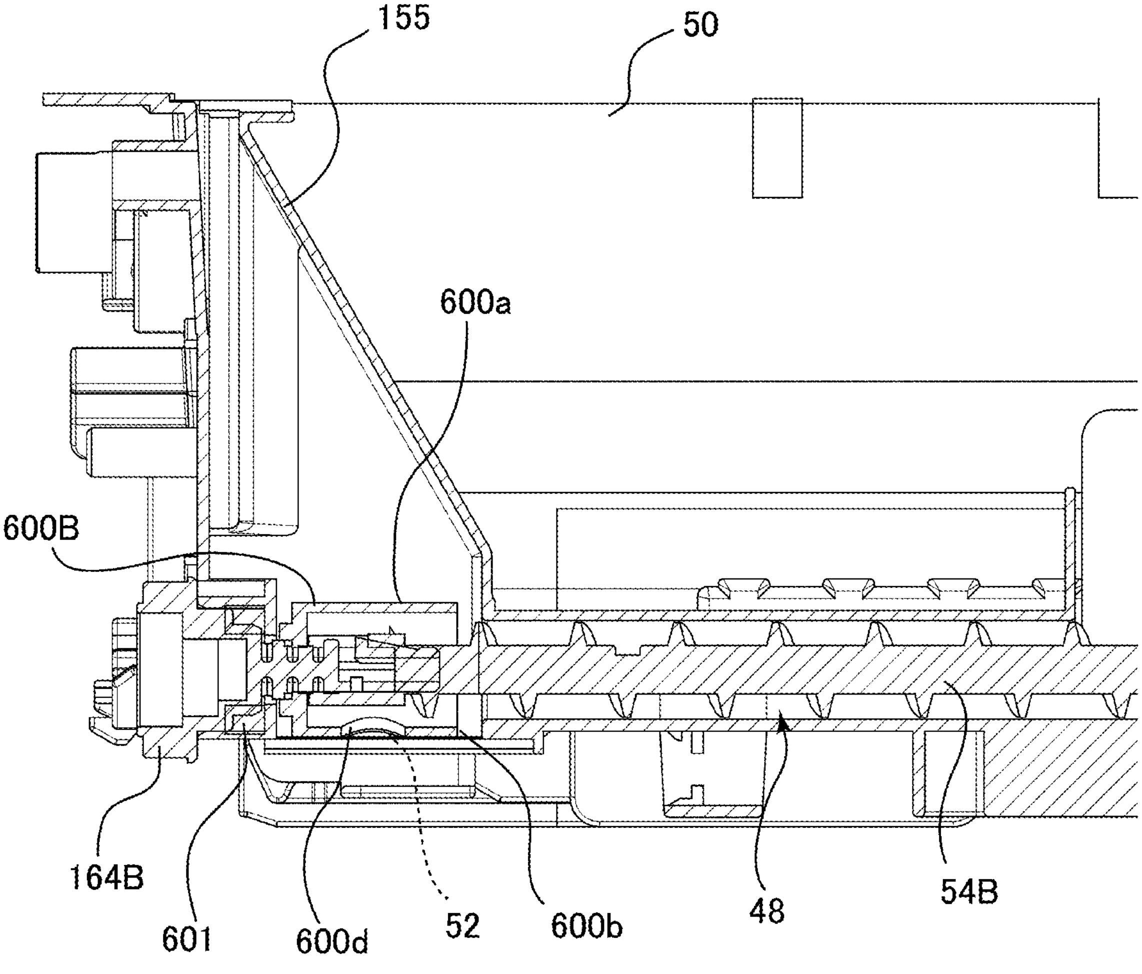

FIG. 17 is a sectional view illustrating a modification of Embodiment 2.

Figure 18:
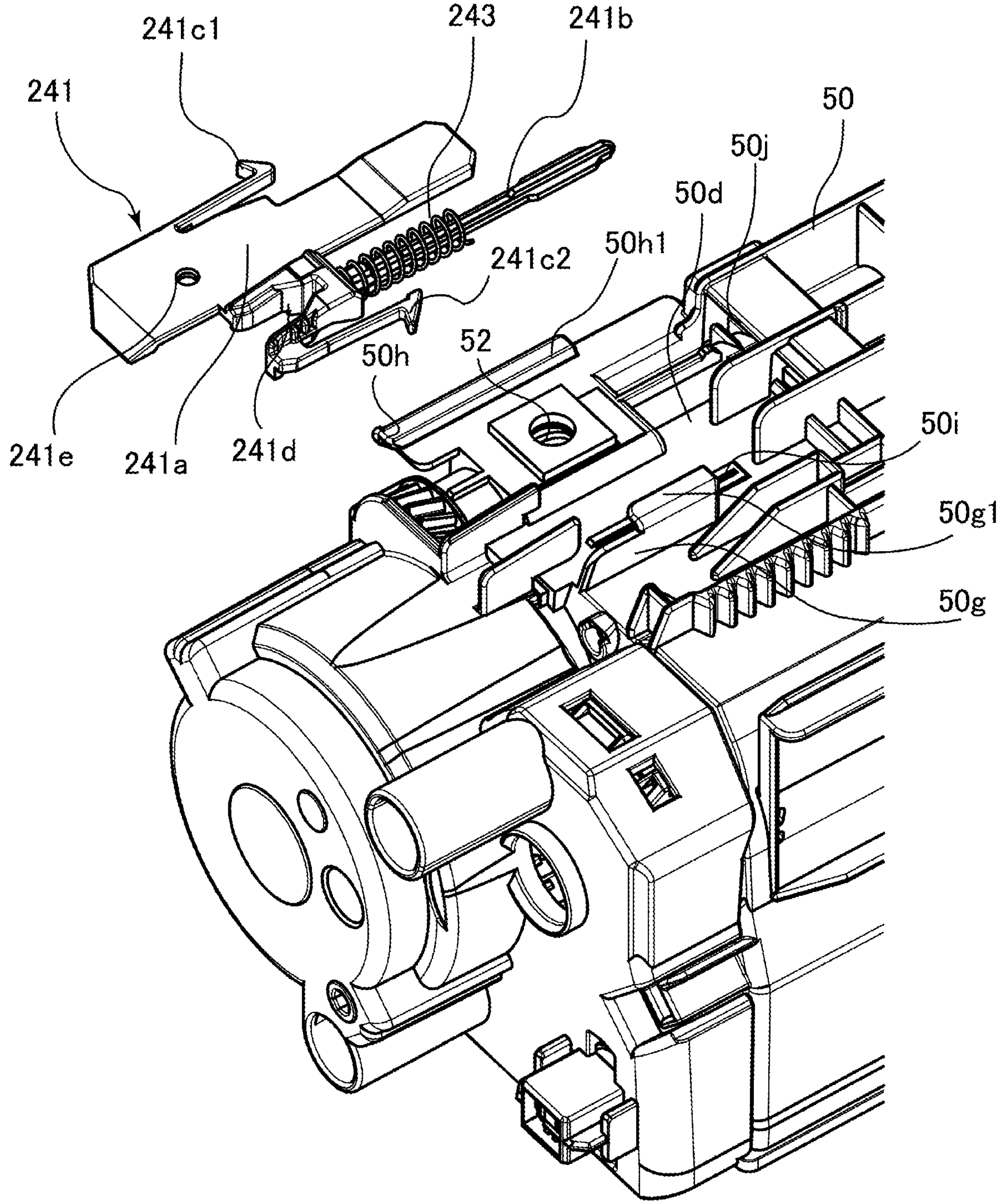

FIG. 18 is a perspective view illustrating a shutter member and peripheral structures thereof.

Figure 19:
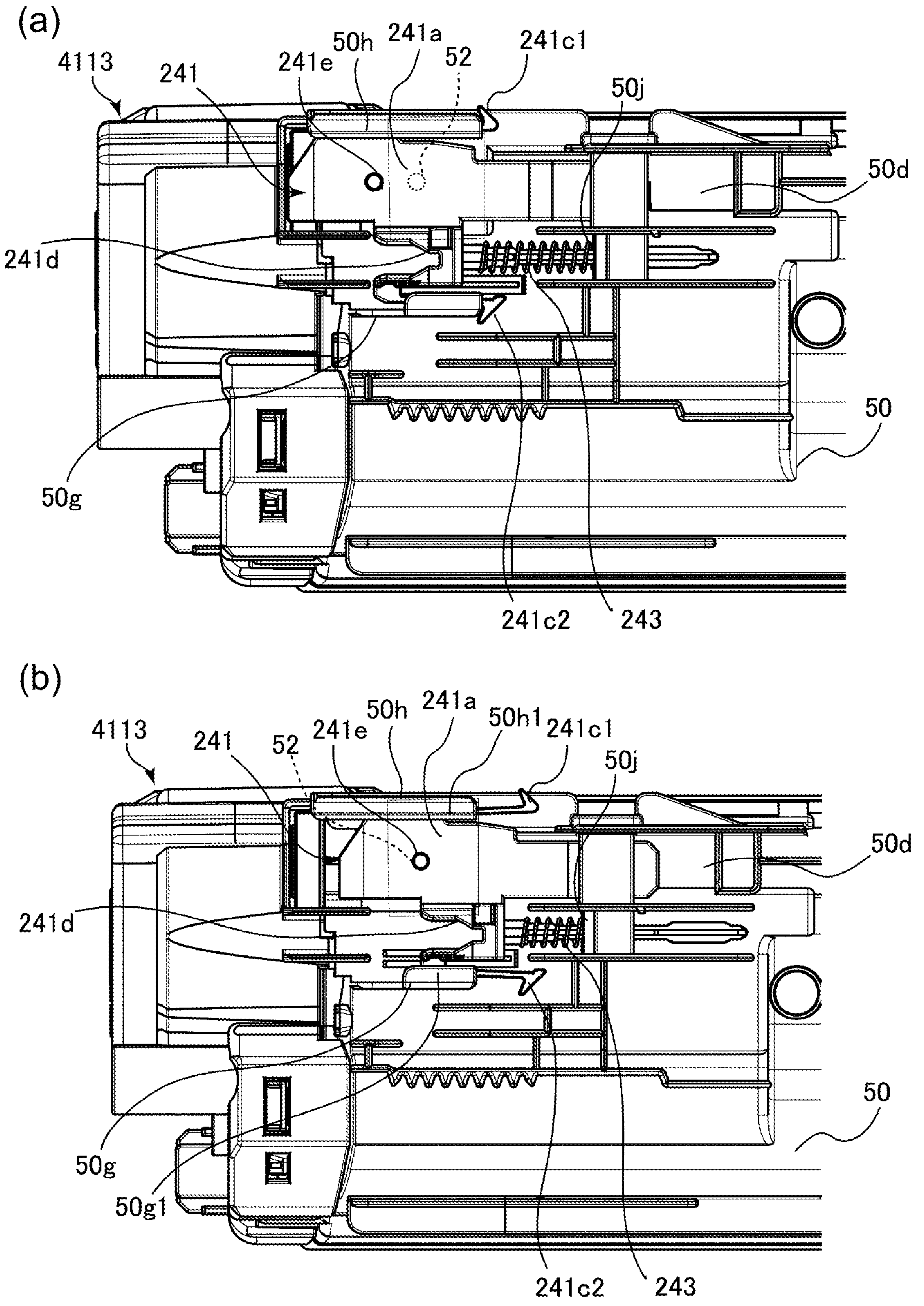

Part (a) of FIG. 19 is a bottom view of the shutter member positioned at the opening position, and part (b) of FIG. 19 is a bottom view of the shutter member positioned at the closing position.

Figure 20:
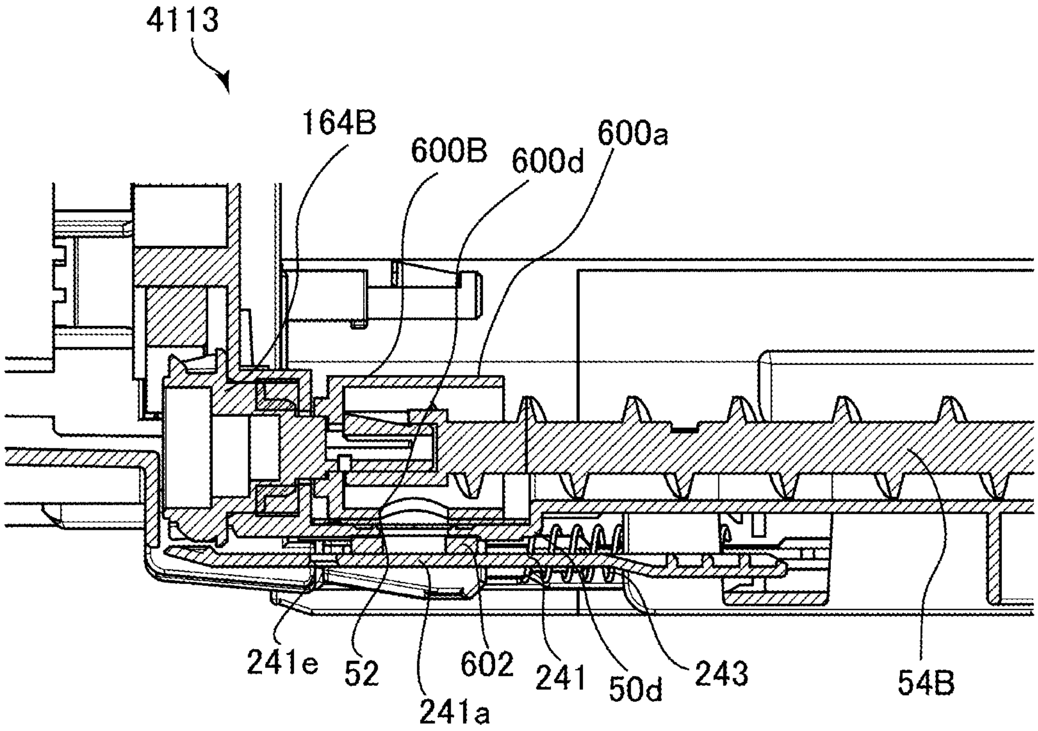
Figure 20:
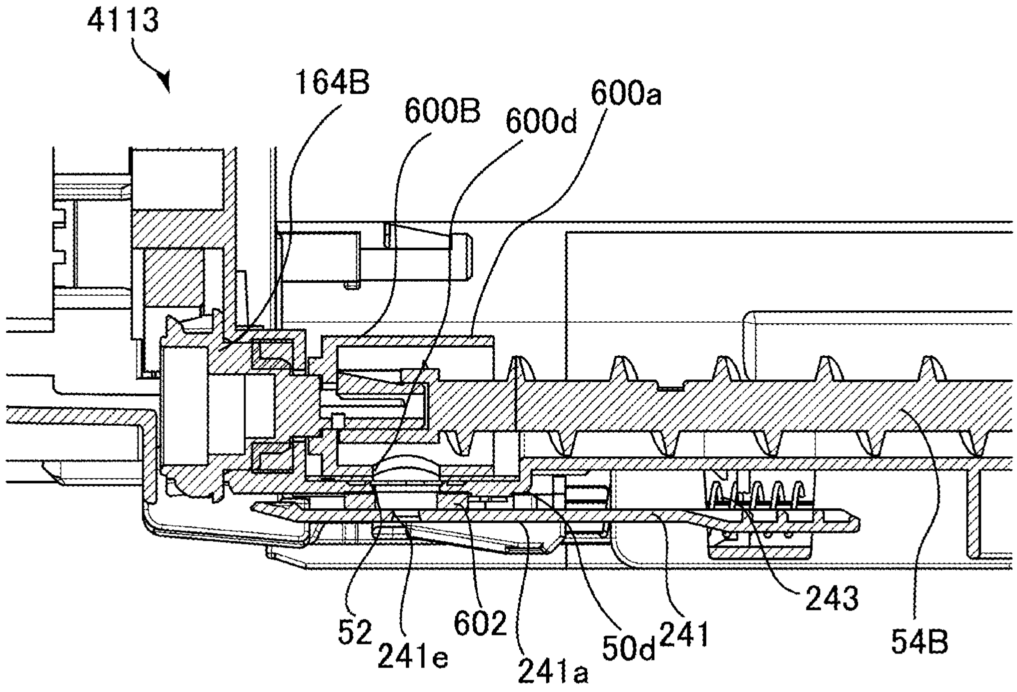

Part (a) of FIG. 20 is a sectional view of the shutter member positioned at the closing position, and part (b) of FIG. 20 is a sectional view of the shutter member positioned at the opening position.

Figure 21:
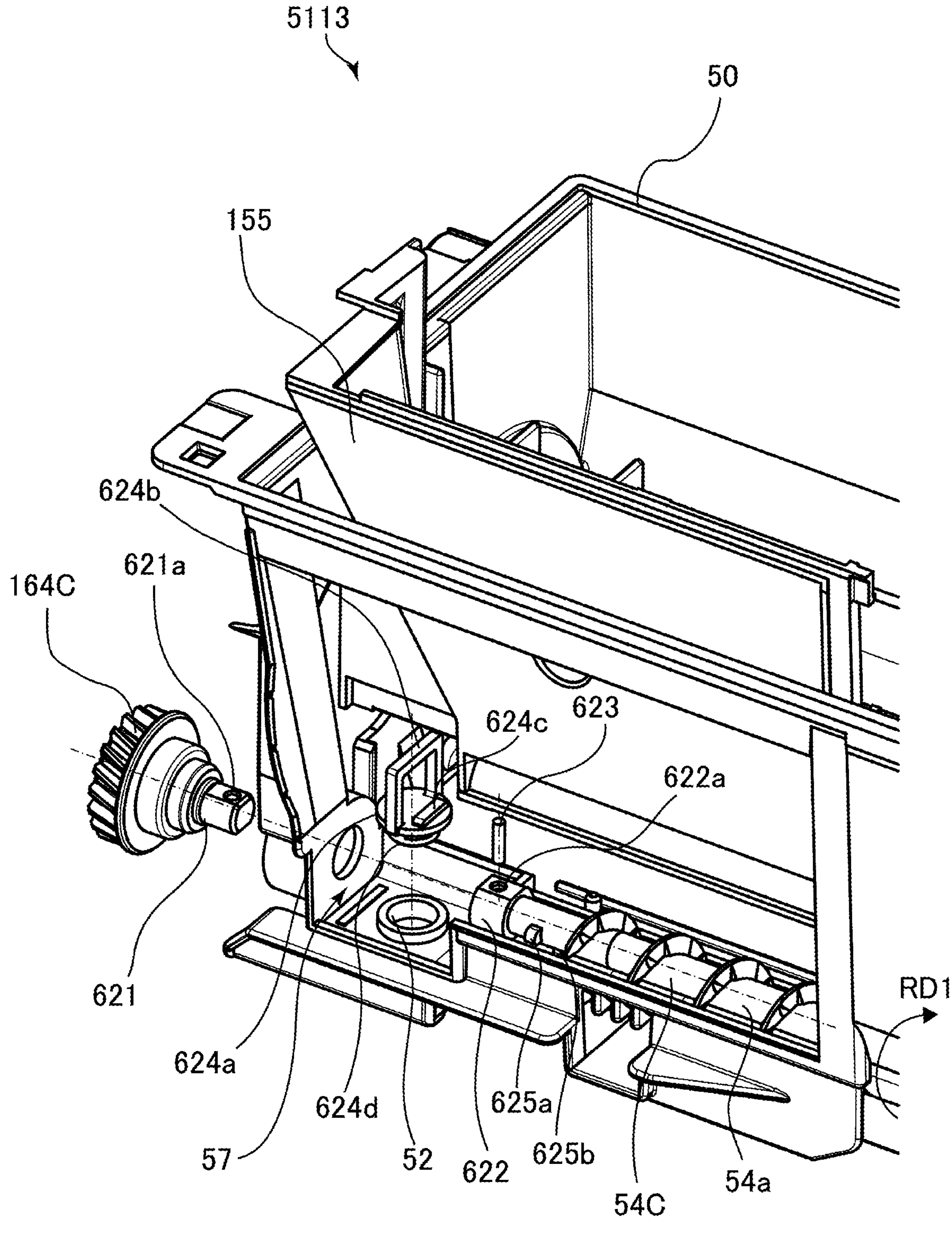

FIG. 21 is a perspective view illustrating an ascending/descending shutter according to Embodiment 3.

Figure 22:
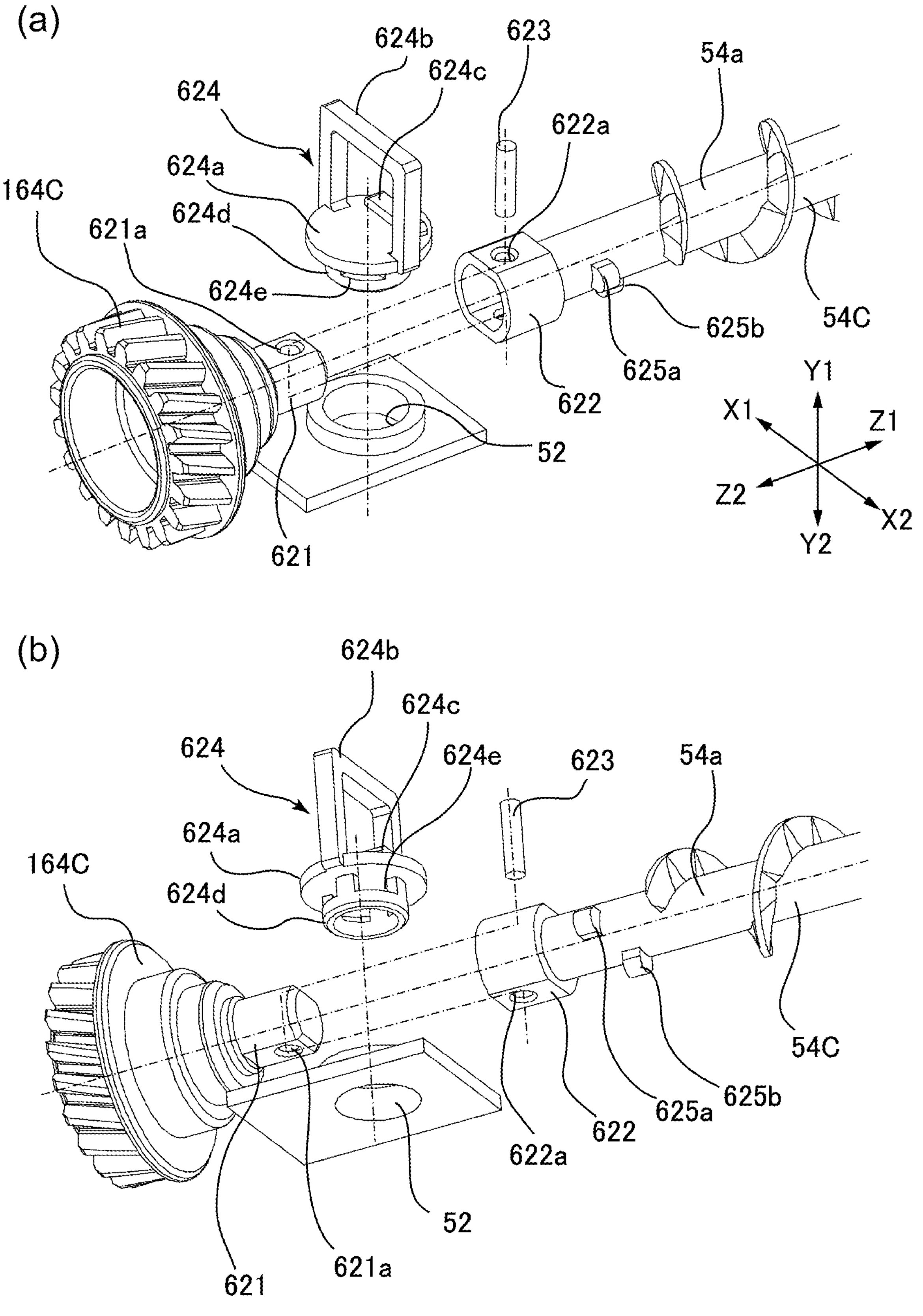

Part (a) of FIG. 22 is an exploded perspective view of the ascending/descending shutter and peripheral structures thereof, and part (b) of FIG. 22 is an exploded perspective view of the ascending/descending shutter and the peripheral structures thereof.

Figure 23:
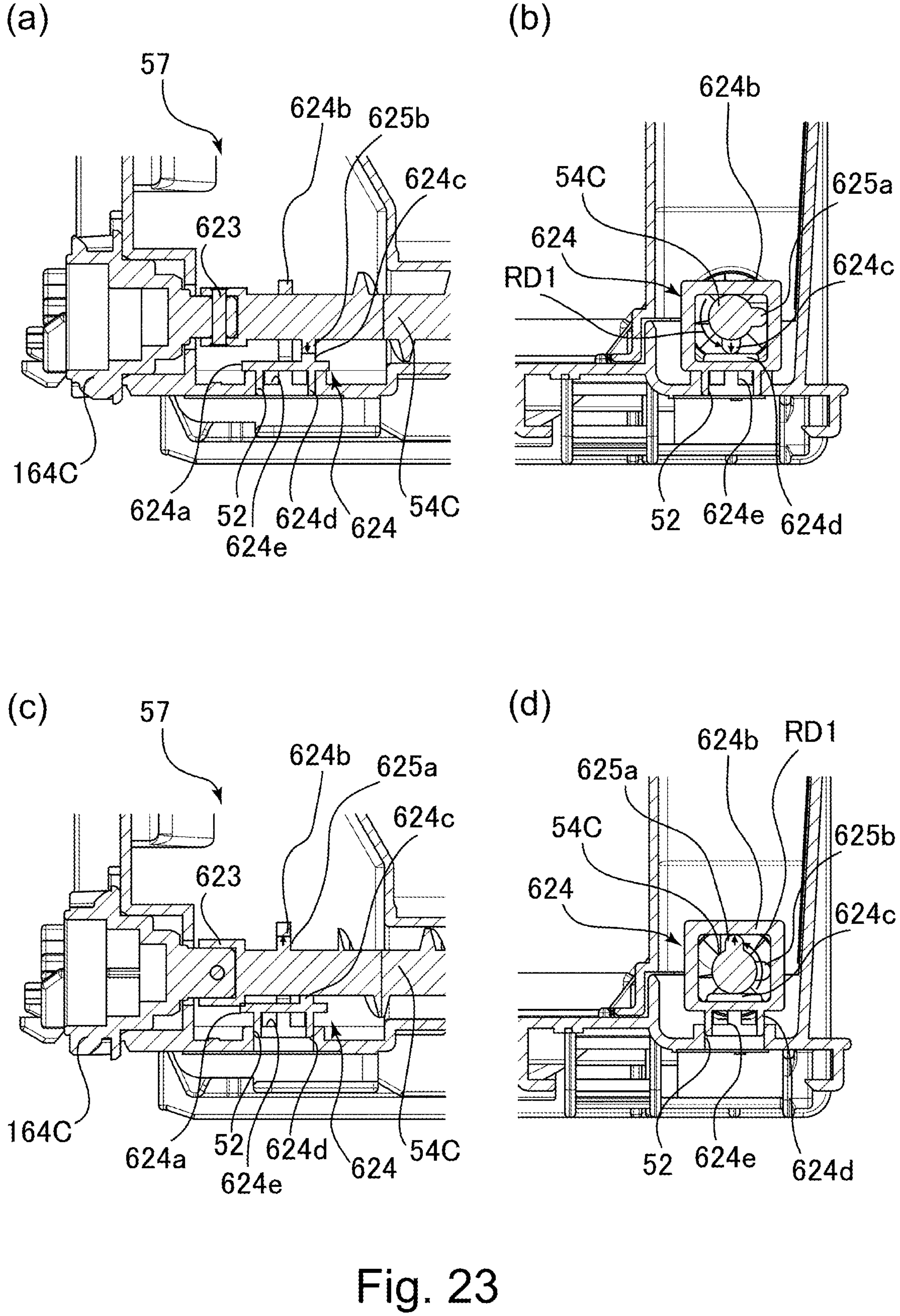

Part (a) of FIG. 23 is a sectional view of the ascending/descending shutter positioned at the closing position, part (b) of FIG. 23 is a sectional view of the ascending/descending shutter positioned at the closing position, part (c) of FIG. 23 is a sectional view of the ascending/descending shutter positioned at the opening position, and part (d) of FIG. 23 is a sectional view of the ascending/descending shutter positioned at the opening position.

Figure 24:
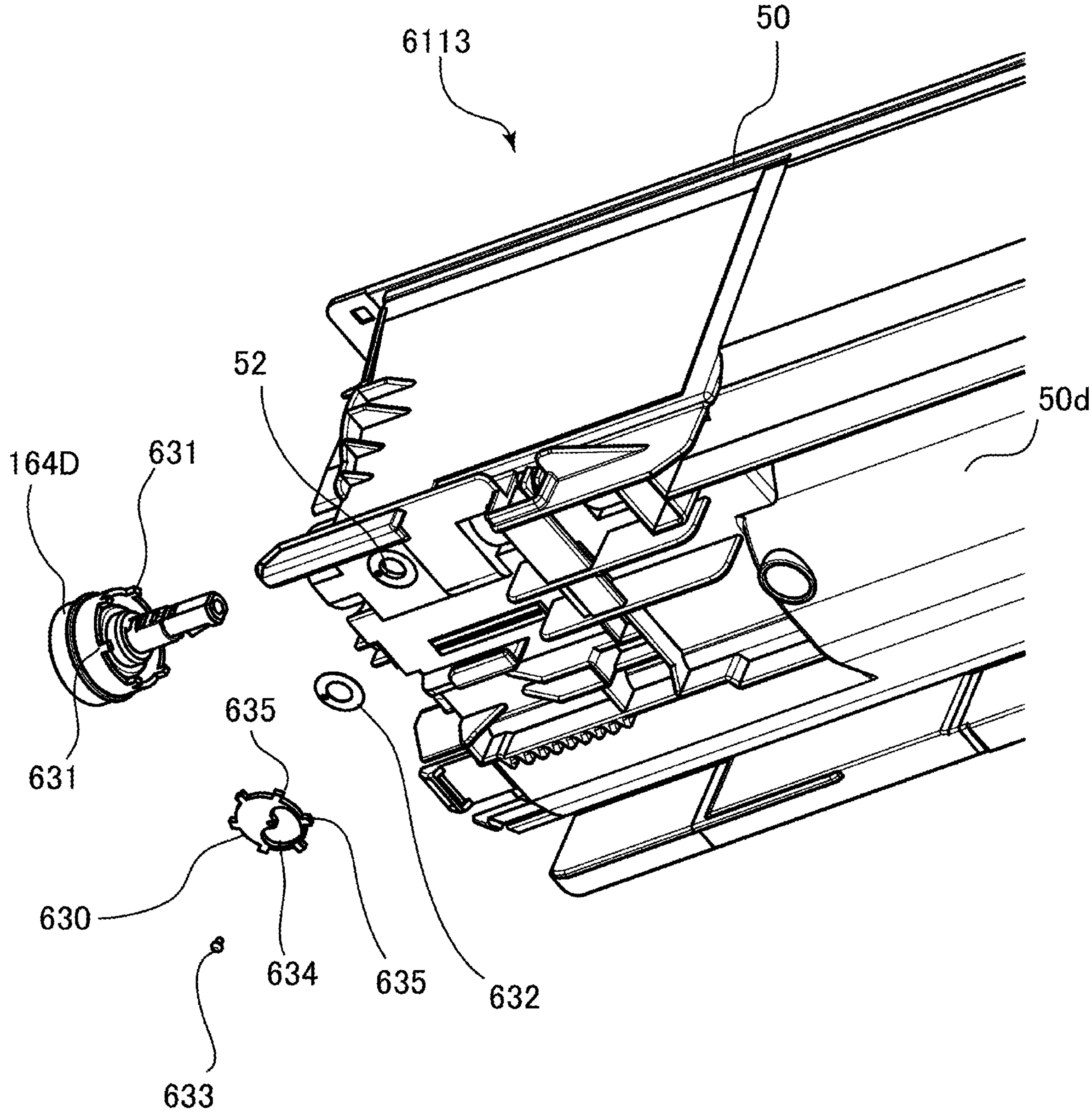

FIG. 24 is a perspective view illustrating a gear shutter according to Embodiment 4.

Figure 25:
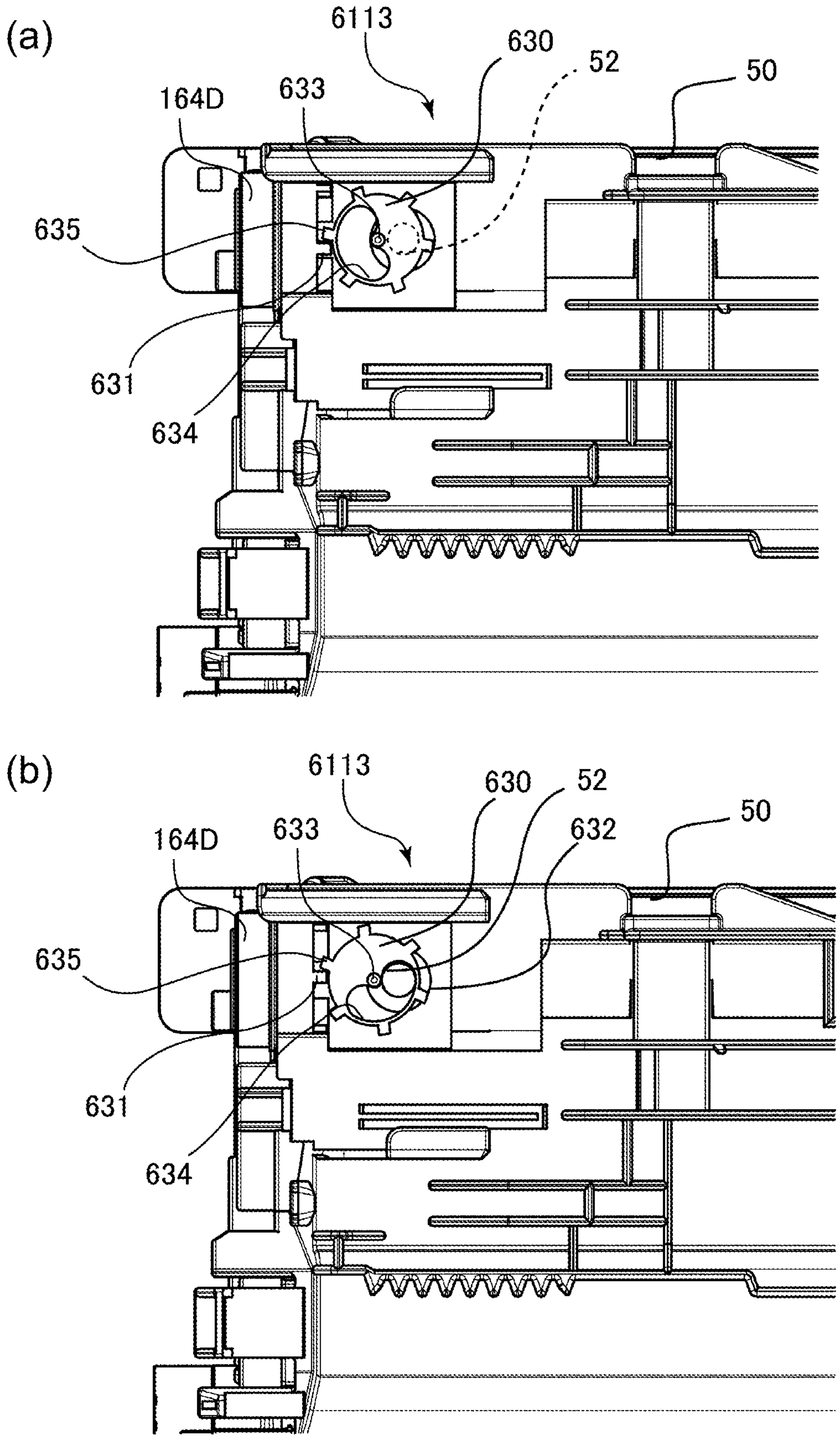

Part (a) of FIG. 25 is a perspective view of the gear shutter positioned at a closing position, and part (b) of FIG. 25 is a perspective view of the gear shutter positioned at an opening position.

Figure 26:
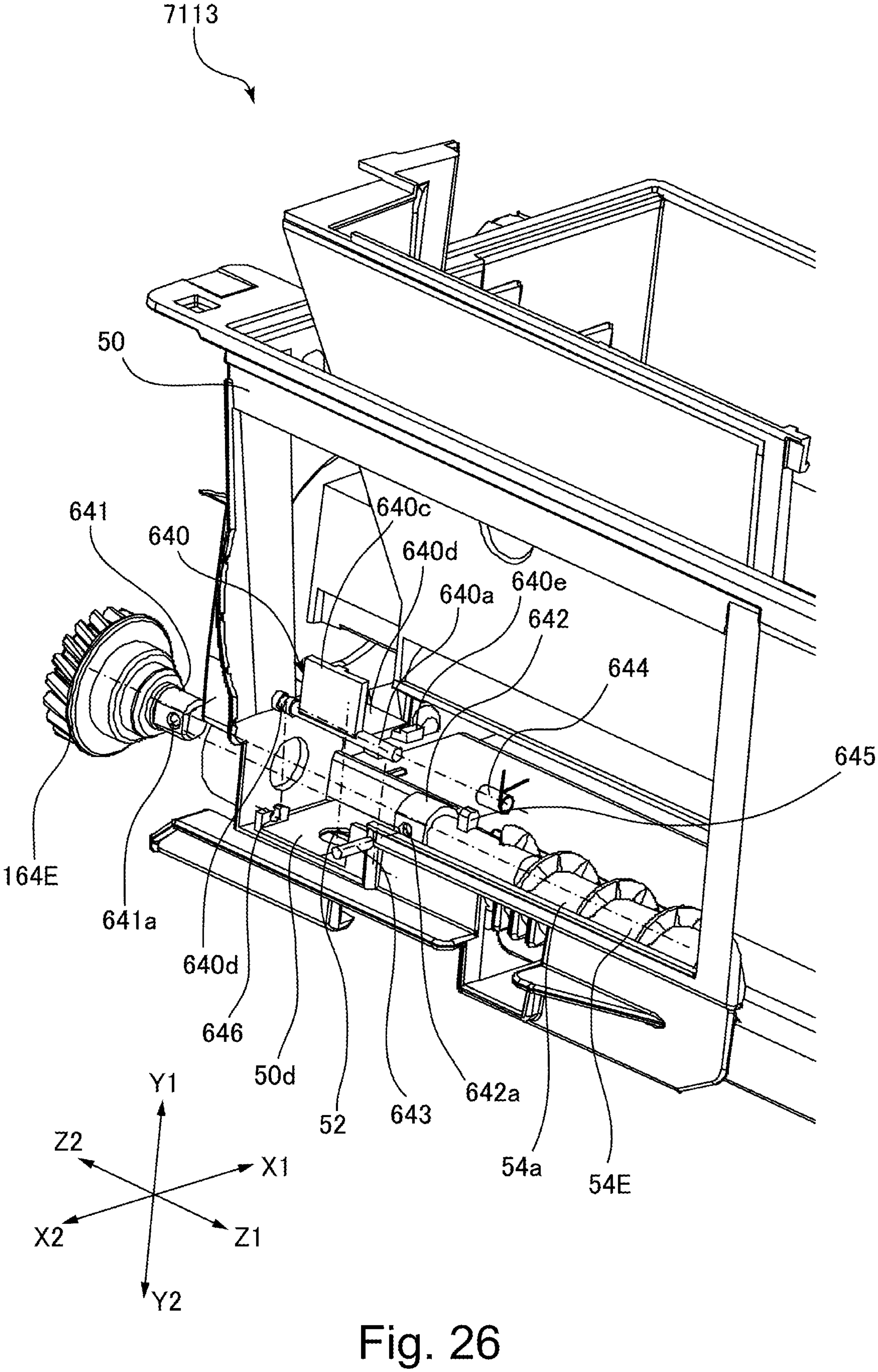

FIG. 26 is a perspective view illustrating a toner cartridge according to Embodiment 5.

Figure 27:
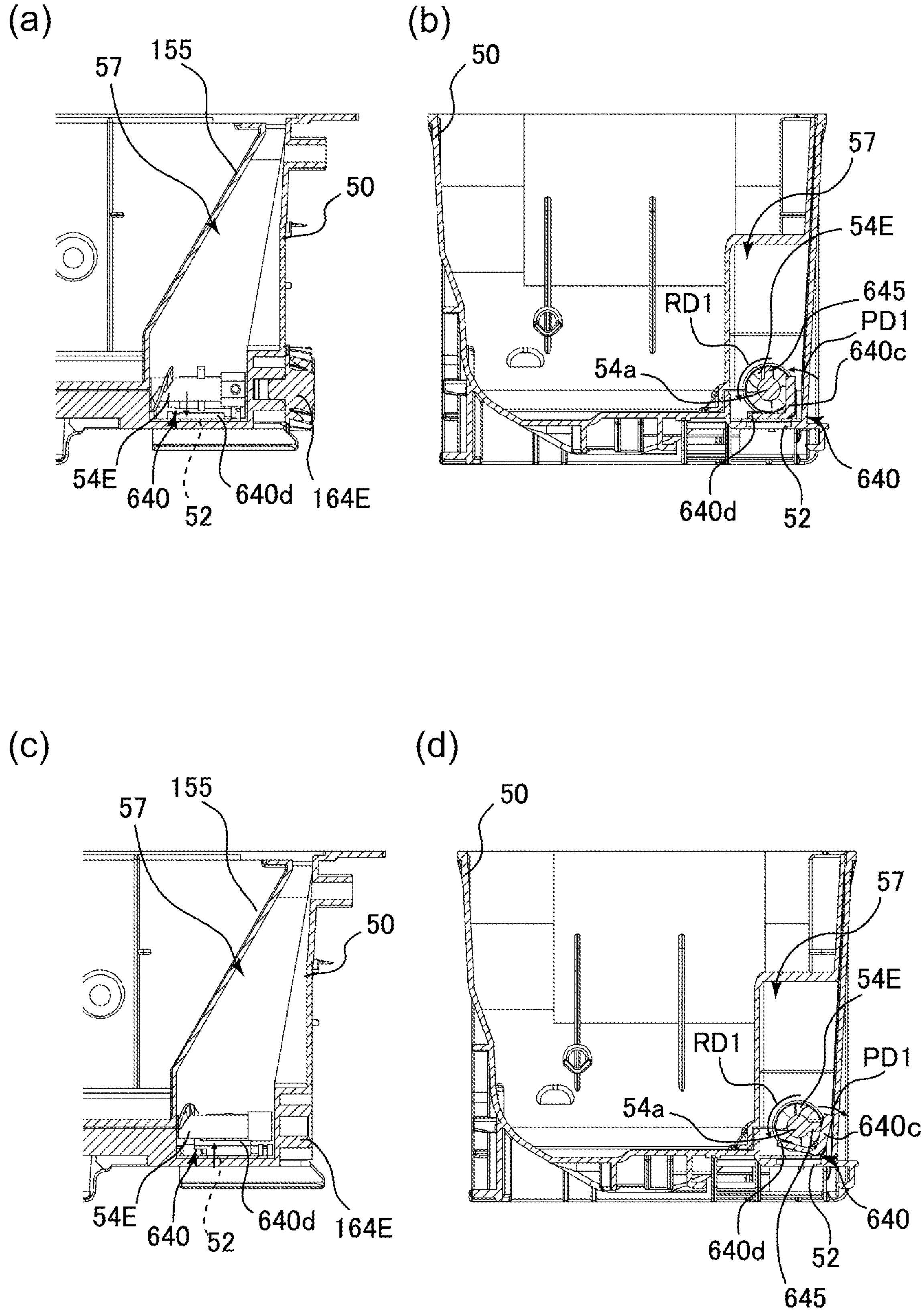

Part (a) of FIG. 27 is a sectional view illustrating a rotational shutter positioned at a closing position, part (b) of FIG. 27 is a sectional view of the rotational shutter positioned at the closing position, part (c) of FIG. 27 is a sectional view of the rotary shutter positioned at an opening position, and part (d) of FIG. 27 is a sectional view illustrating the moving shutter, and part (d) of FIG. 27 is a cross-sectional view illustrating the up-down shutter positioned at the rotating position.

Figure 28:
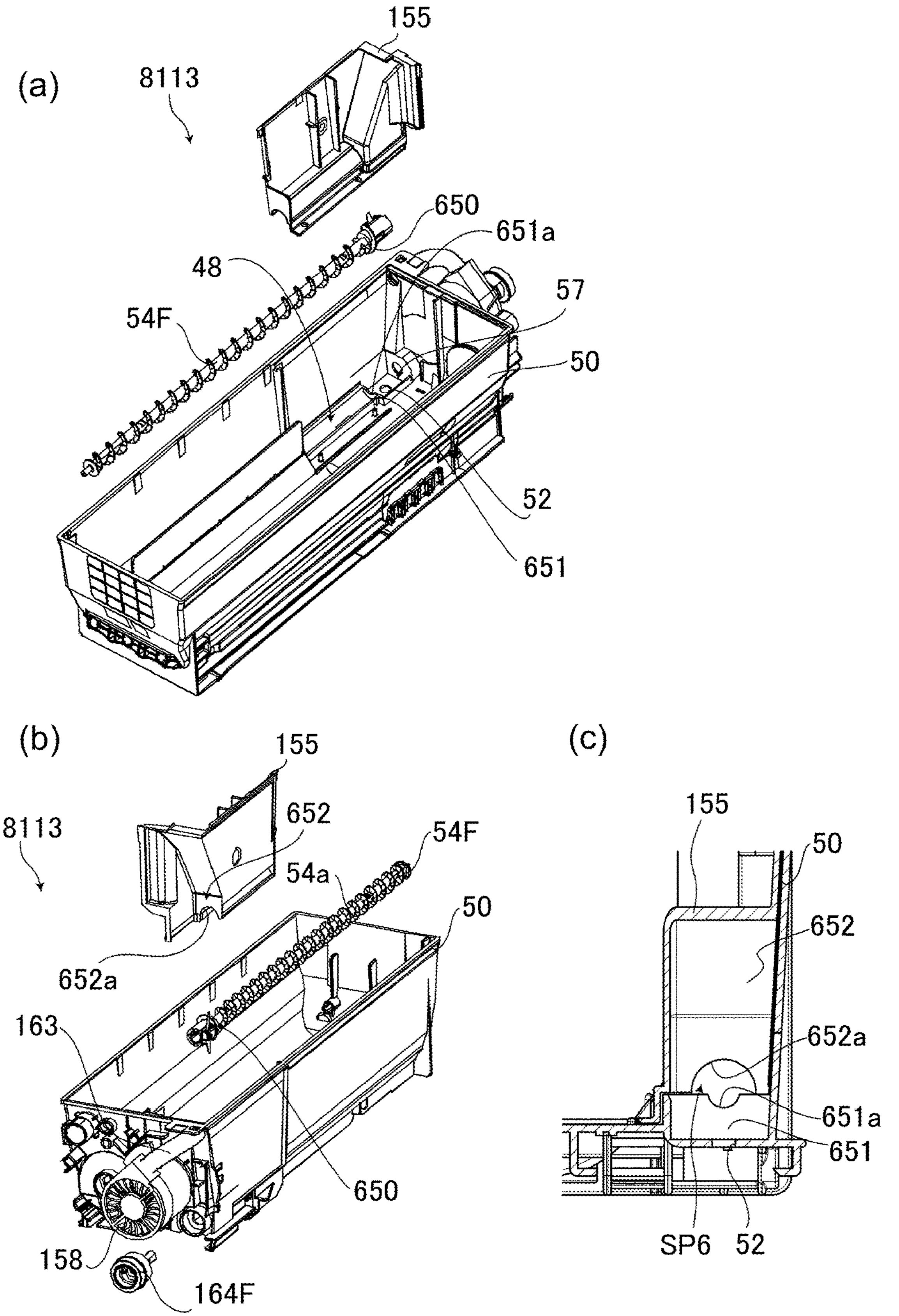

Part (a) of FIG. 28 is an exploded perspective view illustrating a toner cartridge according to Embodiment 6, part (b) of FIG. 28 is another exploded perspective view of the toner cartridge according to Embodiment 6 and, part (c) of FIG. 28 is a sectional view of the toner cartridge according to Embodiment 6.

Figure 29:
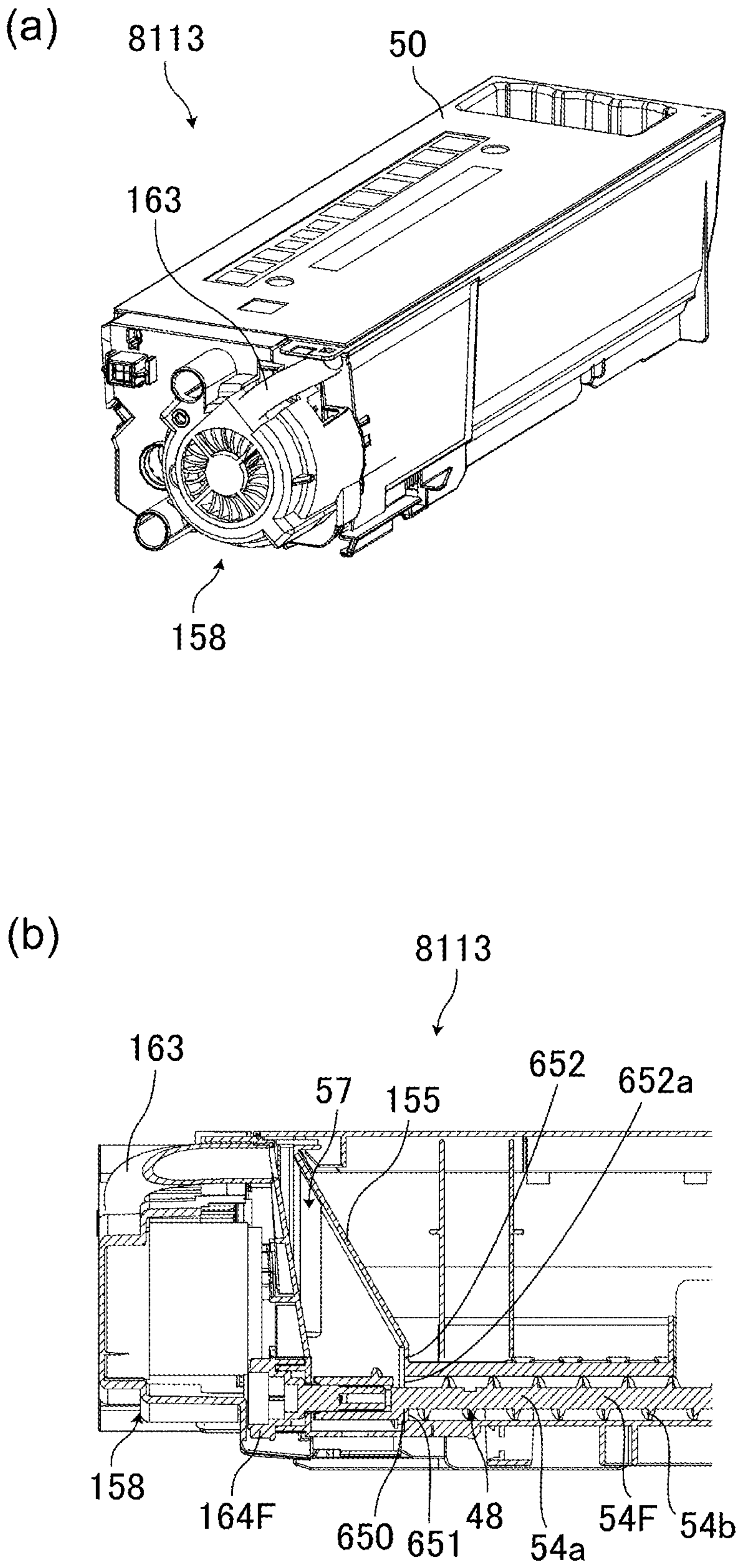

Part (a) of FIG. 29 is a perspective view of the toner cartridge, and part (b) of FIG. 29 is a sectional view of the toner cartridge.

Figure 30:
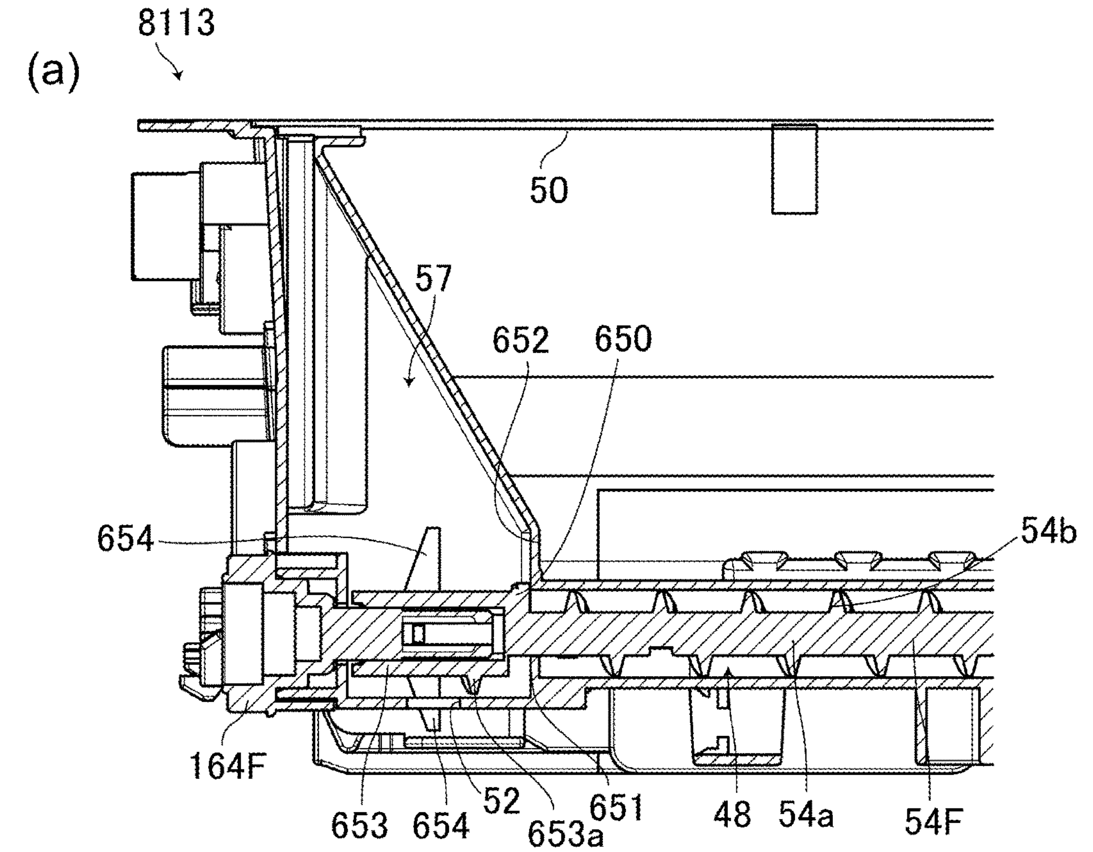
Figure 30:
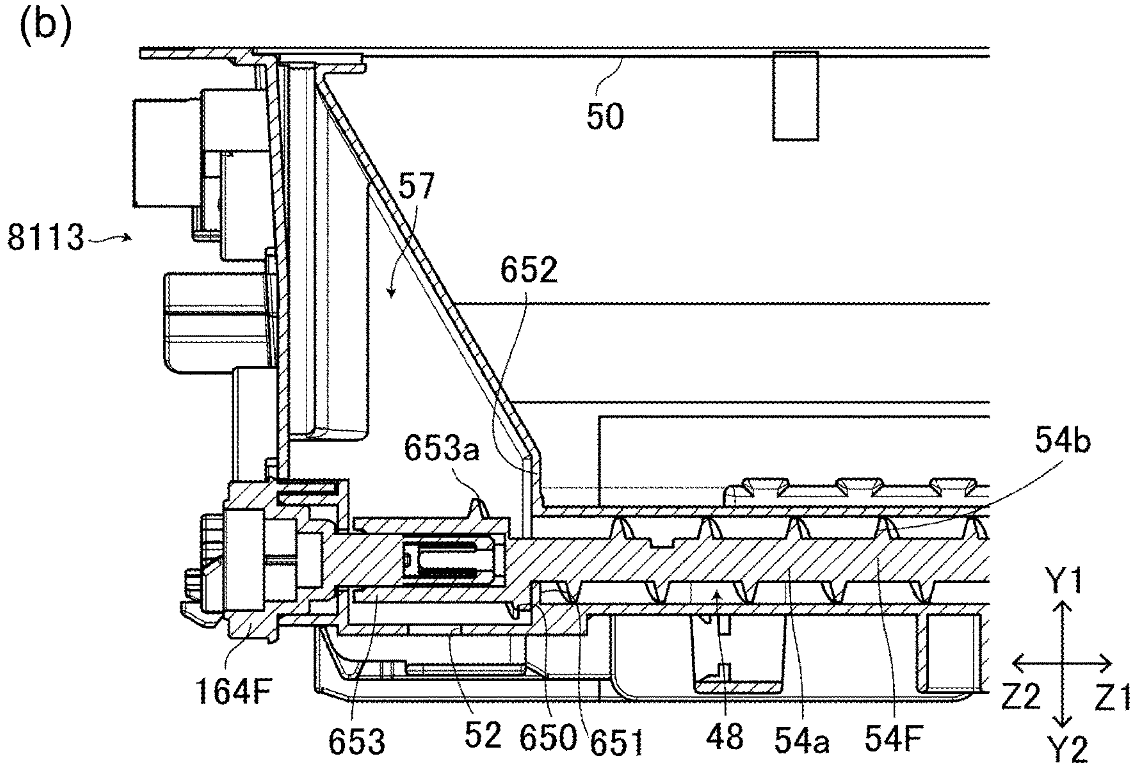

Part (a) of FIG. 30 is a sectional view illustrating a sealing member positioned at a closing position, and part (b) of FIG. 30 is a sectional view of the sealing member positioned at an opening position.

Figure 31:
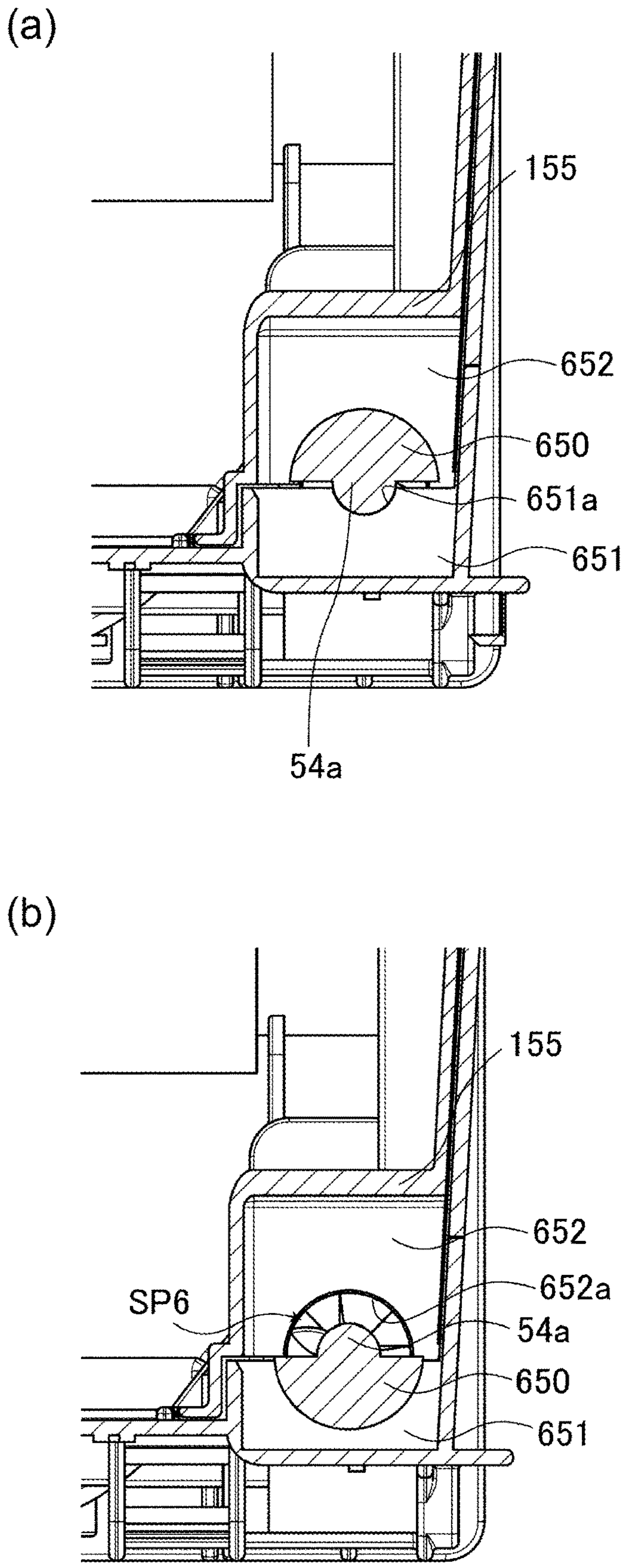

Part (a) of FIG. 31 is a cross-sectional view of the sealing member positioned at the closing position, and part (b) of FIG. 31 is a cross-sectional view of the sealing member positioned at the opening position.

Figure 32:
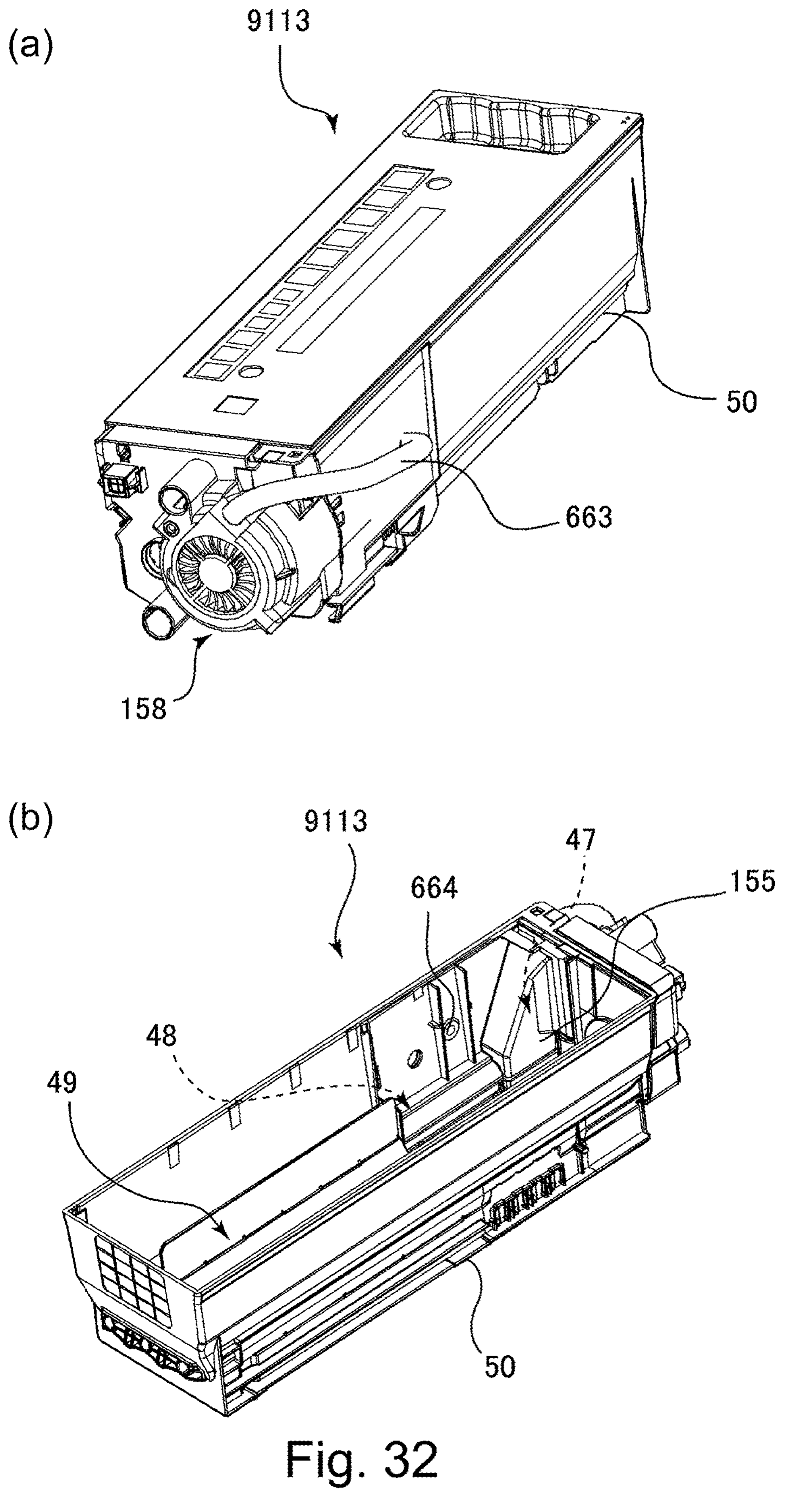

Part (a) of FIG. 32 is a perspective view illustrating a toner cartridge according to Embodiment 7, and part (b) of FIG. 32 is a perspective view of the toner cartridge.

Figure 33:
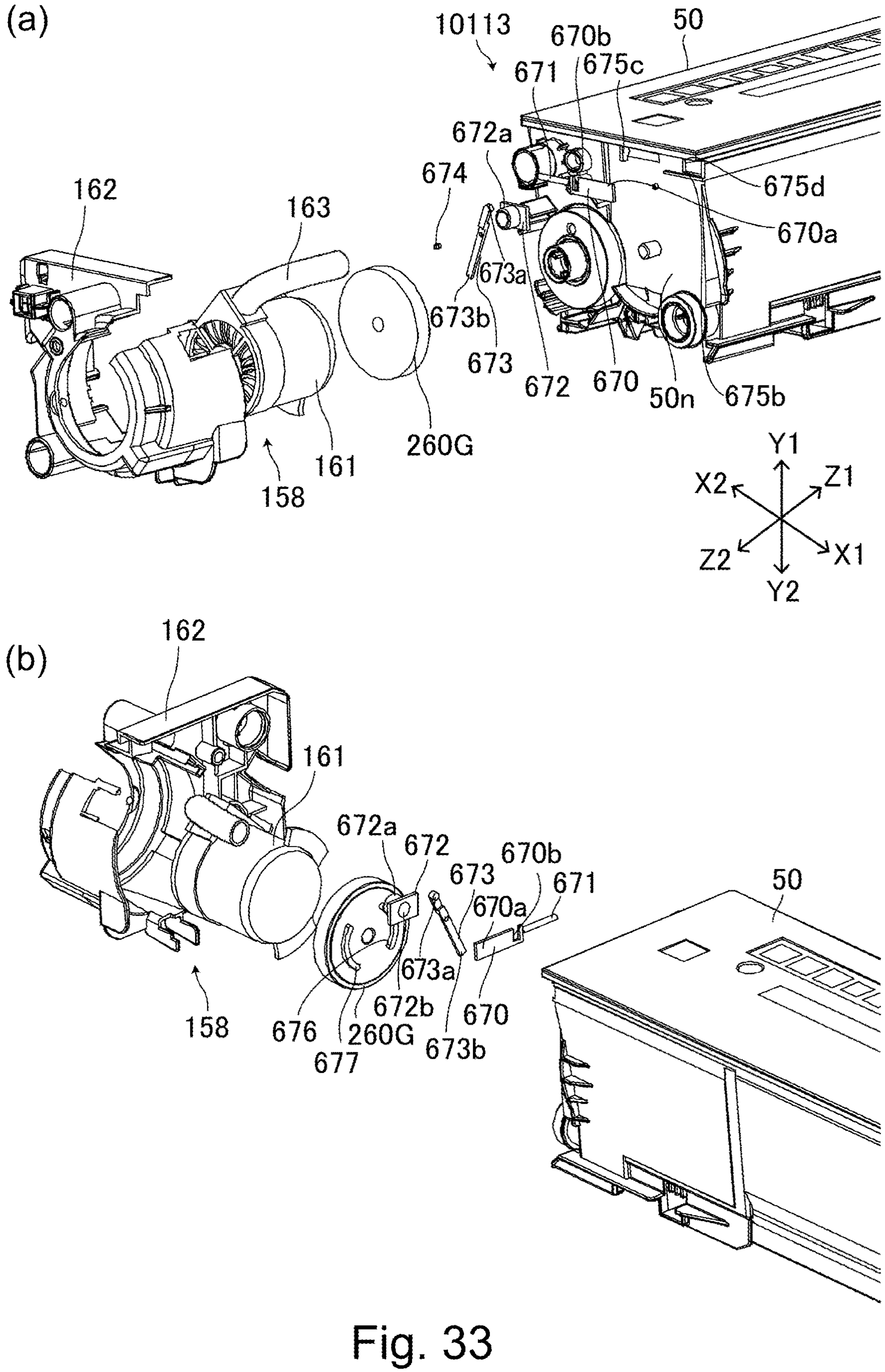

Part (a) of FIG. 33 is an exploded perspective view illustrating a toner cartridge according to Embodiment 8, and part (b) of FIG. 33 is another exploded perspective view of the toner cartridge according to Embodiment 8.

Figure 34:
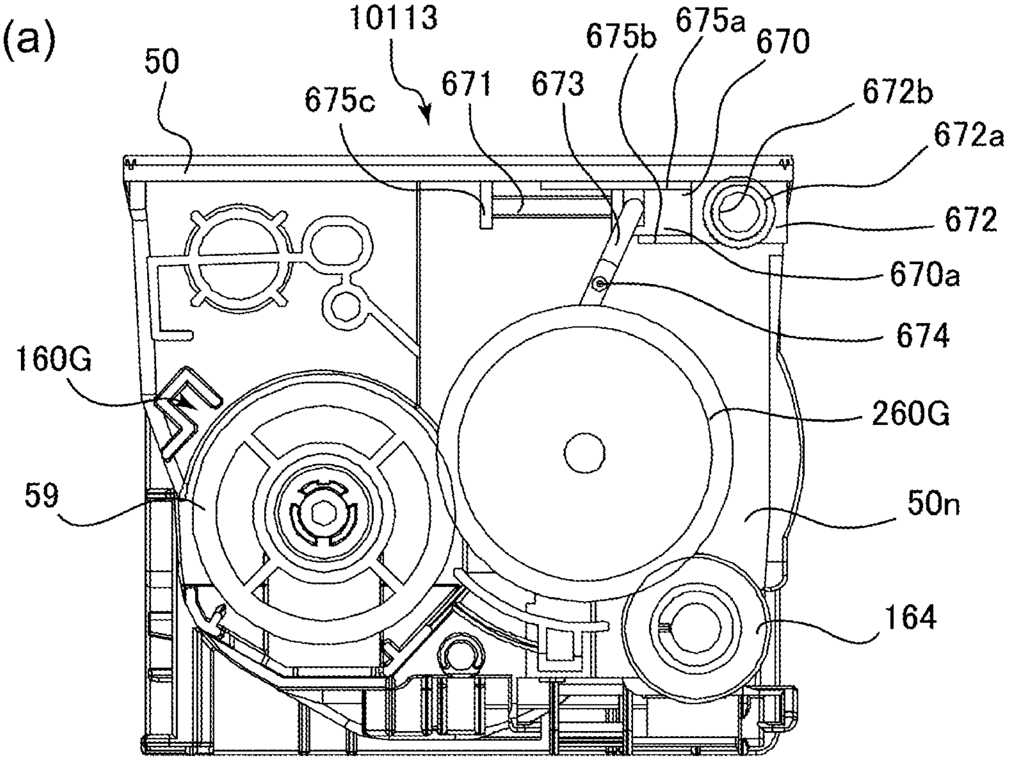
Figure 34:
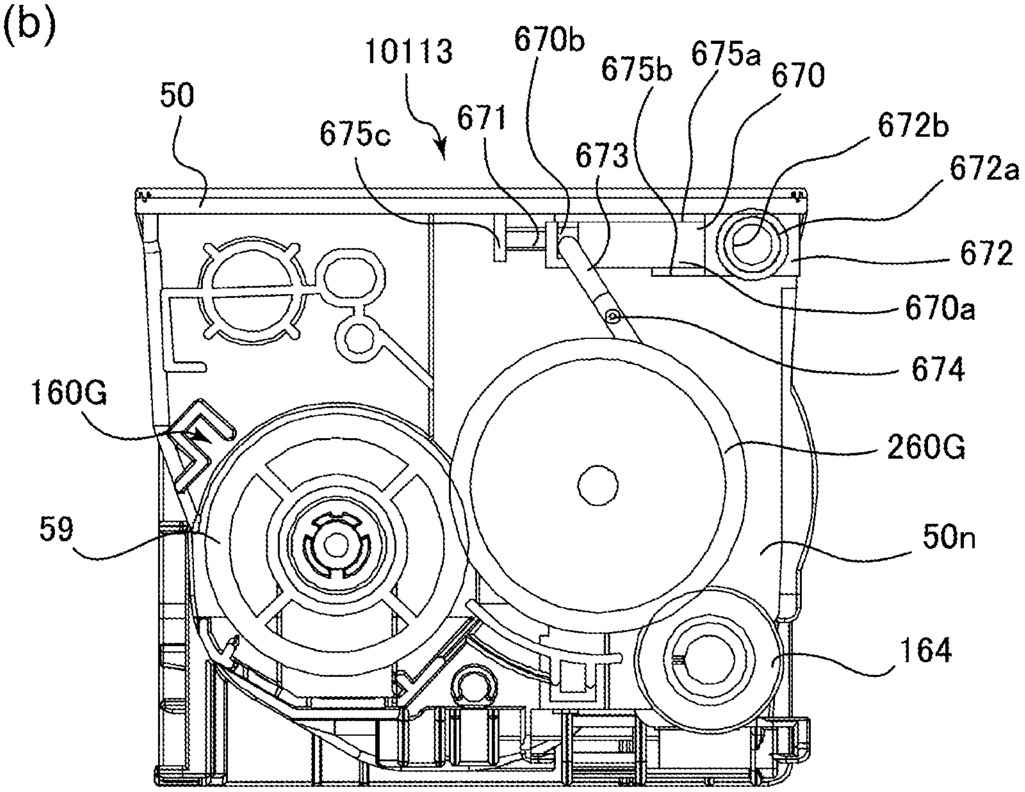

Part (a) of FIG. 34 is a front view illustrating a driving structure of a duct shutter, and part (b) of FIG. 34 is a front view of the driving structure of the duct shutter.

Figure 35:
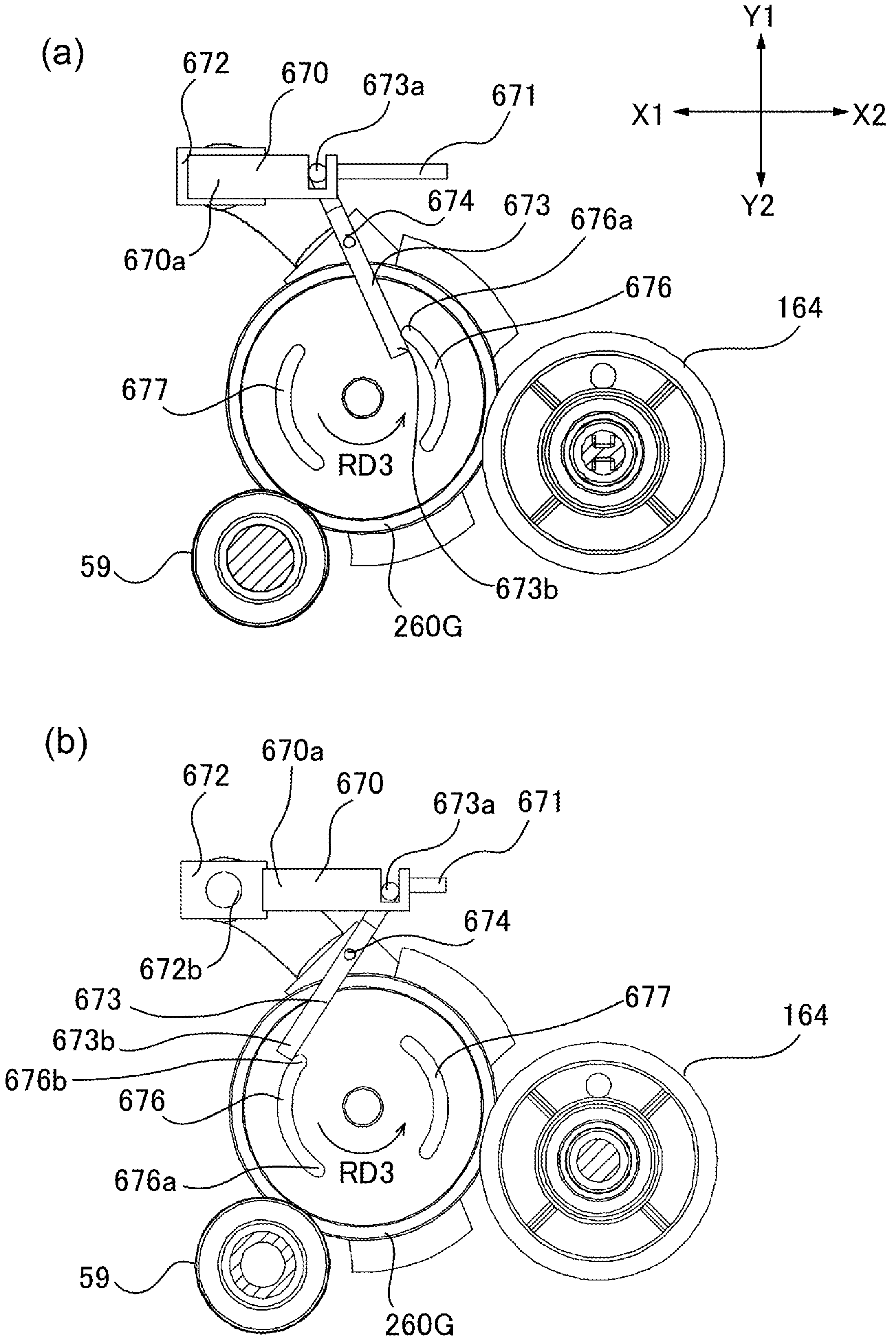

Part (a) of FIG. 35 is a rear view of the duct shutter positioned at a closing position and peripheral structures thereof, and part (b) of FIG. 35 is a rear view of the duct shutter positioned at the opening position and its peripheral structure.

Figure 36:
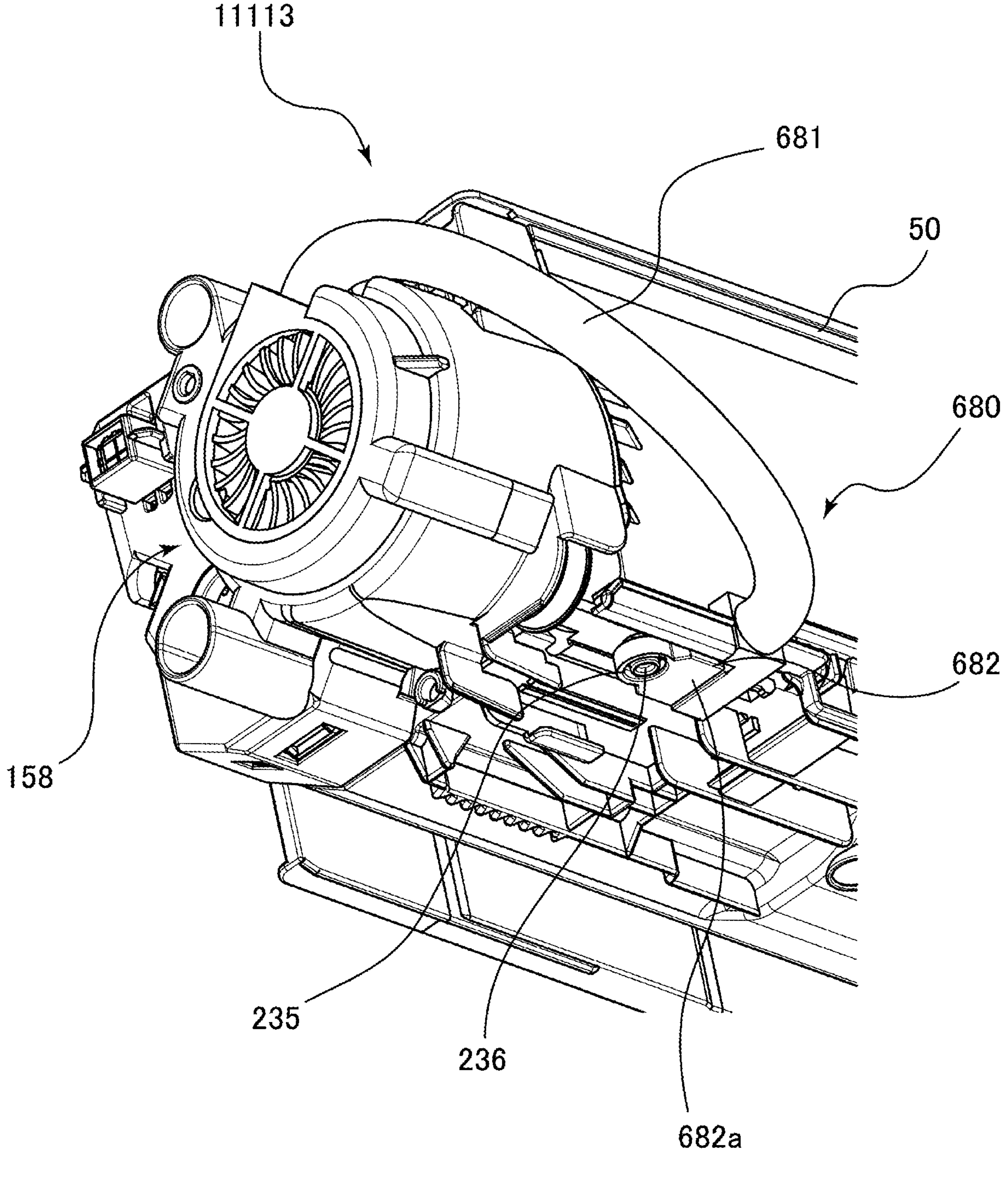

FIG. 36 is a perspective view illustrating a duct in Embodiment 9.

Figure 37:
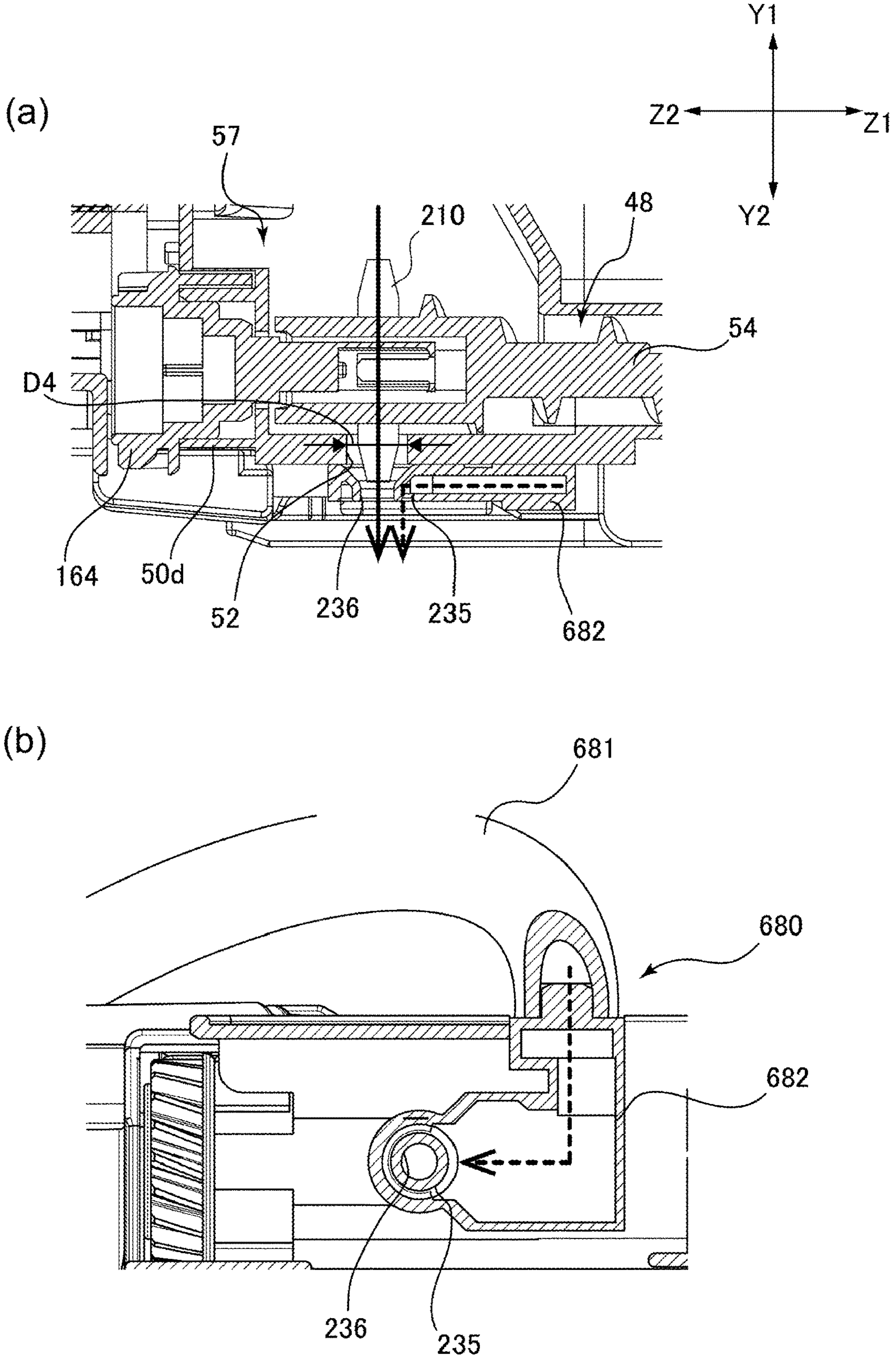

Part (a) of FIG. 37 is a sectional view illustrating the flow of the toner and air, and part (b) of FIG. 37 is a sectional view of the duct.

Figure 38:
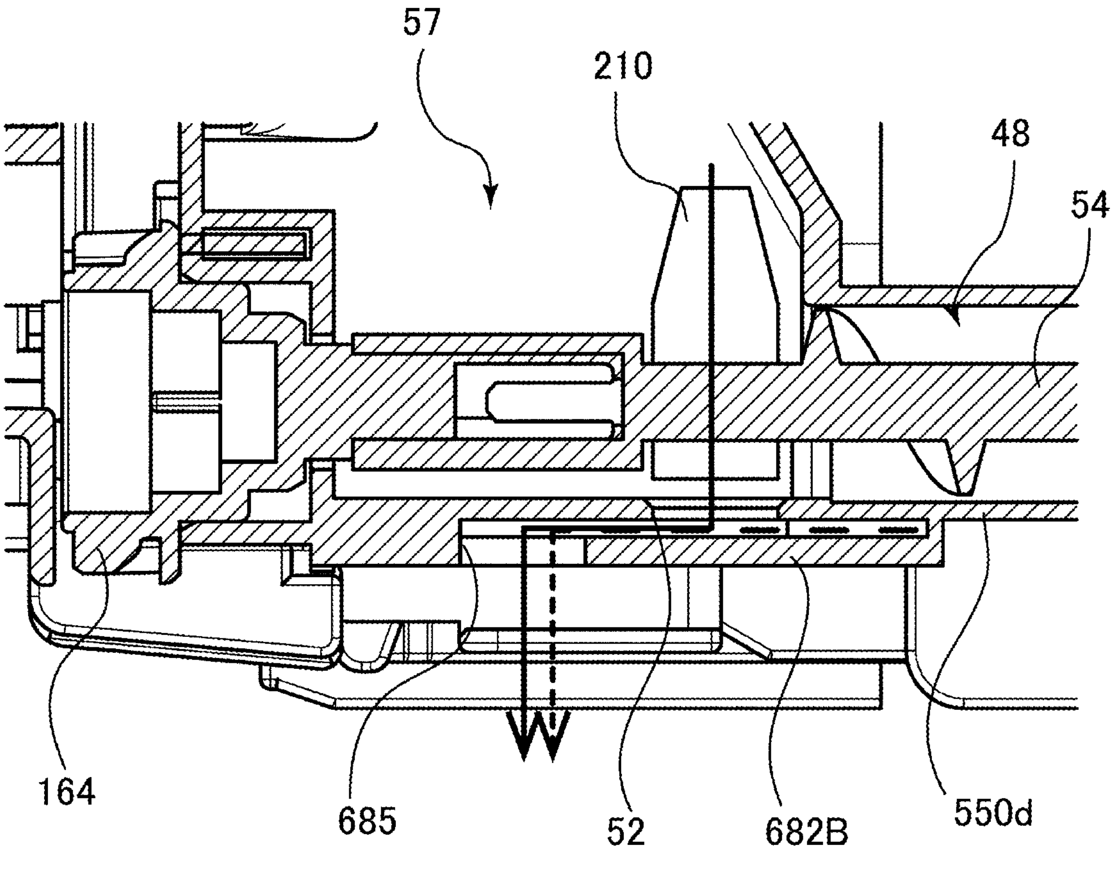

FIG. 38 is a sectional view illustrating the flow of the toner and air.

Figure 39:
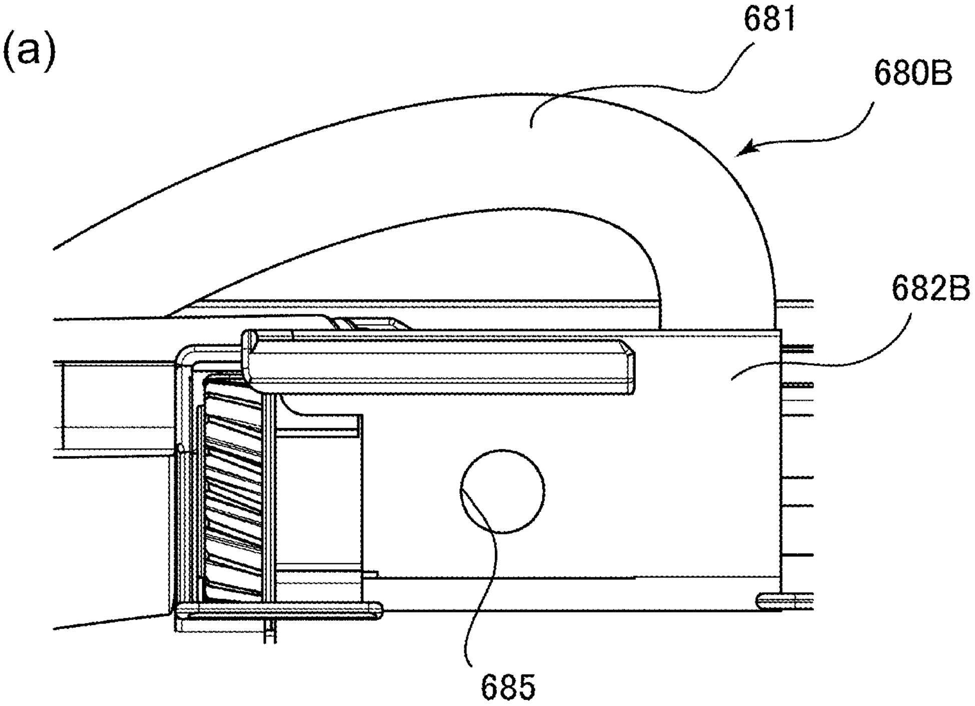
Figure 39:
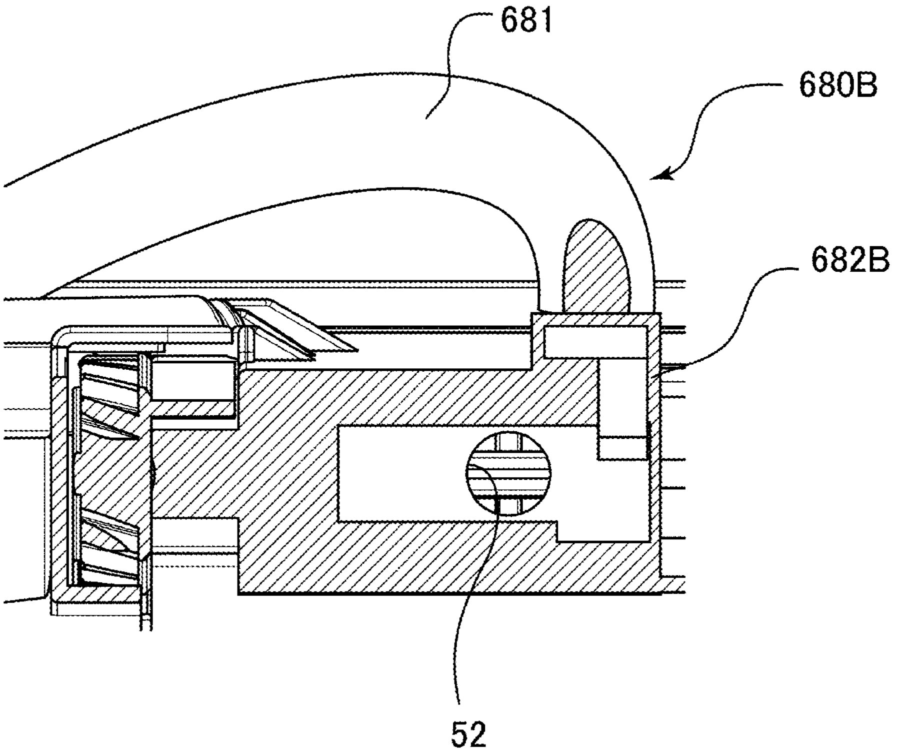

Part (a) of FIG. 39 is a bottom view of the duct, and part (b) of FIG. 39 is a sectional view of the duct.

Figure 40:
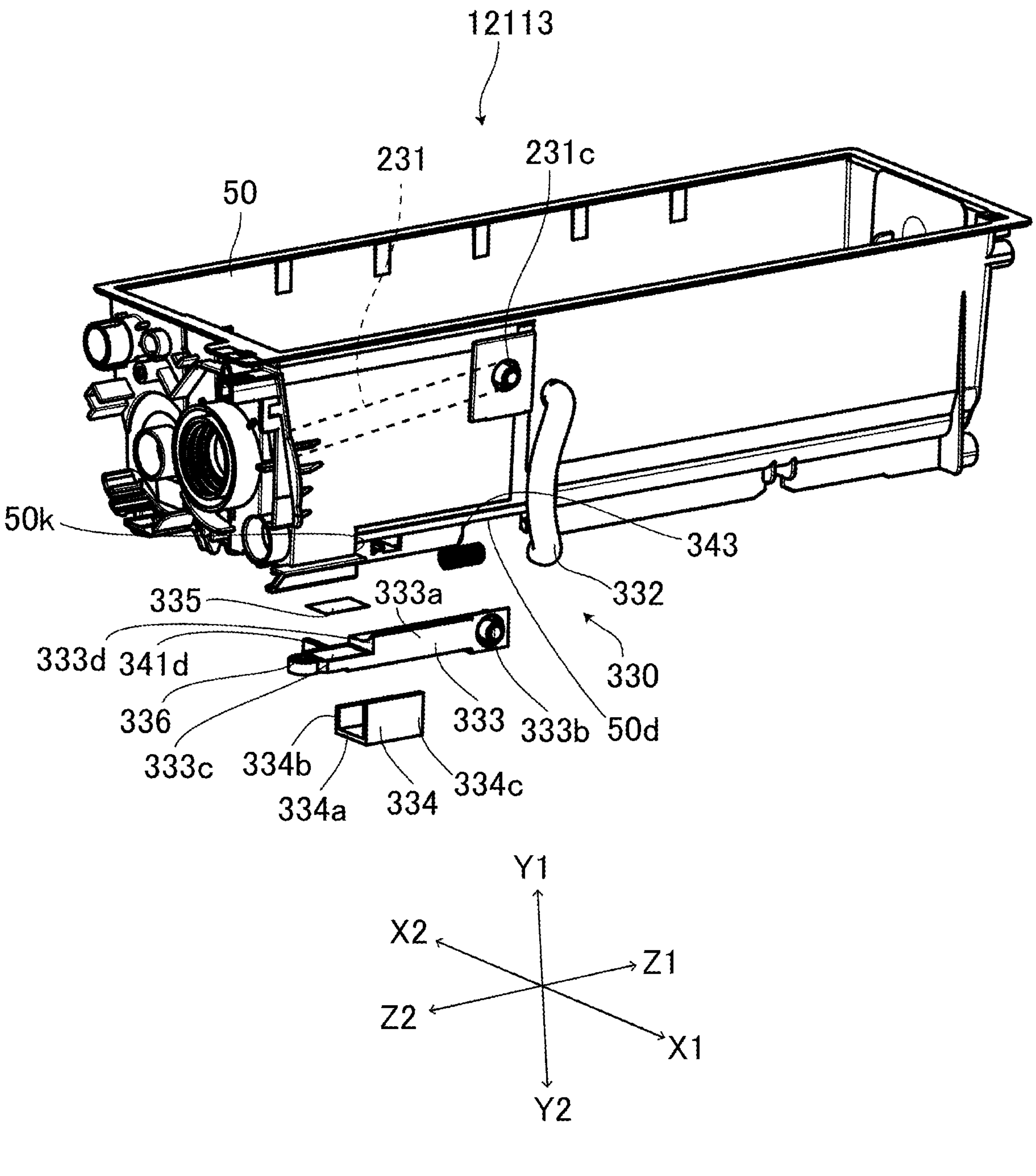

FIG. 40 is an exploded perspective view illustrating a duct in Embodiment 10.

Figure 41:
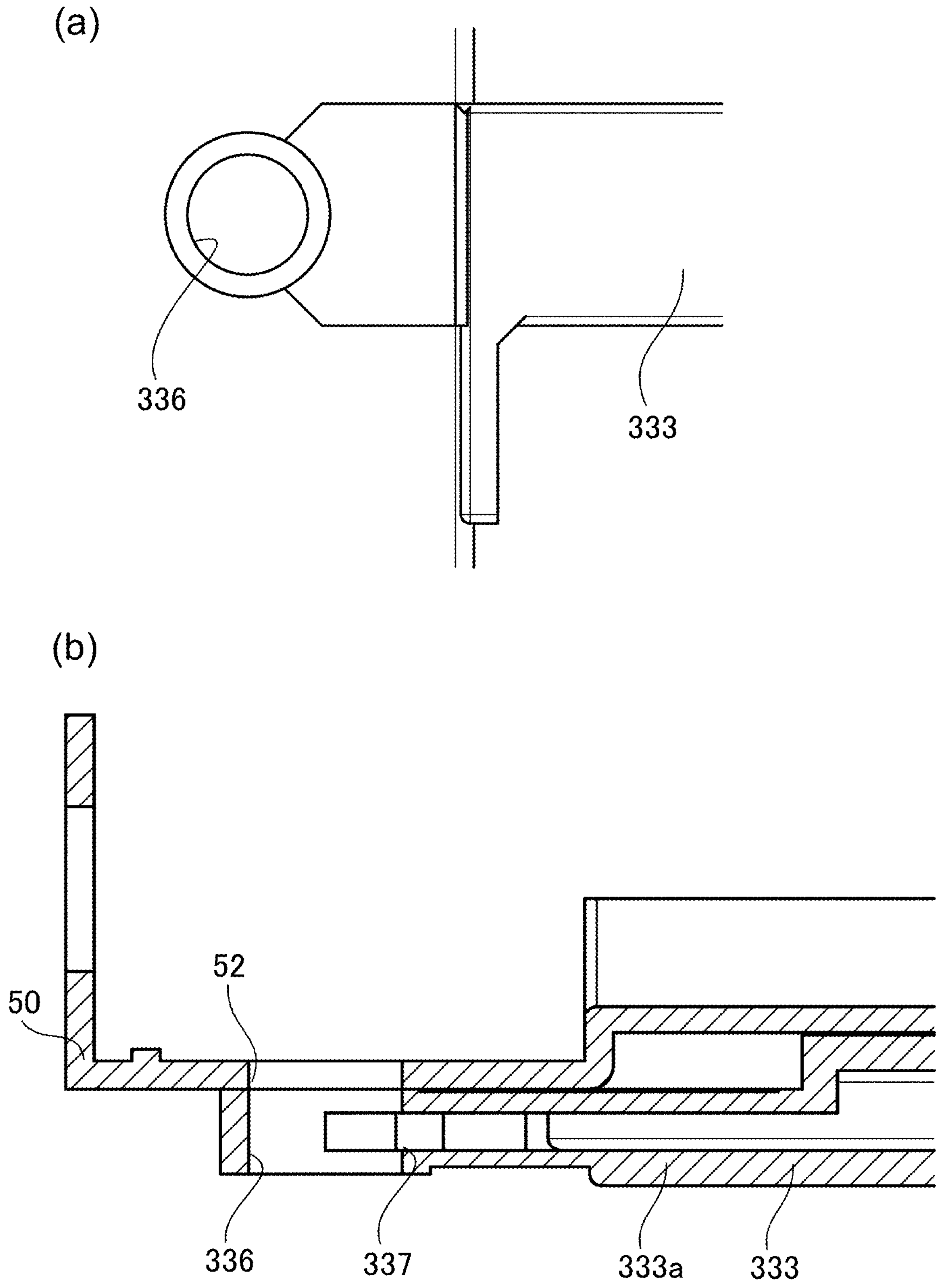

Part (a) of FIG. 41 is a bottom view illustrating the air discharge opening, and part (b) of FIG. 41 is a sectional view illustrating a toner discharge opening and an air discharge opening.

Figure 42:
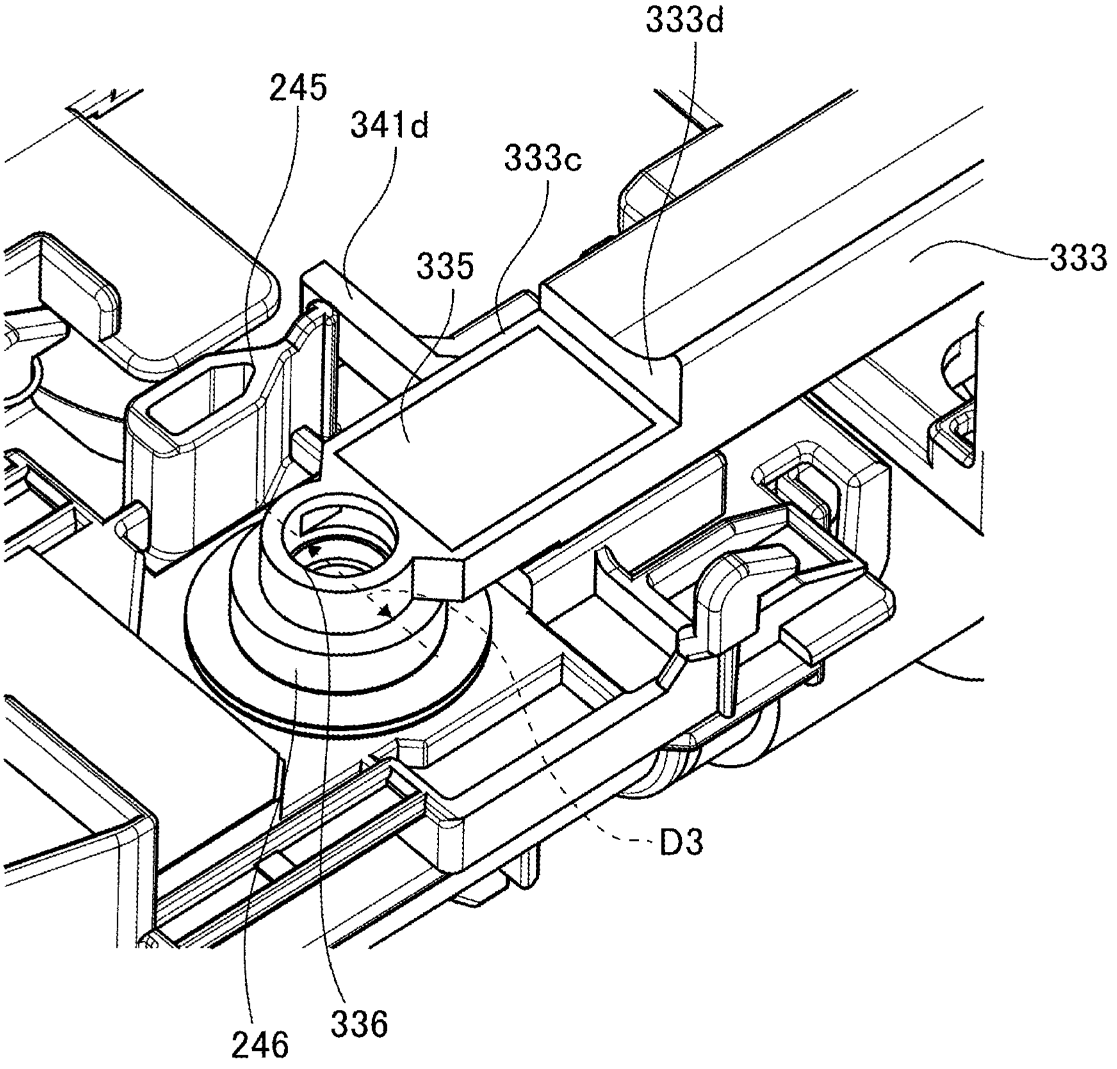

FIG. 42 is a perspective view illustrating a third duct member at the time when the toner cartridge is mounted to the image forming apparatus.

Figure 43:
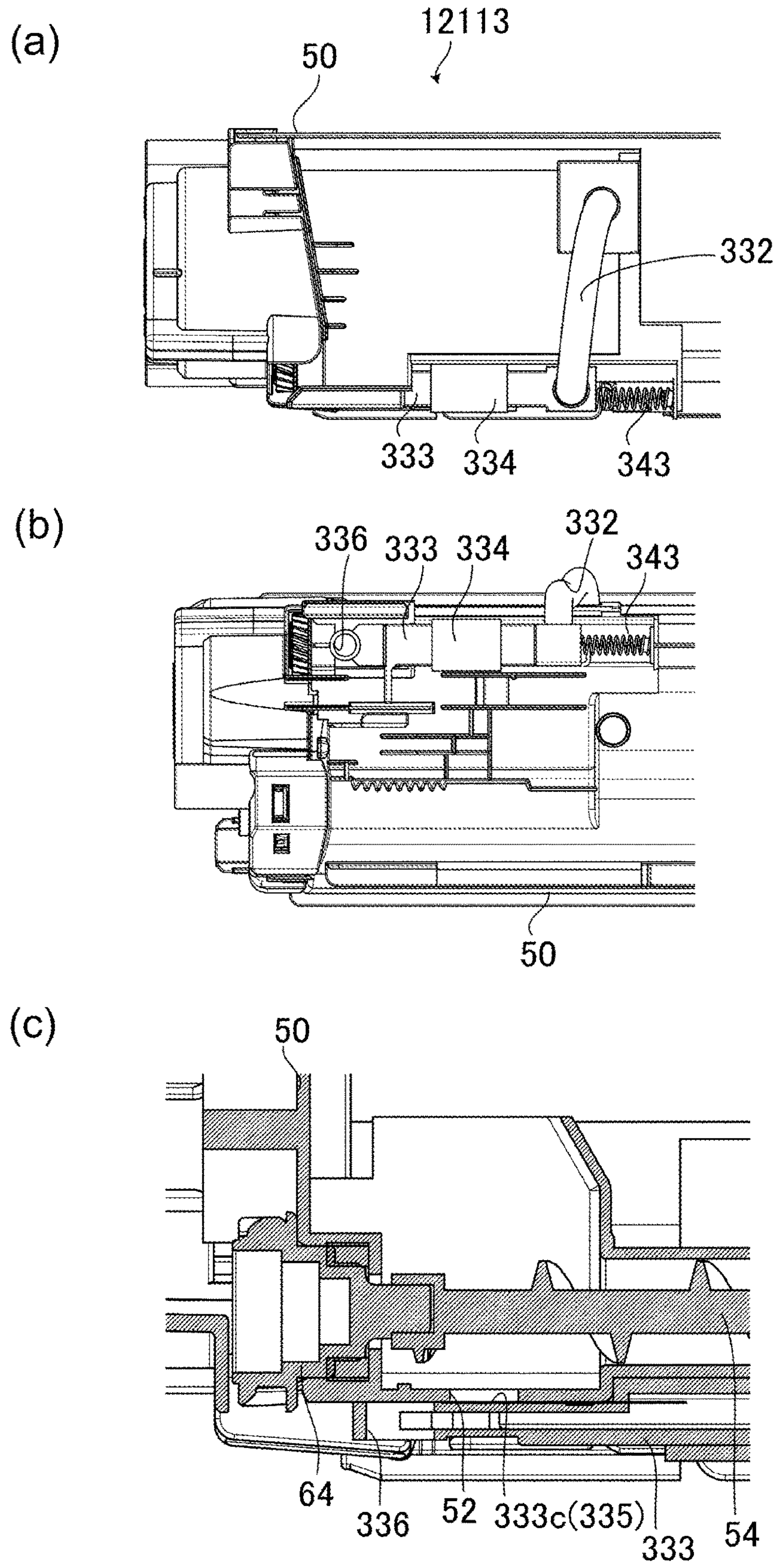

Part (a) of FIG. 43 is a front view illustrating the third duct member positioned at the closing position, part (b) of FIG. 43 is a bottom view of the third duct member positioned at the closing position, and part (c) of FIG. 43 is a sectional view of the third duct member positioned at the closing position.

Figure 44:
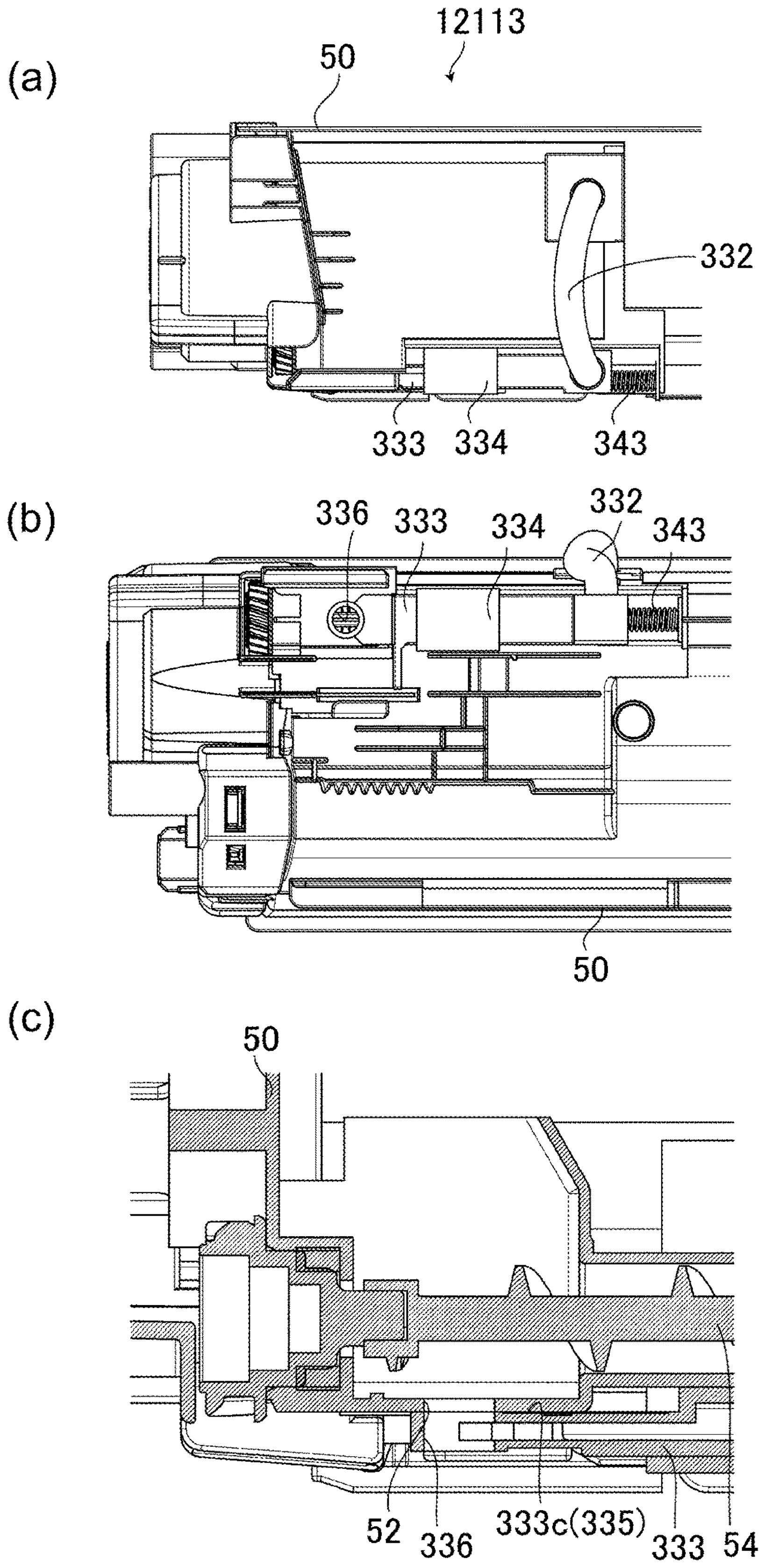

Part (a) of FIG. 44 is a front view of the third duct member positioned at the opening position, part (b) of FIG. 44 is a bottom view of the third duct member positioned at the opening position, and part (c) of FIG. 44 is a sectional view of the third duct member positioned at the opening position.

Figure 45:
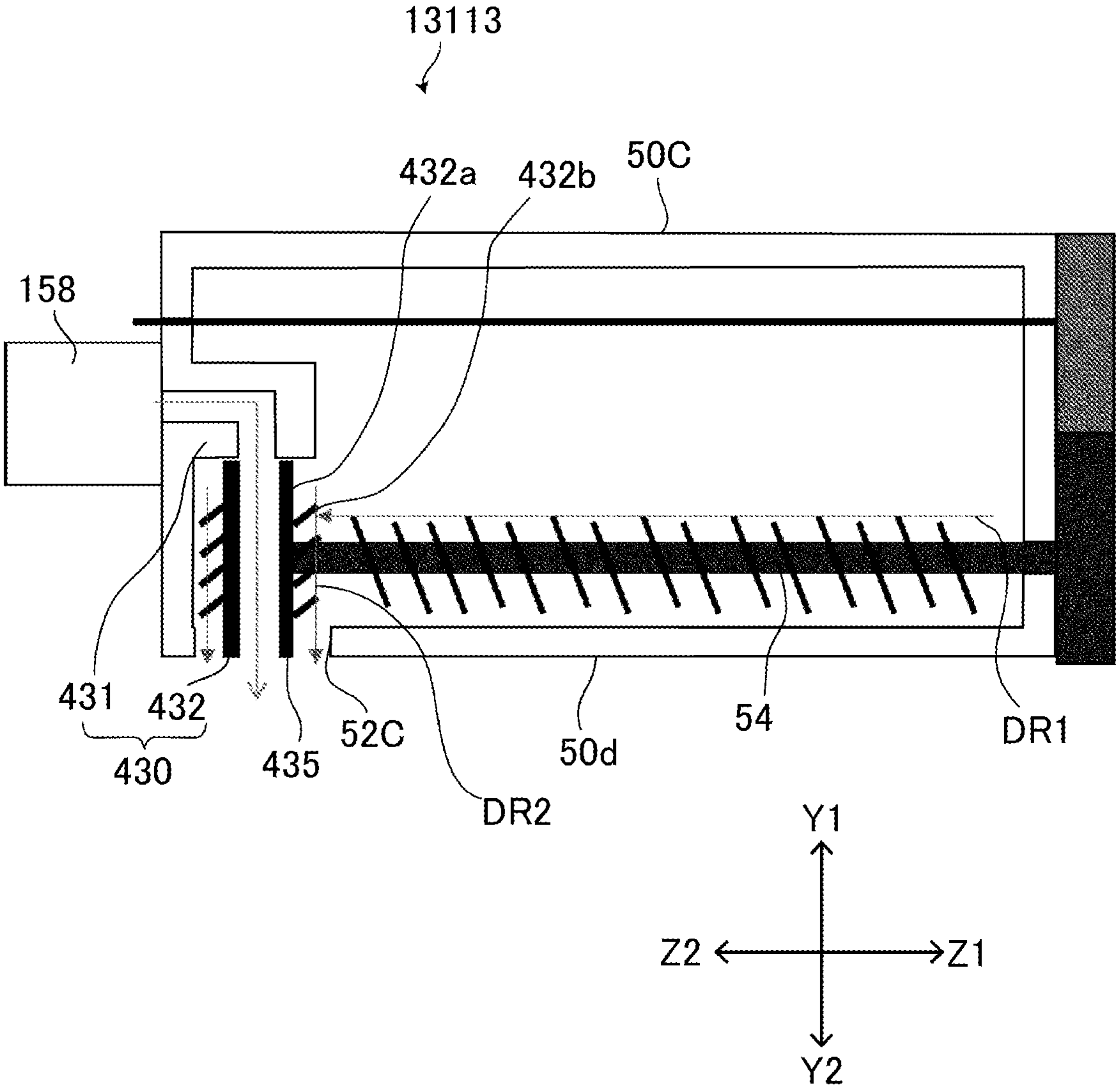

FIG. 45 is a schematic illustration of a toner cartridge according to Embodiment 11.

Figure 46:
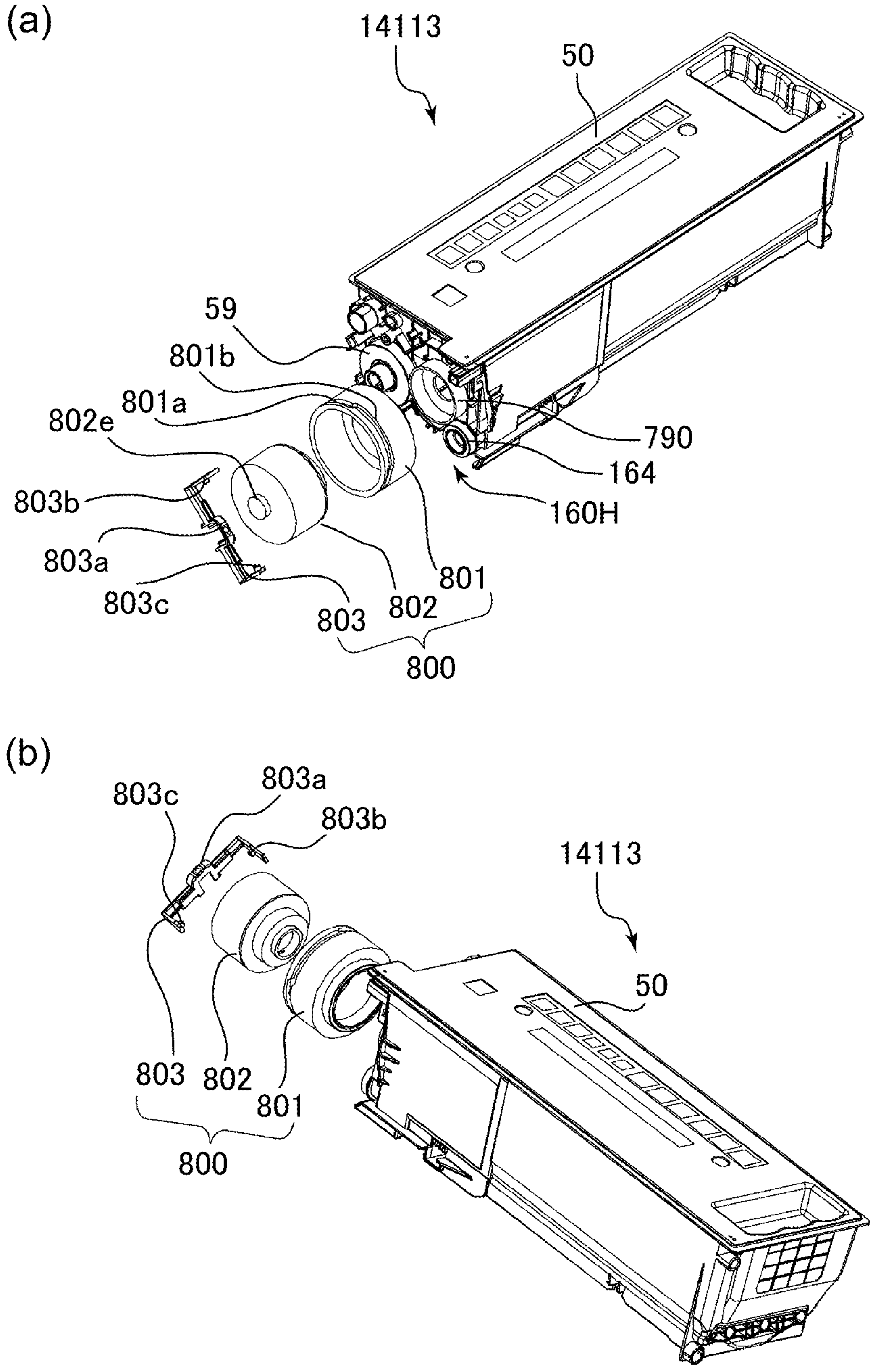

Part (a) of FIG. 46 is an exploded perspective view illustrating a toner cartridge according to Embodiment 12, and part (b) of FIG. 46 is another exploded perspective view of the toner cartridge according to Embodiment 12.

Figure 47:
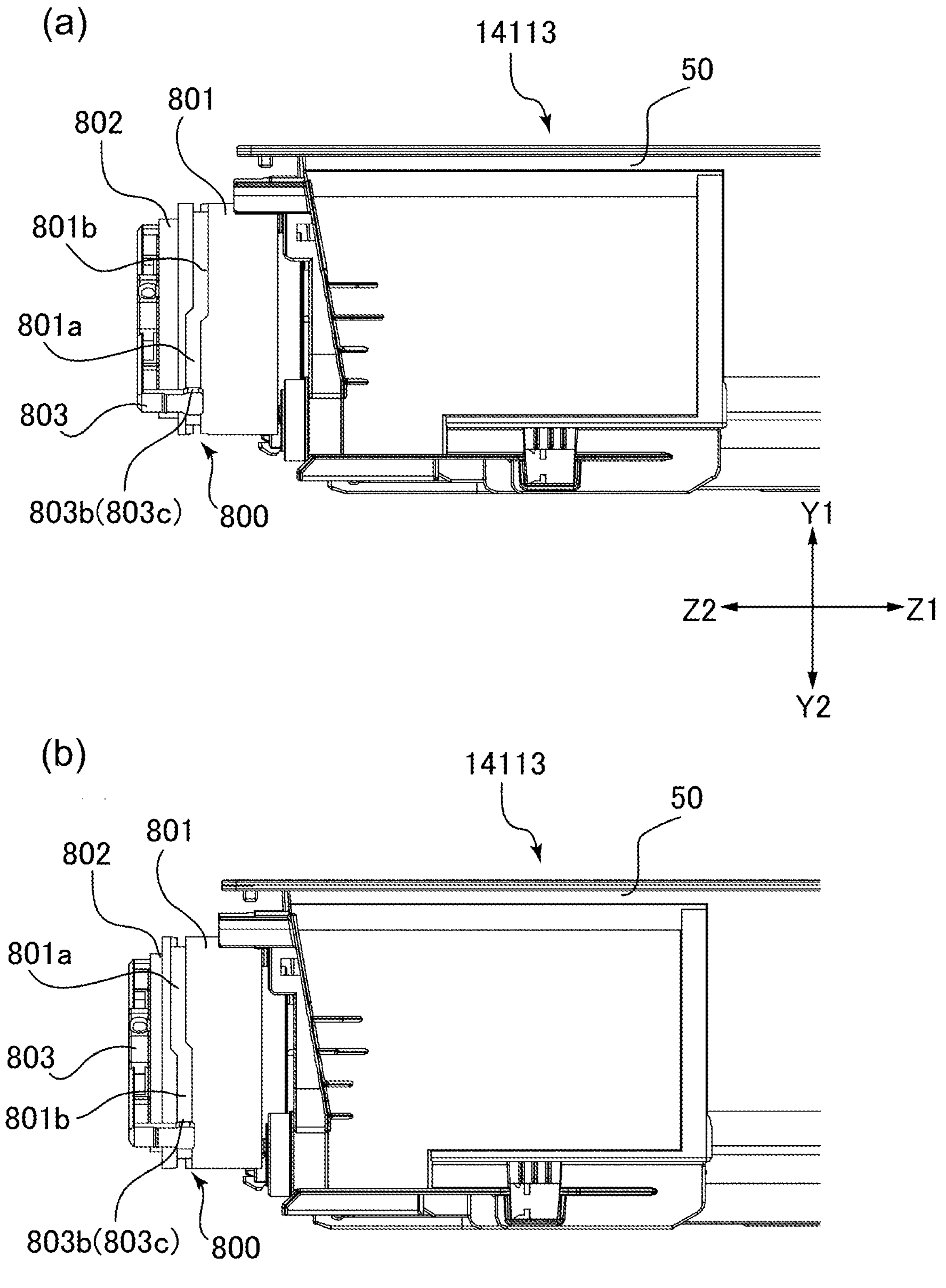

Part (a) of FIG. 47 is a side view illustrating a gas cylinder unit in a closed state, and part (b) of FIG. 47 is a side view illustrating a gas cylinder unit in an open state.

Figure 48:
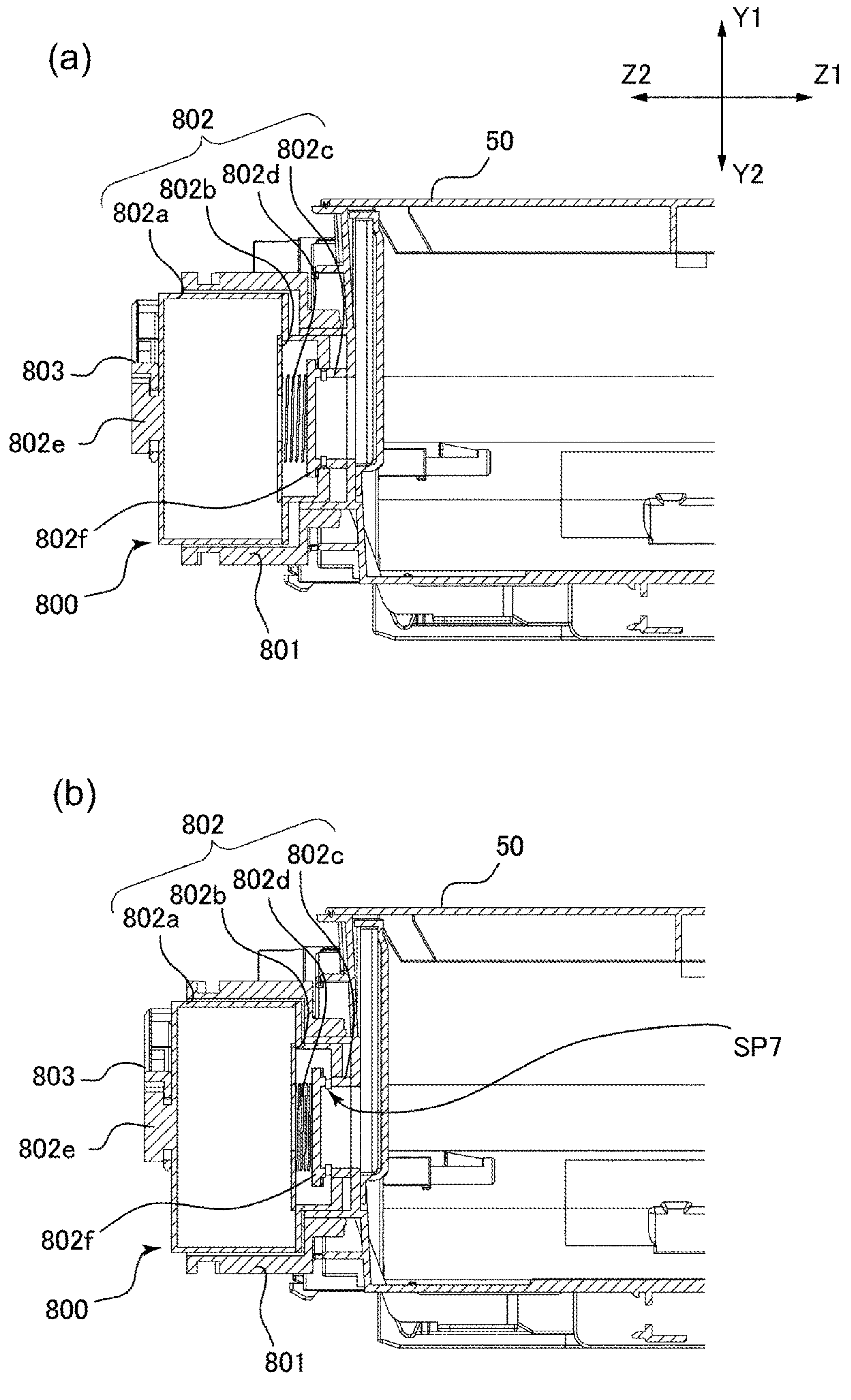

Part (a) of FIG. 48 is a side view of the gas cylinder unit in a closed state, and part (b) of FIG. 48 is a side view of the gas cylinder unit in the open state.

Figure 49:
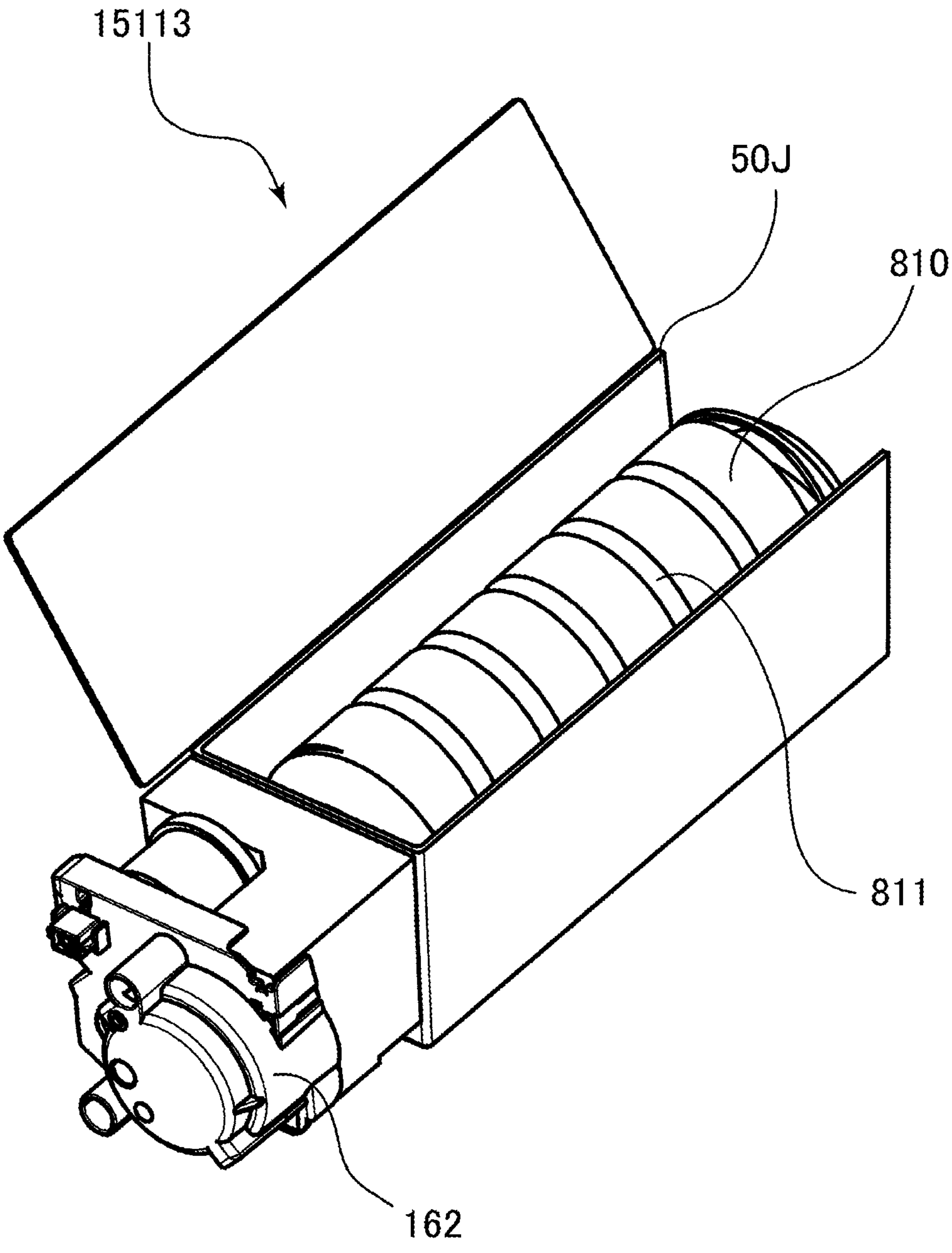

FIG. 49 is a perspective view illustrating a toner cartridge according to Embodiment 13.

Figure 50:
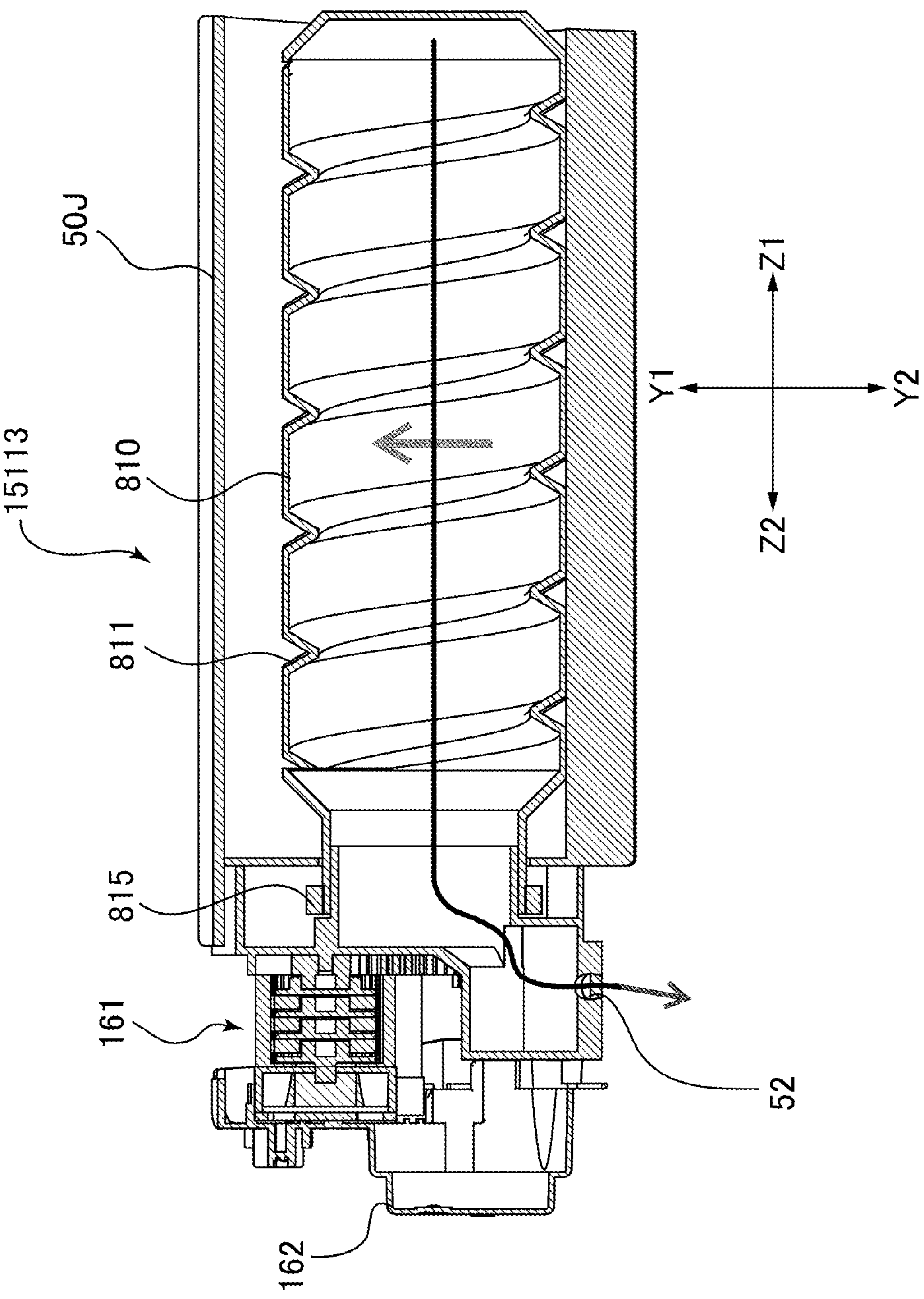

FIG. 50 is a sectional view of the toner cartridge.

Figure 51:
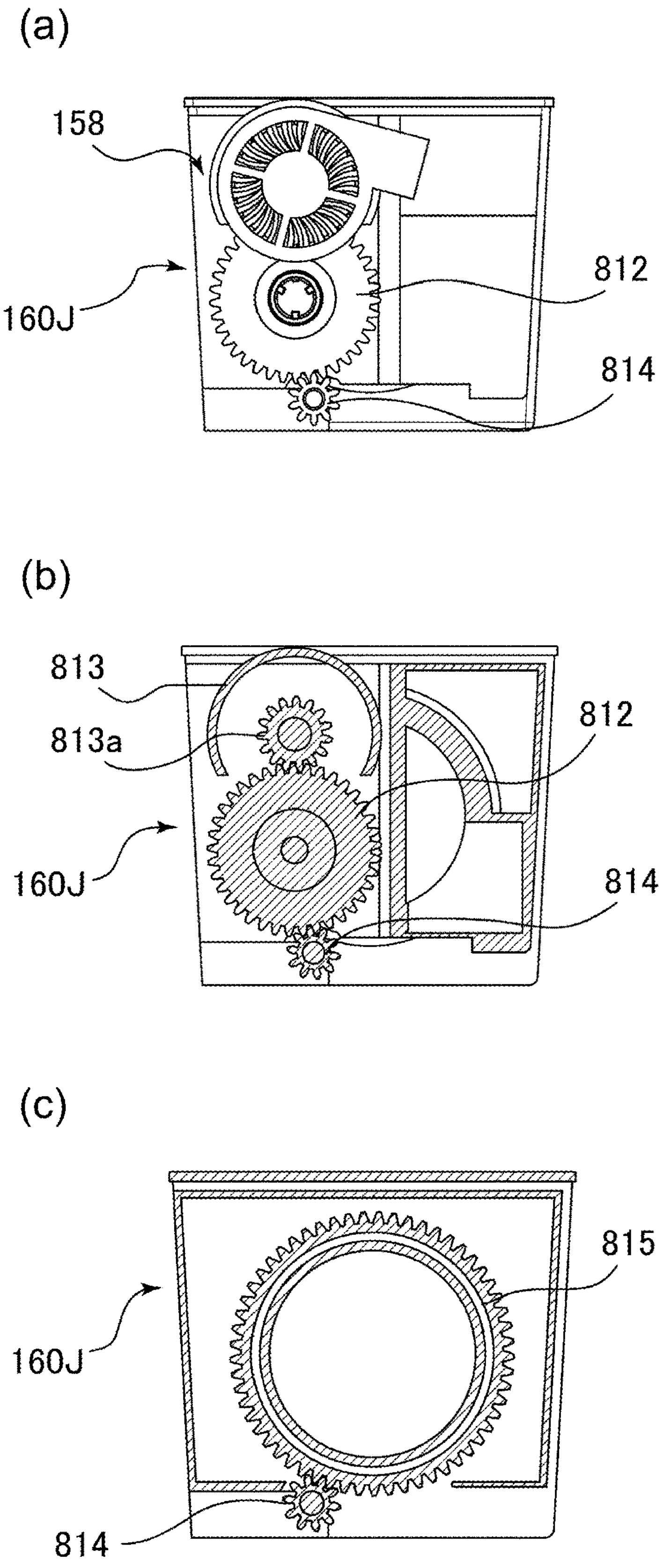

Part (a) of FIG. 51 is a side view illustrating a drive train, part (b) of FIG. 51 is a sectional view of the drive train, and part (c) of FIG. 51 is another sectional view of the drive train.

Figure 52:
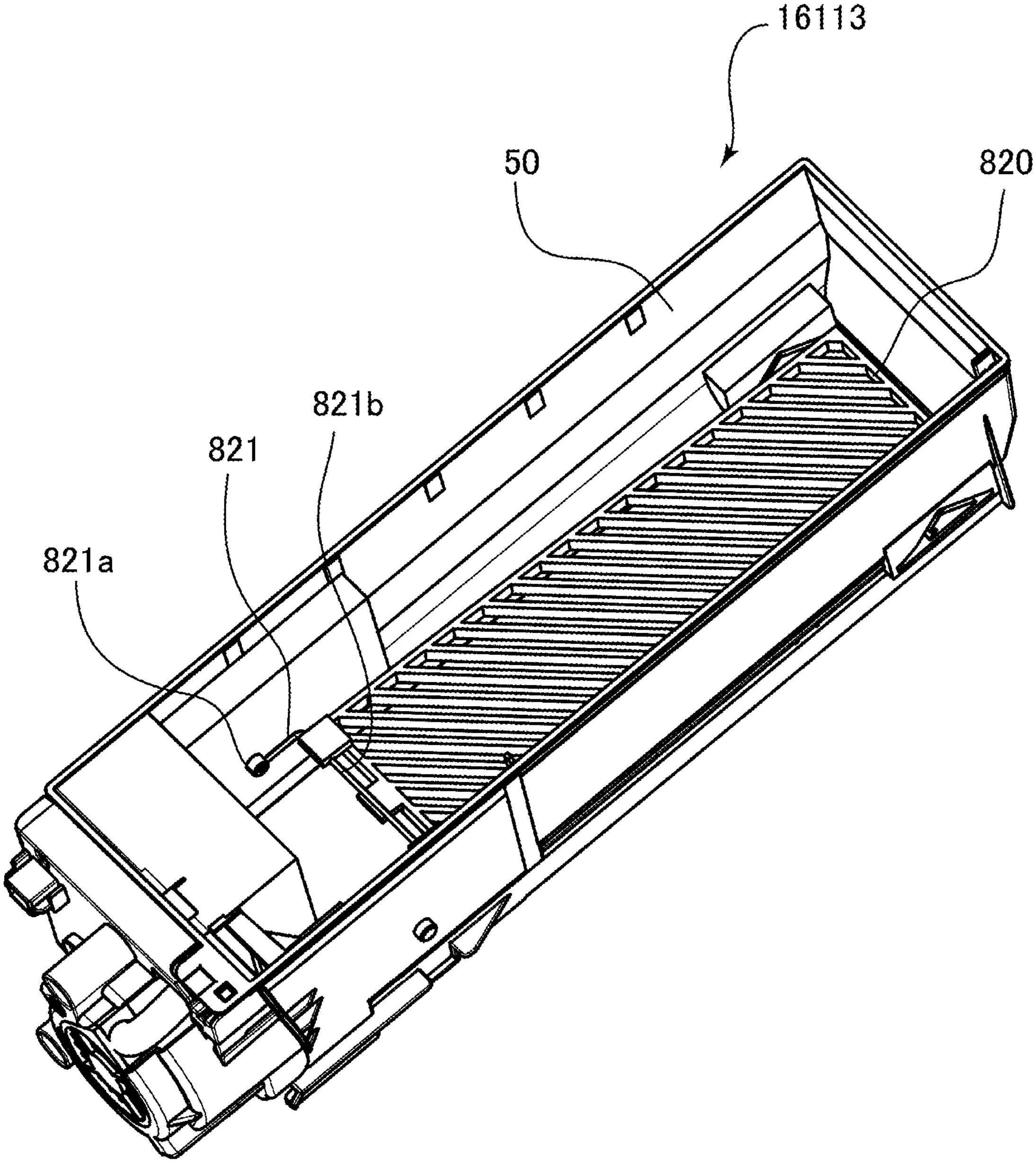

FIG. 52 is a perspective view illustrating a toner cartridge according to Embodiment 14.

Figure 53:
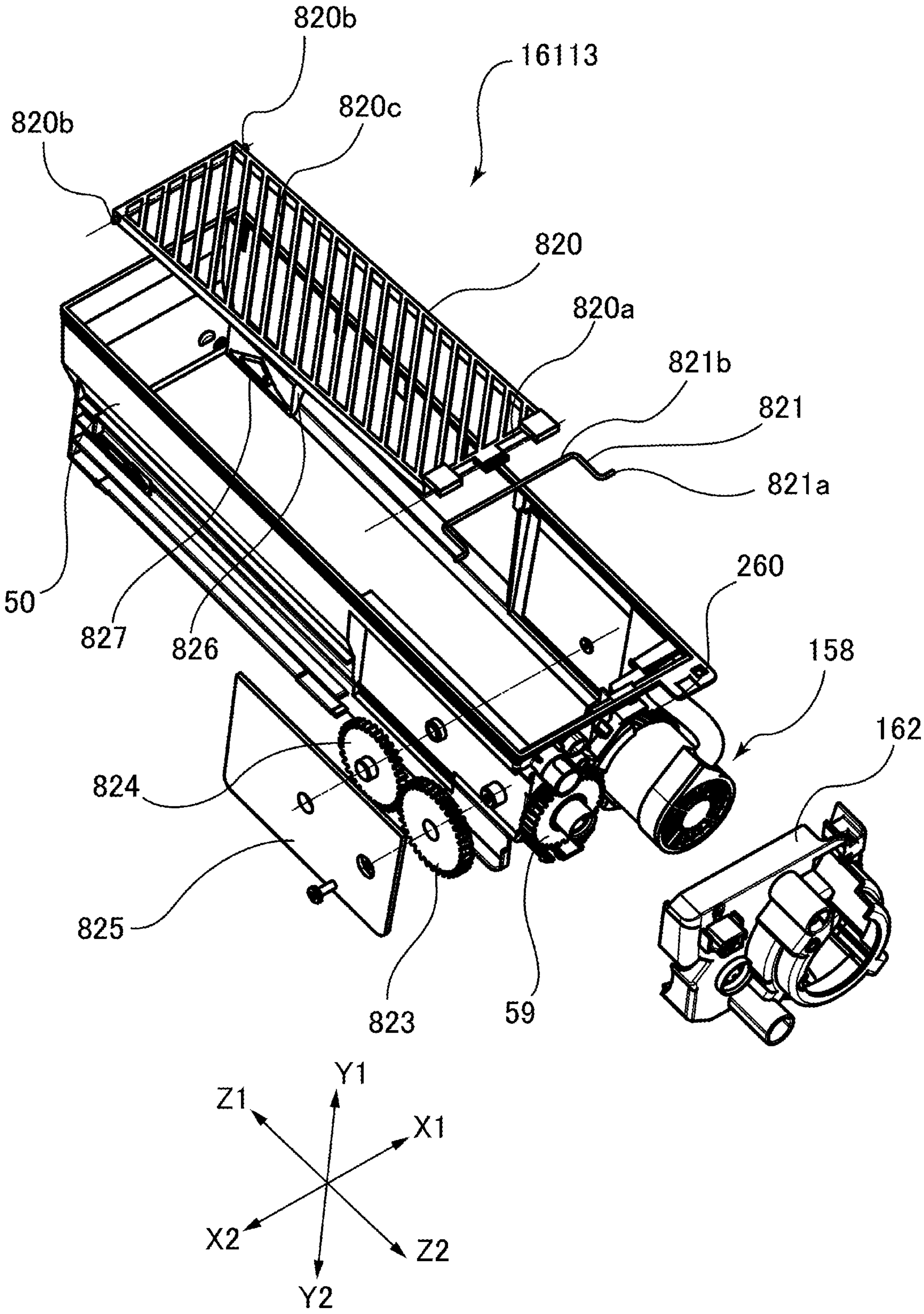

FIG. 53 is an exploded perspective view of the toner cartridge.

Figure 54:
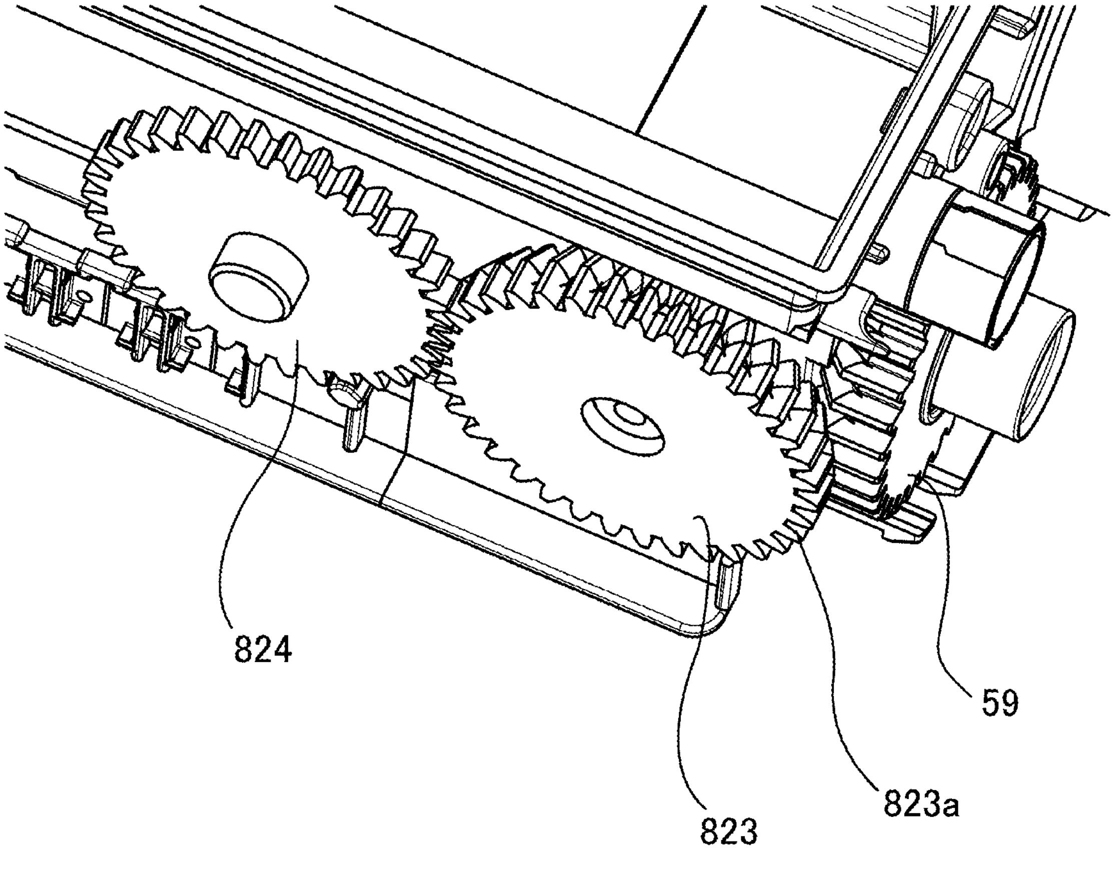

FIG. 54 is a perspective view illustrating a drive train.

Figure 55:
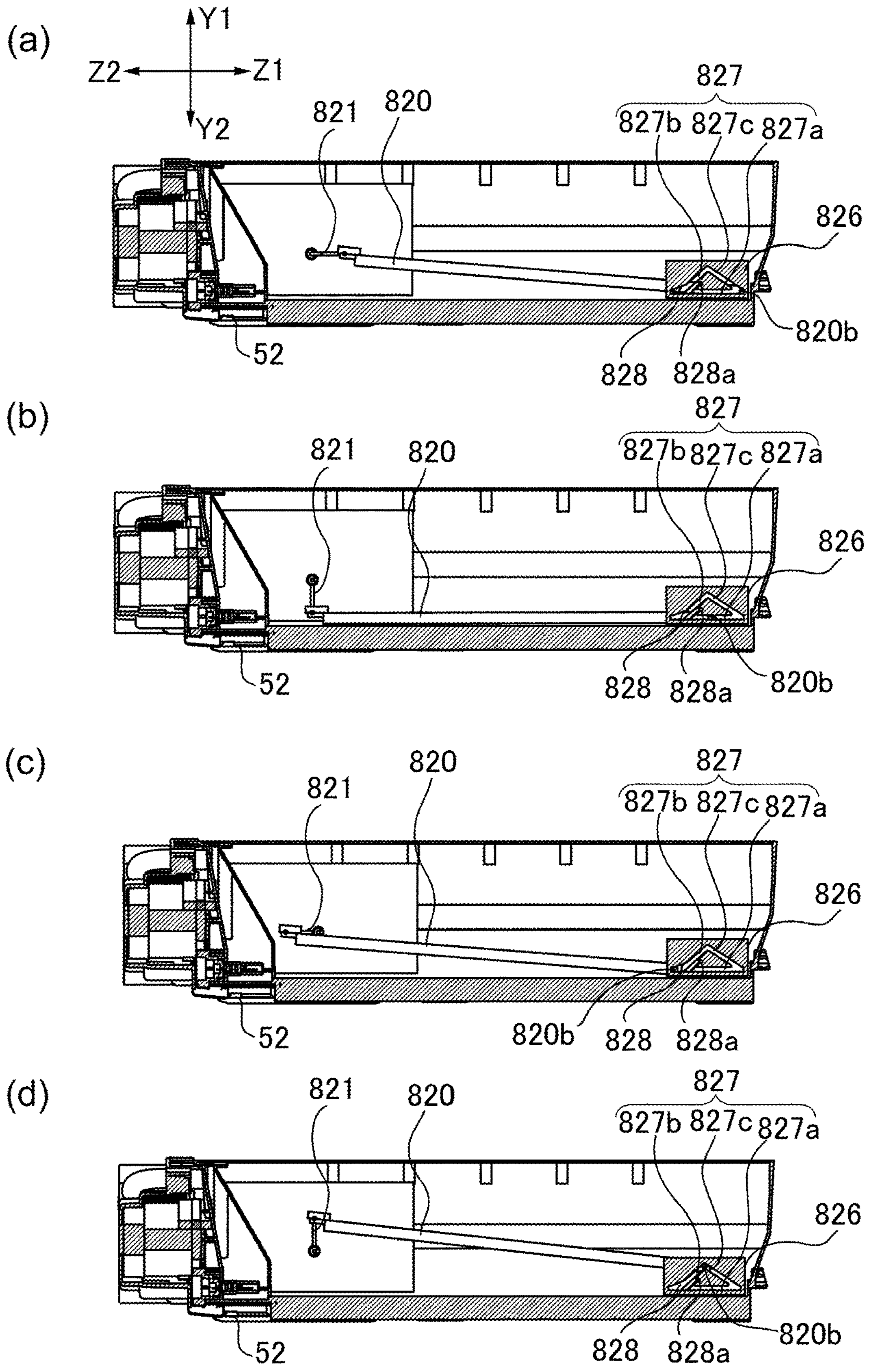

Part (a) of FIG. 55 is a sectional view illustrating movement of a feeding member 820 when it moves in a Z2 direction, part (b) of FIG. 55 is a sectional view illustrating movement of the feeding member 820 when it moves in the Z2 direction, part (c) of FIG. 55 is a sectional view illustrating movement of the feeding member 820 when it moves in a Z1 direction, and part (d) of FIG. 55 is a sectional view illustrating the movement of the feeding member 820 when it moves in the Z1 direction.

Figure 56:
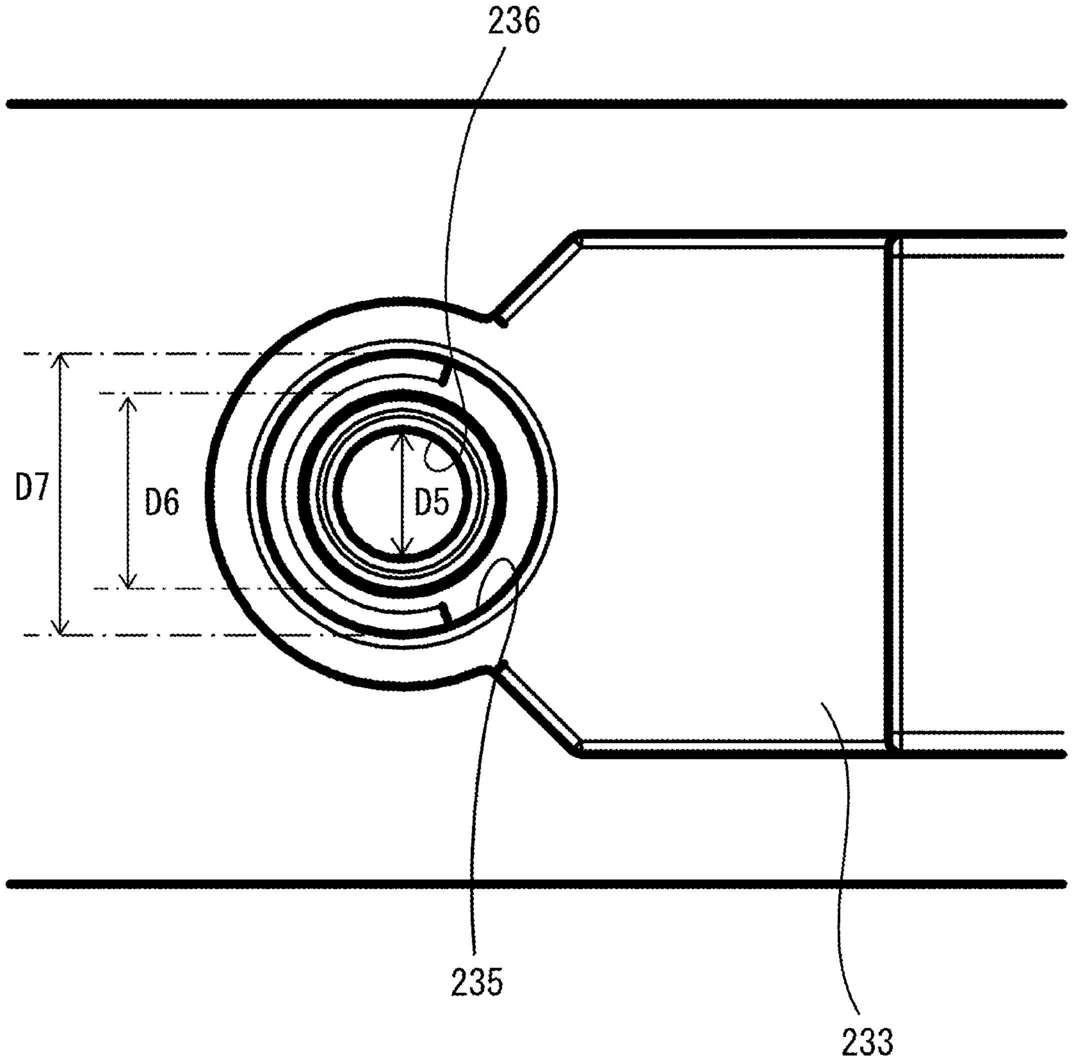

FIG. 56 is an illustration showing the sizes of a vent and the like.

Figure 57:
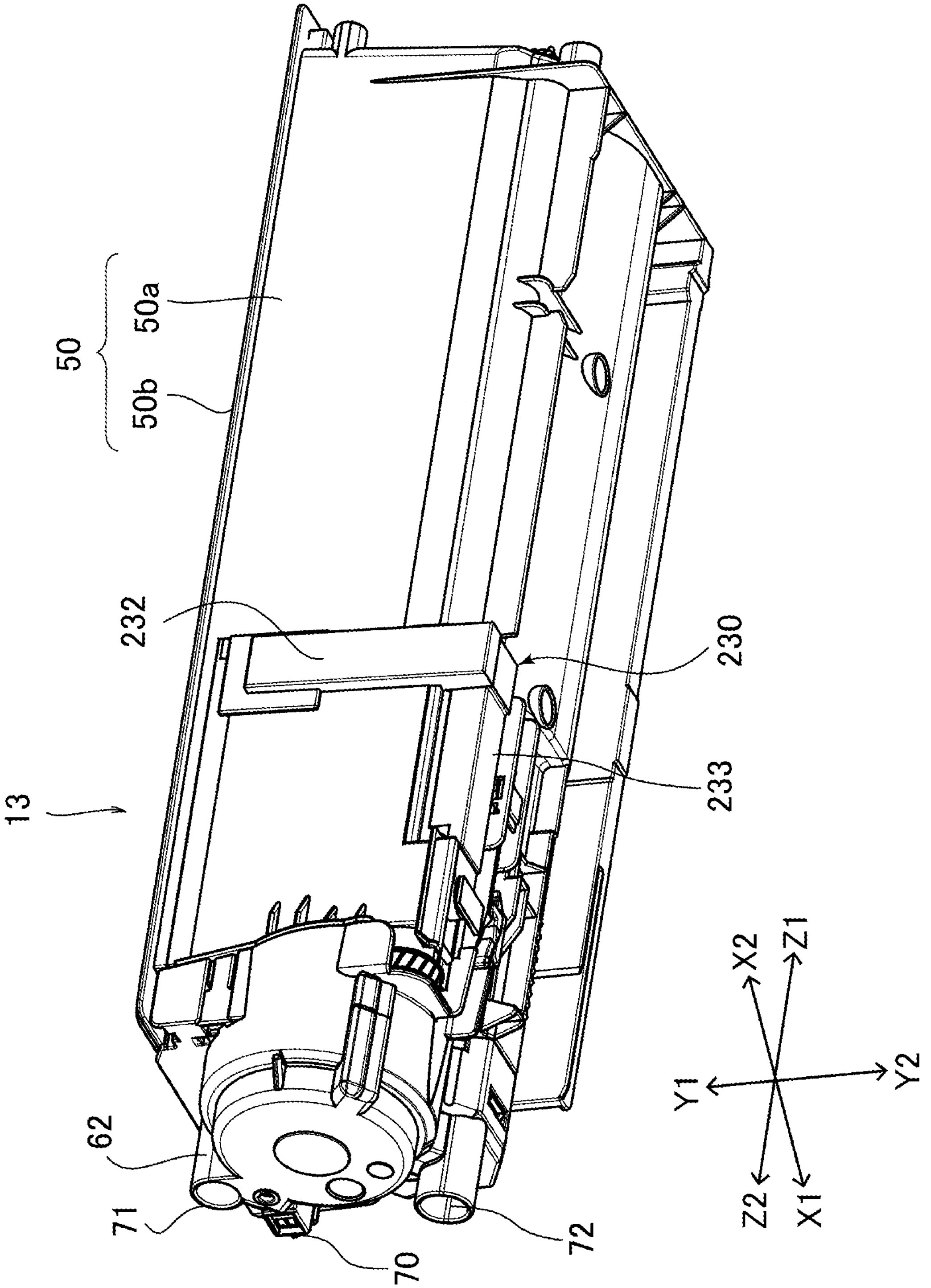

FIG. 57 is a perspective view illustrating a toner cartridge.

Figure 58:
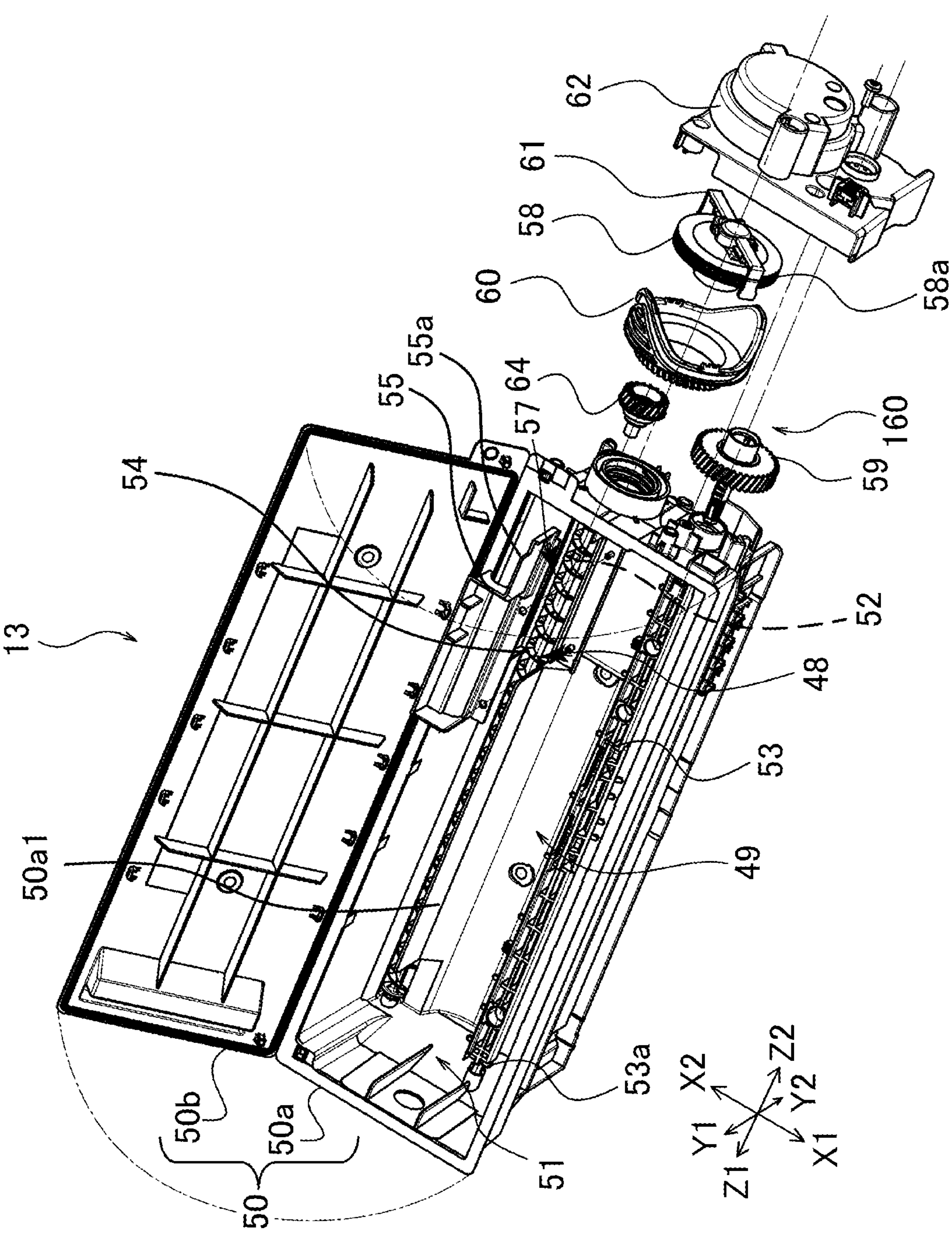

FIG. 58 is an exploded perspective view of the toner cartridge.

Figure 59:
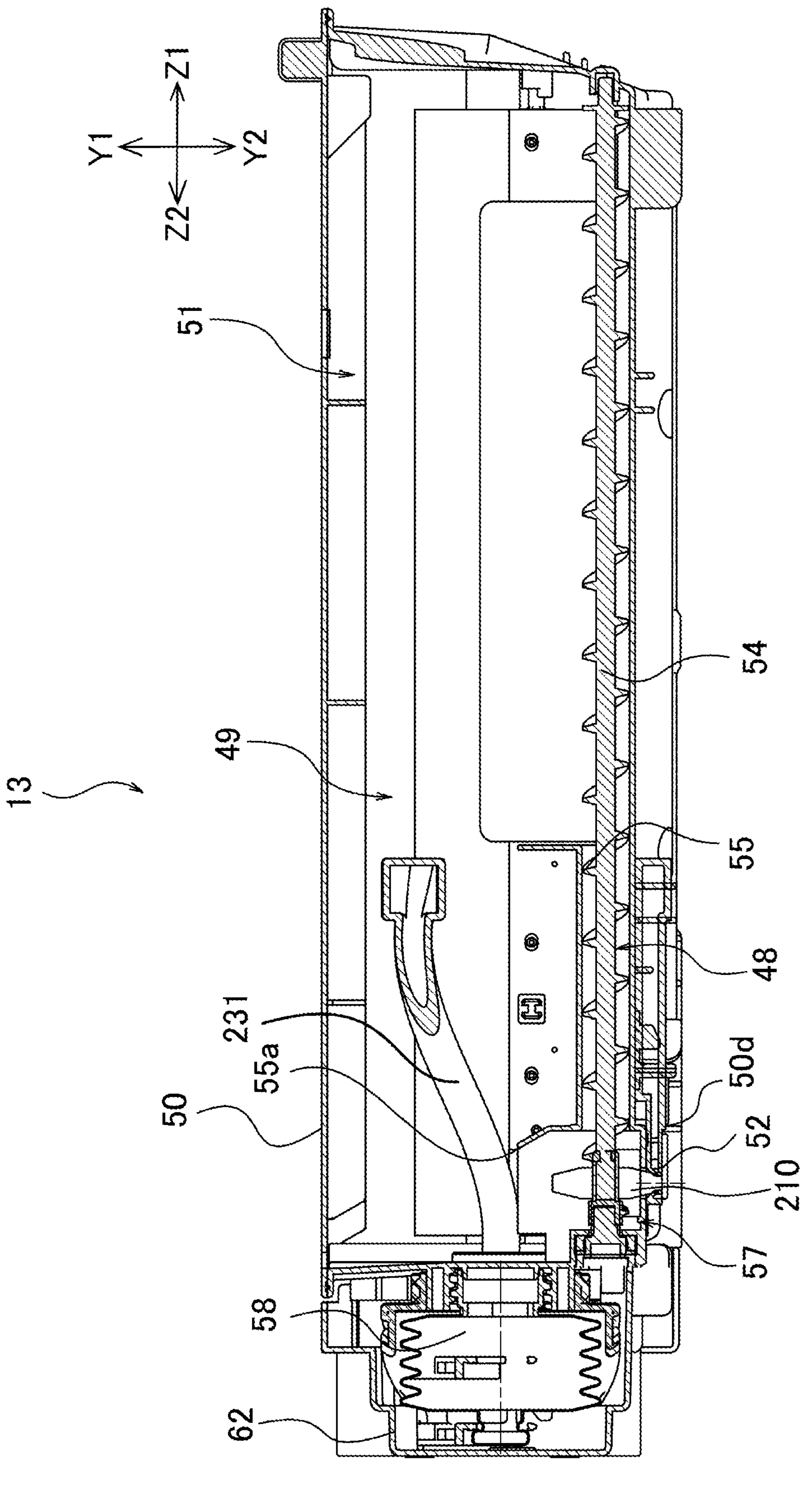

FIG. 59 is a sectional view illustrating a toner cartridge.

Figure 60:
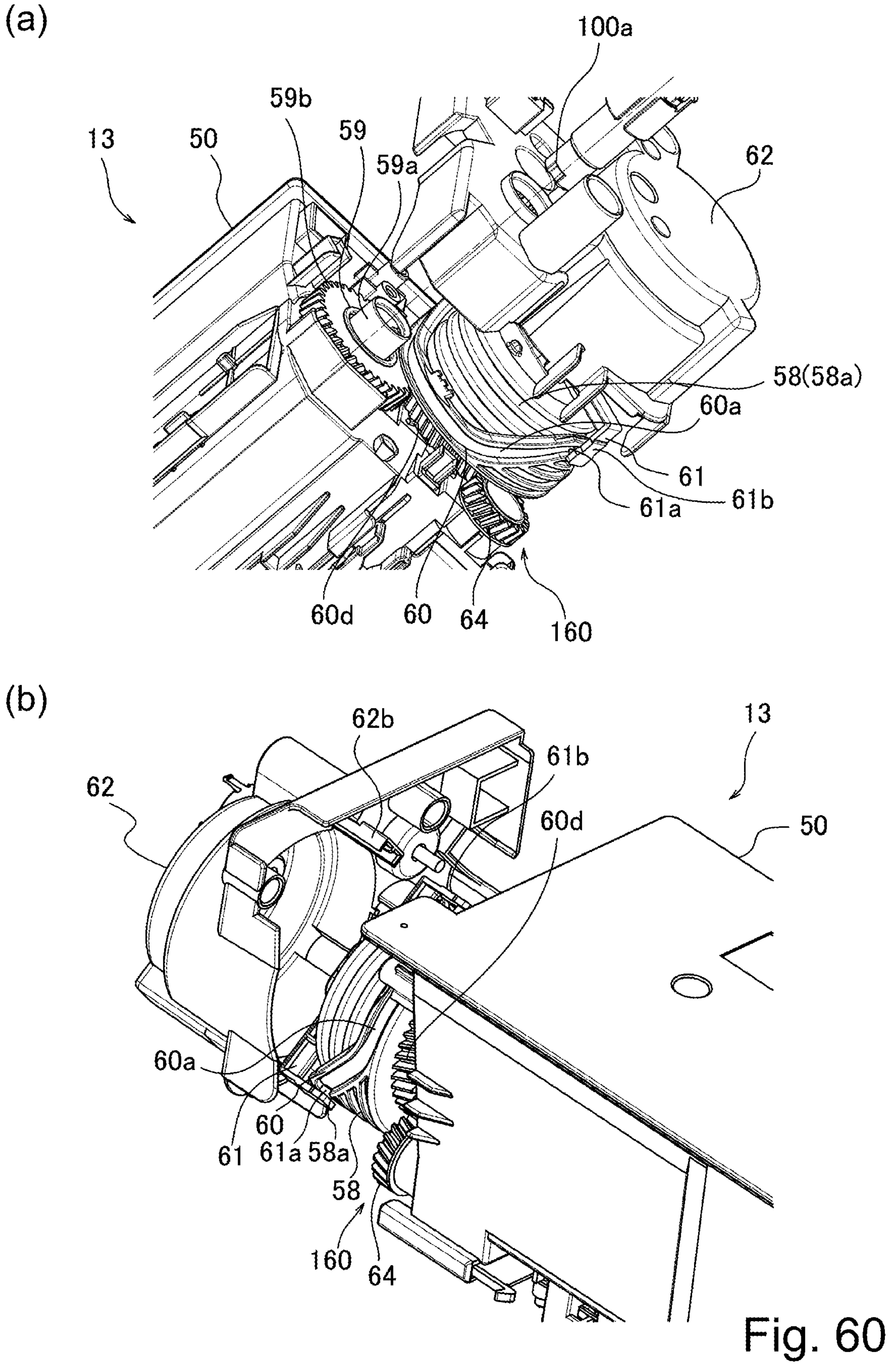

Part (a) of FIG. 60 is a perspective view of a rear end portion of the toner cartridge as viewed from a bottom side, and part (b) of FIG. 60 is a perspective view of the rear end portion of the toner cartridge as viewed from a top side.

Figure 61:
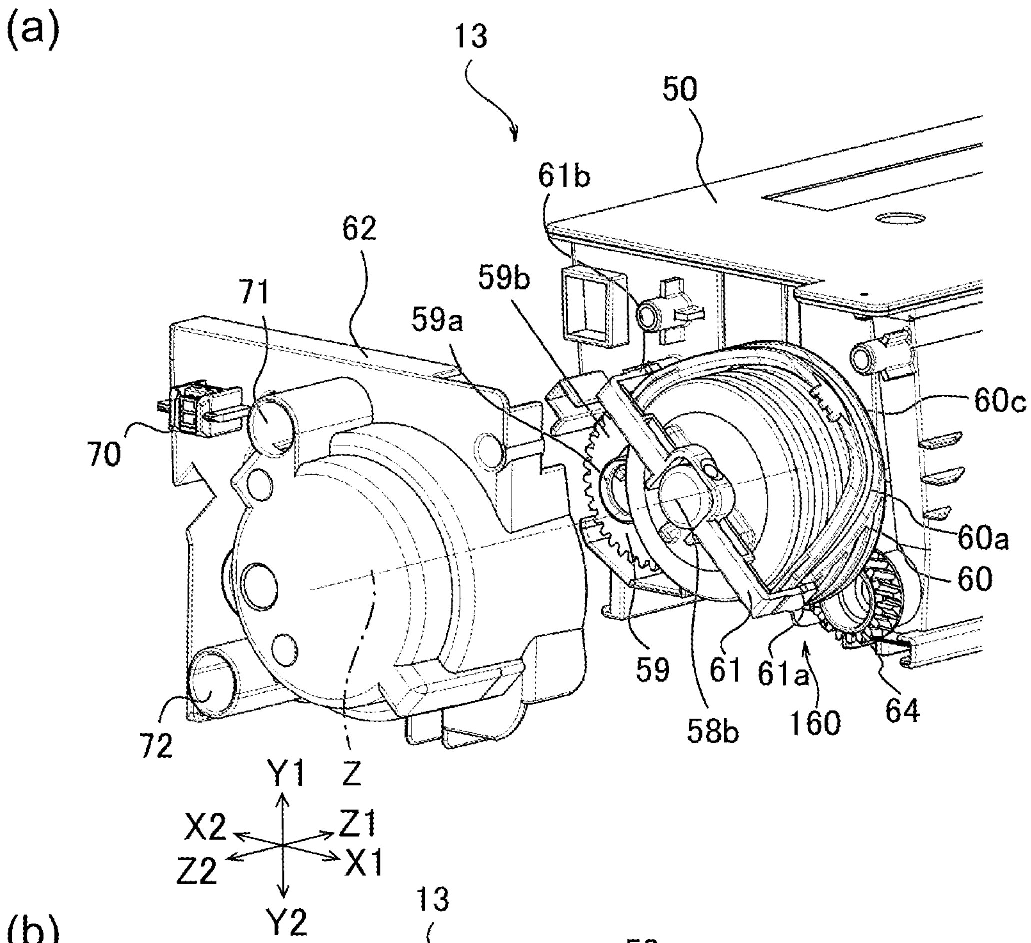
Figure 61:
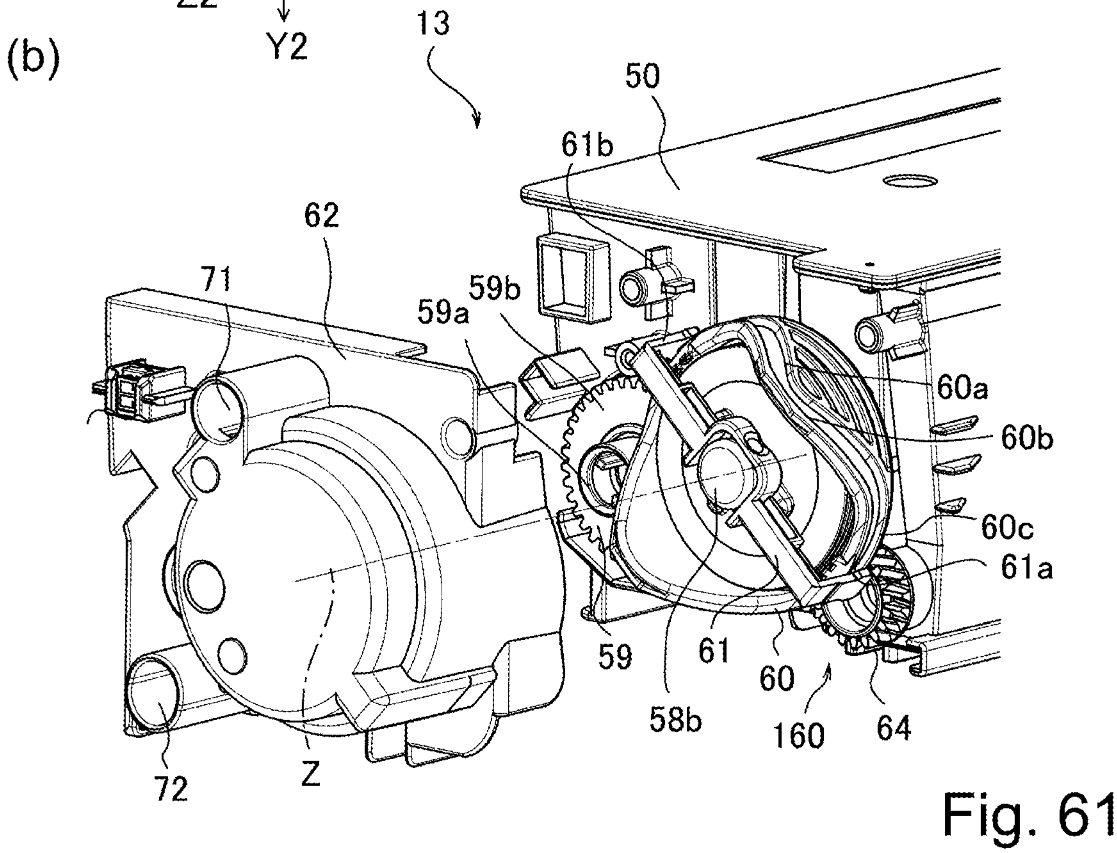

Part (a) of FIG. 61 is a perspective view illustrating an expanded state of a pump, and part (b) of FIG. 61 is a perspective view illustrating a contracted state of the pump.

Figure 62:
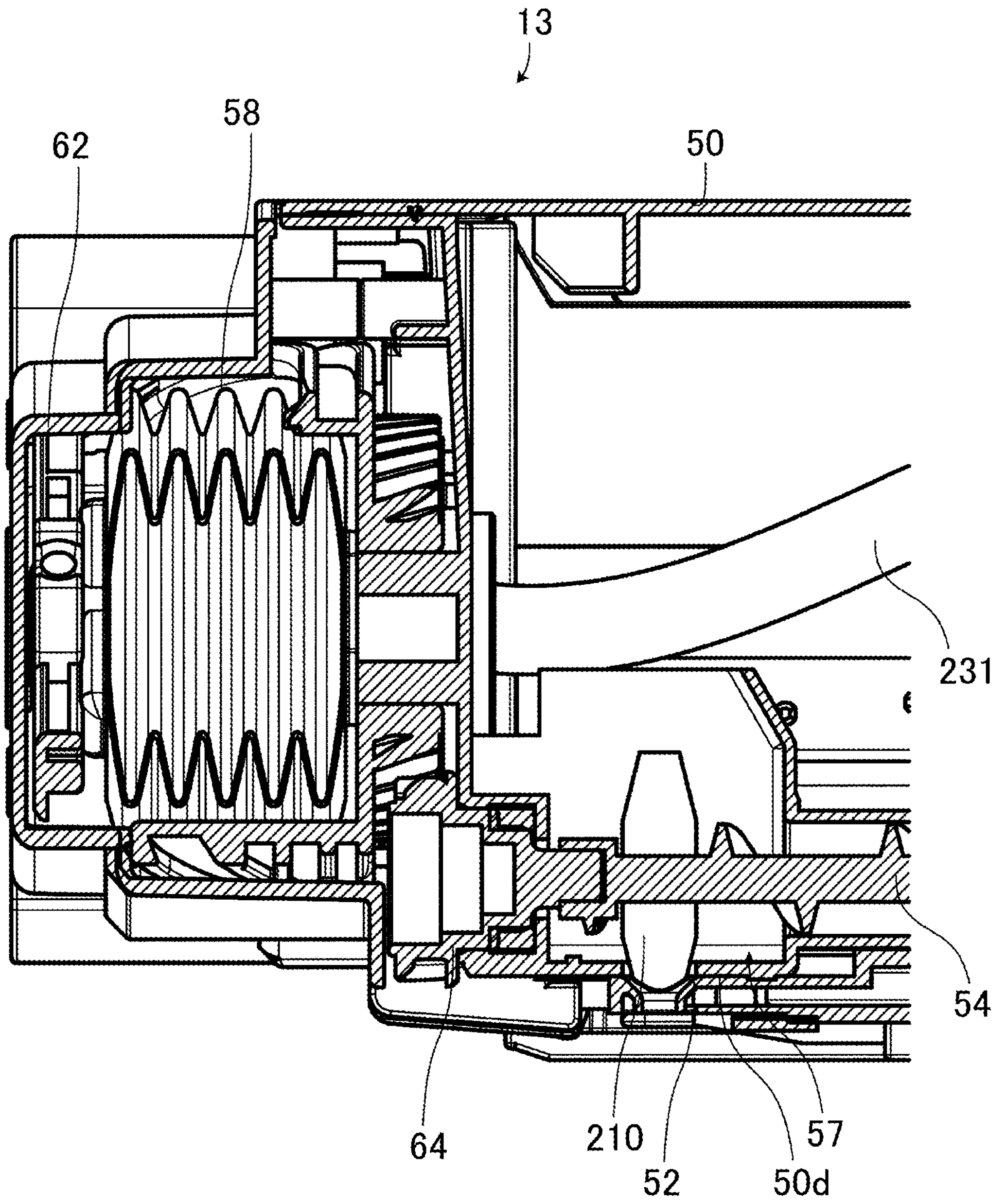

FIG. 62 is a sectional view illustrating a toner discharge chamber.

Figure 63:
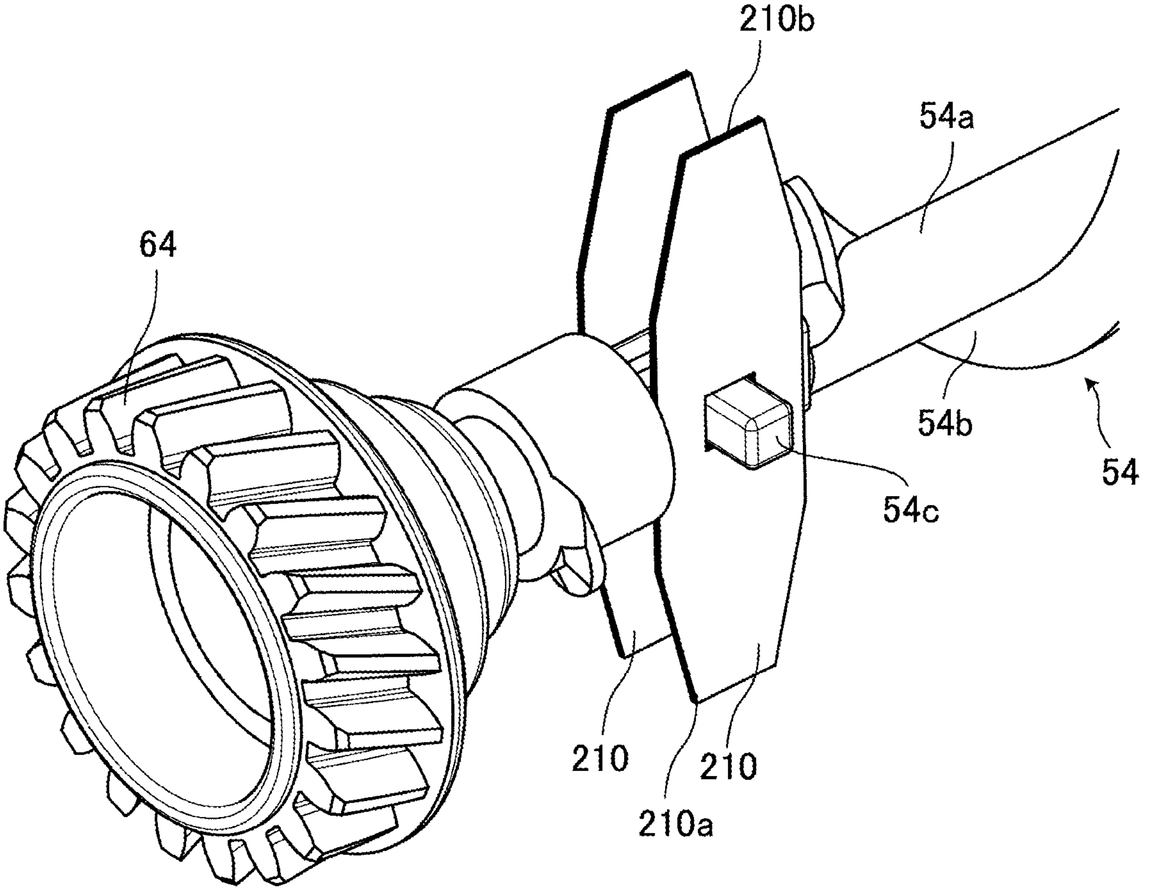

FIG. 63 is a perspective view illustrating a sheet member.

Figure 64:
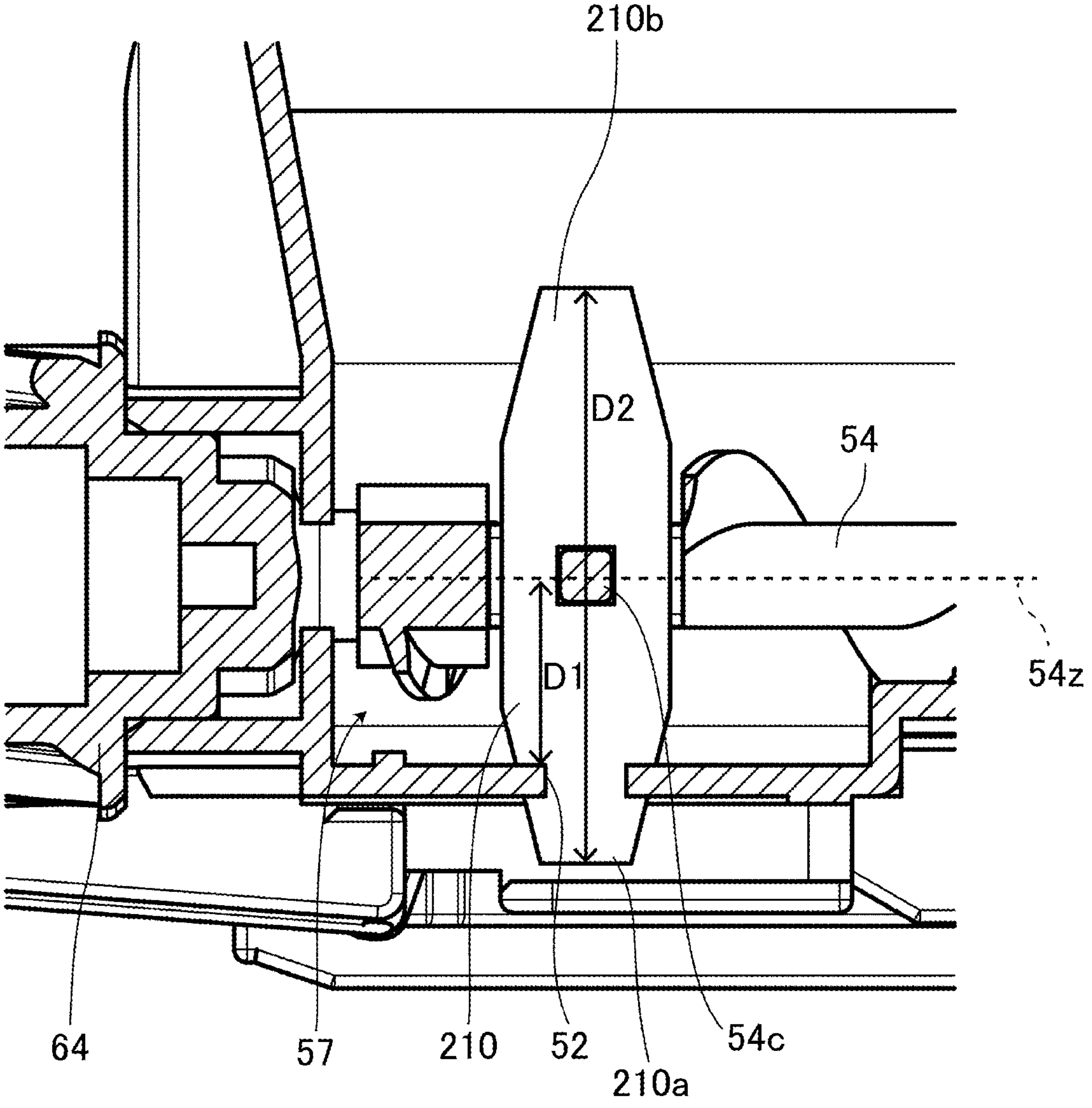

FIG. 64 is a sectional view illustrating the sheet member.

Figure 65:
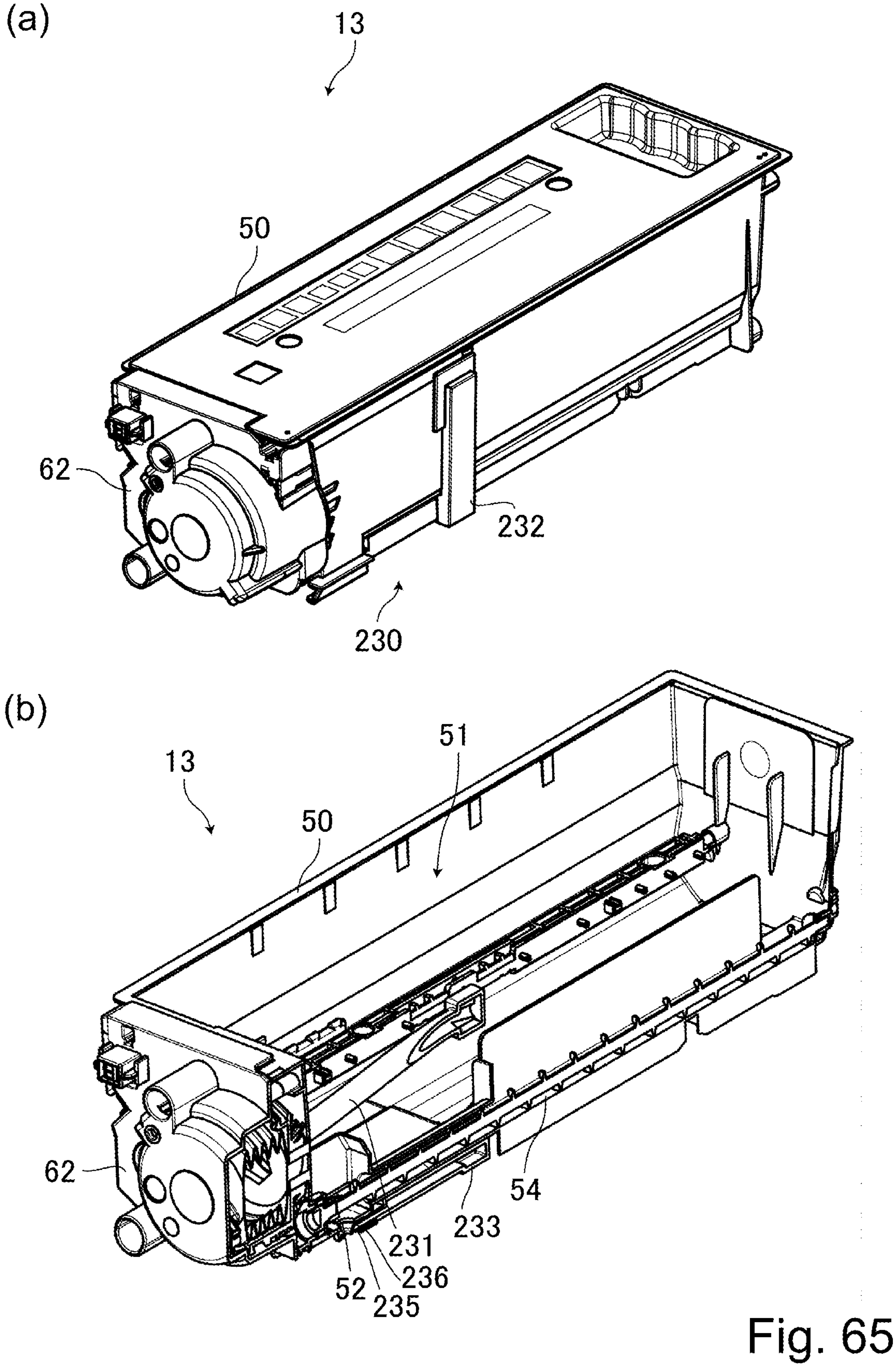

Part (a) of FIG. 65 is a perspective view illustrating a toner cartridge, and part (b) of FIG. 65 is a perspective view of the toner cartridge taken along a plane including the rotation center of the screw.

Figure 66:
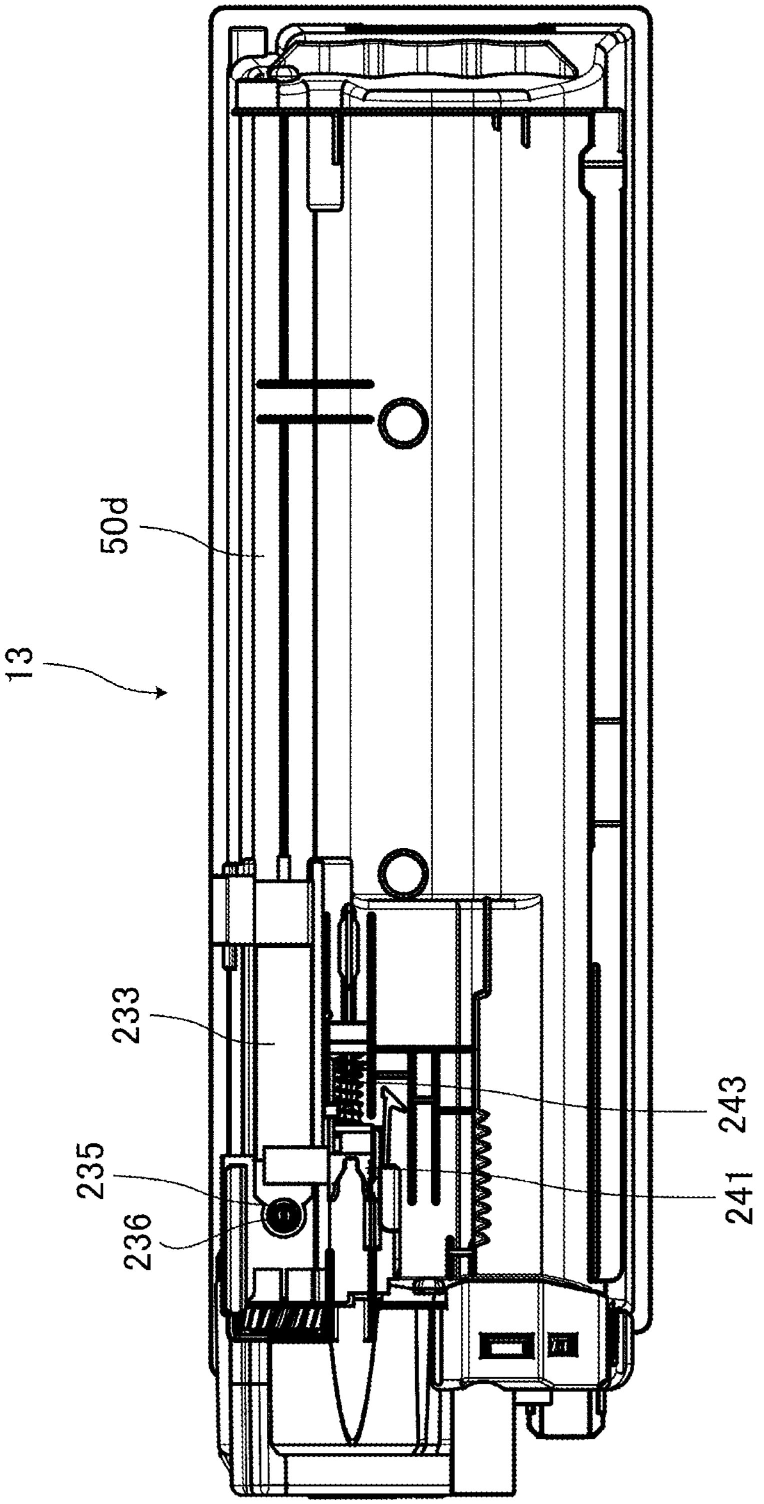

FIG. 66 is a bottom view illustrating the toner cartridge.

Figure 67:
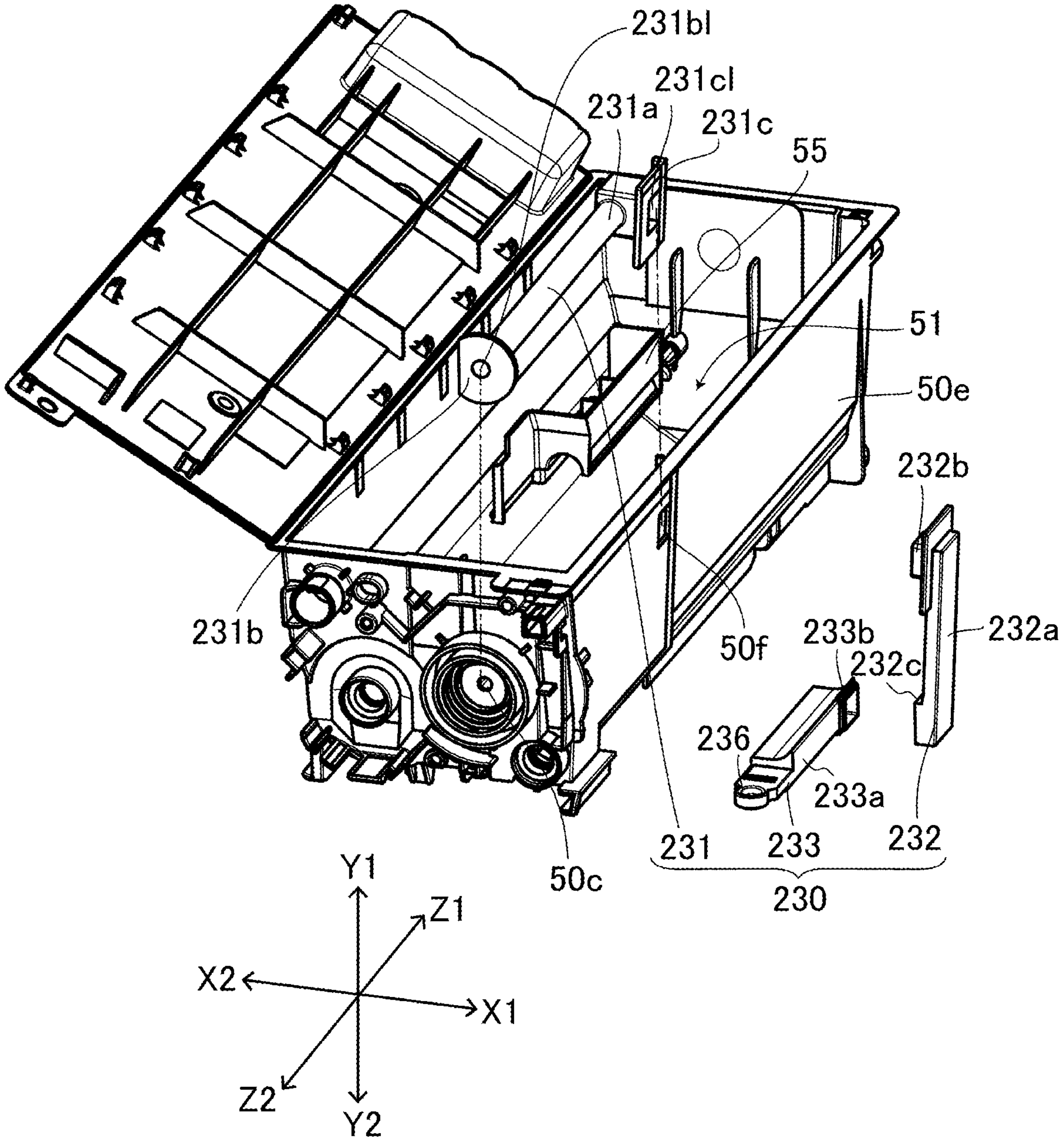

FIG. 67 is a perspective view illustrating assembling of the duct to a supply frame.

Figure 68:
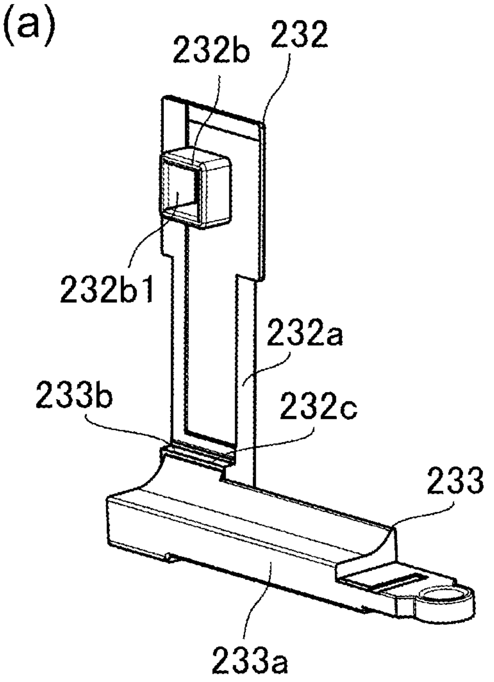
Figure 68:
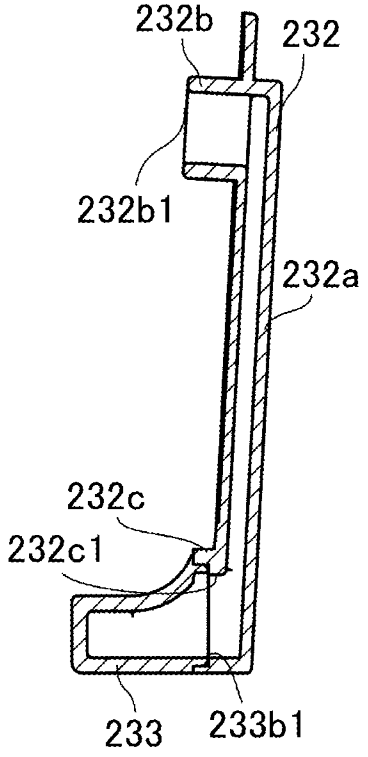
Figure 68:
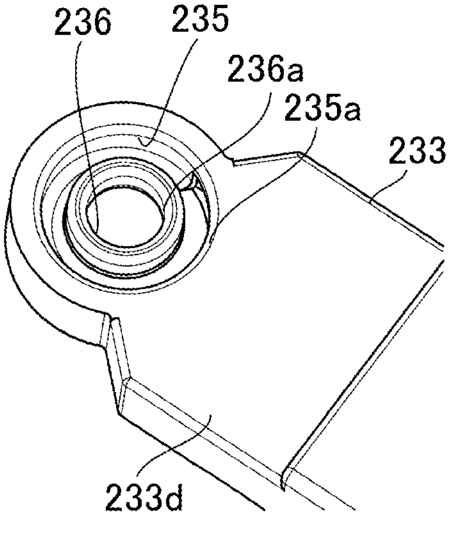

Part (a) of FIG. 68 is a perspective view illustrating a second duct member and a third duct member, part (b) of FIG. 68 is a sectional view illustrating the second duct member and the third duct member, and part (c) of FIG. 68 is a perspective view illustrating an air discharge opening and a hole provided in the third duct member.

Figure 69:
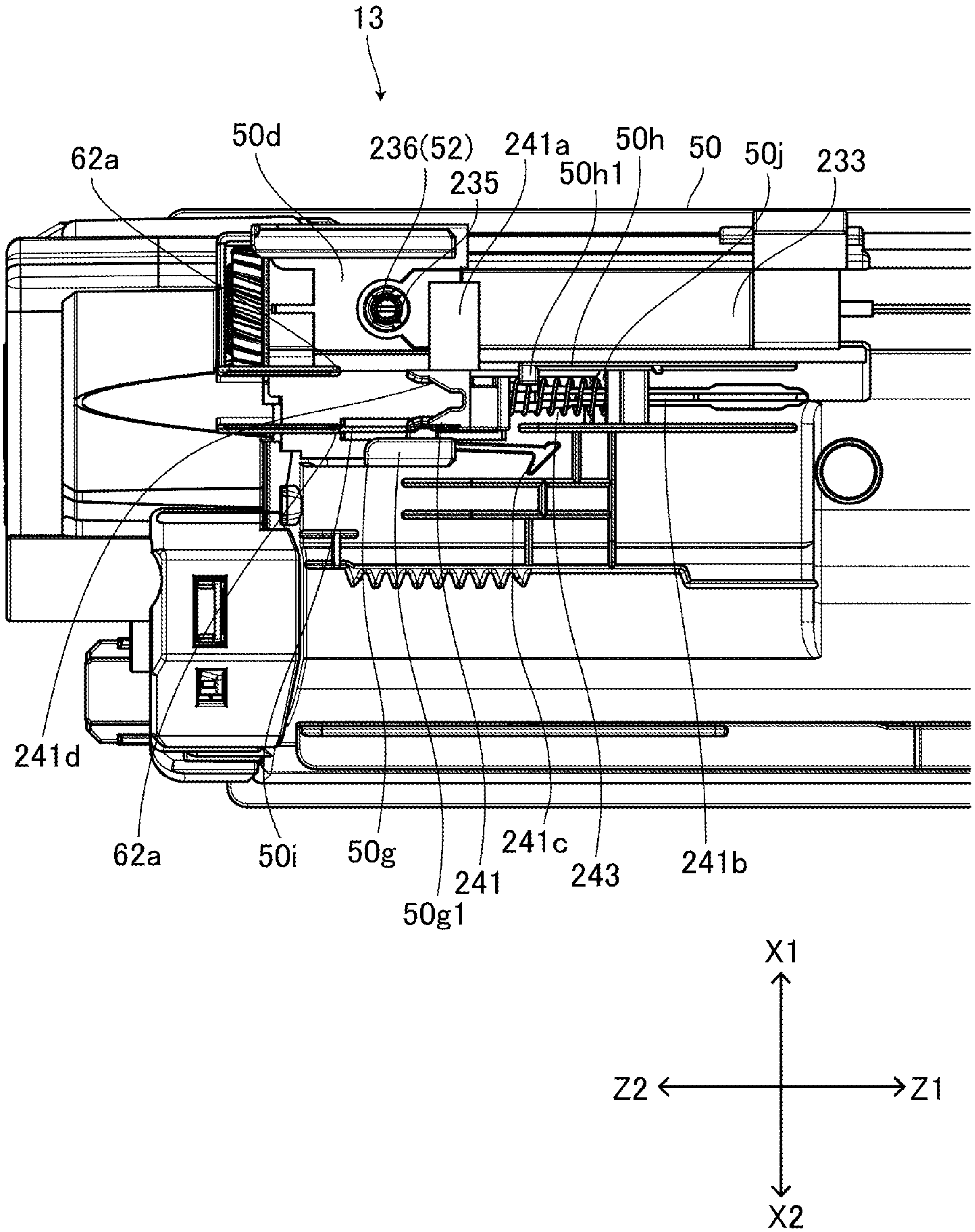

FIG. 69 is a bottom view illustrating the toner cartridge.

Figure 70:
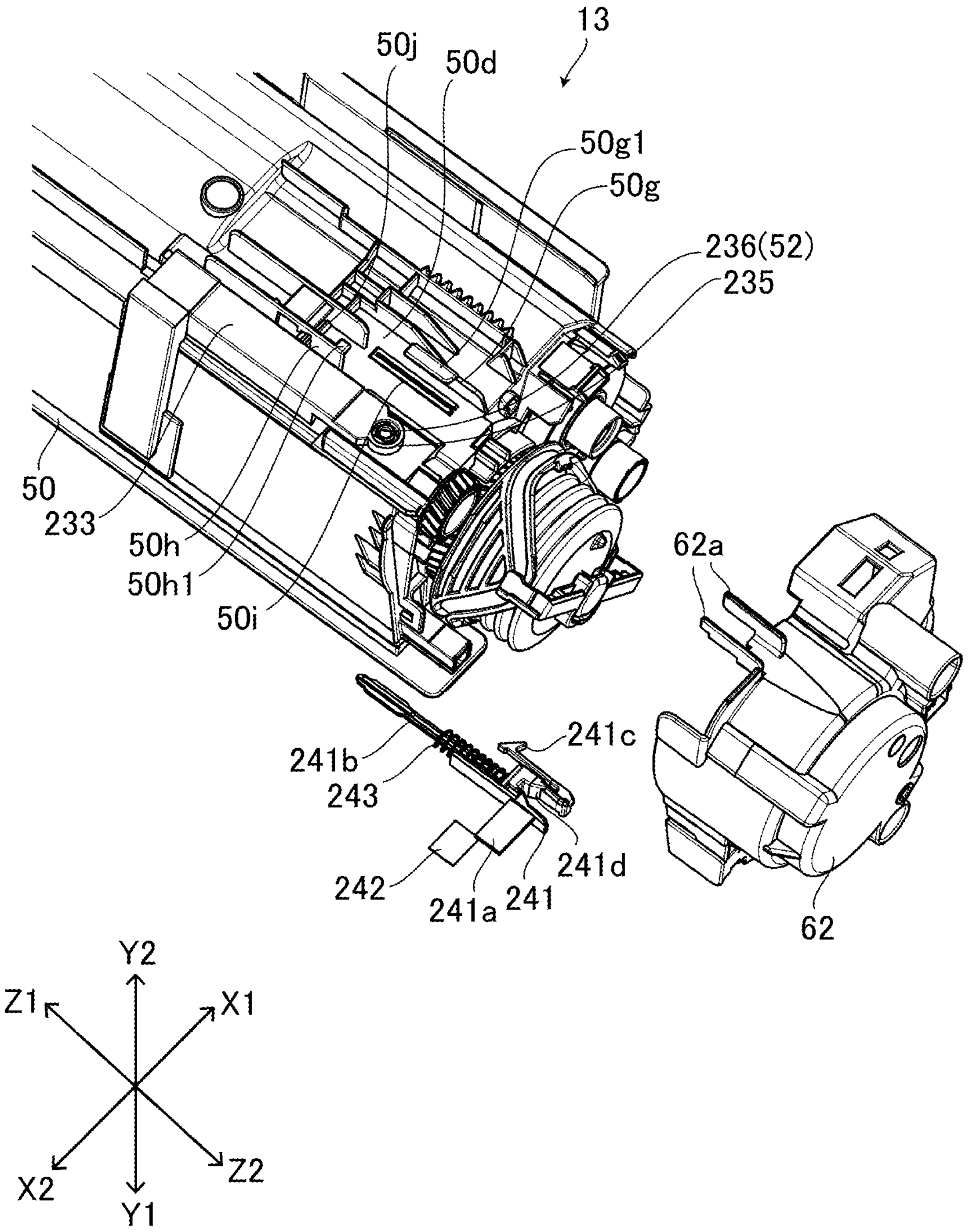

FIG. 70 is an exploded perspective view of the toner cartridge as viewed from a bottom side.

Figure 71:
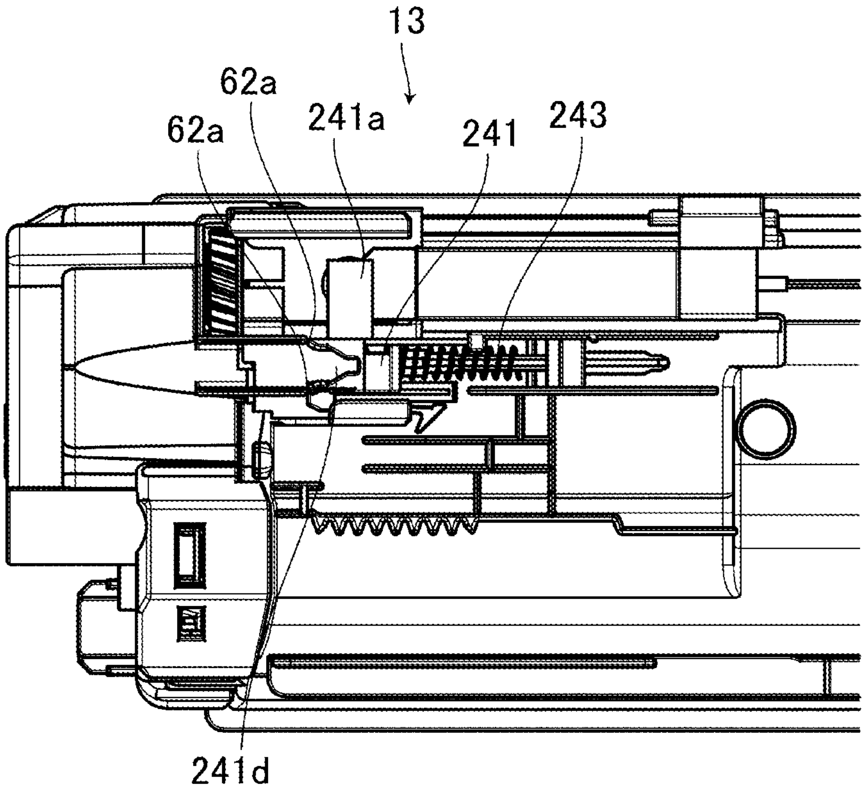
Figure 71:
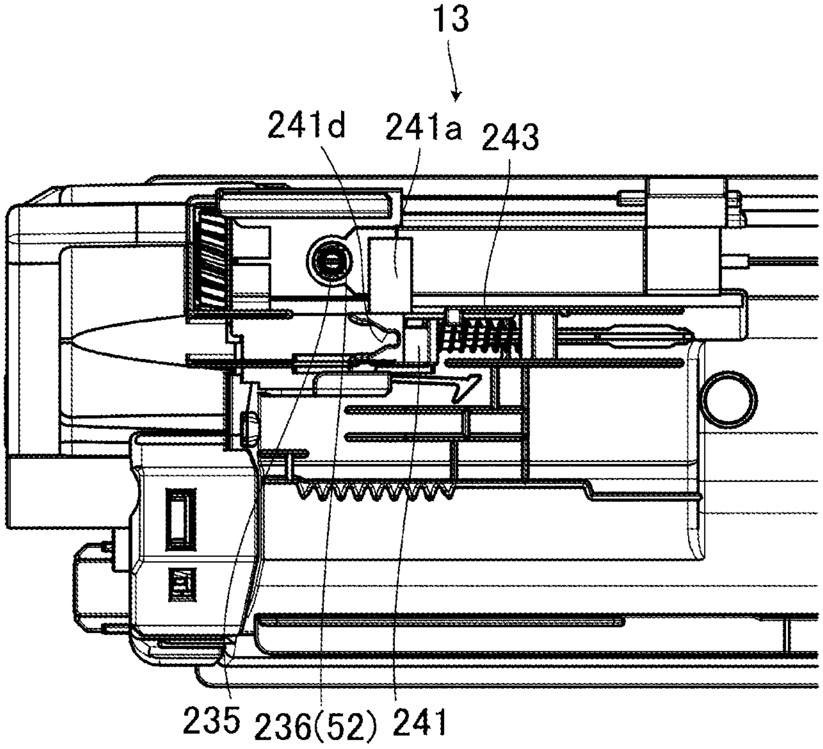

Part (a) of FIG. 71 is a bottom view illustrating a shutter member positioned at a closing position, and part (b) of FIG. 71 is a bottom view of the shutter member positioned at the opening position.

Figure 72:
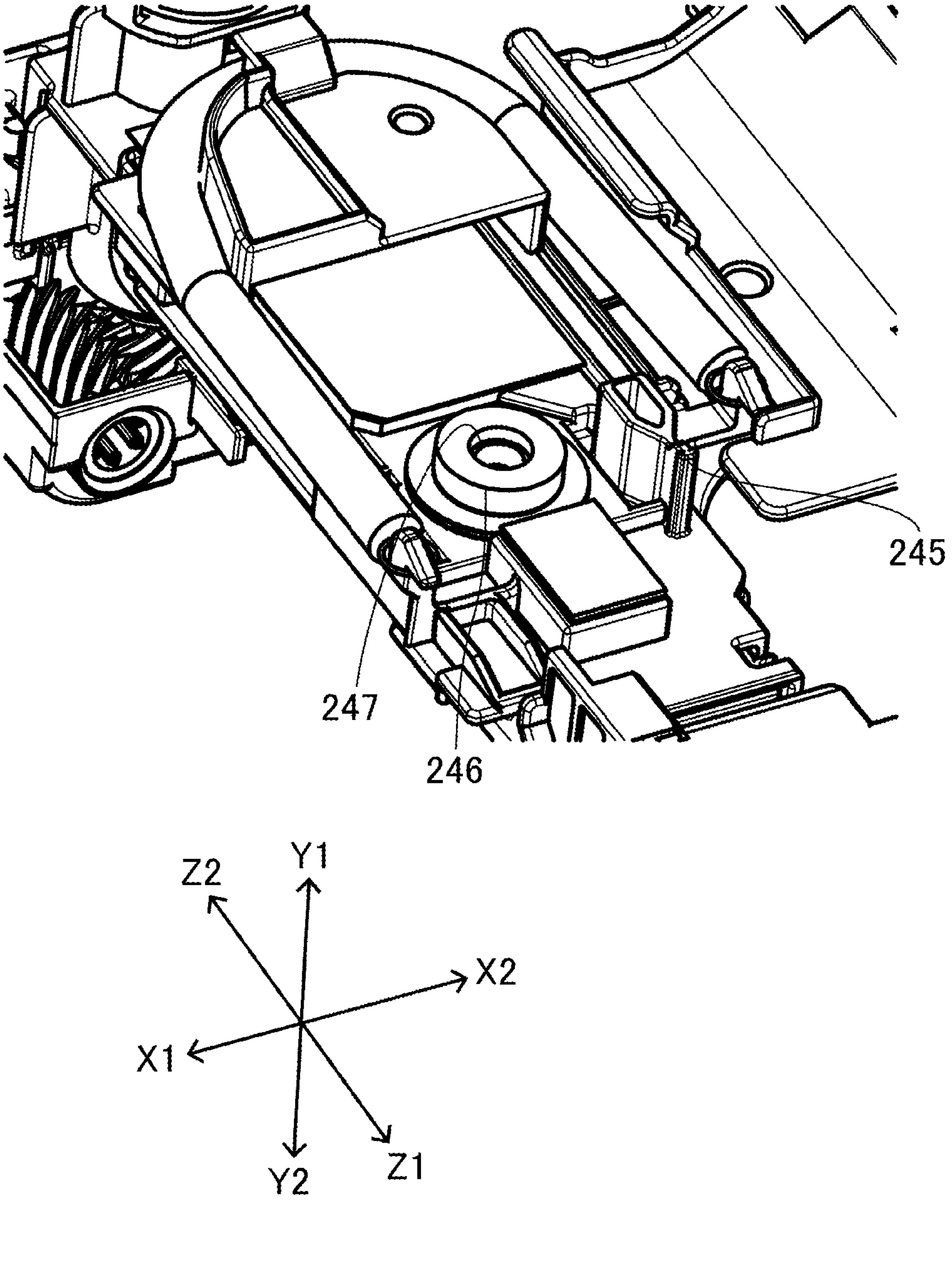

FIG. 72 is a perspective view illustrating the receiving portion of an image forming apparatus 100.

Figure 73:
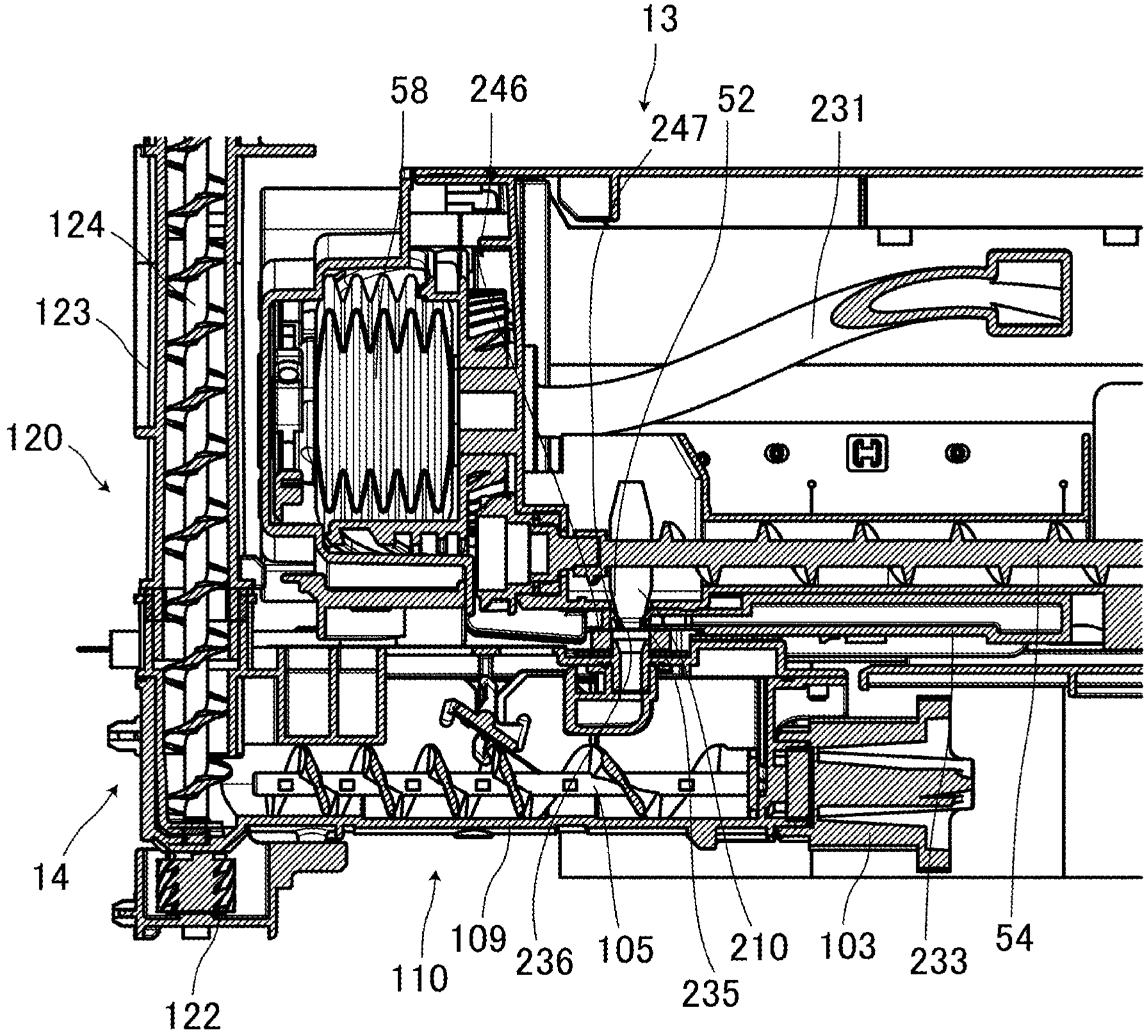

FIG. 73 is a sectional view illustrating a toner feeding device and a toner cartridge.

Figure 74:
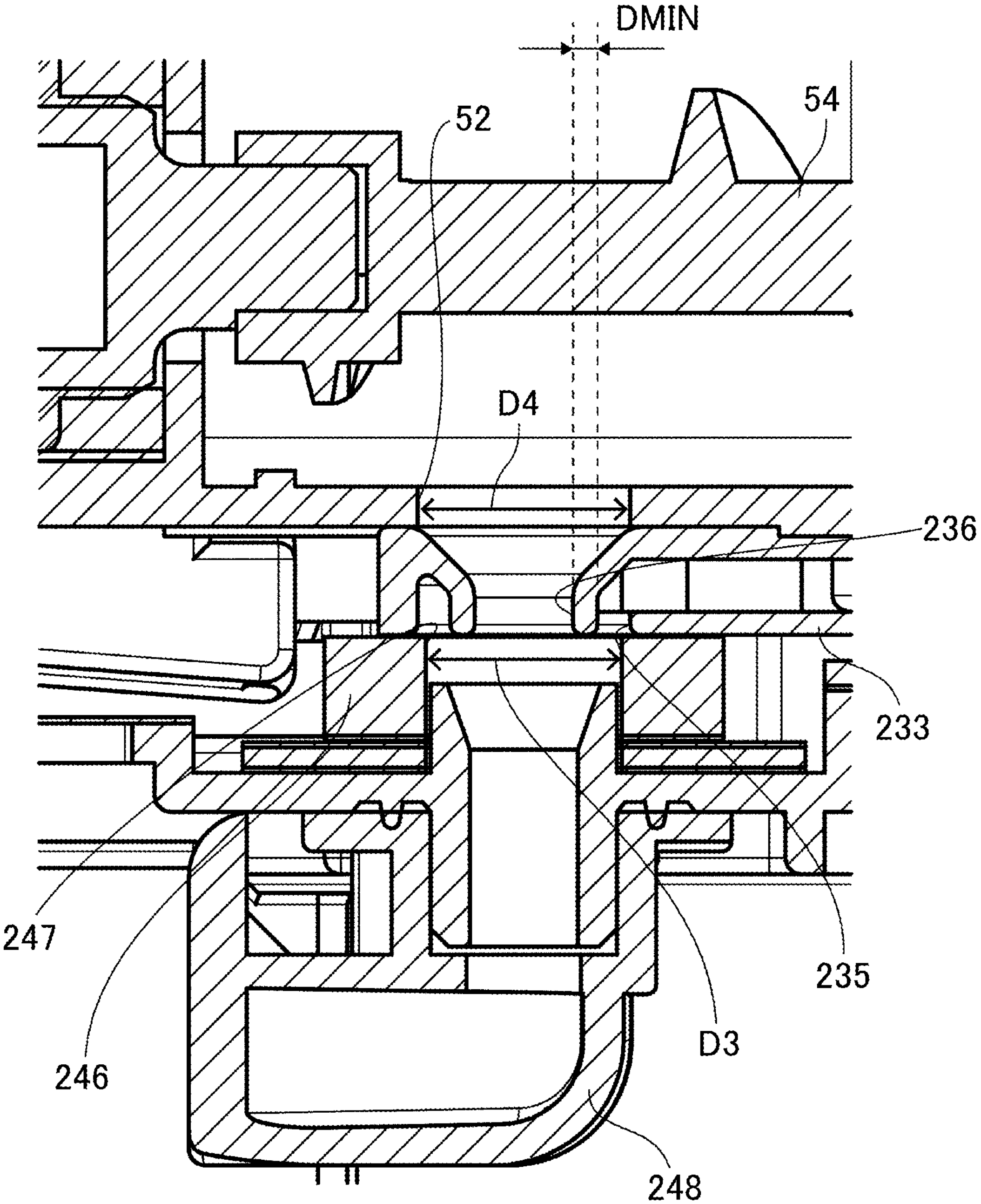

FIG. 74 is a sectional view illustrating a pipe portion of the image forming apparatus.

Figure 75:
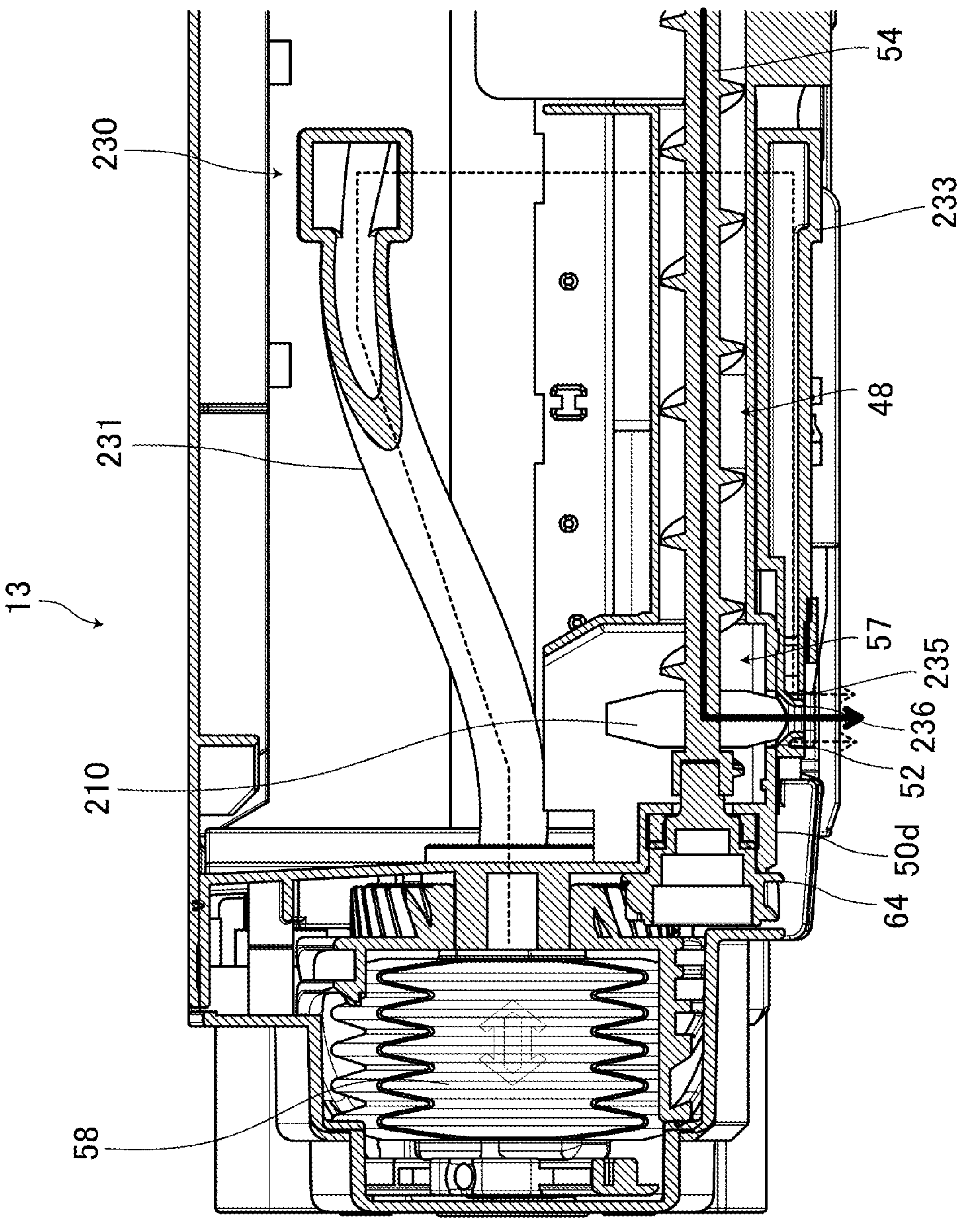

FIG. 75 is a sectional view illustrating a toner feeding path and an air discharging path.

Figure 76:
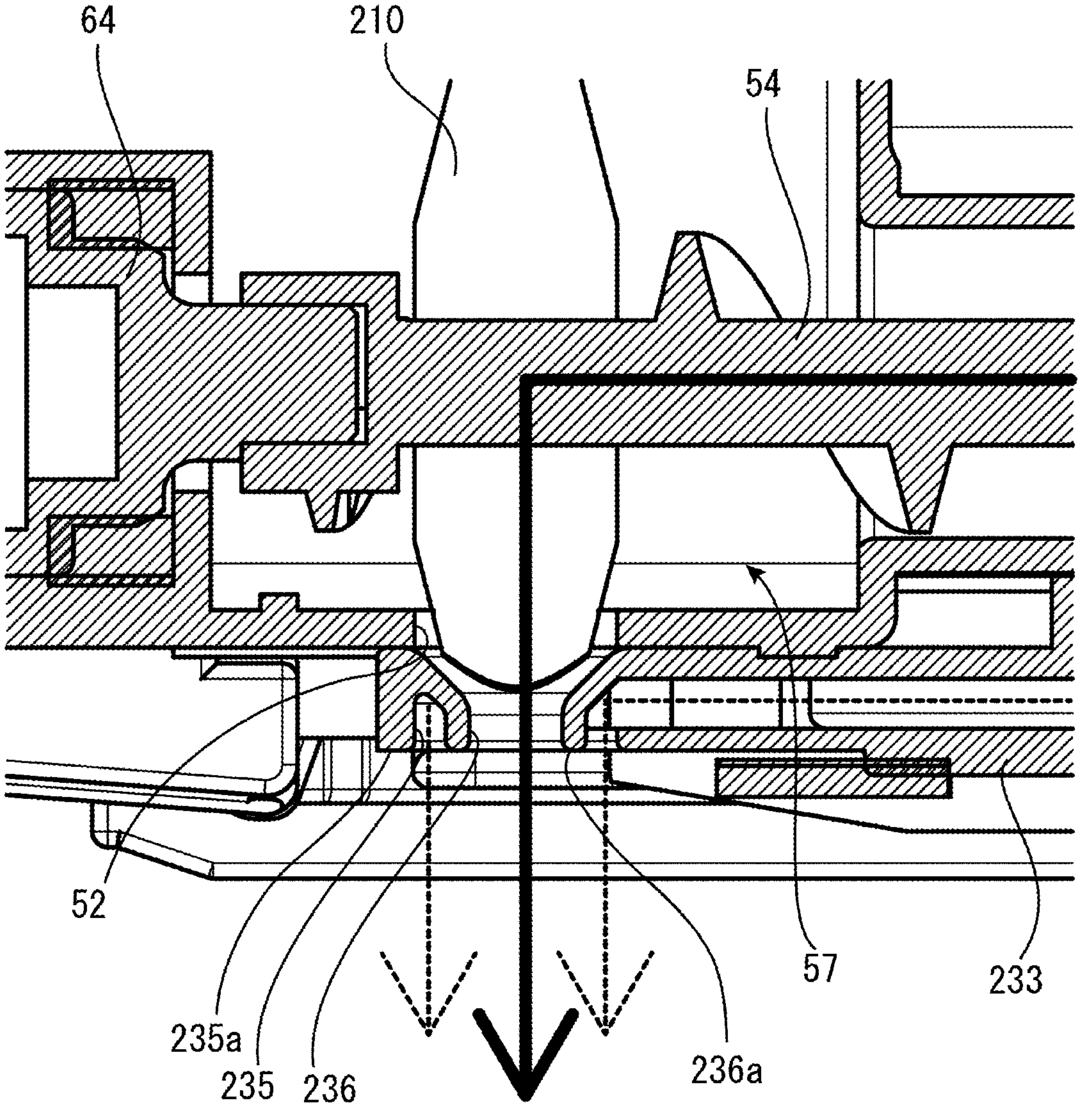

FIG. 76 is an enlarged sectional view illustrating a toner feeding path and an air discharging path.

Figure 77:
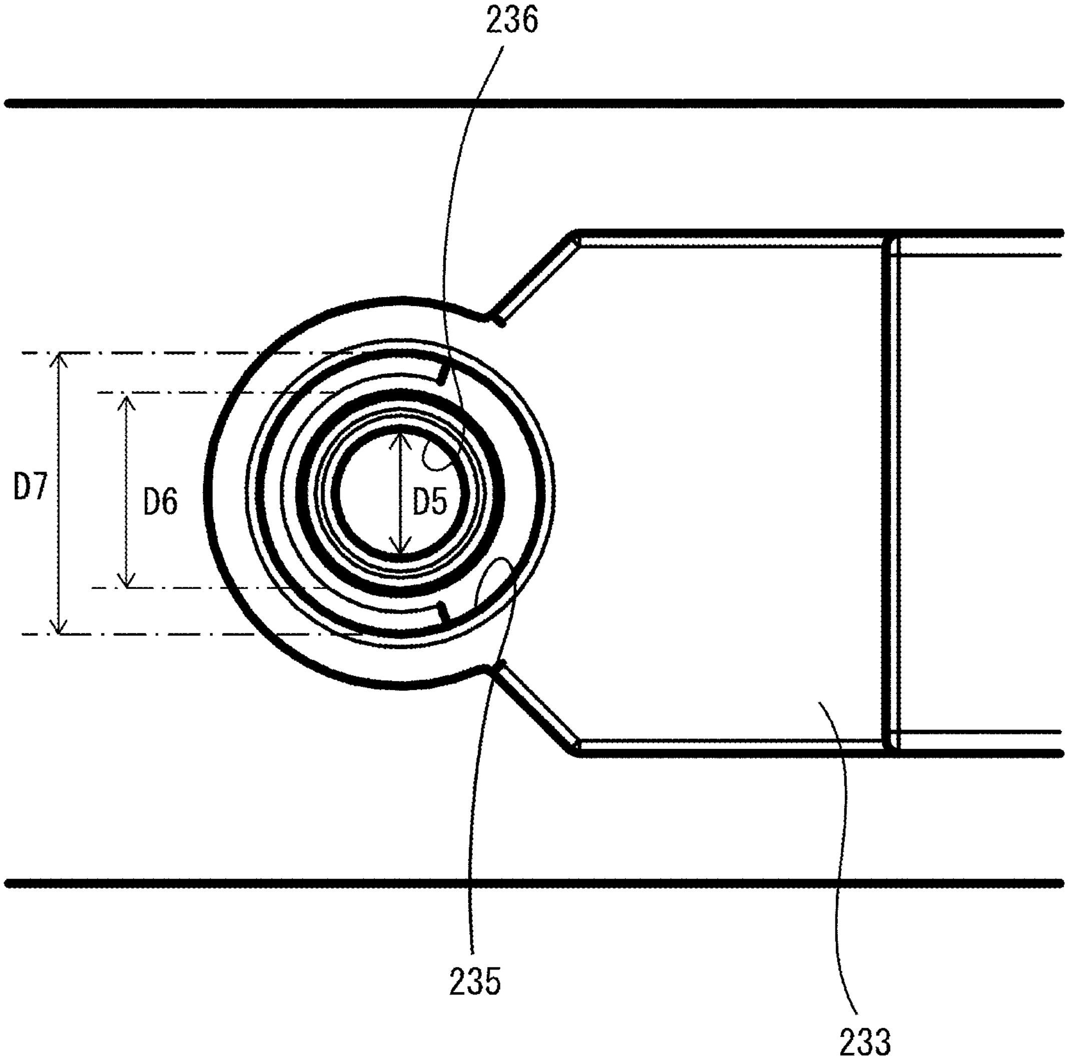

FIG. 77 is a bottom view illustrating an air discharge opening and a hole.

Figure 78:
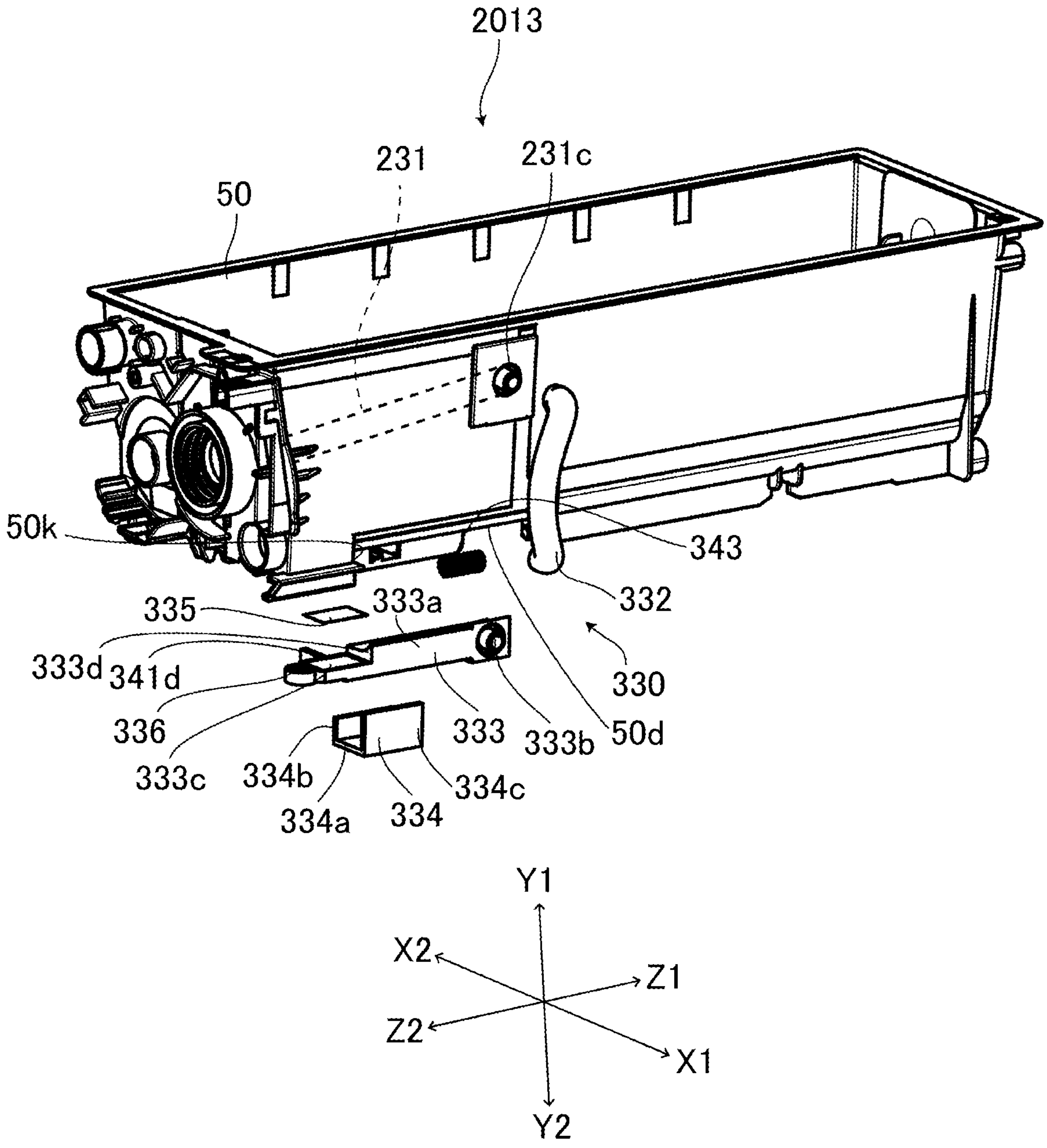

FIG. 78 is an exploded perspective view illustrating a toner cartridge according to Embodiment 16.

Figure 79:
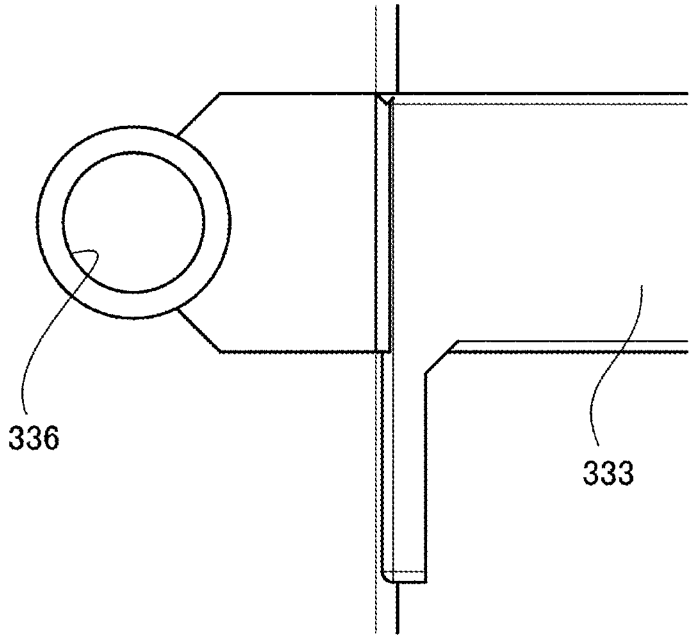
Figure 79:
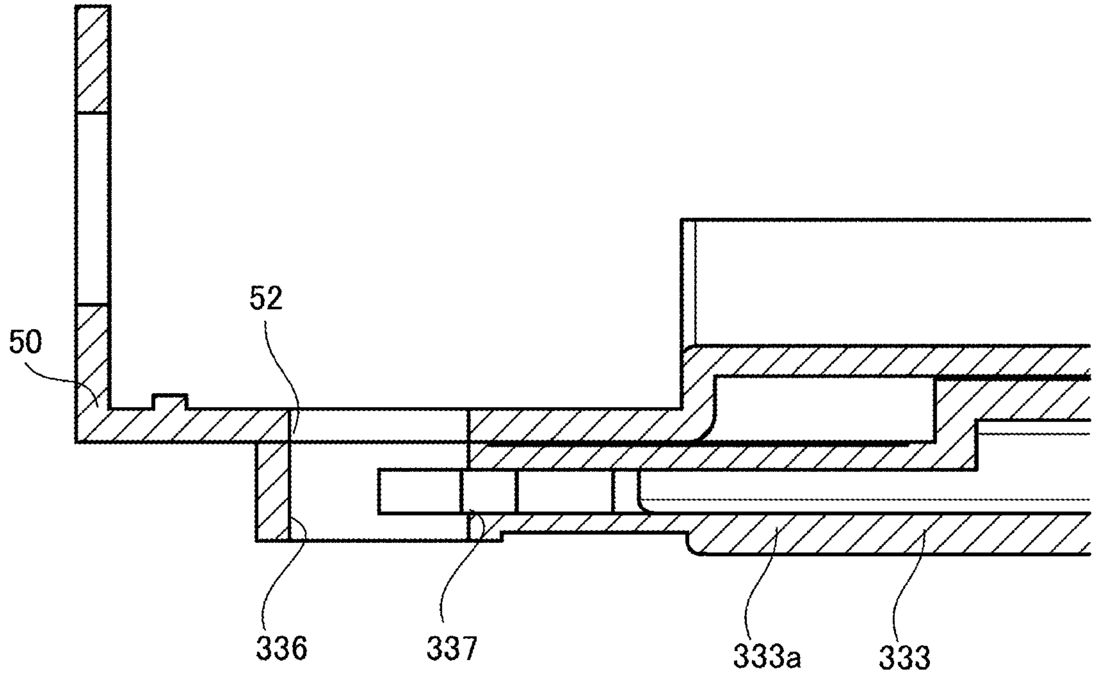

Part (a) of FIG. 79 is a bottom view illustrating a third duct member, and part (b) of FIG. 79 is a sectional view illustrating a toner discharge opening and an air discharge opening.

Figure 80:
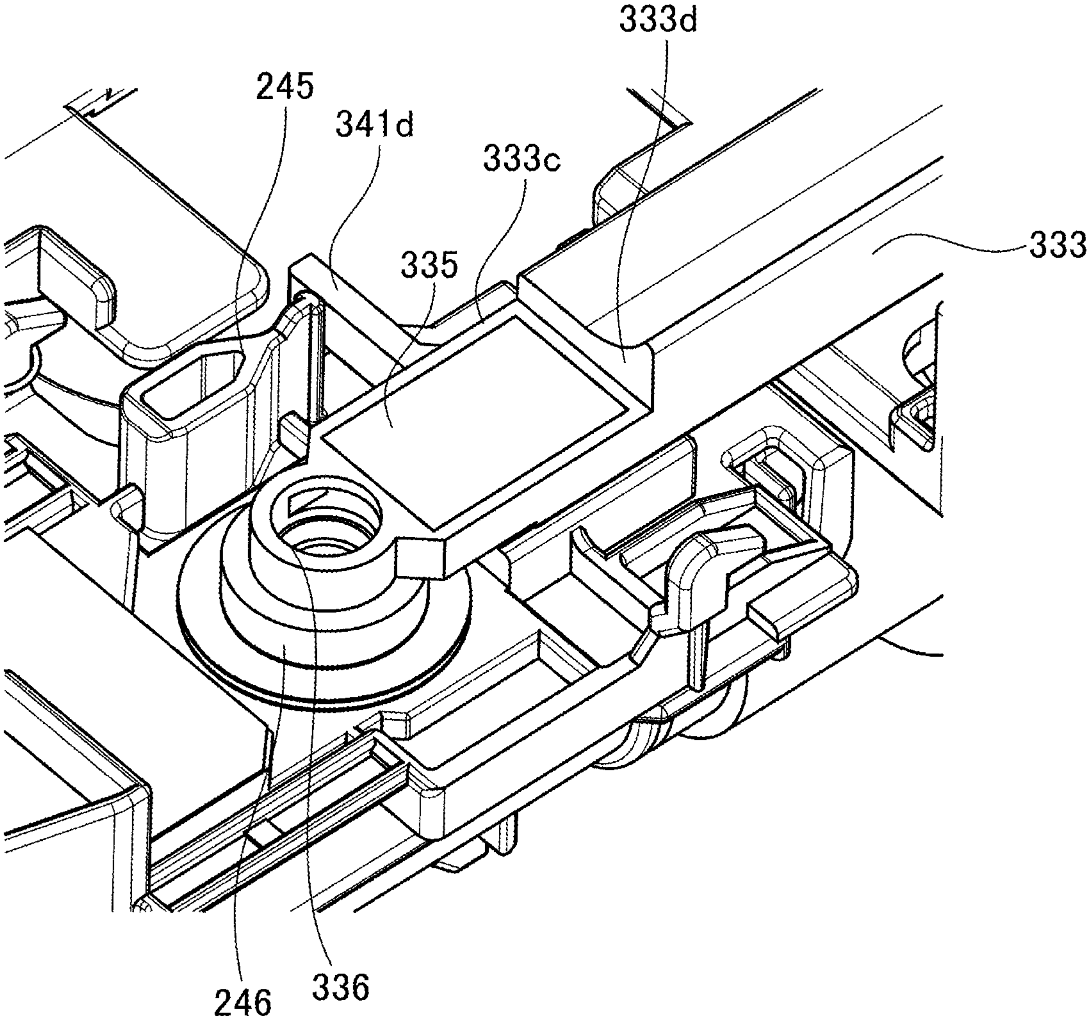

FIG. 80 is a perspective view illustrating the third duct member at the time when the toner cartridge is mounted to the image forming apparatus.

Figure 81:
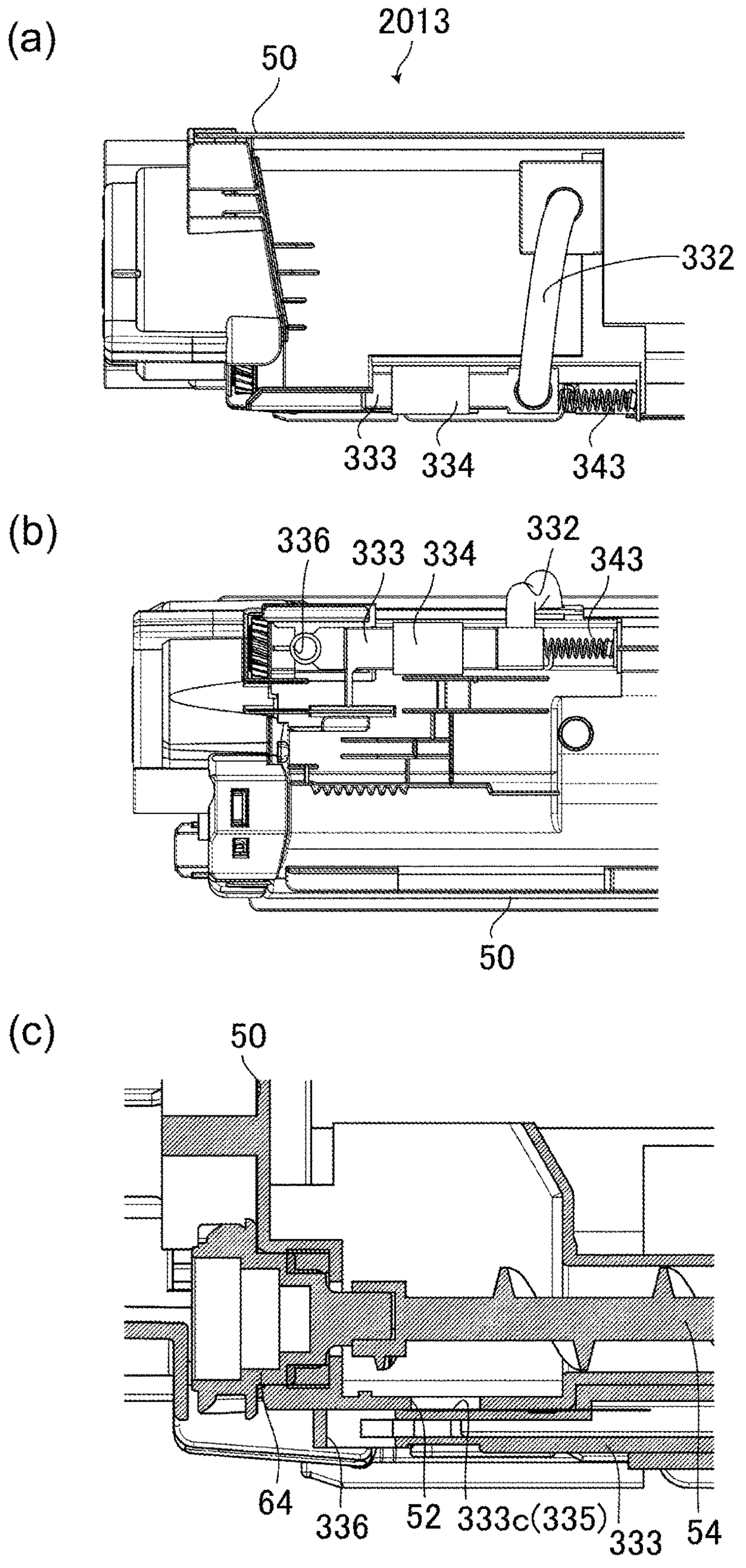

Part (a) of FIG. 81 is a front view of the third duct member positioned at a closing position, part (b) of FIG. 81 is a bottom view of the third duct member positioned at the closing position, and part (c) of FIG. 81 is a sectional view illustrating the third duct member positioned at the closing position.

Figure 82:
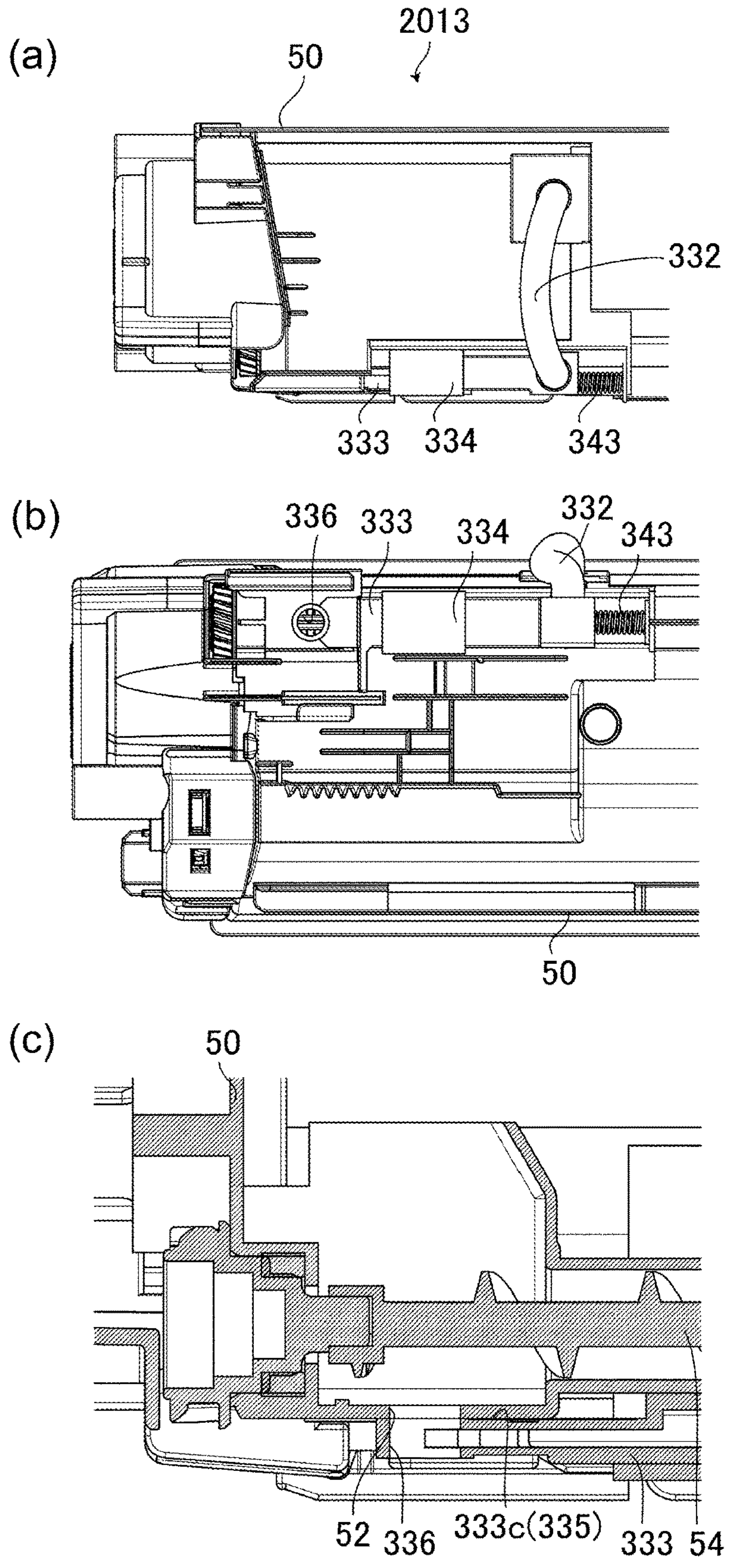

Part (a) of FIG. 82 is a front view illustrating the third duct member positioned at an opening position, part (b) of FIG. 82 is a bottom view illustrating the third duct member positioned at the opening position, and part (c) of FIG. 82 is a sectional view illustrating the third duct member positioned at the opening position.

Figure 83:
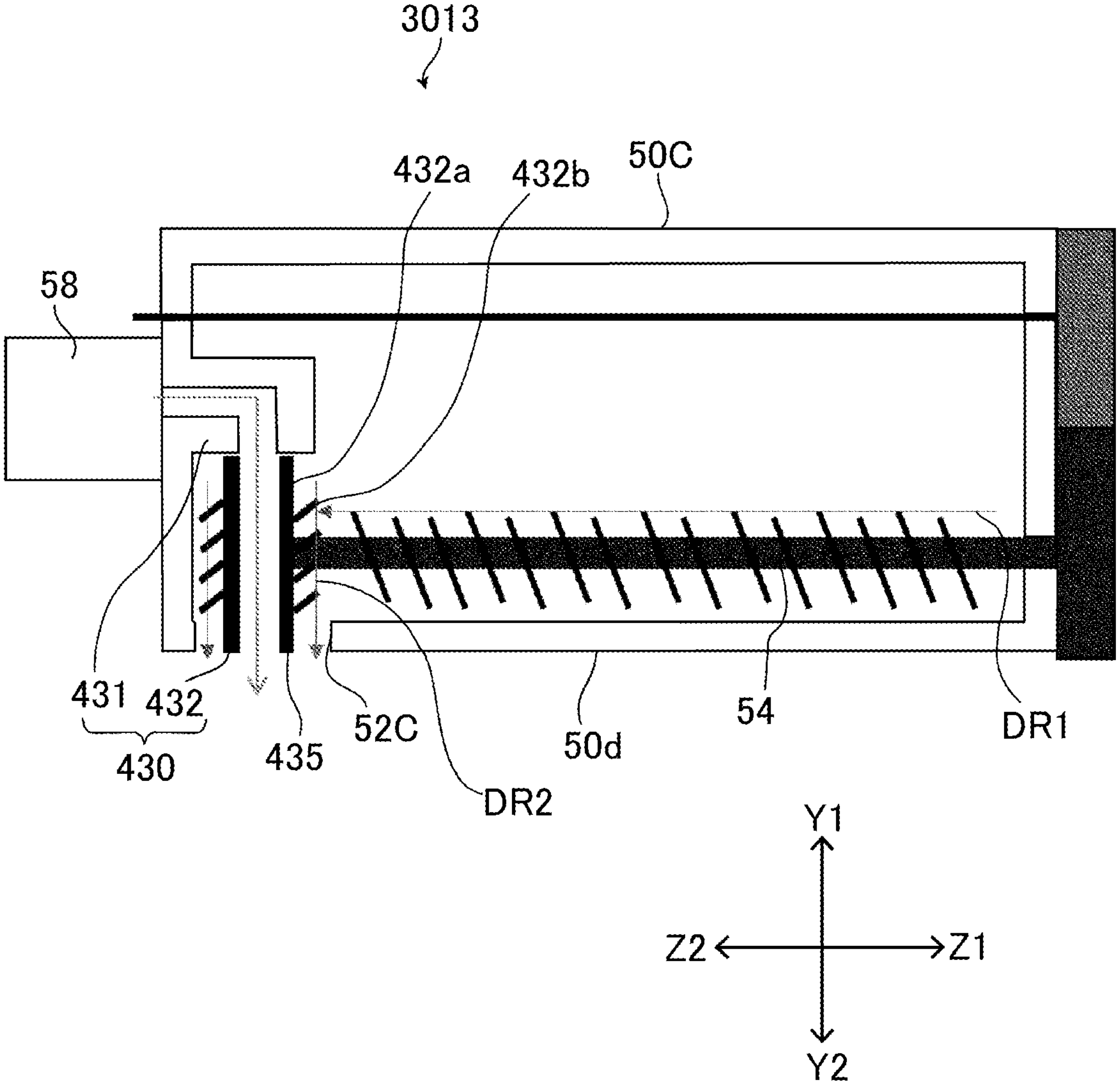

FIG. 83 is a schematic illustration of a toner cartridge according to Embodiment 17.

Figure 84:
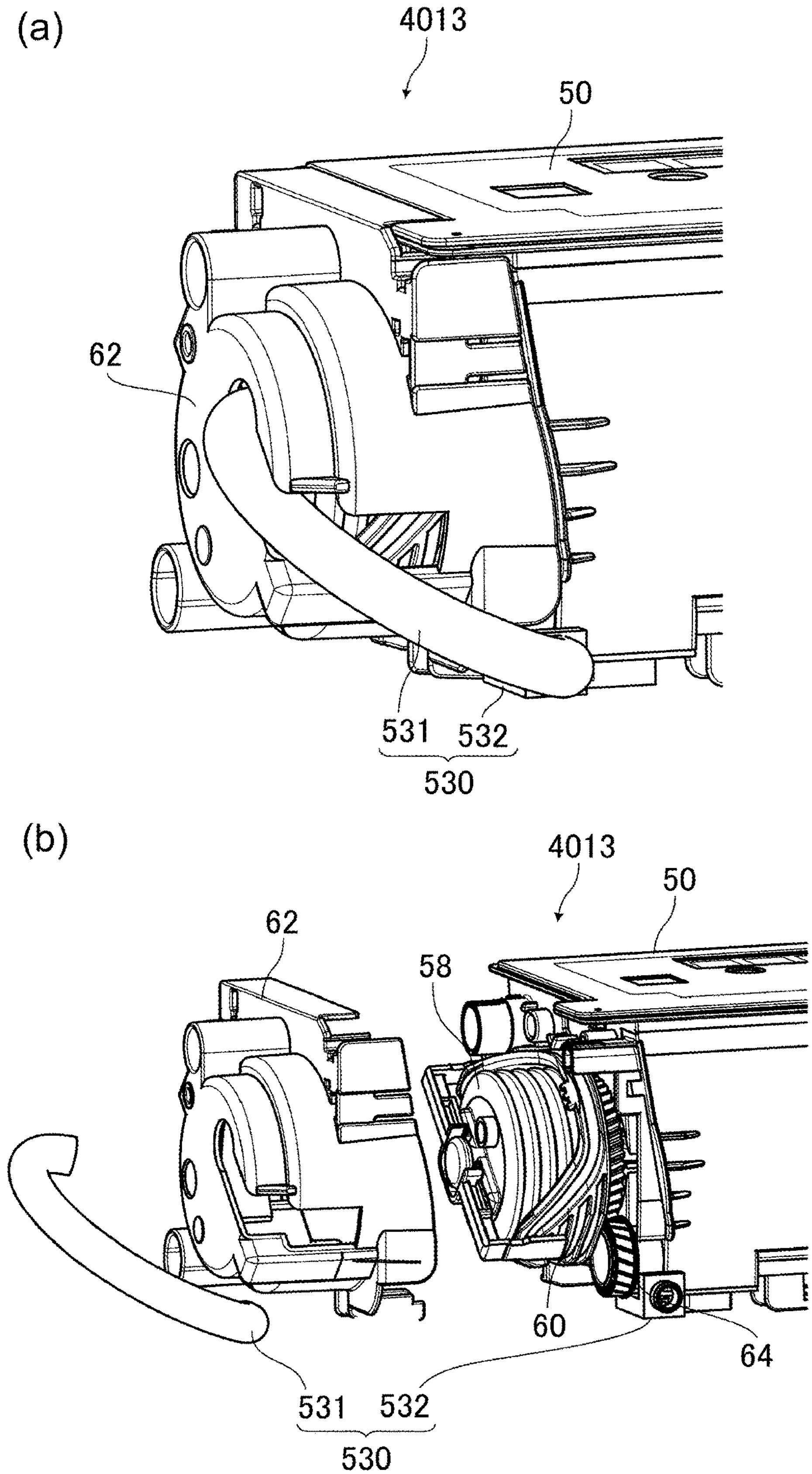

Part (a) of FIG. 84 is a perspective view illustrating a duct in Embodiment 18, and part (b) of FIG. 84 is an exploded perspective view illustrating a toner cartridge according to Embodiment 18.

Figure 85:
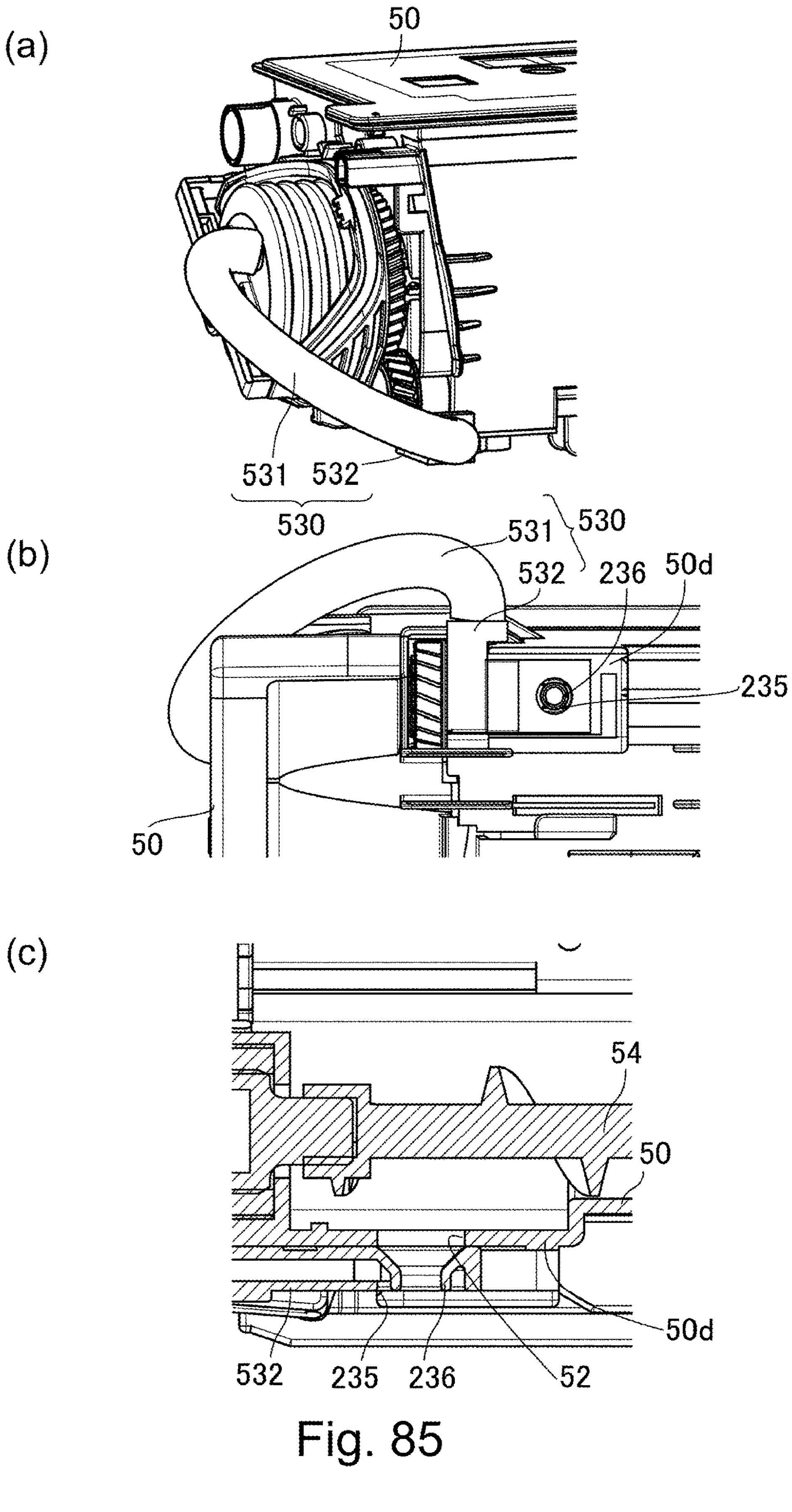

Part (a) of FIG. 85 is a perspective view illustrating a duct, part (b) of FIG. 85 is a bottom view illustrating a second duct member, and part (c) of FIG. 85 is a cross-sectional view illustrating the toner discharge opening and the air discharge opening.

Figure 86:
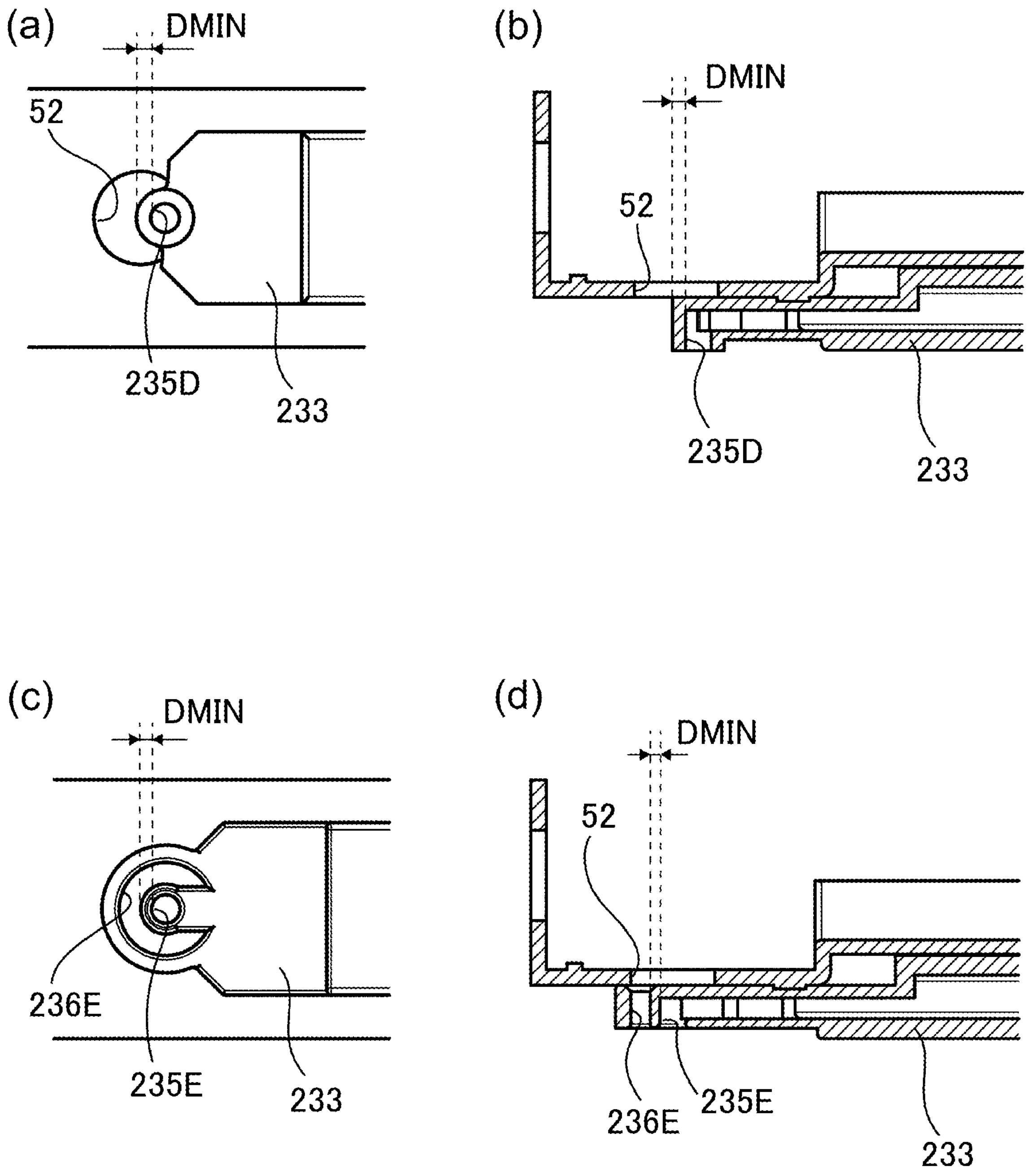

Part (a) of FIG. 86 is a bottom view illustrating a toner discharge opening and an air discharge opening according to another embodiment, part (b) of FIG. 86 is a sectional view of the toner discharge opening and the air discharge opening, part (c) of FIG. 86 is a bottom view of the toner discharge opening and the air discharge opening, and part (d) of FIG. 86 is a sectional view of the toner discharge opening and the air discharge opening.

DESCRIPTION OF EMBODIMENTS

Embodiment 1

Embodiment 1 will be described below in conjunction with the accompanying drawings. However, the dimensions, materials, shapes, and relative arrangement of the components described in the embodiments should be changed as appropriate according to the structure of the device to which the invention is applied and various conditions, and it is not intended to limit the scope of the present invention to the following embodiments.

[General Structure of Image Forming Apparatus]

Figure 1:
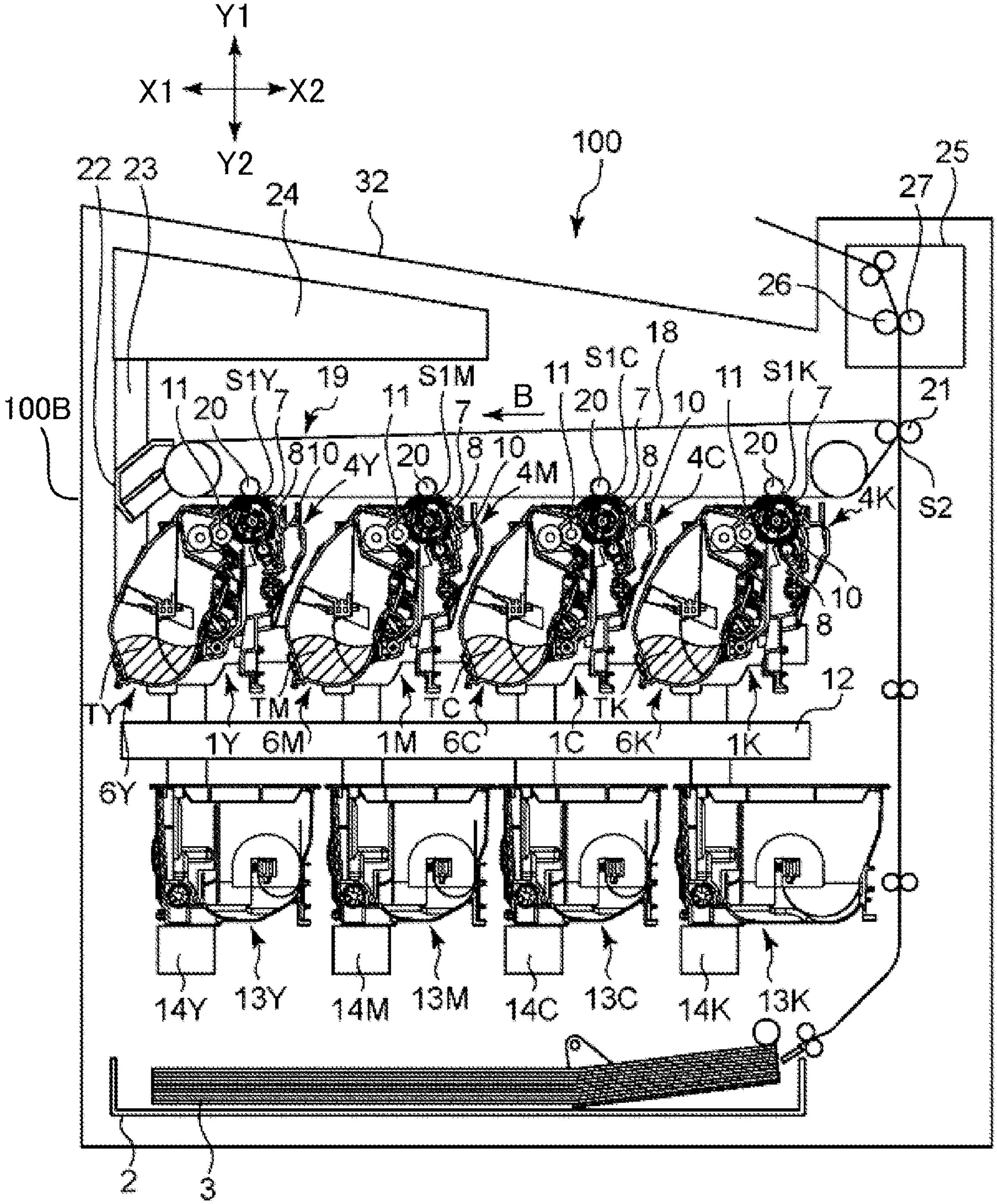
FIG. 1 is a schematic cross-sectional view illustrating an image forming apparatus according to Embodiment 1.

Referring to FIG. 1, an overall structure of an image forming apparatus 100 (hereinafter referred to as image forming apparatus 100) according to Embodiment 1 will be described. FIG. 1 is a schematic illustration showing an image forming apparatus 100, which is an electrophotographic printer, according to Embodiment 1. In this embodiment, the process cartridge 1 and the toner cartridge 13 are mountable to and dismountable from a main assembly 100B of the image forming apparatus 100. Note that the portion of the image forming apparatus 100 excluding the cartridges (1, 13) may be called the main assembly of the image forming apparatus 100 or the apparatus main assembly

100B. The apparatus main assembly 100B is structured to receive toner discharged from the toner cartridge 13.

In this embodiment, the structures and operations of the first to fourth image forming units are substantially the same except that the colors of the images to be formed are different. Therefore, in the following description, the suffixes Y to K will be omitted and a general description will be given unless a particular distinction is required.

The first to fourth process cartridges 1 are arranged horizontally. Each process cartridge 1 comprises a cleaning unit 4 and a developing unit 6. The cleaning unit 4 includes a photosensitive drum 7 as an image bearing member, a charging roller 8 as charging means for uniformly charging the surface of the photosensitive drum 7, and a cleaning blade 10 as cleaning means. The developing unit 6 includes a developing roller 11 and developing means, containing developer (hereinafter referred to as toner) T, for developing an electrostatic latent image on the photosensitive drum 7. The cleaning unit 4 and the developing unit 6 are supported so as to be swingable relative to each other. The first process cartridge 1Y contains yellow (Y) toner in the developing unit 6. Similarly, the second process cartridge 1M contains magenta (M) toner, the third process cartridge 1C contains cyan (C) toner, and the fourth process cartridge 1K contains black (K) toner.

The process cartridge 1 can be mounted to and dismounted from the main assembly of the image forming apparatus 100 by way of mounting means such as a mounting guide (not shown) and a positioning member (not shown) provided in the main assembly of the image forming apparatus 100. A scanner unit 12 for forming an electrostatic latent image is provided below the process cartridge 1. Further, a waste toner feeding unit 23 is provided behind the process cartridge 1 (downstream of the process cartridge 1 in the inserting direction of the process cartridge 1) in the image forming apparatus.

The first to fourth toner cartridges 13 are arranged horizontally below the process cartridge 1 in the order corresponding to the color of the toner accommodated in each process cartridge 1. The toner cartridge 13 may be simply referred to as the cartridge 13 in the following description.

The first cartridge 13Y contains yellow (Y) toner, the second cartridge 13M contains magenta (M), the third cartridge 13C contains cyan (C), and the fourth cartridge 13K contains black toner (K). Each cartridge 13 supplies toner to the process cartridge 1 containing toner of the same color.

The toner supplying operation (supplying operation) by the cartridge 13 is performed when a remaining amount detecting portion (not shown) provided in the apparatus main assembly 100B of the image forming apparatus 100 detects that the remaining amount of the toner in the process cartridge 1 is insufficient. The cartridge 13 can be mounted to and dismounted from the image forming apparatus 100 by way of mounting means such as a mounting guide (not shown) and a positioning member (not shown) provided on the main assembly of the image forming apparatus 100.

In addition, for distinguishing between the toner cartridge 13 and the process cartridge 1, it may be the case that one of them is called the first cartridge and the other is called the second cartridge. A detailed description of the process cartridge 1 and the cartridge 13 will be made later.

Inside the main assembly of the image forming apparatus 100, first to fourth toner feeding devices 14 are provided below the first to fourth cartridges 13 correspondingly to the respective cartridges 13. Above the process cartridge 1, an intermediary transfer unit 19 is provided as an intermediary transfer member. The intermediary transfer unit 19 is provided substantially horizontal with a primary transfer portion S1 facing downward. The intermediary transfer belt 18 facing each photosensitive drum 7 is a rotatable endless belt and stretched around a plurality of tension rollers. On the inner surface of the intermediary transfer belt 18, primary transfer rollers 20 as primary transfer members are arranged at positions where they form the primary transfer portions S1 in cooperation with the associated photosensitive drums 7 with the intermediary transfer belt 18 interposed therebetween. A secondary transfer roller 21, which is a secondary transfer member, is in contact with the intermediary transfer belt 18 and forms a secondary transfer portion S2 with a roller on the opposite side across the intermediary transfer belt 18. Further, the cleaning unit 4 is disposed on the side opposite to the secondary transfer portion S2 in the left-right direction (the direction in which the secondary transfer portion S2 and the intermediary transfer belt are stretched).

A fixing unit 25 is disposed above the intermediary transfer unit 19. The fixing unit 25 comprises a heating unit 26 and a pressure roller 27 that is pressed against the heating unit 26. A discharge tray 32 is provided at the upper surface of the apparatus main assembly 100B, and a waste toner collection container 24 is provided between the discharge tray 32 and the intermediary transfer unit. Further, a sheet feed tray 2 for containing the recording material 3 is provided at the bottom of the apparatus main assembly.

Figure 2:
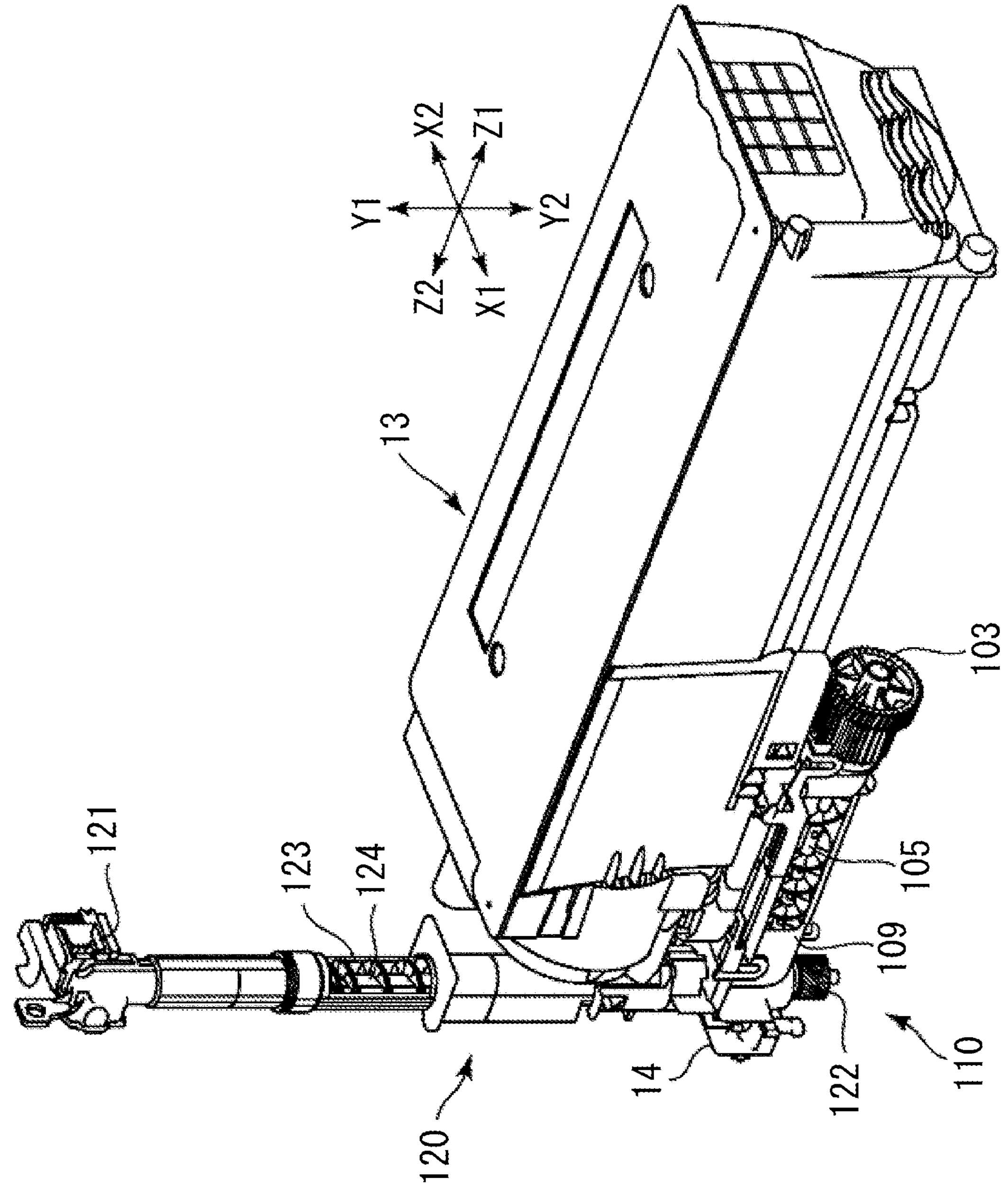
FIG. 2 is a schematic structure illustration showing a toner feeding device mounted in the image forming apparatus.

FIG. 2 schematically shows a structure of the toner feeding device 14 in the image forming apparatus. In addition, FIG. 2 is partially cut away to show the internal structure of the toner feeding device 14. Also, in FIG. 2, a duct 230 which will be described hereinafter is omitted. The toner feeding device 14 as a supply portion is generally divided into an upstream feeding portion 110 and a downstream feeding portion 120.

A supply opening (receiving opening, not shown) is provided at the upper surface of the upstream feeding portion 110. The toner supplied from the toner cartridge 13 (that is, the toner discharged from a frame opening 52 in FIG. 8 which will be explained hereinafter) passes through the supply opening and is supplied to the storage container 109 inside the upstream feeding portion 110.

The toner supplied to the storage container 109 is conveyed by the upstream side screw 105 covered with the storage container 109. The upstream side screw 105 is rotationally driven by an upstream driving gear 103, and the upstream side screw 105 conveys the toner toward the downstream feeding portion 120.

In the downstream feeding portion 120, a downstream side wall surface 123 is provided, and inside the downstream side wall surface 123, a downstream side screw 124 is provided. The most upstream portion of the downstream feeding portion 120 is connected to the most downstream portion of the upstream feeding portion 110, and the toner conveyed by the upstream feeding portion 110 is fed by the downstream side screw 124.

The downstream side screw 124 is rotationally driven by a downstream side drive gear 122 to convey the toner in a direction against gravity. The downstream side screw 124 supplies the toner fed in the direction against gravity to the process cartridge 1 shown in FIG. 1.

More specifically, the toner discharged from the main discharge opening 121 is replenished into the developing unit 6 through a receiving opening 40 provided in the developing unit 6 of the process cartridge 1 as a cartridge shown in part (b) of FIG. 5.

In this manner, the apparatus main assembly of the image forming apparatus temporarily receives the toner discharged from the toner cartridge 13 in the storage container 109, and then supplies the toner to the process cartridge 1 using the upstream side screw 105 and the downstream side screw 124. By this, the toner is transported between the different cartridges 13, 1.

[Image Forming Process]

Figure 3:
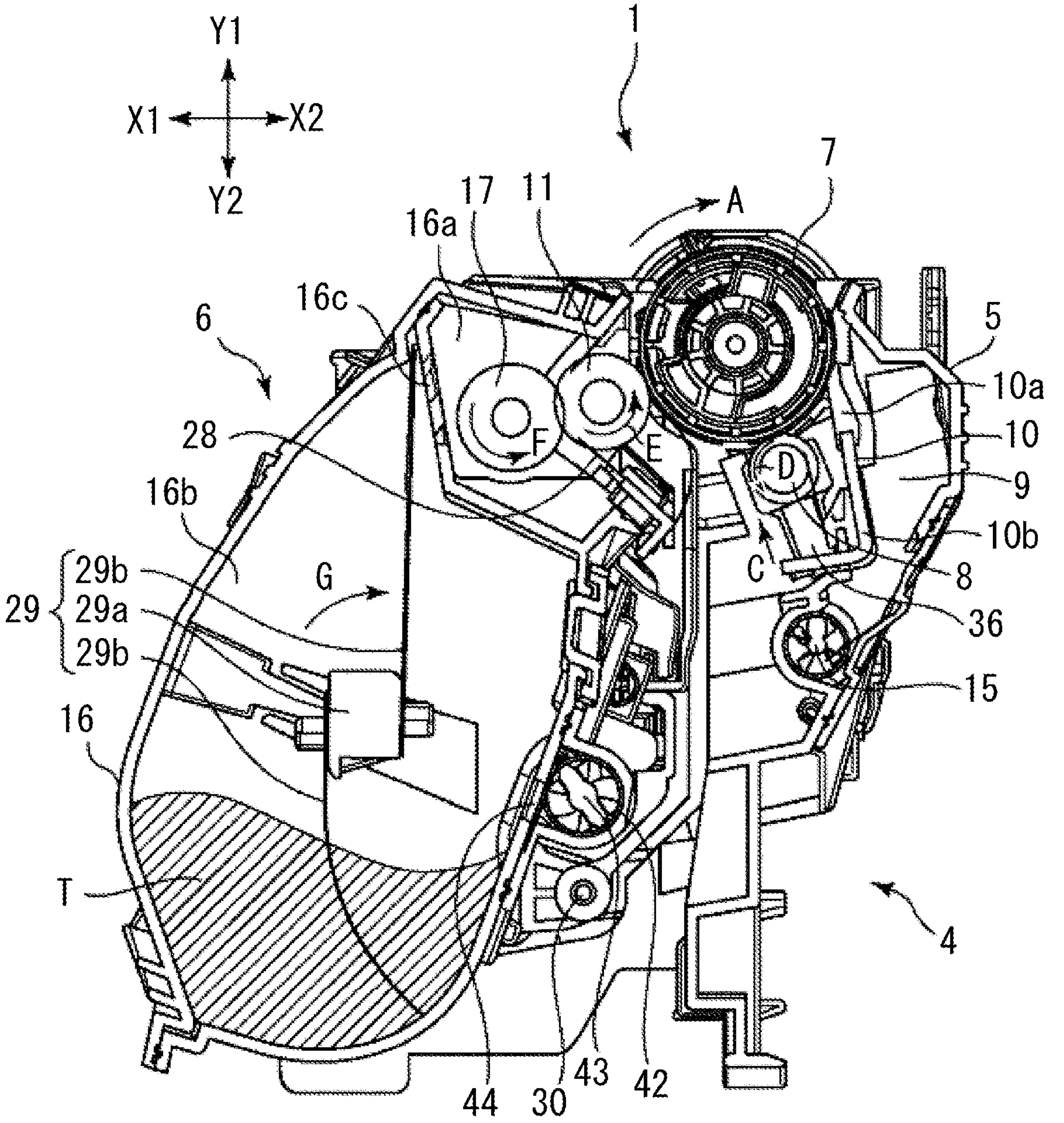
FIG. 3 is a sectional view illustrating a process cartridge.

Next, referring to FIGS. 1 and 3, an image forming operation in the image forming apparatus 100 will be described. During the image forming operation, the photosensitive drum 7 is rotationally driven at a predetermined speed in the direction of arrow A in FIG. 3. The intermediary transfer belt 18 is rotationally driven in the direction of arrow B (codirectional with peripheral movement of the rotation of the photosensitive drum 7).

First, the surface of the photosensitive drum 7 is uniformly charged by the charging roller 8. Next, an electrostatic latent image based on image information is formed on the photosensitive drum 7 by scanning the surface of the photosensitive drum 7 with laser beam emitted from the scanner unit 12. The electrostatic latent image formed on the photosensitive drum 7 is developed into a toner image by the developing unit 6. At this time, the developing unit 6 is pressed by a development pressing unit (not shown) provided in the main assembly of the image forming apparatus 100. The toner image formed on the photosensitive drum 7 is primarily transferred onto the intermediary transfer belt 18 by the primary transfer roller 20.

For example, during a full-color image forming operation, the above-described process operations are sequentially performed in the image forming portions S1Y to S1K, which are the first to fourth primary transfer portions, so that toner images of respective colors are sequentially superimposed on the intermediary transfer belt 18.

On the other hand, the recording material 3 accommodated in the sheet feed tray 2 is fed at a predetermined control timing, and is fed to the secondary transfer portion S2 in synchronization with the movement of the intermediary transfer belt 18. Then, the four-color toner images on the intermediary transfer belt 18 are collectively secondarily transferred onto the recording material 3 by the secondary transfer roller 21 in contact with the intermediary transfer belt 18 with the recording material 3 interposed therebetween.

Thereafter, the recording material 3 onto which the toner image has been transferred is fed to the fixing unit 25. The toner image is fixed on the recording material 3 by heating and pressing the recording material 3 in the fixing unit 25. Thereafter, the recording material 3 on which the toner image is fixed is fed to the discharge tray 32 to complete the image forming operation.

Further, primary untransferred residual toner (waste toner) remaining on the photosensitive drum 7 after the primary transfer process is removed by the cleaning blade 10. Secondary untransferred residual toner (waste toner) remaining on the intermediary transfer belt 18 after the secondary transfer process is removed by the intermediary transfer belt cleaning unit 22. The waste toner removed by the cleaning blade 10 and the intermediary transfer belt cleaning unit 22 is fed by a waste toner feeding unit 23 provided in the apparatus main assembly and accumulated in a waste toner collection container 24. The image forming apparatus 100 is also capable of forming a monochromatic or multicolor image using only a desired single or more (but not all) image forming portions.

[Process Cartridge]

Figure 4:
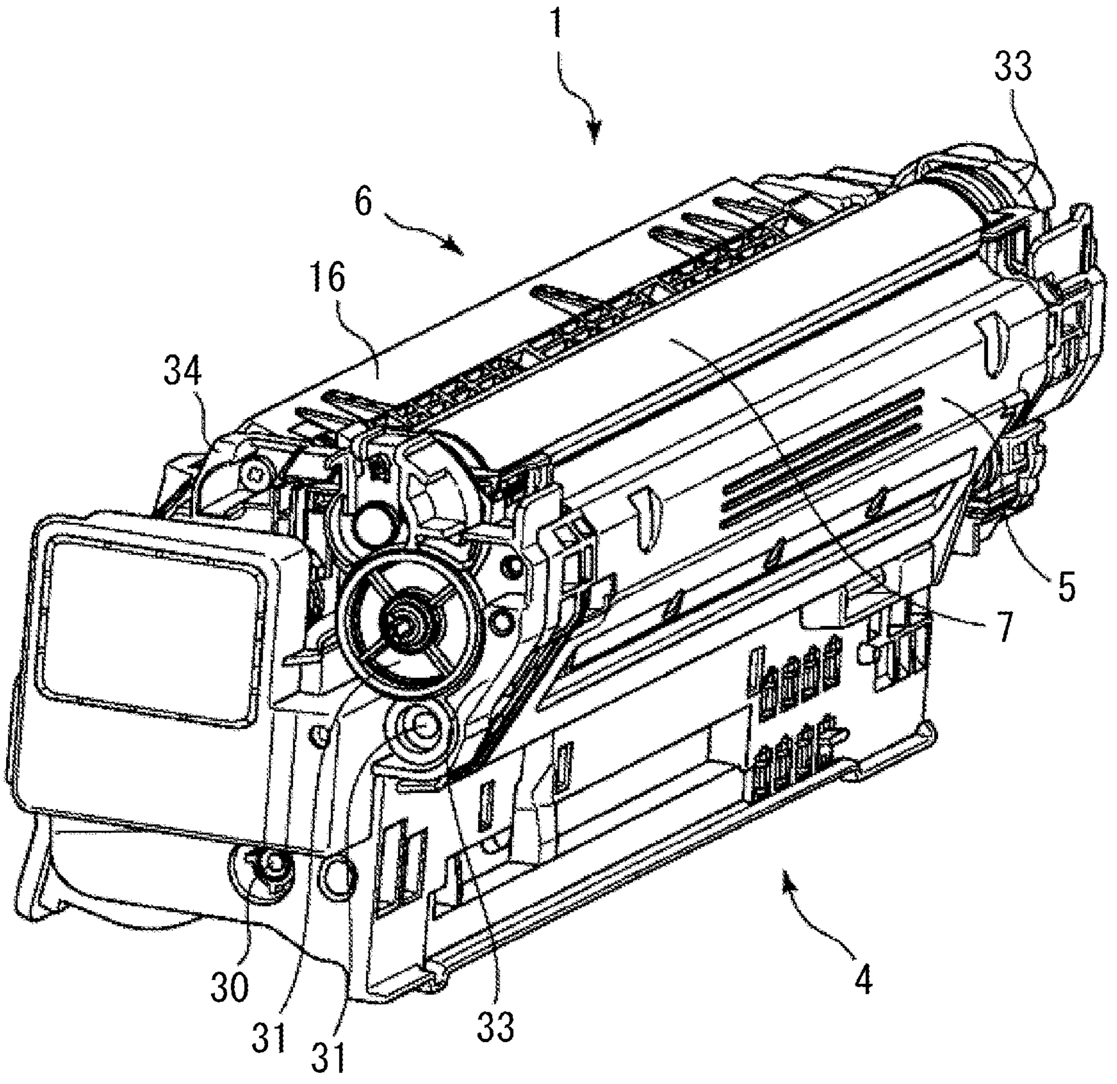
FIG. 4 is an overall perspective view of the process cartridge as viewed from a front side.

Next, referring to FIG. 3 to part (b) of FIG. 5, the overall structure of the process cartridge 1 mountable to the main assembly of the image forming apparatus 100 according to this embodiment will be described. FIG. 3 is a sectional view of the process cartridge 1 according to this embodiment. FIG. 4 is a perspective view of the process cartridge 1 as viewed from the upstream side in the process cartridge mounting direction. Part (a) of FIG. 5 and part (b) of FIG. 5 are perspective views of the process cartridge 1 as viewed from the downstream side in the process cartridge mounting direction.

The process cartridge 1 comprises the cleaning unit 4 and the developing unit 6. The cleaning unit 4 and the developing unit 6 are coupled pivotably about a rotation support pin 30.

The cleaning unit 4 includes a cleaning frame 5 which supports various members inside the cleaning unit 4. In addition to the photosensitive drum 7, the charging roller 8, and the cleaning blade 10, the cleaning unit 4 also includes a waste toner feeding screw 15 extending in a direction parallel to the rotation axis direction of the photosensitive drum 7. The cleaning frame 5 is provided with cleaning bearings 33 at opposite longitudinal ends of the cleaning unit 4 to rotatably support the photosensitive drum 7. A cleaning gear train 31 for transmitting drive from the photosensitive drum 7 to the waste toner feeding screw 15 is provided on the cleaning bearing 33 on the upstream side in the mounting direction of the process cartridge.

The charging roller 8 provided in the cleaning unit 4 is urged in the arrow C direction toward the photosensitive drum 7 by charging roller pressure springs 36 provided at opposite ends. The charging roller 8 is provided so as to be driven by the photosensitive drum 7, and the photosensitive drum 7 is rotationally driven in the direction of the arrow A during image formation, the charging roller 8 is rotated in the direction of the arrow D (codirectional with the rotation of the photosensitive drum 7).

The cleaning blade 10 provided in the cleaning unit 4 includes an elastic member 10*a* for removing untransferred residual toner (waste toner) remaining on the surface of the photosensitive drum 7 after the primary transfer, and a support member 10*b* for supporting the elastic member 10*a*. Waste toner removed from the surface of the photosensitive drum 7 by the cleaning blade 10 is stored in a waste toner accommodating chamber 9 including the cleaning blade 10 and the cleaning frame 5. The waste toner stored in the waste toner storage chamber 9 is conveyed toward the rear site of the image forming apparatus 100 (downstream in the mounting and dismounting direction of the process cartridge 1) by the waste toner feeding screw 15 provided in the waste toner storage chamber 9. The fed waste toner is discharged from the waste toner discharging portion 35 and transferred to the waste toner feeding unit 23 (see FIG. 1) provided in the main assembly of the image forming apparatus 100.

The development unit 6 includes a development frame 16 which supports various members in the development unit 6. The development frame 16 is divided into a developing chamber 16*a* in which the developing roller 11 and a supply roller 17 are provided, and a toner storage chamber 16*b* in which toner is stored and in which a stirring member 29 is provided.

The developing roller 11, the supply roller 17, and a developing blade 28 are provided in the developing chamber 16*a*. The developing roller 11 carries toner and rotates in the direction of arrow E during image formation to feed the toner to the photosensitive drum 7 by contacting the photosensitive drum 7. The developing roller 11 is rotatably supported by the development frame 16, more particularly by development bearing units 34 at opposite end portions in the longitudinal direction (rotational axis direction). The supply roller 17 is rotatably supported by the development bearing unit 34 of the development frame 16 while being in contact with the developing roller 11, and rotates in the direction of arrow F during image forming operation. Further, the developing blade 28 as a layer thickness regulating member for regulating the thickness of the toner layer formed on the developing roller 11 is provided so as to contact the surface of the developing roller 11.

The toner storage chamber 16*b* is provided with a stirring member 29 for stirring the stored toner T and feeding the toner to the supply roller 17 through a developing chamber communication opening 16*c*. The stirring member 29 includes a rotational shaft 29*a* extending parallel to the direction of the rotation axis of the developing roller 11, and a flexible stirring sheet 29*b*. One end portion of the stirring sheet 29*b* is mounted to the rotational shaft 29*a*, and the other end portion of the stirring sheet 29*b* is a free end, so that the stirring sheet 29*b* stirs the toner by rotation of the stirring sheet 29*b* in a direction indicated by an arrow G by rotation of the rotational shaft 29*a*.

The development unit 6 is provided with a developing chamber communication opening 16*c* which provides fluid communication between the developing chamber 16*a* and the toner storage chamber 16*b*. In this embodiment, the developing chamber 16*a* is located above the toner storage chamber 16*b* in the attitude in which the developing unit 6 is normally used (the attitude during use). The toner in the toner storage chamber 16*b* dipped up by the stirring member 29 is supplied to the developing chamber 16*a* through the developing chamber communication opening 16*c*.

Further, the developing unit 6 is provided with the receiving opening 40 at one end portion downstream in the inserting direction of the cartridge 1. A receiving opening sealing member 45 and a receiving opening shutter 41 movable in a front-rear direction are provided above the receiving opening 40. The receiving opening 40 is closed by the receiving opening shutter 41 when the process cartridge 1 is not mounted to the main assembly of the image forming apparatus 100. The inlet shutter 41 is structured to be opened by being urged by the main assembly of the image forming apparatus 100 in interrelation with the mounting/dismounting operation of the process cartridge 1.

The developing unit 6 is provided with a receiving and feeding passageway 42 communicating with the receiving opening 40, and a receiving and feeding screw 43 is provided inside the receiving and feeding path 42. In addition, a storage chamber communication opening 44 for supplying toner to the toner storage chamber 16*b* is provided in the neighborhood of the longitudinal center of the developing unit 6, and the storage chamber communication opening 44 provides the fluid communication between the receiving feed path 42 and the toner storage chamber 16*b*.

In this embodiment, one process cartridge 1 includes both the photosensitive drum 7 and the developing roller 11, but the structure is not necessarily limited such an example. For example, the cleaning unit 4 including the photosensitive drum 7 and the developing unit 6 including the developing roller 11 may not be connected and may be separate cartridges. In such a case, the cartridge including the cleaning unit 4 may be called a drum cartridge, and the cartridge including the developing unit 6 may be called a developing cartridge. In this case, the toner is supplied from the cartridge 13 to the developing cartridge of the developing unit 6.

[Toner Cartridge]

Next, referring to FIGS. 6 to 8, the overall structure of the toner cartridge 13 mounted to the image forming apparatus 100 according to this embodiment will be described. FIG. 6 is a perspective view illustrating the toner cartridge 13. FIG. 7 is an exploded perspective view of the toner cartridge 13. FIG. 8 is a sectional view illustrating the toner discharge chamber 57 of the toner cartridge 13.

The toner cartridge 13 accommodates toner (developer) in the internal space 51 thereof and is mounted to the apparatus main assembly 100B of the image forming apparatus 100 in order to supply (replenish) the toner to the apparatus main assembly 100B.

In describing the toner cartridge 13, unless otherwise specified, it is assumed that the cartridge 13 takes a normal attitude, that is, the attitude taken when it is set in the main assembly of the apparatus, and the orientations (X1, X2, Y1, Y2, Z1, Z2) are defined as follows.

The vertical direction is indicated by Y-axis. Arrow Y1 indicates an upward direction, and arrow Y2 indicates a downward direction. The surface provided at the end of the toner cartridge 13 in the Y1 direction is referred to as a top surface (upper surface), and the surface provided at the end in the Y2 direction is referred to as a bottom surface (bottom portion, lower portion, lower end). The top surface of the toner cartridge 13 faces upward (Y1 direction), and the bottom surface faces downward (Y2 direction). The Y1 direction and the Y2 direction may be collectively referred to as an up-down direction, a height direction, a vertical direction, a gravity direction, a Y direction, or a Y axis direction.

The front-rear direction is indicated by a Z-axis. With respect to the directions at the time when the toner cartridge 13 is mounted to the main assembly of the image forming apparatus 100, an arrow Z1 indicates an upstream direction, and an arrow Z2 indicates a downstream direction. For convenience of explanation, the Z1 direction is the frontward and the Z2 direction is the rearward. That is, the surface provided at the end of the toner cartridge 13 in the Z1 direction is referred to as the front surface (front portion, front end) of the toner cartridge 13, and the surface provided at the end in the Z2 direction is referred to as the rear surface (rear surface, rear end, rear portion).

The front surface of the toner cartridge 13 faces forward (Z1 direction), and the rear surface faces rearward (Z2 direction). The longitudinal direction of the toner cartridge 13 is the extension from the front surface to the rear surface (extension in the Z-axis direction). The Z1 direction and Z2 direction may be collectively referred to as the front-rear direction, longitudinal direction, lengthwise direction, Z direction, and Z-axis direction.

Furthermore, the left-right direction is indicated by the X-axis. For convenience of explanation, as viewed in the mounting direction (that is, the Z2 direction) when the toner cartridge 13 is mounted in the main assembly of the image forming apparatus 100, the direction to the left is indicated by the arrow X1, and the direction to the right is indicated by the arrow X2. The surface provided at the end of the toner cartridge 13 in the X1 direction is referred to as the left side (left surface, left end, left portion), and the surface provided at the end in the X2 direction is referred to as the right side (right surface, right portion, right end). The left side surface of the toner cartridge 13 faces the left direction (X1 direction), and the right-side surface faces the right direction (X2 direction). The direction from the left side to the right side (that is, the of the X axis) is a width direction of the toner cartridge 13. The X1 direction and the X2 direction may be collectively referred to as the left-right direction, the widthwise direction, the lateral direction, the X direction, the X axis direction, and the like.

The distance between the front surface and the rear surface of the toner cartridge 13 is longer than the distance between the right-side surface and the left side surface, and longer than the distance between the top surface and the bottom surface. Also, the distance between the right side and the left side is shorter than the distance between the top surface and the bottom surface. However, the structure is not limited to such an example. For example, the distance between the right side and the left side of the toner cartridge 13 may be the longest, or the distance between the top and the bottom may be the longest. The distance between the top surface and the bottom surface may be the shortest.

The X-axis, Y-axis, and Z-axis are perpendicular to each other. For example, the X-axis is perpendicular to the Y-axis and also perpendicular to the Z-axis. A plane perpendicular to the X axis may be referred to as YZ plane, a plane perpendicular to the Y axis may be referred to as a ZX plane, and a plane perpendicular to the Z axis is may be referred to as an XY plane. For example, the ZX plane is a horizontal plane. The X direction and Z direction are directions along the horizontal ZX plane, that is, horizontal directions.

In this embodiment, the first to third cartridges (13Y, 13M, 13C) containing yellow (Y), magenta (M), and cyan (C) toners, respectively, that is, the cartridges other than the black toner cartridge are taken as examples to be explained in the following.

The fourth cartridge (13K) containing black (K) toner is different only in that it has a larger toner capacity compared to the first to third cartridges (13Y, 13M, 13C), and the other structures are substantially the same. For this reason, description of the fourth toner cartridge 13K is omitted.

The toner supplied to the apparatus main assembly of the image forming apparatus 100 from the toner cartridge 13 is supplied to the process cartridge 1 by the toner feeding device 14 (see FIG. 2) as described above. That is, the toner cartridge 13 contains toner to be supplied (replenished) to the process cartridge 1.

As shown in FIGS. 6 to 8, the toner cartridges 13 (13Y, 13M, 13C) of this embodiment have supply frames 50 as casings, respectively. The supply frame 50 has a container portion 50*a* and a lid portion 50*b*, and is assembled by mounting the lid portion 50*b* to the container portion 50*a*. An internal space 51 is provided, inside the supply frame 50, by the container portion 50*a* and the lid portion 50*b*. The lid portion 50*b* is positioned at the end of the toner cartridge 13 in the Y1 direction, and provides the top surface of the toner cartridge 13 and the supply frame 50.

The supply frame 50 has a partition member 155 in its internal space 51. The partition member 155 divides the internal space 51 into a plurality of areas. That is, as shown in FIGS. 7 and 8, the internal space 51 is divided by the partition member 155 into a plurality of chambers such as the toner accommodating chamber 49, the communication passage 48, and the toner discharge chamber 57. The toner accommodating chamber 49 is a chamber (storage chamber) for storing the toner. The toner discharge chamber 57 has a frame opening 52 which will be described hereinafter, and is in fluid communication with the outside of the toner cartridge 13 through the frame opening 52. The communication path 48 is a toner path which allows the toner accommodating chamber 49 and the toner discharge chamber 57 to be in fluid communication with each other. The partition member 155 can be regarded as a part of the supply frame 50, and the partition member 155 can actually be formed integrally with the supply frame 50. It should be noted that the partitioning of the internal space 51 of the supply frame 50 as described above is merely an example, and the layout can be appropriately changed as required.

At the end (rear end, rear surface) of the supply frame 50 in the Z2 direction, a drive train 160 including a drive input gear 59, a fan input gear 260, a screw gear 164 and an acceleration mechanism 161, a fan 158, and the like are provided. The drive train 160 and the fan 158 are covered by a side cover 162, which is mounted to the supply frame 50. In particular, the fan input gear 260, the acceleration mechanism 161, and the fan 158 are restricted from moving in the Z1 and Z2 directions by the side cover 162 and the supply frame 50.

A stirring member 53 and a screw 54 are rotatably supported by the supply frame 50. The stirring member 53 and the screw 54 are rotatable about axes extending parallel with each other in the Z direction, and the screw 54 is disposed downstream of the stirring member 53 in the X2 direction. The stirring member 53 is disposed in the toner accommodating chamber 49 and has a rotational shaft 53*a* and a stirring sheet (not shown) having one end mounted to the rotational shaft 53*a* and the other end which is a free end. The stirring member 53 rotates to stir the toner in the toner accommodating chamber 49 by the stirring sheet to feed the toner toward the screw 54.

Inside the toner accommodating chamber 49, a wall 50*al* is provided between the stirring member 53 and the screw 54, and the wall 50*al* projects upward from the floor surface of the toner accommodating chamber 49. The wall 50*al* is disposed close to the screw 54 and extends in the axial direction (Z direction) of the screw 54, that is, in the toner feeding direction. By being interposed between the wall 50*al* and the side surface of the toner accommodating chamber 49, the screw 54 as a feeding portion can stably feed the toner existing therearound. A space is provided between the wall 50*al* and the lid portion 50*b* of the supply frame 50. Therefore, the stirring member 53 can send the toner to the screw 54 through the space between the wall 50*al* and the lid portion 50*b*.

The communication path 48 is a space or opening which communicates the toner accommodating chamber 49 with a toner discharge chamber 57, which will be described hereinafter, and is a passage through which toner moves. The communication path 48 is formed by the partition member 155 and the supply frame 50. At least a portion of the screw 54 is provided in the communication passage 48. A part of the screw 54 is exposed to the toner accommodating chamber 49, and conveys, by the rotation thereof, the toner in the toner accommodating chamber 49 along the rotation axis direction of the screw 54.

The communication path 48 extends along the toner feeding direction by the screw 54 and has a tunnel shape. Moreover, the screw 54 is disposed inside the communication passage 48 by the partition member 155 partially covering the screw 54. The tunnel shape of the communication passage 48 is formed corresponding to an outer shape of the screw 54. In other words, the communication passage 48 has the function of scraping off the toner fed by the screw 54 and feeding in a metered manner.

A part of the toner fed by the screw 54 can enter the communication passage 48 and move to the toner discharge chamber 57, but the rest of the toner cannot enter the communication passage 48 and cannot move to the toner storage chamber and remains in the toner accommodating chamber 49. By appropriately selecting the ratio between the size of the tunnel opening formed by the communication passage 48 and the size of the screw 54, the amount of the toner entering the communication passage 48 can be appropriately determined. In other words, only the desired amount of the toner can be supplied to the toner discharge chamber 57 by extending the screw 54 through the communication passage 48.

The screw 54 conveys toner in a direction (Z2 direction) from the front surface (front end) of the toner cartridge 13 to the rear surface (rear end). That is, in this embodiment, the longitudinal direction of the screw 54, that is, the toner feeding direction of the screw 54 is the same as the longitudinal direction of the toner cartridge 13 (Z direction, front-rear direction).

As shown in FIG. 8, the toner discharge chamber 57 is a space defined by the partition member 155 and the supply frame 50, and is disposed downstream of the communication passage 48 in the toner feeding direction in which the screw 54 conveys the toner.

A screw gear 164 is disposed in the neighborhood of the toner discharge chamber 57, that is, in the neighborhood of the rear surface (the end in the Z2 direction) of the supply frame 50 as a gear member for receiving a rotational force for rotating the screw 54. The toner discharge chamber 57 also has the frame opening 52 for discharging toner (developer) from the internal space 51 of the supply frame 50 to the outside. The frame opening 52 is an opening (toner discharge opening) structured to communicate the inside and outside of the supply frame 50 and discharge the toner to outside of the toner cartridge 13.

The frame opening 52 is formed in the bottom surface of the toner cartridge 13 (that is, the bottom surface 50*d* of the supply frame 50) and opens downward of the toner cartridge 13. That is, the toner is discharged downward from the frame opening 52. The frame opening 52 is provided on the downstream side of the toner cartridge 13 in the toner feeding direction of the screw 54. That is, the distance between the frame opening 52 and the rear surface of the toner cartridge 13 (the end in the Z2 direction) is shorter than the distance between the frame opening 52 and the front surface of the toner cartridge 13 (the end in the Z1 direction).

A fan (blower portion, blowing machine, blower, airflow producing mechanism) 158 is disposed in the neighborhood of the rear surface of the toner cartridge 13 (the end in the direction of the arrow Z2). The fan 158 can send gas, that is, air existing around the fan 158, by rotation thereof. The air fed by the fan 158 is fed through a duct 163 into the toner discharge chamber 57 of the supply frame 50 and is used to carry the toner. The fan 158 and the toner discharge chamber 57 communicate with each other through the duct 163, and a connection hole 57*a* to which the duct 163 is connected is formed in the side surface of the supply frame 50 constituting the toner discharge chamber 57. The duct 163 is a pipe-shaped cylindrical member and constitutes a gas flow path (ventilation path, air feed path).

The fan 158 can be rotated by a driving force inputted from the fan input gear 260 which will be described hereinafter by way of the acceleration mechanism 161. By this, the fan 158 can feed the air to the toner discharge chamber 57.

[Drive Train for Rotating Fan and Screw]

Next, referring to FIG. 9 to part (b) of FIG. 11, drive train 160 for rotating the fan 158 and the screw 54 will be described. FIG. 9 is a perspective view of the rear end of the toner cartridge 13 as viewed from above. In FIG. 9, the side cover 162 is shown shifted rearward in order to show the rotational drive transmission path. Part (a) of FIG. 10 is a front view illustrating the drive train 160, and part (b) of FIG. 10 is a perspective view illustrating the drive train 160. Part (a) of FIG. 11 is a perspective view illustrating the acceleration mechanism 161, and part (b) of FIG. 11 is another perspective view illustrating the acceleration mechanism 161.

As shown in FIG. 9 to part (b) of FIG. 10, the driving train 160 is arranged on the rear side of the toner cartridge 13, that is, in the neighborhood of the rear surface. The drive train 160 as a drive transmission portion of this embodiment includes the drive input gear 59, the fan input gear 260, the acceleration mechanism 161 and the screw gear 164. The drive input gear 59 includes a drive receiving portion 59*a* and a gear portion 59*b*. The fan input gear 260 includes a large gear portion 260*a* and a small gear portion 260*b*. The directions of the axes of the drive input gear 59, the fan input gear 260, the gears of the acceleration mechanism 161, and the screw gear 164 are parallel to the Z axis.

The drive input gear 59 is operatively connected to the fan 158 and the screw 54 by way of the drive train 160. The fan 158 and the screw 54 are structured to operate in accordance with the rotation of the drive input gear 59. The drive input gear 59 can transmit the drive force inputted to the drive receiving portion 59*a*, toward the fan 158 and the screw 54 by way of the drive train 160.

The side cover 162 is a cover member for covering the fan 158 to protect the fan 158. The side cover 162 may also be regarded as a part of the frame (casing) of the toner cartridge 13 together with the supply frame 50. In this case, the supply frame 50 may be particularly referred to as a frame body (casing body). The fan 158 is rotated by the driving force outputted from the acceleration mechanism 161.

A rotational drive transmission path will be described. As shown in part (b) of FIG. 10, a rotational drive is inputted to the toner cartridge 13 from a drive output member (coupling member on the main assembly side) 100*a* provided in the main assembly of the image forming apparatus 100. That is, the drive receiving portion 59*a* receives the rotational force (driving force) by connection of the driving force receiving portion (coupling portion) 59*a* of the drive input gear 59 provided on the cartridge to the drive output member 100*a*. As a result, the drive input gear 59 rotates, and driving force is transmitted from the drive input gear 59 to the respective members of the toner cartridge 13.

When the toner cartridge 13 is mounted to the image forming apparatus 100, the first engaging portion 71 and the second engaging portion 72 of the side cover 162 shown in FIG. 9 engage with unshown engaged portions of the image forming apparatus 100. By this the position of the cartridge 13 is determined inside the image forming apparatus 100.

A storing element 70 is arranged on the side cover 162, and the storing element 70 stores information regarding the toner cartridge 13. Examples of the information include the driving status of the toner cartridge 13 and the color of the toner stored inside the toner cartridge 13. In this embodiment, the storing element 70 is an IC chip, and has an electroconductive contact on its surface for electrical connection with a contact (not shown) provided on the main assembly of the image forming apparatus 100. When the toner cartridge 13 is mounted to the image forming apparatus 100, the storing element 70 is electrically connected to contacts provided on the image forming apparatus 100.

As viewed along the rotation axis of the fan 158, the rotation axis of the fan 158 and the storing element 70 are placed on opposite sides of a straight line passing through the first engaging portion and the first engaging portion. The fan 158 and the storing element 70 are intended to be kept apart in order to suppress propagation of the vibration caused by the rotation of the fan 158 to the storing element 70.

As shown in FIG. 7, the drive input gear 59 is connected to the rotational shaft 53*a* of the stirring member 53, and the rotation of the drive input gear 59 causes the stirring member 53 to rotate. As shown in FIG. 9, the gear portion 59*b* of the drive input gear 59 is in meshing engagement with the large gear portion 260*a* of the fan input gear 260 to transmit the rotational drive to the fan input gear 260. In addition, the fan input gear 260 is a step gear comprising a large gear portion 260*a* and a small gear portion 260*b*, and the small gear portion 260*b* rotates integrally with the large gear portion 260*a*. The small gear portion 260*b* is drivingly connected to the acceleration mechanism 161, and the large gear portion 260*a* is in meshing engagement with the screw gear 164. The screw 54 (see FIG. 8) is connected to the screw gear 164, and the screw 54 is driven by rotational drive transmitted from the screw gear 164 to the screw 54.

Thus, the drive input gear 59 is a drive input member (drive receiving member, rotational force receiving member) to which driving force (rotational force) is inputted from outside of the toner cartridge 13 (that is, the main assembly of the image forming apparatus 100). In other words, the drive input gear 59 is a coupling member on the side of the toner cartridge 13 structured to be coupled with the drive output member (coupling member on the main assembly side) 100*a*.

The drive input gear 59 also functions as a drive transmission member (gear member) for transmitting the drive force to the respective members of the cartridge. In other words, the drive input gear 59 is provided with both of the driving force receiving portion (coupling portion) 59*a* to which the driving force is inputted and the gear portion 59*b* for outputting the driving force to another member of the toner cartridge 13. The gear portion 59*b* is provided on the outer peripheral surface of the drive input gear 59.

The rotational force (driving force) inputted to the drive input gear 59 is used not only to drive the screw 54 and the stirring member 53 but also to drive the fan 158. Next, the structure of the acceleration mechanism 161 for outputting the driving force received by the fan input gear 260, to the fan 158 with acceleration is described.

As shown in part (a) of FIG. 11 and part (b) of FIG. 11, the acceleration mechanism 161 includes a carrier unit 79, a sun gear unit 96, and a ring gear 99. The carrier unit 79 is an input element to which driving force is inputted from the small gear portion 260*b* of the fan input gear 260. The sun gear unit 96 is an output element which outputs the driving force transmitted from the carrier unit 79 to the fan 158. The ring gear 99 is a fixed element, the rotation of which is restricted.

The ring gear 99 is structured in a substantially cylindrical shape, and an internal gear 99*a* is formed on the inner peripheral surface thereof. Further, the ring gear 99 has flange portions 99*b* and 99*c* projecting radially outward from its outer peripheral surface, and the flange portions 99*b* and 99*c* are fixed to the side surfaces of the supply frame 50. That is, the ring gear 99 is non-rotatably fixed to the supply frame 50.

The method of fixing the flange portions 99*b* and 99*c* to the supply frame 50 may be any such as adhesion or screwing. In addition, even if the ring gear 99 may not be fixed to the supply frame 50, it will suffice if the ring gear 99 is regulated so as not to rotate. For example, while the ring gear 99 is sandwiched between the supply frame 50 and the side cover 162, a stopper (not shown) provided on the supply frame 50 or the side cover 162 abuts the flange portions 99*b* and 99*c* to restrict the rotation.

The carrier unit 79 has a first unit 80, a second unit 90A and a third unit 90B. The first unit 80 includes a carrier 81 and planetary gears 82, 83, 84 and 85. The carrier 81 includes an engaged portion 81*a* with which the small gear portion 260*b* (see part (a) of FIG. 10) of the fan input gear 260 is spline-engaged, and shaft portions 81*b*, 81*c*, 81*d*, and 81*e* provided on a side surface of the carrier 81 opposite to the engaged portion 81*a*. The planetary gears 82, 83, 84 and 85 are rotatably supported by the shaft portions 81*b*, 81*c*, 81*d* and 81*e*. The planetary gears 82, 83, 84 and 85 are in meshing engagement with the internal gear 99*a* of the ring gear 99 and with the input gear 95A of the second unit 90A.

The second unit 90A includes a carrier 91A, planetary gears 92A, 93A, 94A, 95A and an input gear 95A. The input gear 95A is fixed with respect to the carrier 91A. That is, the input gear 95A and the carrier 91A rotate together with each other. The planetary gears 92A, 92A, 93A, and 94A are rotatably supported by four shafts provided on the carrier 91A and are engaged with the internal gear 99*a* of the ring gear 99 and with the input gear 95B of the third unit 90B.

The third unit 90B has the same structure as the second unit 90A, and therefore, detailed description thereof is omitted, but it includes a carrier 91B, planetary gears 92B, 93B, 94B, and 95B, and an input gear 95B.

The sun gear unit 96 includes an output member 97 and a sun gear 98 fixed to a shaft portion 97*a* of the output member 97. The output member 97 has an output shaft 97*b* projecting to the opposite side of the shaft portion 97*a* in the Z direction, and the output shaft 97*b* outputs the driving force to the impeller 158*b* of the fan 158.

When a driving force is input from the small gear portion 260*b* of the fan input gear 260 to the carrier 81 of the first unit 80, the carrier 81 rotates, and the planetary gears 82, 83, 84 and 85 revolve and rotate, since the ring gear 99 is stationary. In the following description, the circumferential movement of the planetary gears about the rotation axis ZZ of the impeller 158*b* is referred to as revolution, and the rotation of the planetary gears about their own axes of support shafts is referred to as rotation. Also, the rotation axis ZZ is parallel to the Z direction.

Rotation of the planetary gears 82, 83, 84, 85 is transmitted to the input gear 95A of the second unit 90A. Thus, the rotation input to the carrier 81 is accelerated by the planetary gears 82, 83, 84, 85 and is output to the input gear 95A of the second unit 90A. That is, the input gear 95A functions as a sun gear which outputs a driving force to the planetary gears 82, 83, 84, and 85.

Similarly, the rotation of the carrier 91A which rotates together with the input gear 95A is accelerated by the planetary gears 92A, 93A, 94A and 95A and is outputted to the input gear 95B of the third unit 90B. Further, the rotation of the carrier 91B which rotates integrally with the input gear 95B is accelerated by the planetary gears 92B, 93B, 94B, and 95B and is outputted to the sun gear 98 of the sun gear unit 96.

By the rotation of the sun gear 98, the output shaft 97*b* of the output member 97 is rotated. The output shaft 97*b* has a D-shaped cross-section, and the impeller 158*b* of the fan 158 is fixed to the output shaft 97*b*. Therefore, the impeller 158*b* is rotated integrally with the output shaft 97*b*. As described above, the acceleration mechanism 161 accelerates the rotation inputted from the small gear portion 260*b* of the fan input gear 260 and outputs it to the impeller 158*b*. In this embodiment, for example, the rotational speed of the drive input gear 59 which receives the driving force from outside of the toner cartridge 13 is 89.5 [rpm], whereas the rotational speed of the impeller 158*b* is about 5000 [rpm]. It is desirable that the rotational speed of the impeller 158*b* is higher than the rotational speed of the drive input gear 59. The rotational speed of the impeller 158*b* is preferably 10 times or more, further preferably 20 times or more, and even further preferably 40 times or more than the rotational speed of the drive input gear 59. In this embodiment, it is selected to be 50 times or more. The rotational speed of the impeller 158*b* is selected to be 500 times or less that of the drive input gear 59 in consideration of the load required to rotate the drive input gear 59 and the durability of the impeller 158*b* and the like. The rotation speed here is defined using the number of rotations of the object per unit time. The aforementioned [rpm] is the number of times an object rotates in one minute.

The acceleration mechanism (acceleration section, speed change portion) 161 is structured by a so-called planetary gear mechanism, which is small in size but can provides a large speed change (acceleration) ratio. In addition, in this embodiment, a planetary gear mechanism is used for the acceleration mechanism 161, but the present invention is not limited to such a structure example. For example, other speed change mechanisms such as harmonic gear driving mechanism may be used.

The screw gear 164 is selected to have fewer teeth than the large gear portion 260*a* of the fan input gear 260, and the rotational speed of the screw gear 164 is selected to be faster than the rotational speed of the fan input gear 260 and slower than the rotational speed of the impeller 158*b*.

[Flow of Air]

Next, referring to part (a) of FIG. 11 to part (b) of FIG. 12, the flow of air fed by the fan 158 will be described. As shown in part (a) of FIG. 11 and part (b) of FIG. 11, the fan 158 includes a fan case 158*a* and an impeller 158*b*, and the impeller 158*b* is rotatably supported by the fan case 158*a*. The fan case 158*a* is provided with an air suction opening 158*c* and an air discharge opening 158*d*, and a duct 163 (see FIG. 9) is connected to the air discharge opening 158*d*. When the impeller 158*b* rotates by receiving the driving force from the output shaft 97*b* of the acceleration mechanism 161, the fan 158 suctions air through the air suction opening 158*c* and delivers it through the air discharge opening 158*d*.

As shown in part (a) of FIG. 12 and part (b) of FIG. 12, the air discharged from the air discharge opening 158*d* of the fan 158 passes through the duct 163 and is fed into the toner discharge chamber 57 through the connection hole 57*a*. A ventilation filter 164 is provided on the toner discharge chamber 57 side of the connecting hole 57*a*, and the ventilation filter 164 has ventilation property which allows air to pass through but prevents toner from passing through. Therefore, it is possible to prevent the toner from flowing back from the toner discharge chamber 57 to the duct 163. The air fed to the toner discharge chamber 57 through the ventilation filter 164 is discharged through the frame opening 52 together with the toner fed by the screw 54. Therefore, the frame opening 52 is an opening (toner discharge opening) for discharging the toner and for discharging the air (air discharge opening) to the outside of the toner cartridge 13.

[Slide Shutter]

Next, referring to FIGS. 8, FIG. 13, part (a) of FIG. 14, and part (b) of FIG. 14, the slide shutter 141 mounted to the bottom surface 50*d* of the supply frame 50 will be described. The slide shutter 141 is a shutter member (shut-off member, airflow shut-off member, valve) which periodically stops the airflow produced by the fan 158 by periodically shutting off the air passage. As shown in FIGS. 8 and 13 and part (a) of FIG. 14 and part (b) of FIG. 14, the bottom surface 50*d* of the supply frame 50 is provided with shutter support portions 50*m*1 and 50*m*2 for supporting the slide shutter 141, and a spring support portion 50*m*3. These shutter support portions 50*m*1, 50*m*2 and the support portion 50*m*3 are integrally formed.

The shutter support portions 50*m*1 and 50*m*2 support the slide shutter 141 so as to be slidable in the Z direction, and cooperates with the bottom surface 50*d* of the supply frame 50 to sandwich the slide shutter 141 to fix the position of the slide shutter 141 in the Y direction. The slide shutter 141 as a shut-off member has an abutting portion 141*a*, an inclined surface 141*b*, and a toner discharge opening 141*c*. The abutting portion 141*a* faces a flat portion 164*a* of the screw gear 164, and the inclined surface 141*b* is inclined with respect to the X direction and the Z direction. The toner discharge opening 141*c* is a through hole (opening) penetrating in the Y direction.

A shutter spring (elastic member) 142 as a first biasing portion is arranged between the slide shutter 141 supported by the shutter support portions 50*m*1 and 50*m*2 and the spring support portion 50*m*3. In this embodiment, the shutter spring 142 comprises an elastic plate spring, but other springs such as a coil spring and a leaf spring, or other elastic members such as rubber may be used.

The slide shutter 141 is urged in the direction of arrow Z2 by the shutter spring 142, and the abutting portion 141*a* of the slide shutter 141 abuts the flat portion 164*a* of the screw gear 164. By this, the slide shutter 141 is positioned at the shut-off position. A shutter seal 143 is bonded to the surface of the slide shutter 141 on the downstream side in the Y1 direction. The shutter seal 143 is an elastic, substantially plate-shaped sealing member and has a toner discharge opening 143*a*. The shutter seal 143 is mounted to the slide shutter 141 so that the toner discharge opening 143*a* and the toner discharge opening 141*c* of the slide shutter 141 are overlapped. The slide shutter 141 is disposed downstream of the frame opening 52 in the discharge direction (Y2 direction) of the toner discharged through the frame opening 52.

As shown in part (a) of FIG. 14, the slide shutter 141 and the shutter seal 143 closes the frame opening 52 when the slide shutter 141 is positioned in the shut-off position. Therefore, no toner and no air are discharged through the frame opening 52. When the toner cartridge 13 is not mounted to the apparatus main assembly 100B of the image forming apparatus 100, the slide shutter 141 is positioned in the shut-off position by the urging force of the shutter spring 142. Therefore, when the toner cartridge 13 is in a free state, the toner is not discharged from the frame opening 52.

As shown in part (b) of FIG. 14, the screw gear 164 is provided with a cam 164*b*, and the cam 164*b* as a cam portion projects from the flat portion 164*a* in the Z1 direction, that is, toward the slide shutter (141) side. The cam 164*b* extends in the circumferential direction around the rotation axis of the screw gear 164 and has an inclined surface 164*c* which is inclined with respect to the circumferential direction and to the Z direction.

When the cam 164*b* rotates as the screw gear 164 rotates, the inclined surface 164*c* of the cam 164*b* contacts the inclined surface 141*b* of the slide shutter 141 positioned at the shut-off position. When the cam 164*b* rotates further, the inclined surface 141*b* is pressed by the inclined surface 164*c* of the cam 164*b*, so that the slide shutter 141 slides in the Z1 direction against the urging force of the shutter spring 142.

As shown in part (b) of FIG. 14, the slide shutter 141 is positioned in the open position with the abutting portion 141*a* of the slide shutter 141 abutting against the cam 164*b*. That is, the slide shutter 141 is pressed by the cam 164*b* of the screw gear 164 to move between the shut-off position and the opening position. When the slide shutter 141 is positioned at the open position, the toner discharge opening 141*c* of the slide shutter 141 and the frame opening 52 of the supply frame 50 are aligned with each other. That is, the frame opening 52 is opened and the toner and the air are discharged through the frame opening 52. In other words, the frame opening 52 is a passageway for the air fed to the supply frame 50 by the fan 158 and is shut off or released by the slide shutter 141.

When the cam 164*b* rotates further and the cam 164*b* separates from the abutting portion 141*a* of the slide shutter 141, the slide shutter 141 moves to the shut-off position by the urging force of the shutter spring 142. In this manner, the slide shutter 141 repeats movement between the shut-off position and the open position as the screw gear 164 rotates. As a result, the frame opening 52 is periodically opened and closed by the slide shutter 141, and repeats the closed state and the open state.

Similar to the fan 158 and screw 54 described above, the slide shutter 141 is also operatively connected to the drive input gear 59. That is, the slide shutter 141 is driven according to the rotation of the drive input gear 59 and slides so as to repeatedly open and close the frame opening 52. That is, the slide shutter 141 reciprocates between the closed position and the open position. The slide shutter 141 receives drive force from the drive input gear 59 by way of a drive transmission portion 160 such as a screw gear 164. The cam 164*b* of the screw gear 164 is a drive conversion portion (drive conversion mechanism) for converting the rotary motion of the screw gear 164 into a reciprocating motion of the slide shutter 141. In other words, the cam 164*b* converts the rotational force transmitted from the drive input gear 59 toward the slide shutter 141 into a driving force (translational force) for driving the shutter 141 to move the shutter 141.

The cam 164*b* is an example of a drive conversion portion for converting rotational motion, and for a drive conversion portion for moving the slide shutter 141 using the rotational force transmitted from the drive input gear 59, known mechanical elements such as a crank, link, or the like can be used, as appropriate.

Operation in Embodiment 1

As described above, when the toner cartridge 13 is being driven by the drive output member 100*a* (see part (b) of FIG. 10) of the image forming apparatus 100, the air is continuously fed into the toner discharge chamber 57 by the fan 158 through the duct 163. On the other hand, the frame opening 52 of the toner discharge chamber 57 is periodically opened and closed by the slide shutter 141 which moves between the shut-off position and the open position.

By this, the internal pressure (internal air pressure) of the toner discharge chamber 57 periodically changes, and a difference is generated between the external pressure of the toner cartridge 13 and the internal pressure of the toner discharge chamber 57. When the frame opening 52 is shut off by the slide shutter 141, the internal pressure of the toner discharge chamber 57 is positive because the air is fed into the toner discharge chamber 57 by the fan 158, that is, it is higher than the pressure outside the toner cartridge 13.

Thereafter, when the slide shutter 141 moves from the shut-off position to the open position, the frame opening 52 is opened, and the compressed air is discharged through the frame opening 52 so that the internal pressure of the toner discharge chamber 57 lowers. At this time, the toner in the toner discharge chamber 57 spews with vigor through the frame opening 52 together with the compressed air, and therefore, the toner can be discharged into the main assembly 100B of the image forming apparatus.

In the structure in which the toner is conveyed together with the air, the toner can be easily conveyed in a narrow passage, or the toner discharged from the frame opening 52 can be easily moved far away together with the flow of air. This is suitable for increasing the transportation efficiency of the toner discharged from the toner cartridge 13. In addition, the toner can be discharged even if the frame opening 52 is made small, and therefore, it is possible to refrain the toner from unintentionally scattering outside the cartridge 13 through the frame opening 52.

In particular, since the slide shutter 141 periodically interrupts the flow of air, the air is intermittently discharged through the frame opening 52 of the toner cartridge 13. By periodically and intermittently discharging the air, the fluidity of the toner discharged through the frame opening 52 to the outside of the cartridge 13 is also enhanced. It is possible to prevent the discharged toner from clogging the path inside the apparatus main assembly B, thus achieving smoother transportation of the toner.

In this embodiment, the fan 158 and the slide shutter 141 are driven to periodically change the air pressure inside the toner discharge chamber 57, and therefore, the toner can be stirred. In particular, in this embodiment, when the frame opening 52 is opened and closed by the slide shutter 141, the pressure in the neighborhood of the frame opening 52 changes greatly. Therefore, the toner in the neighborhood of the frame opening 52 can be easily stirred, which is suitable for improving the fluidity of the toner and feeding it efficiently.

When the fan 158 is driven, the smaller the pressure difference between the toner accommodating chamber 49 and the toner discharge chamber 57, the more stable the toner can be discharged. For this reason, in this embodiment, in the attitude in which it is normally used (attitude during use), the vent hole 46 for ventilating the toner discharge chamber 57 and the toner accommodating chamber 49 is located above the frame opening 52 and the connection hole portion 57*a* (See FIG. 8).

That is, when the fan 158 and the slide shutter 141 are driven, the air pressure (internal pressure) inside the toner discharge chamber 57 periodically increases and decreases. Further, as the toner moves from the toner accommodating chamber 49 toward the toner discharge chamber 57, the air pressure (internal pressure) inside the toner accommodating chamber 49 lowers. If, a large difference in pressure occurs between the toner accommodating chamber 49 and the toner discharge chamber 57, as a result of these pressure changes, the amount of the toner passing through the communication passage 48 may fluctuate or the toner may flow back through the communication passage 48, with the possible result that the amount of the toner supplied to the toner discharge chamber 57 fluctuates. This may result an unstable amount of the toner discharged through the frame opening 52.

Therefore, in this embodiment, the vent hole 46 is located at a position different from the communication passage 48 to allow mutual fluid communication between the toner accommodating chamber 49 and the toner discharge chamber 57, thus permitting passage of the air between the toner accommodating chamber 49 and the toner discharge chamber 57. This can suppress an increase in the pressure difference between the toner accommodating chamber 49 and the toner discharge chamber 57.

That is, increasing and decreasing of the internal pressure of the toner discharge chamber 57 by the fan 158 to stably discharge the toner from the frame opening 52, and suppressing the pressure difference between the toner accommodating chamber 49 and the toner discharge chamber 57 from increasing are both accomplished by providing the vent 46.

The air vent 46 may be structured to allow passage of not only air but also toner. In such a case, however, it is desirable that the amount of the toner entering and exiting the toner discharge chamber 57 through the vent 46 is sufficiently smaller than the amount of the toner supplied to the toner discharge chamber 57 through the communication passage 48. By doing so, even if an amount of the toner passes through the vent 46, the amount of the toner inside the toner discharge chamber 57 does not fluctuate greatly. The influence on the amount of the toner discharged through the frame opening 52 can be reduced or eliminated.

In view of this, it is desirable to locate the air vent 46 at a position where the toner does not easily pass, that is, at a position around which no toner is present. For example, it is conceivable to locate the air vent 46 at a position as high as possible inside the toner discharge chamber 57 or inside the toner storage chamber. By doing so, the amount of the toner passing through the vent 46 can be reduced. In addition, it is possible to prevent the air vent 46 from being clogged with toner. That is, the toner does not hinder the movement of air through the vent 46.

From this point of view, the lower end of the vent hole 46 is located above the upper end of the communication passage 48 and above the screw 54 inside the toner accommodating chamber 49. This is to reduce the amount of the toner passing through the vent hole 46 as compared with the amount of the toner passing through the communication passage 48 by the screw 54. In addition, it is preferable to limit the amount of the toner to be accommodated in the toner accommodating chamber 49 so that the upper surface of the toner is positioned below the lower end of the vent hole 46, and by doing so, the toner inside the toner accommodating chamber 49 does not easily reach the vent hole 46.

Here, the upper surface of the toner in the toner accommodating chamber 49 is the upper surface of the toner powder before the user starts to use the toner cartridge 13, that is, it is the surface when the toner stored in the cartridge 13 has not started to be consumed. In determining the height of the upper surface of the toner, the toner cartridge 13 is set in the normal use attitude. In this embodiment, this is an attitude in which the frame opening 52 faces downward, that is, an attitude in which the surface on which the frame opening 52 is provided is the bottom surface. Then, the upper surface of the toner powder is made parallel to the horizontal plane so that the toner is accommodated uniformly inside the toner accommodating chamber 49. Then, the height of the upper surface of the toner is determined after a proper time passes until the state of the toner is stabilized.

By providing the air vent 46 inside the toner accommodating chamber 49 and appropriately setting the amount of the toner stored in this manner, the toner flows from the toner accommodating chamber 49 into the toner discharge chamber 57 through the air vent 46 can be suppressed. In addition, blocking of the air vent 46 by the toner in the toner accommodating chamber 49 is suppressed.

Further, in this embodiment, the drive force input from the drive output member 100*a* (see part (b) of FIG. 10 of the image forming apparatus 100 to the drive input gear 59 is outputted to the fan 158 and the slide shutter 141, while the speed of the driving force changed by the drive train 160. By setting the gear ratio of the drive train 160, the rotational speed of the fan 158 and the opening/closing frequency of the slide shutter 141 can be changed. By doing so, the rotational speed of the fan 158 and the open/close frequency of the slide shutter 141 can be adjusted independently of the drive output member 100*a* of the image forming apparatus 100. In addition, by changing the opening/closing frequency of the slide shutter 141, the amount of the toner discharged through the frame opening 52 can be easily adjusted. The slide shutter 141 opens and closes in accordance with the rotation of the drive input gear 59 (drive input member, drive receiving member). In this embodiment, the number of times the slide shutter 141 is opened, per unit time, that is, the number of times the air is discharged per unit time is selected to be greater than the number of times the drive input gear 59 rotates per unit time. The rotation speed of the drive input gear 59 is 89.5 [rpm], as described above, the number of times the slide shutter 141 is opened and the air is discharged is set to be more than 89.5 times per minute. This increases the number of times the toner is discharged.

In addition, as comparing the numbering of rotations of the impeller 158*b* of the fan 158 per unit time and the number of times the frame opening 52 is opened by the slide shutter 141 per unit time, it is desirable that the rotation speed of the fan 158 is larger. This is because then the impeller 158*b* of the fan 158 produces sufficient airflow. The number of rotations of the fan 158 per unit time is preferably 10 times or more, more preferably 20 times or more, more preferably 40 times the number of times the frame opening 52 is opened by the slide shutter 141. More preferably, considering the durability of the fan 158, the rotation speed of the fan 158 is selected to be 500 times or less the number of times the slide shutter 141 moves to the opening position.

In addition, when the driving force is inputted to the toner cartridge 13 from the drive output member 100*a* of the image forming apparatus 100, the fan 158 continues to be driven, and the airflow from the fan 158 to the toner discharge chamber 57 by way of the duct 163 is always unidirectional. The ventilation filter 164 is provided in the connection hole portion 57*a*. Therefore, the fan 158 does not suck the toner from the toner discharge chamber 57 through the duct 163, and the loss of the toner in the toner discharge chamber 57 can be reduced.

The drive input gear 59 is operatively connected to the slide shutter 141, the fan 158, the screw 54, and so on. That is, the drive input gear 59 transmits the drive force (rotational force) inputted from the drive output member 100*a* through the drive transmission portion (drive train 160), towards the members such as the slide shutter 141, the fan 158, the screw 54, and so on. The transmission path of the driving force input from the drive output member 100*a* of the apparatus main assembly 100B to the toner cartridge 13 is branched into a plurality of paths, inside the cartridge 13. This makes it possible to simplify the structure of the driving connection mechanism between the toner cartridge 13 and the apparatus main assembly 100B.

In this embodiment, in particular, only one drive input member (drive receiving member) is provided in the toner cartridge 13, that is, it is the drive input gear 59, which is operatively connected to all drive members inside the toner cartridge 13. Therefore, only by rotating the drive input gear 59 by the drive output member 100*a*, all the drive portions provided in the toner cartridge 13 can be driven. However, it is also possible to provide a plurality of drive input members (drive receiving members) for one toner cartridge 13 and provide a plurality of drive output members for the one toner cartridge 13 in the apparatus main assembly 100B.

The slide shutter 141 of this embodiment functions as an airflow shut-off member which blocks the flow of air, and also functions as a shut-off member that prevents the toner from moving through the discharge opening to the outside of the toner cartridge 13. However, the airflow stopping member and the toner shut-off member may be provided separately in the toner cartridge 13. Such an embodiment will be described hereinafter.

Embodiment 2

Next, Embodiment 2 of the present invention will be described, in which in place of the slide shutter 141 of Embodiment 1, a rotary shutter (rotary valve) 600 is used to open and close the frame opening 52. Therefore, the structure similar to that of Embodiment 1 will be omitted from illustration or will be assigned the same reference numerals in the drawings. In addition, the structure for sending the air to the toner discharge chamber 57 by the fan 158 is the same as in Embodiment 1.

As shown in part (a) of FIG. 15 to part (b) of FIG. 16, the toner cartridge 4113 according to Embodiment 2 includes a supply frame 50 and a screw 54B rotatably supported by the supply frame 50. The screw 54B conveys the toner toward the toner discharge chamber 57 partitioned by the partition member 155. The screw gear 164B is rotatably supported by a bearing provided integrally with the supply frame 50, and in order to close a gap between the supply frame 50 and the screw gear 164B to prevent the toner from leaking out, a toner sealing member 601 is provided in the gap. A driving force is inputted to the screw gear 164B from the fan input gear 260 (see part (a) of FIG. 10) as in Embodiment 1.

A rotary shutter 600 and a screw 54B are fixed to the screw gear 164B, so that the rotary shutter 600 and the screw 54B rotate integrally with the screw gear 164B. The rotary shutter 600 includes a cylindrical portion 600*a* having an outer peripheral surface centered on a rotational axis of the screw 54, a screw insertion hole 600*b* into which the screw 54 is inserted, two holes 600*c* and 600*d* formed in the cylindrical portion 600*a*. The rotary shutter 600 as a shut-off member is disposed upstream of the frame opening 52 in the discharge direction (Y2 direction) of the toner discharged through the frame opening 52, and is rotatable about an axis of rotation extending in the longitudinal direction (Z direction) of the toner cartridge 4113. As with the slide shutter 141 described in Embodiment 1, the rotary shutter 600 is a shutter member (shut-off member, airflow shut-off member) which periodically shuts off the airflow produced by the fan 158 by periodically closing the air passage.

The cylindrical portion 600*a* is structured to be slidable on the circumferential surface 50*r* in which the frame opening 52 of the supply frame 50 is formed. The screw insertion hole 600*b* has an inner diameter larger than an outer diameter of the spiral of the screw 54B, so that the toner in the toner discharge chamber 57 and the toner fed from the communication passage 48 and the air can pass through.

The holes (openings) 600*c* and 600*d* formed in the cylindrical portion 600*a* are open in a direction perpendicular to the axial direction of the rotational axis of the rotary shutter 600, that is, in a radial direction, and they are provided with 180 degrees different phases. The toner in the toner discharge chamber 57 can pass through the holes 600*c* and 600*d*, and as shown in part (a) of FIG. 16, the toner and the air are discharged through the frame opening 52 when the frame opening 52 is aligned with either one of the holes 600*c* and 600*d*. That is, the toner and the air are discharged through the frame opening 52 every half rotation of the rotary shutter 600. In this manner, the rotary shutter 600 transitions between a closed position where the frame opening 52 is closed by the cylindrical portion 600*a* and an open position where the frame opening 52 is opened by the overlapping between the frame opening 52 and the holes 600*c* and 600*d*. When the rotary shutter 600 is in the open position, ventilation is permitted through the frame opening 52 and the holes 600*c* and 600*d*, by the overlap of the frame opening 52 and the holes 600*c* and 600*d*.

The axis of rotation of the rotary shutter 600 intersects the direction of movement of the air and the toner passing through the holes 600*c* and 600*d* and the frame opening 52, and in this embodiment, the axis of rotation is substantially perpendicular to the direction of the movement.

In this embodiment, the cylindrical portion 600*a* and the circumferential surface 50*r* of the supply frame 50 are structured to rub each other. As shown in part (b) of FIG. 16, when neither of the holes 600*c*, 600*d* overlaps (aligns with) the frame opening 52, the toner and the air are not discharged through the frame opening 52. In this embodiment, the space between the cylindrical portion 600*a* and the circumferential surface 50*r* is sealed so that the toner does not enter the space, but the sealing effect may be further enhanced by using an elastic material such as rubber as a material of the circumferential surface 50*r*, or by adhering an elastic sealing member to the circumferential surface 50*r*.

As described above, in this embodiment, the screw 54B and the rotary shutter 600 rotate as the drive input gear 59 and the screw gear 164B rotate. The frame opening 52 of the supply frame 50 is periodically opened and closed by the rotary shutter 600. Accordingly, the internal pressure (internal air pressure) of the toner discharge chamber 57 periodically changes, and a difference is produced between the external atmospheric pressure of the toner cartridge 4113 and the internal pressure of the toner discharge chamber 57. When the rotary shutter 600 closes the frame opening 52, the internal pressure of the toner discharge chamber 57 is positive, that is, higher than the pressure outside the toner cartridge 4113, because of the supply of the air into the toner discharge chamber 57 by the fan 158.

Thereafter, when the rotary shutter 600 moves from the closed position to the open position, the frame opening 52 is opened, and the compressed air is discharged through the frame opening 52 so that the internal pressure of the toner discharge chamber 57 drops. At this time, the toner in the toner discharge chamber 57 is discharged with vigor through the frame opening 52 together with the compressed air.

Further, in this embodiment, the driving force inputted from the drive output member 100*a* (see part (b) of FIG. 10) of the image forming apparatus 100 to the drive input gear 59 is outputted to the fan 158 and the rotary shutter 600, while the speed is changed by the drive train 160 (see part (a) of FIG. 10). By properly selecting the gear ratio in the drive train 160, the rotation speed of the fan 158 and the opening/closing frequency of the rotary shutter 600 can be changed. Accordingly, the rotation speed of the fan 158 and the opening/closing frequency of the rotary shutter 600 can be adjusted without depending on the drive output member 100*a* of the image forming apparatus 100. Further, by changing the opening/closing frequency of the rotary shutter 600, the amount of the toner discharged from the frame opening 52 can be easily controlled.

Modification Examples of Embodiment 2

Next, referring to FIGS. 17 to 20, a modified example of Embodiment 2 will be described. In the forgoing description, two holes 600*c* and 600*d* are formed in the rotary shutter 600, but the present invention is not limited such an example. For example, as shown in FIG. 17, only one hole 600*d* may be formed in the cylindrical portion 600*a* of the rotary shutter 600B. Even in such a case, the toner and the air can pass through the screw insertion hole 600*b* and the hole 600*d* and can be discharged through the frame opening 52. Of course, the cylindrical portion 600*a* may have three or more holes instead of one or two holes.

Further, the toner cartridge 4113 described with part (a) of FIG. 15 to FIG. 17 does not have a mechanism for maintaining the rotary shutters 600 and 600B at the closed position when the toner cartridge 4113 is outside of the apparatus main assembly 100B. In this case, for example, when the toner cartridge 4113 is out of the apparatus main assembly 100B of the image forming apparatus 100 with the rotary shutter 600 positioned at the opening position, the frame opening 52 remains open.

Therefore, a structure in which a shutter member 241 is further added downstream of the frame opening 52 of the supply frame 50 in the toner discharge direction will be described. Such a shutter member 241 is preferably provided when the toner cartridge does not have a structure for urging the rotary shutter 600 to the closed position.

[Shutter Member]

As shown in FIG. 17 to part (b) of FIG. 19, the bottom surface 50*d* of the supply frame 50 is provided with a first support portion 50*g*, a second support portion 50*h*, a guide portion 50*i*, and a spring seat 50*j*. A barb portion 50*g*1 extending in the horizontal direction (X direction) is formed at the free end, that is, a barb portion 50*h*1 extending in the horizontal direction (X direction) is formed at the lower end of the first support portion 50*g*.

The first support portion 50*g* and the second support portion 50*h* supports a shutter member 241 such that the shutter member 241 is movable in the mounting direction (Z direction) of the toner cartridge 4113. The shutter member 241 is guided in the mounting direction (Z direction) of the toner cartridge 4113 by the groove-shaped guide portion 50*i* extending in the mounting direction (Z direction) of the toner cartridge 4113. The shutter member 241 is held by the barb portions 50*g*1 and 50*h*1 so as not to disengage from the supply frame 50.

The shutter member 241 includes a sealing portion 241*a*, a spring support portion 241*b*, barb portions 241*cl* and 241*c*2, and an engaged portion 241*d*. The sealing portion 241*a* extends in the horizontal direction (Z direction) and is structured to be able to close the frame opening 52. The sealing portion 241*a* is provided with a hole 241*e* which opens in the Y direction. The spring support portion 241*b* extends in the Z1 direction and supports the shutter spring 243 at its base portion.

The shutter spring 243 is lightly press-fitted around the spring support portion 241*b* and compressed between the shutter member 241 and the spring seat 50*j* of the supply frame 50. The shutter member 241 is urged in the mounting direction (Z2 direction) of the toner cartridge 4113 by an urging force of the shutter spring 243. The shutter member 241 urged by the shutter spring 243 is positioned at the closed position as the second closed position shown in part (a) of FIG. 19, by the barb portions 241*cl* and 241*c*2 abutting against the first support portion 50*g* and the second support portion 50*h*.

The engaged portion 241*d* of the shutter member 241 is pressed by an engaging portion (not shown) provided in the image forming apparatus 100 when the toner cartridge 4113 is mounted to the apparatus main assembly of the image forming apparatus 100. By this, the shutter member 241 is moved from the closed position to the open position as a second open position, against the urging force of the shutter spring 243.

Part (a) of FIG. 19 is a bottom view illustrating the shutter member 241 positioned at the closed position, and part (b) of FIG. 19 is a bottom view illustrating the shutter member 241 positioned at the open position. part (a) of FIG. 20 is a cross-sectional view illustrating the shutter member 241 positioned at the closed position, and part (b) of FIG. 20 is a cross-sectional view illustrating the shutter member 241 positioned at the open position. Part (a) of FIG. 20 and part (b) of FIG. 20 show a rotary shutter 600B provided with only one hole 600*d* in the cylindrical portion 600*a*, but in place of the rotary shutter 600B, the rotary shutter 600 having two holes 600*c* and 600*d* is usable.

As shown in part (a) of FIG. 19 and part (a) of FIG. 20, when the toner cartridge 4113 is not mounted to the apparatus main assembly 100B of the image forming apparatus 100, the shutter member 241 is positioned at the closed position by the urging force of the shutter spring 243. At this time, the sealing portion 241*a* of the shutter member 241 seals the frame opening 52 and restricts the discharge of the toner and the air from the toner cartridge 4113. In other words, when the shutter member 241 is positioned at the closed position, the hole 241*e* of the sealing portion 241*a* is placed so as not to overlap the frame opening 52 in bottom view.

As shown in part (a) of FIG. 20, an elastic sealing member 602 may be provided between the sealing portion 241*a* of the shutter member 241 and the bottom surface 50*d* of the supply frame 50. The sealing member 602 is provided with a hole 602*a*, through which toner and air can be discharged, at a position corresponding to the frame opening 52. By this, the sealing can be effected between the shutter member 241 and the bottom surface 50*d* of the supply frame 50.

When the toner cartridge 4113 is mounted to the image forming apparatus 100, the engaged portion 241*d* is pressed by an engaging portion (not shown) provided in the apparatus main assembly 100B of the image forming apparatus 100, by which the shutter member 241 is moved from the closed position to the open position. The engaged portion 241*d* has a tapered tip shape at the upstream end in the mounting direction (Z2 direction) of the toner cartridge 4113. Since the shutter member 241 is not driven by the drive train 160, it does not move between the closed position and the open position even if the drive input gear 59 is driven.

By moving the shutter member 241 to the open position, the sealing portion 241*a* opens the frame opening 52 and the toner and the air can be discharged from the toner cartridge 4113. In other words, the arrangement is such that when the shutter member 241 is positioned at the open position, the hole 241*e* of the sealing portion 241*a* overlaps the frame opening 52 in bottom view.

As described above, by providing the shutter member 241 on the outer side of the bottom surface 50*d* of the supply frame 50, the frame opening 52 can be closed by the shutter member 241 regardless of the positions of the rotary shutters 600 and 600B. Therefore, in the state that the toner cartridge

4113 is out of the apparatus main assembly 100B of the image forming apparatus 100, it is possible to prevent the toner from being discharged to the outside through the frame opening 52 of the supply frame 50.

In addition, by mounting the toner cartridge 4113 in the apparatus main assembly 100B, the shutter member 241 moves to the open position, so that the toner can be quickly discharged through the frame opening 52.

In above-described Embodiment 1, the slide shutter 141 closes the frame opening 52 when the toner cartridge 13 is not mounted in the apparatus main assembly 100B. That is, the slide shutter 141 has a function of blocking air movement and a function of preventing toner from leaking out of the toner cartridge 13.

However, as also in Embodiment 1, the shutter member 241 as in this embodiment may be separately provided. By doing so, toner leakage through the frame opening 52 can be suppressed more reliably when the toner cartridge 13 is not mounted to the apparatus main assembly 100B. Alternatively, it is possible to employ a structure in which the slide shutter 141 does not close the frame opening 52 when the toner cartridge 13 is not mounted to the apparatus main assembly B. A toner cartridge of another embodiment which will be described hereinafter. The shutter member 241 can also be usable, if necessary. Unlike the rotary shutter 600 and the slide shutter 141 described above, the shutter member 241 is not a shutter member (shut-off member, airflow shut-off member) driven to periodically shut off the airflow from the fan 158. It is simply a shutter member intended to prevent the toner from scattering or leaking by covering the frame opening 52 of the toner cartridge when the toner cartridge is being removed or before it is mounted to the main assembly of the image forming apparatus.

The shutter member 241 does not have to be provided when a structure for urging the rotary shutter 600 to the closing position is provided. For example, a coil portion of a torsion coil spring may be wound around any one of the screw gear 164B, the rotary shutter 600, and the screw 54B to position the rotary shutter 600 at the shut-off position by an urging force of the torsion coil spring. In addition, a stopper may be provided which urges, by a torsion coil spring, the rotary shutter 600 in a direction opposite to the direction in which it is rotated by the driving force of the screw gear 164B so as to place only the rotary shutter 600 rotating in the opposite direction, at the shut-off position.

When the screw gear 164B is driven, the coil portion of the torsion coil spring is loosened so that the drive transmission from the rotary shutter 600 to the torsion coil spring is interrupted. Therefore, the rotary shutter 600 can rotate. On the other hand, when the toner cartridge is removed from the apparatus main assembly 100B and the driving force from the screw gear 164B is not applied, for example, the urging force of the torsion coil spring brings the rotary shutter 600 into abutment to the stopper and positions it at the shut-off position.

Embodiment 3

Next, Embodiment 3 of the present invention will be described, in which instead of the rotary shutter 600 of Embodiment 2, an up-down shutter 624 opens and closes the frame opening 52. Therefore, the structures similar to those of Embodiment 2 will be omitted from the illustration or will be assigned the same reference numerals in the drawing. The structure for sending air to the toner discharge chamber 57 by the fan 158 is the same as in Embodiment 1. Similarly to the rotary shutter 600 described above, the up-down shutter 624 in this embodiment is a shutter member (shut-off member, airflow shut-off member, valve) driven to periodically shut-off the air flow produced by the fan 158 by periodically shutting off the air passage.

The toner cartridge 5113 according to Embodiment 3 includes a supply frame 50 and a screw 54C rotatably supported by the supply frame 50. The screw 54C conveys the toner toward the toner discharge chamber 57 partitioned by the partition member 155. A screw gear 164C is rotatably supported by the supply frame 50, and the drive is inputted to the screw gear 164C from the fan input gear 260 (see part (a) of FIG. 10) as in Embodiment 1.

The screw gear 164C has an insertion portion 621, and the insertion portion 621 is provided with a pin hole 621*a*. Further, the screw 54C has a recipient portion 622 into which the insertion portion 621 is inserted, and the recipient portion 622 is provided with a pin hole 622*a*. The insertion 621 has a double-sided chamfered cross-sectional shape, and the recipient portion 622 has an opening shape corresponding to the cross-sectional shape of the insertion 621.

The insertion 621 of the screw gear 164C is inserted into the recipient portion 622 of the screw 54C so that the pin holes 621*a* and 622*a* are aligned with each other. By fitting a pin 623 into the pin holes 621*a* and 621*b*, the screw gear 164C and the screw 54C are connected so as to be rotatable integrally.

Above the frame opening 52, an up-down shutter 624 as a shut-off member is provided. In other words, the up-down shutter 624 is disposed on an upstream side of the frame opening 52 in the discharge direction (Y2 direction) of the toner discharged from the frame opening 52. The up-down shutter 624 is a shutter member which opens and closes the frame opening 52 as the screw 54C rotates. The up-down shutter 624 includes a lid portion 624*a*, a square frame portion 624*b* extending upward from the lid portion 624*a*, a rib 624*c* projecting from the top surface of the lid portion 624*a*, and a cylindrical portion 624*d* projecting downward from the bottom surface of the lid portion 624*a*.

The square frame portion 624*b* has a square hole inside of itself, and the screw 54C is inserted into the square hole. The rib 624*c* is placed at a position different from that of the square frame portion 624*b* in the axial direction (Z direction) of the screw 54C. The cylindrical portion 624*d* has an outer diameter smaller than that of the lid portion 624*a* and is inserted into the frame opening 52 with almost no gap. A plurality of (four in this embodiment) hole portions 624*e* are formed in the cylindrical portion 624*d*, and these hole portions 624*e* are formed at positions with phases different from each other by 90 degrees.

The rotation shaft 54*a* of the screw 54C is provided with a push-up projection 625*a* and a push-down projection 625*b* projecting radially outward from the rotation shaft 54*a*. In the Z1 direction, the push-up projection 625*a* and the push-down projection 625*b* are disposed downstream of the recipient portion 622, and the push-down projection 625*b* is disposed downstream of the push-up projection 625*a*. The push-up projection 625*a* is provided at a position a phase of which is 90 degrees downstream of the push-down projection 625*b* in the rotational direction RD1 of the screw 54C.

More specifically, the push-up projection 625*a* is disposed at a position where it can contact the square frame portion 624*b* of the up-down shutter 624, but is disposed at the position where it cannot contact with the rib 624*c*. That is, the push-up projection 625*a* is disposed at a position overlapping the square frame portion 624*b* and is disposed at a position deviated from the rib 624*c*, in the axial direction (Z direction) of the screw 54C. The push-down projection 625*b* is disposed at a position where it can contact the rib 624*c* of the up-down shutter 624, but is disposed at the position where it cannot contact with the square frame portion 624*b*. That is, the push-down projection 625*b* is disposed at a position overlapping the rib 624*c* and at the position deviated from the square frame portion 624*b*, in the axial direction (Z direction) of the screw 54C.

Part (a) of FIG. 23 is a cross-sectional view of the up-down shutter 624 placed at the shut-off position taken along a line parallel to the axial direction of the screw 54C, and part (b) of FIG. 23 is a cross-sectional view of the up-down shutter 624 placed at the shut-off position taken along a line perpendicular to the axial direction of the screw 54C. Part (c) of FIG. 23 is a cross-sectional view showing the up-down shutter 624 placed at the opening position taken along a line parallel to the axial direction of the screw 54C, and part (d) of FIG. 23 is a cross-sectional view of the up-down shutter 624 placed at the opening position taken along a line perpendicular to the axial direction of the screw 54C.

As shown in part (a) of FIG. 23 and part (b) of FIG. 23, the up-down shutter 624 is placed at the shut-off position with the rib 624*c* in contact with the push-down projection 625*b*. At this time, the frame opening 52 is closed by the lid portion 624*a* and the cylindrical portion 624*d* of the up-down shutter 624.

Also, as shown in part (c) of FIG. 23 and part (d) of FIG. 23, the up-down shutter 624 is placed at the opening position with the square frame portion 624*b* in contact with the push-up projection 625*a*. At this time, the frame opening 52 is in fluid communication with the hole 624*e* of the up-down shutter 624 and is not closed by the up-down shutter 624.

When the screw 54C rotates 90 degrees in the rotational direction RD1 from the state in which the up-down shutter 624 is placed at the shut-off position shown in part (a) of FIG. 23 and part (b) of FIG. 23, the up-down shutter 624 reaches the open position as shown in parts (c) and (d) of FIG. 23. That is, when the screw 54C rotates in the rotational direction RD1 with the up-down shutter 624 placed at the shut-off position, the push-up projection 625*a* approaches to the square frame portion 624*b*.

The push-up projection 625*a* then presses the square frame portion 624*b* upward, thereby lifting the up-down shutter 624 upward (in the Y1 direction). As shown in part (c) of FIG. 23 and part (d) of FIG. 23, when the push-up projection 625*a* is placed directly above, the up-down shutter 624 is in the highest position, and at this time, the communication area between the frame opening 52 and the hole 624*e* is maximum.

When the screw 54C further rotates in the rotational direction RD1, the push-up projection 625*a* separates from the square frame portion 624*b*, and the up-down shutter 624 comes into contact with the rotational shaft 54*a* of the screw 54C by the gravity. At this time, the frame opening 52 is basically closed by the up-down shutter 624, and the up-down shutter 624 is considered to be positioned at the closed position. Further, when the screw 54C rotates in the rotational direction RD1, the push-down projection 625*b* pushes down the rib 624*c*, and the up-down shutter 624 shifts to the shut-down position where the frame opening 52 is closed. That is, the up-down shutter 624 is structured to reciprocate by moving up and down in a predetermined direction (Y direction) parallel to the discharge direction of the toner discharged from the frame opening 52.

In order to more reliably move the up-down shutter 624 to the position covering the frame opening 52, the shutter 624 may be urged toward the frame opening 52 using an urging member such as a spring.

As described above, in this embodiment, the screw 54C and the up-down shutter 624 are driven as the drive input gear 59 and the screw gear 164C rotate. The frame opening 52 of the supply frame 50 is periodically opened and closed by the up-down shutter 624. With this operation, the internal pressure (internal air pressure) of the toner discharge chamber 57 periodically changes, and a difference is produced between the external atmospheric pressure of the toner cartridge 5113 and the internal air pressure of the toner discharge chamber 57. When the up-down shutter 624 shuts off the frame opening 52, the internal pressure of the toner discharge chamber 57 becomes positive, that is, higher than the external atmospheric pressure of the toner cartridge 5113 by supply of the air into the toner discharge chamber 57 by the fan 158.

Thereafter, when the up-down shutter 624 moves from the shut-off position to the open position, the frame opening 52 is opened, and therefore, the compressed air is discharged through the frame opening 52 so that the internal pressure of the toner discharge chamber 57 lowers. At this time, the toner in the toner discharge chamber 57 is discharged with vigor through the frame opening 52 together with the compressed air, and therefore, the toner is well discharged into the main assembly 100B of the image forming apparatus 100.

In addition, in this embodiment, the drive force inputted from the drive output member 100*a* (see part (b) of FIG. 10) of the image forming apparatus 100 to the drive input gear (drive input member, drive receiving member) 59 is outputted to the fan 158 and the up-down shutter 624 while changing the speed by the drive train 160 (See part (a) of FIG. 10). By setting the speed change ratio of the drive train 160, the rotational speed of the fan 158 and the opening/closing frequency of the up-down shutter 624 can be changed. By this, the rotation speed of the fan 158 and the opening/closing frequency of the up-down shutter 624 can be adjusted without depending on the drive output member 100*a* of the image forming apparatus 100. In addition, by changing the opening/closing frequency of the up-down shutter 624, the amount of the toner discharged through the frame opening 52 can be easily controlled.

In this embodiment, the push-up projection 625*a* is provided at a 90 degrees phase downstream of the push-down projection 625*b*, in the rotational direction RD1 of the screw 54C, but the present invention is not limited to such an example. The phase difference between the push-up projection 625*a* and the push-down projection 625*b* may be any, and for example, the push-up projection 625*a* may be disposed at a phase 180 degrees downstream of the push-down projection 625*b* in the rotational direction RD1 of the screw 54C.

Further, the push-down projection 625*b* and the rib 624*c* may be omitted, and the up-down shutter 624 may be moved only by its own weight when moving from the open position to the closed position. Furthermore, the numbers of the push-up projection 625*a* and the push-down projection 625*b* are not limited to one, and a plurality of them may be provided.

Further, similar to Embodiment 2, the up-down shutter 624 does not have a mechanism for maintaining the shut off position when the toner cartridge 5113 is out of the apparatus main assembly 100B. For this reason, the toner cartridge 5113 may be provided with a shutter member 241 described in Embodiment 2.

A screw 54*c* provided with the push-up projection 625*a* and the push-down projection 625*b* can be regarded as a cam (camshaft) for converting the rotational motion of the screw 54C into a reciprocating motion with the vertical movement of the up-down shutter 624 to move the up-down shutter 624. In other words, the screw 54*c* is a drive converter for converting the rotary motion input to the drive input gear 59 of the toner cartridge 13 into the up-and-down motion (reciprocating motion) of the up-down shutter 624. The drive converting portion is not limited to the screw 54*c*, the push-up projection 625*a*, or the push-down projection 625*b*, and known mechanical elements such as cranks and links may be used as appropriate.

Embodiment 4

Next, Embodiment 4 of the present invention will be described in which in place of the rotary shutter 600 of Embodiment 2, a gear shutter 630 is used to open and close the frame opening 52. Structures similar to those of Embodiment 1 and Embodiment 2 will be omitted from illustration or assigned the same reference numerals in the drawings. Also, the structure for supplying the air to the toner discharge chamber 57 by the fan 158 is the same as in Embodiment 1. The gear shutter 630 is a shutter member (shut-off member, airflow shut-off member, valve) for periodically blocking the airflow produced by the fan 158, similar to the rotary shutter 600.

The toner cartridge 6113 according to Embodiment 4, as shown in FIG. 24 and part (a) of FIG. 25 comprises a supply frame 50 and a screw 54 (see FIG. 8) rotatably supported by the supply frame 50. A screw gear 164D as a gear member is rotatably supported by the supply frame 50, and a drive is supplied from a fan input gear 260 (see part (a) of FIG. 10) to the screw gear 164D as in Embodiment 1.

A screw 54 (see FIG. 8) is fixed to the screw gear 164D, so that the screw gear 164D and the screw 54 rotate integrally with each other. The screw gear 164D is provided with a plurality of (six in this embodiment) projections 631 which are arranged in a circumferential direction and project in the direction (Z1 direction) opposite to the mounting direction of the toner cartridge 6113.

A sealing member 632 having an elasticity and provided to surround the frame opening 52 is bonded to the bottom surface 50*d* of the supply frame 50. A gear shutter 630 is rotatably supported at a position adjacent to the frame opening 52 on the bottom surface 50*d* by a pin 633 extending along the Y direction. That is, the pin 633 as a rotational shaft is the center of rotation of the gear shutter 630, penetrates the sealing member 632, and is supported by the bottom surface 50*d*. A gear shutter 630 as a closing member is formed in a substantially disk shape and is provided downstream of the frame opening 52 in the discharge direction (Y2 direction) of the toner discharged through the frame opening 52.

The gear shutter 630 has a long hole (opening) 634 extending in the circumferential direction about the pin 633, and a plurality of (six in this embodiment) projections 635 projecting radially outward. The long hole 634 is formed so as to be larger than the frame opening 52. The projections 635 are structured to be engageable with the projections 631 provided on the screw gear 164D, respectively.

Part (a) of FIG. 25 is a bottom view illustrating the gear shutter 630 positioned at the closed position, and part (b) of FIG. 25 is a bottom view illustrating the gear shutter 630 positioned at the open position. As shown in part (a) of FIG. 25, the gear shutter 630 is located at the closed position when the frame opening 52 and the long hole 634 are in a phase relationship in which they do not overlap each other. At this time, the frame opening 52 is sealed by the gear shutter 630. In addition, as shown in part (b) of FIG. 25, the gear shutter 630 is placed at the open position when the frame opening 52 and the long hole 634 are in phase to overlap each other. At this time, the frame opening 52 communicates with the long hole 634 and is opened without being blocked by the gear shutter 630. And, the air is allowed to pass through the frame opening 52.

The gear shutter 630 rotates by increment of 60 degrees by engagement between projection 635 provided on screw gear 164D and projections 631 provided on gear shutter 630. This is because six projections 631 and six projections 635 are provided, and the numbers of projections 631 and 635 may be selected as desired. For example, the gear shutter 630 reaches the position shown in part (b) of FIG. 25 by rotation the screw gear 164D about 240 degrees from the position shown in part (a) of FIG. 25. In this manner, the gear shutter 630 rotates alternating the closed position and the open position, as the screw gear 164D rotates.

The axis of rotation of the gear shutter 630 extends along the moving direction of air and toner passing through the long hole 634 and the frame opening 52. In this embodiment, the axis of rotation is substantially parallel to the direction of movement.

As described above, in this embodiment, the screw 54 and the gear shutter 630 rotate as the drive input gear 59 and the screw gear 164D rotate. The frame opening 52 of the supply frame 50 is periodically opened and closed by the gear shutter 630. With such operations, the internal pressure (internal air pressure) in the toner discharge chamber 57 periodically changes, and a difference is produced between the external atmospheric pressure of the toner cartridge 6113 and the internal air pressure of the toner discharge chamber 57. When the frame opening 52 is closed by the gear shutter 630, the internal pressure of the toner discharge chamber 57 is made positive, that is, higher than the atmospheric pressure outside the toner cartridge 6113, by the air being fed to the toner discharge chamber 57 by the fan 158.

Thereafter, when the gear shutter 630 moves from the closed position to the open position, the frame opening 52 is opened, and the compressed air is discharged through the frame opening 52 so that the internal pressure of the toner discharge chamber 57 lowers. At this time, the toner in the toner discharge chamber 57 is vigorously discharged through the frame opening 52 together with the compressed air, so that the toner can be properly discharged into the main assembly 100B of the image forming apparatus 100.

Further, in this embodiment, the driving force inputted from the drive output member 100*a* (see part (b) of FIG. 10) of the image forming apparatus 100 to the drive input gear 59 is output to the fan 158 and the gear shutter 630 by the drive train 160 (see part (a) of FIG. 10) while changing the speed. By setting the speed ratio of the drive train 160 as desired, the rotation speed of the fan 158 and the opening/closing frequency of the gear shutter 630 can be changed. Accordingly, the rotation speed of the fan 158 and the opening/closing frequency of the gear shutter 630 can be adjusted without depending on the drive output member 100*a* of the image forming apparatus 100. Further, by changing the opening/closing frequency of the gear shutter 630, the amount of the toner discharged through the frame opening 52 can be easily controlled.

Similar to Embodiment 2, the gear shutter 630 does not have a mechanism for maintaining the closed position when toner cartridge 6113 is out of the apparatus main assembly 100B. For this reason, the toner cartridge 6113 may be provided with the shutter member 241 described in Embodiment 2.

Embodiment 5

Next, Embodiment 5 of the present invention will be described, in which the frame opening 52 is opened and closed by a rotary shutter 640 instead of the up-down shutter 620 of Embodiment 3. Therefore, the structures similar to those of Embodiment 3 will be omitted from the illustration or assigned the same reference numerals in the drawing. Also, the structure for supplying air to the toner discharge chamber 57 by the fan 158 is the same as in Embodiment 1. The rotary shutter 640 is a shutter member (closing member, airflow shut-off member, valve) which periodically stops the airflow produced by the fan 158 by periodically closing the air passage, similarly to the up-down shutter 620.

As shown in FIG. 26, the toner cartridge 7113 according to Embodiment 5 has a supply frame 50 and a screw 54E rotatably supported by the supply frame 50. The screw 54E conveys the toner toward the toner discharge chamber 57 partitioned by the partition member 155. A screw gear 164E is rotatably supported by the supply frame 50, and the drive is inputted to the screw gear 164E from the fan input gear 260 (see part (a) of FIG. 10) as in Embodiment 1.

The screw gear 164E is provided with an inserted portion 641, and the inserted portion 641 is provided with a pin hole 641*a*. Further, the screw 54E is provided with a receptor portion 642 into which the inserted portion 641 is inserted, and the receptor portion 642 is provided with a pin hole 642*a*. The inserted portion 641 has a double-sided flat cross-sectional shape, and the receptor portion 642 has an opening shape corresponding to the cross-sectional shape of the inserted portion 641.

The inserted portion 641 of the screw gear 164E is inserted into the receptor portion 642 of the screw 54E, and the pin holes 641*a* and 642*a* are aligned with each other. By fitting the pin 643 into the pin holes 641*a* and 641*b*, the screw gear 164E and the screw 54E are connected to each other so as to be integrally rotatable.

The rotatory shutter (swinging shutter) 640 as a closing member is disposed above the frame opening 52. In other words, the rotary shutter 640 is disposed at a position upstream of the frame opening 52 in the discharge direction (Y2 direction) of the toner to be discharged through the frame opening 52. The rotary shutter 640 is a shutter member for opening and closing the frame opening 52 as the screw 54E rotates. The rotary shutter 640 includes a rotational shaft 640*a*, a channel-shaped groove portion 640*b* provided at the downstream end of the rotational shaft 640*a* in the Z2 direction, a first wall portion 640*c*, and a second wall portion 640*d* projecting radially outward from the rotational shaft 640*a*.

Opposite end portions of the rotational shaft 640*a* are rotatably supported by two shaft support portions 646 (one of which is not shown) provided on a bottom surface 50*d* of the supply frame 50. In particular, the channel-shaped groove portion 640*b* provided on the rotational shaft 640*a* engages with one of the two shaft support portions 646, to restrict movement of the rotational shaft 640*a* in the axial direction (Z direction).

The second wall portion 640*d* is provided 90 degrees downstream of the first wall portion 640*c* in the rotational direction RD1 of the screw 54E. The second wall portion 640*d* is provided with a spring seat 640*e*, which is engaged with one end of a shutter spring 644. The coil portion of the shutter spring 644 is inserted into the rotational shaft 640*a* of the rotary shutter 640, and the other end of the shutter spring 644 is engaged with the supply frame 50. The rotary shutter 640 is urged by the urging force of the shutter spring 644 in the direction in which the second wall portion 640*d* approaches the frame opening 52.

The rotational shaft 54*a* of the screw 54E is provided with a projection 645 projecting radially outward from the rotational shaft 54*a*. The projection 645 is disposed downstream of the recipient portion 622 in the Z1 direction, and is structured to be contactable with the first wall portion 640*c*.

Part (a) of FIG. 27 is a sectional view, taken along a plane parallel with an axial direction of the screw 54*e*, of the screw 54E showing the rotary shutter 640 placed in the closed position, and part (b) of FIG. 27 is a cross-sectional view, taken along a plane perpendicular to the axial direction of the screw 54E, of the rotary shutter 640 placed in the closed position. Part (c) of FIG. 27 is a sectional view, taken along the plane parallel with the axial direction of the screw 54E, showing the rotary shutter 640 placed in the open position, and part (d) of FIG. 27 is a cross-sectional view, taken along the plane perpendicular to the axial direction of the screw 54E, showing the rotary shutter 640 placed in the open position.

As shown in part (a) of FIG. 27 and part (b) of FIG. 27, the rotary shutter 640 is positioned at the closed position with the first wall portion 640*c* separated from the projection 645 of the screw 54E. At this time, the rotary shutter 640 is urged in the arrow PD1 direction by the urging force of the shutter spring (elastic member) 644, and the frame opening 52 is closed by the second wall portion 640*d*.

Further, as shown in part (c) of FIG. 27 and part (d) of FIG. 27, the rotary shutter 640 is positioned at the open position in the state that the first wall portion 640*c* is pressed by the projection 645 of the screw 54E. At this time, there is provided a gap between the second wall portion 640*d* of the rotary shutter 640 and the frame opening 52, and the frame opening 52 is open.

When the screw 54E rotates 270 degrees in the rotational direction RD1 from the state in which the rotary shutter 640 is positioned at the closed position shown in part (a) of FIG. 27 and part (b) of FIG. 27, the rotary shutter 640 reaches the open position shown in part (c) of FIG. 23 and part (d) of FIG. 23. At this time, when the projection 645 is positioned directly below the rotational shaft 54*a*, the projection 645 and the second wall portion 640*d* are closest to each other, but the projection 645 does not contact the second wall portion 640*d*. Therefore, the projection 645 does not collide with the second wall portion 640*d*, and therefore, the rotation of the screw 54E is not hindered.

When the screw 54E is further rotated in the rotational direction RD1 from the state in which the projection 645 is positioned directly below the rotational shaft 54*a*, the projection 645 approaches to the first wall portion 640*c*. The first wall portion 640*c* of the rotary shutter 640 positioned at the closed position is positioned so as to overlap the locus of movement of the projection 645. Therefore, as the screw 54E rotates, the projection 645 presses the first wall portion 640*c*, so that the rotary shutter 640 rotates in the arrow PD2 direction. By this, the rotary shutter 640 is brought into the open position in which the frame opening 52 is opened. The projection 645 or the screw 54E provided with the same can be regarded as a cam (cam shaft) which converts the rotary motion of the screw 54E into the reciprocating motion caused by the swinging motion of the rotary shutter 640. In other words, the projection 645 or the screw 54E provided with the projection 645 is a drive converting portion which converts rotational motion into another motion. The screw 54E is an example of a drive converting portion, and known mechanical elements may be used therefor.

As described above, in this embodiment, the screw 54E and the rotary shutter 640 are driven as the drive input gear 59 and the screw gear 164E rotate. The frame opening 52 of the supply frame 50 is periodically opened and closed by a rotary shutter 640 which periodically rotates between the closed position and the open position. That is, the rotatory shutter 640 reciprocates in the arrow PD1 direction and the arrow PD2 direction, and swings about the rotation axis of the rotary shutter 640.

With the opening and closing operation of the rotary shutter 640, the internal pressure (internal air pressure) of the toner discharge chamber 57 periodically changes, so that a difference between the external atmospheric pressure of the toner cartridge 7113 and the internal air pressure of the toner discharge chamber 57 is produced. When the frame opening 52 is closed by the rotary shutter 640, the air is fed into the toner discharge chamber 57 by the fan 158 so that the internal pressure of the toner discharge chamber 57 becomes positive, that is, higher than the atmospheric pressure outside the toner cartridge 7113.

Thereafter, when the rotary shutter 640 moves from the closed position to the open position, the frame opening 52 is opened, and therefore, the compressed air is discharged through the frame opening 52 so that the internal pressure of the toner discharge chamber 57 lowers. At this time, the toner in the toner discharge chamber 57 is discharged with vigor through the frame opening 52 together with the compressed air.

Further, in this embodiment, the driving force inputted from the drive output member 100*a* (see part (b) of FIG. 10) of the image forming apparatus 100 to the drive input gear 59 is outputted to the fan 158 and the rotary shutter 640 while being changed in the speed by the drive train 160 (see part (a) of FIG. 10). By desirably selecting the gear ratio of the drive train 160, the rotation speed of the fan 158 and the opening/closing frequency of the rotary shutter 640 can be changed. Accordingly, the rotation speed of the fan 158 and the opening/closing frequency of the rotary shutter 640 can be adjusted without depending on the drive output member 100*a* of the image forming apparatus 100. Further, by changing the opening/closing frequency of the rotary shutter 640, the amount of the toner discharged through the frame opening 52 can be easily controlled.

In this embodiment, the shutter spring 644 urges the rotary shutter 640 to the closed position, but the present invention is not limited to such an example. For example, the position of the center of gravity of the rotary shutter 640 may be set so that the rotary shutter 640 is urged to the closed position by its own weight without providing the shutter spring 644. Alternatively, the rotary shutter 640 may be moved to the closed position by pressing the second wall portion 640*d* using the projection 645.

Further, similarly to Embodiment 2, the rotary shutter 640 does not have a mechanism for maintaining the closed position when the toner cartridge 7113 is removed from the apparatus main assembly 100B. Therefore, the toner cartridge 7113 may be provided with the shutter member 241 described in Embodiment 2.

Embodiment 6

Next, Embodiment 6 of the present invention will be described in which the slide shutter (airflow shut-off member) 141 of Embodiment 1 is omitted, and a sealing wall 650 is provided on the screw 54F. Therefore, the structure similar to that of Embodiment 1 will be omitted from illustration or assigned the same reference numerals in the drawings. Also, the structure for feeding air to the toner discharge chamber 57 by the fan 158 is the same as in Embodiment 1. In this embodiment, there is no shutter member (closing member, airflow shut-off member) which periodically shuts off the airflow produced by the fan 158, and in place thereof, the sealing wall (toner shut-off member) 650 is employed to control the feeding of the toner.

As shown in part (a) of FIG. 28 to part (b) of FIG. 29, the toner cartridge 8113 according to Embodiment 6 includes a supply frame 50 and a screw 54F rotatably supported by the supply frame 50. The screw 54F transports the toner to the communication path 48 and into the toner discharge chamber 57 partitioned by the partition member 155. A screw gear 164F is rotatably supported by the supply frame 50, and drive is inputted to the screw gear 164F from the fan input gear 260 (see part (a) of FIG. 10) as in Embodiment 1.

A screw 54F is fixed to the screw gear 164F, and the screw 54F rotates integrally with the screw gear 164F. The exit portion of the communication passage 48, that is, the boundary between the communication passage 48 and the toner discharge chamber 57, is constituted by a lower wall 651 formed on the supply frame 50 and an upper wall 652 formed on the partition member 155. A semicircular shaft support portion 651*a* is formed on the lower wall 651, and the shaft support portion 651*a* rotatably supports the rotation shaft 54*a* of the screw 54F. The rotational shaft 54*a* is provided with a spiral portion 54*b* for conveying toner in the Z2 direction.

The upper wall 652 is provided with a semicircular opening 652*a*. As shown in part (c) of FIG. 28, in the state in which the screw 54F is omitted, the communication passage 48 and the toner discharge chamber 57 are in fluid communication with each other, in the space SP6 between the lower wall 651 and the upper wall 652, that is, the space SP6 surrounded by the shaft support portion 651*a* and the opening 652*a*.

Part (a) of FIG. 30 is a sectional view of the sealing wall 650 placed in the closed position, taken along a plane parallel to the axial direction of the screw 54F, and part (b) of FIG. 30 is a sectional view of the sealing wall 650 placed in in the open position, taken along a plane parallel to the axial direction of the screw 54F. Part (a) of FIG. 31 is a cross-sectional view of the sealing wall 650 placed in the closed position, taken along a plane perpendicular to the axial direction of the screw 54F showing, and part (b) of FIG. 31 is a cross-sectional view of the sealing wall 650 placed in the open position, taken along a plane perpendicular to the axial direction of the screw 54F.

As shown in part (a) of FIG. 30, a cylindrical portion 653 connected to the screw gear 164F is provided at the downstream end of the screw 54F in the Z2 direction, and the downstream end of the cylindrical portion 653 in the Z1 direction is provided with the sealing wall 650. As shown in part (a) of FIG. 30, the cylindrical portion 653 includes a sheet portion 654 provided at a position overlapping with the frame opening 52 in the Z direction, and a spiral portion 653*a* for feeding the toner in the Z2 direction.

As shown in part (a) of FIG. 31, the sealing wall 650 as a toner shut-off member is formed in a sector shape (semicircular shape) projecting radially outward beyond the outer diameter of the cylindrical portion 653 and is rotatable together with the screw 54F. In addition, the sealing wall 650 is disposed downstream of the upper wall 652 of the partition member 155 in the Z2 direction and at a position where it can rub against the upper wall 652.

As shown in part (a) of FIG. 30 and part (a) of FIG. 31, when the sealing wall 650 is in contact with the upper wall 652, the sealing wall 650 is positioned at the toner closed position. The space SP6 (see part (c) of FIG. 28) establishing fluid communicating between the communication passage 48 and the toner discharge chamber 57 is sealed by the rotational shaft 54*a* of the screw 54F and the sealing wall 650. Therefore, the toner in the communication passage 48 is not fed into the toner discharge chamber 57.

As shown in part (b) of FIG. 30 and part (b) of FIG. 31, when the sealing wall 650 is located at the open position as the toner release position, the contact between the sealing wall 650 and the upper wall 652 is broken. At this time, the sealing wall 650 faces the lower wall 651 in the Z direction, and there is a space between the opening 652*a* of the upper wall 652, the rotational shaft 54*a*, and the sealing wall 650. That is, since the communication passage 48 and the toner discharge chamber 57 communicate with each other, the toner in the communication passage 48 can be fed into the toner discharge chamber 57.

As described above, in this embodiment, the screw 54F and the sealing wall 650 rotate as the screw gear 164F rotates. The space SP6, which is a boundary portion between the communication path 48 and the toner discharge chamber 57, is periodically opened and closed by the sealing wall 650. By this, a predetermined amount of the toner can be fed from the communication passage 48 into the toner discharge chamber 57. The frame opening 52 is kept open regardless of whether the sealing wall 650 is positioned at the closed position or the open position.

Furthermore, the toner fed from the communication passage 48 into the toner discharge chamber 57 is discharged into the frame opening 52 by the spiral portion 653*a* and the sheet portion 654 provided on the cylindrical portion 653. The sheet portion 654 is formed so as to be able to enter the frame opening 52, and pushes the toner out of the frame opening 52 while loosening the toner existing in the neighborhood of the frame opening 52.

Air is fed into the toner discharge chamber 57 by the fan 158 through the duct 163, and the toner in the toner discharge chamber 57 is discharged through the frame opening 52 together with the air fed by the fan 158 with vigor. As a result, the toner can be satisfactorily discharged to the inside of the apparatus main assembly 100B of the image forming apparatus 100.

Further, in this embodiment, the driving force inputted from the drive output member 100*a* (see part (b) of FIG. 10) of the image forming apparatus 100 to the drive input gear 59 is outputted to the fan 158 and the screw 54F while the speed is changed by the drive train 160 (see part (a) of FIG. 10). By selecting the gear ratio of the drive train 160, the rotational speed of the fan 158 and the opening/closing frequency of the sealing wall 650 provided on the screw 54F can be changed. By this, the rotation speed of the fan 158 and the opening/closing frequency of the sealing wall 650 can be adjusted without depending on the drive output member 100*a* of the image forming apparatus 100. In addition, by changing the opening/closing frequency of the sealing wall 650, the amount of the toner discharged through the communication passage 48 into the toner discharge chamber 57 can be easily controlled.

Further, by changing the shape of the sealing wall 650, the amount of the toner discharged through the communication passage 48 into the toner discharge chamber 57 can be easily controlled without changing the rotational speed of the screw 54F. That is, the sealing wall 650 is a shutter member (toner shut-off member) for shutting off the flow of the toner by periodically closing the passage of the toner.

Moreover, the sealing wall 650 is integrally formed with the screw 54F, and therefore, the structure is simple. Therefore, it is possible to reduce the number of parts and the assembling man-hours, thereby reducing the cost.

Further, in this embodiment, regardless of the phase of the sealing wall 650, the frame opening 52 is always open. Therefore, even if air is fed into the toner discharge chamber 57 by the fan 158, the internal pressure of the toner discharge chamber 57 does not rise significantly. Therefore, the degree of airtightness of the toner discharge chamber 57 can be set relatively low, and a sealing member for increasing the degree of airtightness of the toner discharge chamber 57 is not required. Therefore, it is possible to reduce the number of parts and the assembling man-hours, thereby reducing the cost.

In this embodiment, unlike the above-described embodiments, the air pressure inside the toner cartridge 13 and the airflow discharged from the toner cartridge 13 are not periodically changed. However, by the action of the sealing wall 650, the flow of the toner moving outward from the toner cartridge 13 is periodically changed. As a result, the fluidity of the toner is increased, and it is possible to suppress toner clogging.

Further, similar to Embodiment 2, the sealing wall 650 does not have a mechanism for maintaining the closed position when the toner cartridge 8113 is removed from the apparatus main assembly 100B. Therefore, the toner cartridge 8113 may be provided with the shutter member 241 described in Embodiment 2.

Embodiment 7

Next, Embodiment 7 of the present invention will be described, in which a duct 663 is employed in place of the duct 163 of Embodiment 6. Therefore, the structure similar to that of Embodiment 6 will be omitted from the illustration or assigned the same reference numerals in the Figures for explanation.

The toner cartridge 9113 according to Embodiment 7 includes a duct 663 connecting the fan 158 and the supply frame 50, as shown in part (a) of FIG. 32 and part (b) of FIG. 32, and the duct 663 is connected to the toner accommodating chamber 49 not to the discharge chamber 57. That is, a connection hole portion 664 connected to the duct 663 is formed in the side surface of the supply frame 50 which defines the toner accommodating chamber 49. The duct constitutes a gas feed path (ventilation path).

The air fed from the fan 158 passes through the duct 663 and enters the toner accommodating chamber 49 through the connection hole portion 664. The toner accommodating chamber 49 communicates with the toner discharge chamber 57 by way of the communication passage 48, but as in Embodiment 7, the space SP6 at the boundary between the communication passage 48 and the toner discharge chamber 57 is periodically opened and closed by a sealing wall 650 which rotates integrally with the screw 54F. By this, a predetermined amount of the toner can be fed through the communication passage 48 into the toner discharge chamber 57.

In this embodiment, the air is fed from the fan 158 into the toner accommodating chamber 49 through the duct 663. Therefore, when the sealing wall 650 is positioned at the closed position, the internal pressure of the toner accommodating chamber 49 and the communication passage 48 is positive, that is, higher than the atmospheric pressure outside the toner cartridge 9113.

Thereafter, when the sealing wall 650 moves from the closed position to the open position, the space SP6 is opened, and therefore, the communication path 48 and the toner discharge chamber 57 communicate with each other so that the compressed air is discharged to the toner discharge chamber 57, by which the internal pressures of the toner accommodating chamber 49 and the communication path 48 are lowered. At this time, the toner in the communication passage 48 enters into the toner discharge chamber 57 vigorously together with the compressed air, and the toner in the toner discharge chamber 57 is stirred. In addition, the toner which is mixed with the compressed air and vigorously fed from the communication passage 48 to the toner discharge chamber 57 pushes the toner adjacent the frame opening 52 out and pushes the toner to inside the apparatus main assembly 100B of the image forming apparatus 100 satisfactorily.

In this embodiment, the sealing wall 650 can be regarded as a shutter member (closing member, airflow shut-off member, valve) which blocks not only the movement of the toner but also the airflow produced by the fan 158. In this embodiment, the communication path 48 is a path through which not only the toner but also the air moves. Therefore, the sealing wall 650 serves as both a toner shut-off member and an airflow shut-off member.

Embodiment 8

Next, an Embodiment 8 of the present invention will be described, in which in place of the slide shutter 141 of Embodiment 1, a duct shutter 670 opens and closes the connection portion between the duct 163 and the supply frame 50. Therefore, the structure similar to that of Embodiment 1 will be omitted from illustration or will be assigned the same reference numerals in the drawings. Also, the structure for feeding the air to the toner discharge chamber 57 by the fan 158 is the same as in Embodiment 1.

As shown in part (a) of FIG. 33 and part (b) of FIG. 34, the toner cartridge 10113 according to Embodiment 8 includes a supply frame 50, a fan 158, a duct shutter 670, a shutter spring 671, and a duct a connection member 672 and a link member 673. Shutter support portions 675*a* and 675*b*, a wall portion 675*c*, and a through hole 675*d* are provided on a side surface 50*n* of the supply frame 50 on the downstream end side in the Z2 direction.

The shutter support portions 675*a* and 675*b* are arranged facing each other with a gap therebetween in the Y direction, and support the duct shutter 670 so as to be slidable in the X direction. The duct shutter 670 has a plate-shaped sealing portion 670*a* and a cut-away portion 670*b*. A shutter spring 671 is compressed between the duct shutter 670 and the wall portion 675*c*, and the duct shutter 670 is biased in X1 direction by the shutter spring 671.

A duct connection member 672 is fixed to the shutter support portions 675*a* and 675*b* so as to face the through hole 675*d*, and the duct connection member 672 has a cylindrical portion 672*a*. The cylindrical portion 672*a* extends in the Z2 direction and has a through hole 672*b* in the center. To the cylindrical portion 672*a*, the duct 163 is connected. The through hole 672*b* is placed so as to overlap the through hole 675*d* of the side surface 50*n* as viewed in the Z1 direction, and the duct shutter 670 is positioned in the Z direction by the duct connection member 672 and the side surface 50*n*.

A link member 673 is rotatably supported by way of a pin 674 on the side surface 50*n* of the supply frame 50. The link member 673 has an elongated rod-like shape, and a projection 673*a* extending in the Z1 direction is formed at one end. The projection 673*a* is engaged with the cut-away portion 670*b* of the duct shutter 670, and is structured so that the duct shutter 670 slides in the X direction in interrelation with the rotation of the link member 673 about the pin 674.

A drive train 160G as a drive transmission portion of this embodiment has a drive input gear 59, a fan input gear 260G, an acceleration mechanism 161, and a screw gear 164. The fan input gear 260G is in meshing engagement with the drive input gear 59 and the screw gear 164, and is rotated by receiving a driving force from the drive input gear 59.

Link driving ribs 676 and 677 are provided on a downstream, in the Z1 direction, side surface of the fan input gear 260G. The link drive ribs 676, 677 each extend in the circumferential direction of the fan input gear 260G and are circumferentially spaced from each other.

Part (a) of FIG. 34 is a side view of the toner cartridge 10113 as viewed in the Z1 direction, in which the duct shutter 670 is placed at the closed position. Part (b) of FIG. 34 is a side view of the toner cartridge 10113 when the duct shutter 670 is placed at the release position, as viewed in the Z1 direction. Part (a) of FIG. 35 is a side view of the duct shutter 670 placed at the closed position and its peripheral structure as viewed in the Z2 direction. Part (b) of FIG. 35 is a side view of the duct shutter 670 placed at the open position and its peripheral structure as viewed in the Z2 direction.

As shown in part (a) of FIG. 34 and part (a) of FIG. 35, the duct shutter 670 as a closing member is urged in the X1 direction by the shutter spring 671 to be positioned in the closed position by abutting against the duct connection member 672 or the supply frame 50. At this time, the sealing portion 670*a* of the duct shutter 670 blocks communication between the through hole 672*b* of the duct connection member 672 and the through hole 675*d* of the supply frame 50. Therefore, the air fed from the duct 163 to the duct connection member 672 cannot enter the toner discharge chamber 57 of the supply frame 50. In other words, the communication hole 672*b* is a connecting portion between the duct 163 and the supply frame 50, and also is a passage of air fed to the supply frame 50 by the fan 158, in which it is closed or opened by the duct shutter 670.

In addition, when the duct shutter 670 is placed at the closed position, the other end 673*b* of the link member 673 opposite to the projection 673*a* contacts the downstream end 676*a* of the link drive rib 676 in the rotational direction RD3.

When the fan input gear 260G further rotates in the rotational direction RD3, the other end 673*b* of the link member 673 is pressed by the downstream end 676*a* of the link drive rib 676, so that the link member 673 rotates around the pin 675. As shown in part (b) of FIG. 34 and part (b) of FIG. 35, in interrelation with the rotation of the link member 673, the duct shutter 670 slides in the X2 direction against the urging force of the shutter spring 671. By this, the duct shutter 670 is moved to the open position.

At this time, the sealing portion 670*a* of the duct shutter 670 allows the through hole 672*b* of the duct connection member 672 and the through hole 675*d* of the supply frame 50 to communicate with each other. That is, the duct shutter 670 opens the through hole 672*b* of the duct connection member 672 and the through hole 675*d* of the supply frame 50, at the open position. By this, the air fed from the duct 163 to the duct connection member 672 can enter the toner discharge chamber 57 of the supply frame 50.

When the duct shutter 670 is at the open position, the other end 673*b* of the link member 673 is in contact with the upstream end 676*b* of the link drive ribs 676 in the rotational direction RD3. When the fan input gear 260G further rotates in the rotational direction RD3, the other end 673*b* of the link member 673 separates from the upstream end 676*b* of the link drive rib 676, and the duct shutter 670 is moved to the closed position by the urging force of the shutter spring 671.

By the movement of the duct shutter 670 to the closed position, the link member 673 rotates and comes into contact with the link drive rib 677. The driving of the duct shutter 670 by the link drive ribs 677 is the same as that of the link drive ribs 676, and therefore, the description is omitted.

As described above, in this embodiment, duct shutter 670 reciprocates between the closed position and the open position as the fan input gear 260G rotates. The through hole 672*b* of the duct connection member 672 and the through hole 675*d* of the supply frame 50 are periodically opened and closed by the duct shutter 670.

With this operation, the internal pressure (internal air pressure) of the duct 163 changes periodically, and a difference occurs between the external air pressure of the toner cartridge 10113 and the internal air pressure of the duct 163. In the state that the through hole 672*b* of the duct connection member 672 is closed by the duct shutter 670 placed in the closed position, the air is fed to the duct 163 by the fan 158, and therefore, the internal pressure of the duct 163 is positive, that is, it is higher than the external atmospheric pressure.

Thereafter, when the duct shutter 670 moves from the closed position to the open position, the through hole 672*b* of the duct connection member 672 is opened, so that the compressed air is discharged from through the duct 163, by which the internal pressure of the duct 163 lowers. By this, the toner discharge chamber 57 also temporarily changes to have a positive pressure, and the toner in the toner discharge chamber 57 is vigorously discharged through the frame opening 52 together with the compressed air. In this manner, the toner can be satisfactorily discharged to an inside of the apparatus main assembly 100B of the image forming apparatus 100.

Further, in this embodiment, the driving force inputted from the drive output member 100*a* (see part (b) of FIG. 10) of the image forming apparatus 100 to the drive input gear 59 is applied to the fan 158 and the duct shutter 670 by the drive train 160 (see part (a) of FIG. 10), while changing the speed. By setting the gear ratio of the drive train 160, the rotational speed of the fan 158 and the opening/closing frequency of the duct shutter 670 can be selected. By this, the rotation speed of the fan 158 and the opening/closing frequency of the duct shutter 670 can be adjusted without dependance on the drive output member 100*a* of the image forming apparatus 100. In addition, by changing the opening/closing frequency of the duct shutter 670, the amount of the toner discharged through the frame opening 52 can be controlled.

In this embodiment, the fan input gear 260G is provided with the link drive ribs 676 and 677, and the driving force of the link drive ribs 676 and 677 is used to drive the duct shutter 670, but the present invention is not limited to such an example. For example, a gear other than the fan input gear 260G may be provided with link drive ribs 676 and 677 to drive the duct shutter 670. In addition, the number and shape of the link drive ribs 676 and 677 are not particularly limited.

In this embodiment, the duct shutter 670 is a shutter member (shut-off member, airflow shut-off member, valve) which periodically shuts off the airflow generated by the fan 158 by periodically closing the air passage. The slide shutter 141 which is the shutter member described above and so on are disposed in the neighborhood of the frame opening 52, and by closing the frame opening 52, not only air but also toner movement and toner discharge are blocked. In other words, the slide shutter 141 can be regarded as an airflow shut-off member and a toner blocking member at the same time. On the other hand, the duct shutter 670 according to this embodiment is characterized in that it shuts off the airflow (movement of air) but does not block the movement of the toner. In addition, the duct shutter 670 is disposed upstream of the frame opening 52, which is the toner discharge opening, in the movement direction of the airflow (air feeding path), and is not disposed in the neighborhood of the frame opening 52. The structure of this embodiment is particularly effective when there is no space for arranging the shutter member in the neighborhood of the frame opening 52. Moreover, since there is no toner around the duct shutter 670, it is possible to avoid a situation in which the operation of the duct shutter 670 is hindered by toner.

Embodiment 9

Next, Embodiment 9 of the present invention will be described, in which in place of the duct 163 of Embodiment 1, a duct 680 including a first duct member 681 and a second duct member 682 is provided. Therefore, the structure similar to that of Embodiment 1 will be omitted from illustration or assigned the same reference numerals, in the drawings.

A toner cartridge 11113 according to Embodiment 9 includes a supply frame 50, a fan 158, and a duct 680, as shown in FIG. 36. The duct 680 constitutes a feed path for feeding air from the fan 158 toward the air discharge opening 235, which will be described hereinafter. That is, the inside of the duct 680 is a movement path along which the air moves. The duct 680 include a first duct member 681 and a second duct member 682, the first duct member 681 being connected to the fan 158. The first duct member 681 is connected to the second duct member 682, and the wind generated by the fan 158 is fed through the first duct member 681 to the second duct member 682.

The second duct member 682 is in the shape of a hollow square pipe, and is provided with an air discharge opening 235 and a hole 236 which is in fluid communication with the frame opening 52. The second duct member 682 is bonded to the supply frame 50. The discharge opening 235 is provided in the bottom surface 682*a* of the second duct member 682, and the hole 236 is a circular through hole penetrating from the top surface of the second duct member 682 to the bottom surface 682*d*. The discharge opening 235 is an annular hole provided so as to surround the hole 236 and opens downward.

In this embodiment, the end surface of the edge of discharge opening 235 and the end surface of the edge of the air discharge opening 236 are flush with each other, but the present invention is not limited such an example. For example, either one of these end surfaces may project downward relative to the other. That is, in a coordinate system parallel to the Y-axis (vertical direction), the two end surfaces may be positioned at different positions.

As shown in part (a) of FIG. 37, the air discharge opening 235 and the hole 236 are arranged adjacent to the frame opening 52 in the discharge direction (Y2 direction) of the toner discharged from the frame opening 52. Further, the air discharge opening 235 and the hole 236 are disposed downstream of the frame opening 52 in the toner discharge direction (Y2 direction). Therefore, the toner discharged through the frame opening 52 passes through the hole 236 and is discharged into the image forming apparatus 100. The air is discharged through the discharge opening 235 so as to surround the toner.

In this embodiment, the toner having fallen through the frame opening 52 is discharged through the hole 236, and therefore the hole 236 can be regarded as a toner discharge opening. Alternatively, the frame opening 52 and the hole 236 can be collectively regarded as a single element called a toner discharge opening. In the above-described embodiment, not only the toner but also the air is discharged through the frame opening 52, which is the toner discharge opening. On the other hand, in this embodiment, air is not discharged through hole 236, which is a toner discharge opening. That is, as contrasted to the above-described embodiments, this embodiment is characterized in that the air discharge opening 235 and the toner discharge opening (hole 236) are different openings.

Although not shown in part (a) of FIG. 37, in this embodiment, the air discharge opening 235 and the hole 236 are periodically opened and closed by one of the shutter members (shut-off member, airflow shut-off member) described above. By opening and closing the air discharge opening 235, the discharge of the airflow by the fan 158 is periodically interrupted.

[Toner and Air Discharge]

Next, referring to part (a) of FIG. 37 and part (b) of FIG. 37, the discharge of the toner and air from the toner cartridge 11113 will be described in more detail. As described above, the driving force is supplied to the toner cartridge 11113 from the drive output member 100*a* (see part (b) of FIG. 10) provided in the image forming apparatus 100, so that the fan 158 and the screw 54 are driven. In part (a) of FIG. 37, the solid line indicates the toner feed path, and the broken line indicates the air discharge path.

By rotation of the screw 54, the toner in the toner cartridge 11113 is fed into the toner discharge chamber 57 through the communication passage 48. Then, the toner fed into the toner discharge chamber 57 moves in the toner discharge chamber 57 downward toward the hole 236 through the frame opening 52 formed in the bottom surface 50*d* of the supply frame 50.

The fan 158 operates to continuously send air from the fan 158 into the duct 680. The duct 680 comprises the first duct member 681 and the second duct member 682, and the air fed from the fan 158 is fed into the second duct member 682 by way of the first duct member 681. Then, the air fed to the second duct member 682 is discharged to outside from the air discharge opening 235 provided at the end of the second duct member 682. The air discharge opening 235 is annularly formed to surround the hole 236 and is adjacent to the hole 236. That is, the air discharge opening 235 is adjacent to the toner discharge opening (hole 236) in the horizontal direction (X direction, Z direction).

In this embodiment, the air discharge opening 235 and the hole 236 are periodically opened and closed by one of the shutter structures described above. With this, the internal pressure (internal air pressure) of the duct 680 periodically changes, so that a difference is produced between the external atmospheric pressure of the toner cartridge 11113 and the internal air pressure of the duct 680. When the air discharge opening 235 is closed by the shutter mechanism located at the closed position, the air is fed into the duct 680 by fan 158, so that the internal pressure of the duct 680 is positive, that is, it is, higher than the atmospheric pressure outside the toner cartridge 11113.

Thereafter, when the shutter mechanism moves from the closed position to the open position, the air discharge opening 235 is opened, and the compressed air is discharged through the discharge opening 235 so as to reduce the internal pressure of the duct 680. At this time, the toner discharged from the frame opening 52 is impelled by the compressed air discharged through the air discharge opening 235, so that the toner can be discharged into the apparatus main assembly 100B of the image forming apparatus 100 satisfactorily.

In addition, the air which is vigorously discharged through the air discharge opening 235 creates a negative pressure around the frame opening 52, so that the effect of sucking the toner from the frame opening 52 is provided. Further, in the toner cartridge 11113, the air feeding path from the fan 158 is separated from the toner feeding path, so that the toner does not interfere with air blowing from the fan 158. Therefore, air blowing failure inside the toner cartridge 11113 can be suppressed.

Further, since the toner feeding path and the air feeding path are separated, the operation test of the fan 158 can be easily performed when the toner cartridge 11113 is assembled. This is because even if air passes through the interior of the duct 230 during the operation test for the fan 158, the air does not directly act on the toner stored in the toner accommodating chamber 49. That is, if the operation test of the fan 158 is performed without operating the screw 54, the toner is suppressed from being discharged through the frame opening 52 and the hole 236. Therefore, the operation test for the fan 158 can be performed in a state in which toner scattering is suppressed, and the assembling operativity of the toner cartridge 11113 can be improved.

In this embodiment, the air feeding path from the fan 158 is separated from the toner feeding path, and therefore, the air does not tend to act directly on the toner in the toner discharge chamber 57. Therefore, it is particularly preferable to promote the transportation of the toner stored inside the toner discharge chamber 57 by using the structure described below.

That is, as shown in part (a) of FIG. 37, a flexible sheet member 210 is mounted to the screw 54. The sheet member 210 enters the frame opening 52 while rotating together with the screw 54. By this, the toner staying near the frame opening 52 can be loosened and the toner can be urged to be discharged through the frame opening 52. For example, if the screw 54 of the toner cartridge 11113 is not driven for a long time, the toner in the toner cartridge 11113 may become tight and it is difficult for the toner to fall out of the frame opening 52. Even in such a case, the toner can be loosened by the sheet member 210, and therefore, the toner can be discharged through the frame opening 52 satisfactorily.

Modification Examples of Embodiment 9

The shape and arrangement of the second duct member 682 are not limited to the description above. For example, as shown in FIG. 38 to part (b) of FIG. 39, a duct 680B connected to the fan 158 has the first duct member 681 and the second duct member 682B.

The second duct member 682B is structured in the shape of a hollow square pipe and has a hole 685. The second duct member 682B is bonded to the supply frame 50. The hole 685 is provided in the bottom surface of the second duct member 682B and opens downward. An upper surface of the second duct member 682B is in fluid communication with the frame opening 52, and the hole 685 is disposed at a position different from the frame opening 52 in the Z direction.

As shown in FIG. 38, the toner having dropped from the frame opening 52 enters the second duct member 682B and is discharged from the toner cartridge through the hole 685 together with the air. In this embodiment, the hole 685 is a toner discharge opening and also an air discharge opening (discharge opening).

[Toner and Air Discharge]

Next, referring to FIG. 38, the discharge of the toner and the air from the toner cartridge 11113 will be described in more detail. As described above, the driving force is supplied to the toner cartridge 11113 from the drive output member 100*a* (see part (b) of FIG. 10) provided in the image forming apparatus 100, so that the fan 158 and the screw 54 are operated. In FIG. 38, the solid line indicates a toner feed path, and a broken line indicates the air discharge path.

As the screw 54 rotates, the toner in the toner cartridge 11113 is fed to the toner discharge chamber 57 through the communication passage 48. Then, the toner fed to the toner discharge chamber 57 is discharged downward from the frame opening 52 formed in the bottom surface 50*d* of the supply frame 50 in the toner discharge chamber 57.

At this time, the sheet member 210 fixed to the screw 54 enters the frame opening 52 while rotating together with the screw 54. By this, the toner staying in the neighborhood of the frame opening 52 can be loosened and the toner can be urged to be discharged through the frame opening 52. For example, if the screw 54 of the toner cartridge 11113 is not driven for a long time, the toner in the toner cartridge 11113 may become tight and it is difficult for the toner to fall through the frame opening 52. Even in such a case, since the toner can be loosened by the sheet member 210, the toner can be discharged through the frame opening 52 satisfactorily.

The toner discharged through the frame opening 52 merges into the inner space of the second duct member 682B. By the operation of the fan 158, the air is continuously fed from the fan 158 into the duct 680B. The duct 680B comprises the first duct member 681 and the second duct member 682B, and the air fed from the fan 158 is fed by way of the first duct member 231 into the second duct member 682B.

In this modified example, the hole 685 is periodically opened and closed by any of the shutter structures described in the foregoing. With this operation of the shutter, the internal pressure (internal air pressure) of the duct 680B periodically changes, and a difference is produced between the external atmospheric pressure of the toner cartridge 11113 and the internal air pressure of the duct 680B. In the state that the hole 685 is blocked by the shutter mechanism placed in the closed position, by the air being fed to the duct 680B by the fan 158, the internal pressure of the duct 680B is positive, that is, higher than the atmospheric pressure outside the toner cartridge 11113.

Thereafter, when the shutter mechanism moves from the closed position to the open position, the hole 685 is opened, and therefore, the compressed air is discharged through the hole 685 so as to reduce the internal pressure of the duct 680B. At this time, the toner discharged through the hole 685 is mixed with the compressed air and is forced to be discharged into the inside of the apparatus main assembly 100B of the image forming apparatus 100 in a satisfactory manner.

In addition, the toner cartridge 11113 may be provided with the shutter member 241 described in Embodiment 2.

Here, the dimensions and arrangement of the frame opening 52, the air discharge opening 235, the hole 236, and the receiving opening 246 (see FIG. 42) in the apparatus main assembly 100B side will be considered. An inner diameter of the receiving opening 246 of the image forming apparatus 100 is D3 (see FIG. 42), an inner diameter of the frame opening 52 is D4 (see part (a) of FIG. 37), and as shown in FIG. 56, an inner diameter of the hole 236 is D5, an inner diameter of the air discharge opening 235 (diameter of the inner circle) is D6, and an outer diameter of the discharge opening 235 (diameter of the outer circle) is D7.

At this time, in this embodiment, the following relational relationships are satisfied:

$$D3>D6>D5 \quad (1)$$

$$D4>1.0\ [\text{mm}] \quad (2)$$

$$D5>1.0\ [\text{mm}] \quad (3)$$

$$D7-D6>0.5\ [\text{mm}] \quad (4)$$

Expressions (1) to (4) are relational expressions set so that toner and air can be smoothly discharged through the frame opening 52, the hole 236, and the air discharge opening 235. For example, D4, which is the inner diameter of the frame opening 52 through which the toner passes, and D5, which is the inner diameter of the hole 236, are required to be 1.0 [mm] or more for smooth passage of the toner. In addition, the difference (D7–D6), which is a difference between the inner diameter and the outer diameter of the air discharge opening 235, is required to be 0.5 [mm] or more. This is because if the difference (D7–D6) is smaller than that, the air speed is higher, but there is a larger required torque to cover the corresponding pressure loss.

As can be understood from above inequality (1), the inner diameter (D5) of hole 236 is smaller than the outer diameter (D7) of the air discharge opening 235. Based on the above inequalities (1) to (4), the areas of the frame opening 52, the hole 236, and the air discharge opening 235 are preferably 0.78 [$mm^2$] or more individually. In consideration of the toner scattering and air flow speed, the areas of the frame opening 52, the hole 236, and the air discharge opening 235 are preferably 117 [$mm^2$] or less.

In this embodiment, the dimensions are D3=6.0 [mm], D4=6.5 [mm], D5=3.0 [mm], D6=4.5 [mm], and D7=6.5 [mm]. At this time, both the toner passing through the frame opening 52 and discharged through the hole 236 and the air discharged through the air discharge opening 235 are required to be supplied to the receiving opening 246 on the apparatus main assembly (100B) side. For this reason, considering the inlet opening 246 as a reference, a closest distance between the hole 236 and the air discharge opening 235 is 6 [mm] in the horizontal direction (X direction, Z direction) perpendicular to the toner discharging direction (Y2 direction). That is, the minimum value of the thickness measured in the horizontal direction of the wall separating the hole 236 and the air discharge opening 235 is within 6 [mm].

In other words, when the diameter (inner diameter) of the receiving opening 246 is D [mm], the air discharge opening 235 is adjacent within D [mm], as viewed in a direction perpendicular to the discharging direction (Y2 direction) of the toner discharged through the frame opening 52. In other words, the frame opening 52 and the air discharge opening 235 can be said to be adjacent to each other if the frame opening 52 and the discharge opening 235 are within a distance of D [mm] which is the diameter (inner diameter) of the receiving opening 246, as viewed in the toner discharge direction (Y2 direction). The hole 236 and the discharge opening 235 are disposed so close to each other that both the toner and the air can be discharged to the same inlet 246.

With such arrangement relationships of the air discharge opening 235 and the hole 236, the toner and the air can be supplied into the receiving opening 246 of the image forming apparatus 100 in a state that they are mixed with each other. As such, the toner discharged from the toner cartridge 13 can be fed by the air produced by the fan 158, and the toner discharging and feeding properties can be improved.

More preferably, the air discharge opening 235 is disposed such that at least a part of the air discharge opening 235 overlaps the frame opening 52 as viewed in the discharge direction (Y2 direction) of the toner discharged through the hole 236.

Embodiment 10

Next, Embodiment 10 of the present invention will be described, in which the structure of the duct of Embodiment 9 is modified, and the duct is provided with the function of a shutter member 241. Therefore, the structure similar to that of Embodiment 1 will be omitted from illustration or will be assigned the same reference numerals in the drawings.

A toner cartridge 12113 according to Embodiment 10 includes a duct 330 which guides the air fed from the fan 158 (see FIG. 36). As shown in FIG. 40, the duct 330 includes a first duct member 231, a second duct member 332, and a third duct member 333. The first duct member 231 is connected to the fan 158 and extends inside the supply frame 50.

The second duct member 332 has flexibility and elasticity, and is formed in a pipe shape, and extends in a substantially vertical direction (Y direction). One end of the second duct member 332 is connected to an external connecting portion 231*c* of the first duct member 231 and the other end is connected to a duct connecting portion 333*b* of the third duct member 333.

A guide member 334 is fixed to the bottom surface 50*d* of the supply frame 50. The guide member 334 includes a horizontally extending flat plate portion 334*a*, a first support wall 334*b* erecting from a downstream, in the X2 direction, end of the flat plate portion 334*a*, and a second support wall 334*c* erecting from the downstream, in the X1 direction, end of the flat plate portion 334*a*. The third duct member 333 is supported by the supply frame 50 and the guide member 334 so as to be movable in the Z direction. More specifically, the movement of the third duct member 333 in the Y direction is restricted by the bottom surface 50*d* of the supply frame 50 and the flat plate portion 334*a*. In addition, the third duct member 333 is restricted from moving in the X direction by the first support wall 334*b* and the second support wall 334*c* of the guide member 334, and is guided so as to be movable in the Z direction.

The third duct member 333 includes a hollow square pipe-shaped portion 333*a*, a duct connecting portion 333*b* connected to the second duct member 332, a sealing portion 333*c*, a stepped portion 333*d*, an air discharge opening 336, and an engaged portion 341*d*. An elastic sealing member 335 is bonded to the sealing portion 333*c*. A spring 343 is compressed between the third duct member 333 and the supply frame 50, and the third duct member 333 is urged in the Z2 direction by an urging force of the spring 343 as a second urging portion.

The third duct member 333 urged by the spring 343 is positioned at a closed position by the stepped portion 333*d* abutting the abutment surface 50*k* of the supply frame 50. As shown in part (a) of FIG. 41 and part (b) of FIG. 41, the air discharge opening 336 is provided at the downstream end of the third duct member 333 in the mounting direction (Z2 direction) of the toner cartridge 12113, and it is a circular through hole penetrating from the top surface to the bottom surface. That is, the air discharge opening 336 opens downward. Further, the pipe portion 333*a* is in fluid communication with the air discharge opening 336 through a communication hole 337.

As shown in FIG. 42, the engaged portion 341*d* of the third duct member 333 is pressed by the engaging portion 245 provided in the image forming apparatus 100 when the toner cartridge 12113 is mounted to the image forming apparatus 100. By this, the third duct member 333 is moved from the closed position to the open position against the urging force of the spring 343. In this state that the third duct member 333 is in the open position, the air discharge opening 336 is in fluid communication with the receiving portion of the image forming apparatus.

Further, when the position of the duct 330 at the time when the third duct member 333 is in the closed position, and the position of the duct 330 at the time when the third duct member 333 is in the open position, the duct 330 is changeable between the closed position and the open position. In addition, the duct 330 is structured to be movable with respect to the supply frame 50, blocks the frame opening 52 at the closed position, and opens the frame opening 52 at the open position. That is, in this embodiment, duct 330 can be regarded as also serving as a shutter member for opening and closing frame opening 52, which is a toner discharge opening.

Part (a) of FIG. 43 is a front view illustrating the third duct member 333 placed at the closed position, part (b) of FIG. 43 is a bottom view illustrating the third duct member 333 placed at the closed position, and part (c) of FIG. 43 is a sectional view illustrating the third duct member 333 placed at the closed position. Part (a) of FIG. 44 is a front view illustrating the third duct member 333 placed at the open position, part (b) of FIG. 44 is a bottom view illustrating the third duct member 333 placed at the open position, and part (c) of FIG. 44 is a cross-sectional view illustrating the third duct member 333 placed at the open position.

As shown in part (a) of FIG. 43 to part (c) of FIG. 43, when the toner cartridge 12113 is not mounted to the image forming apparatus 100, the third duct member 333 is positioned at the closed position by the action of the spring 343. At this time, the frame opening 52 is closed by the sealing portion 333*c* of the third duct member 333 and the sealing member 335. Therefore, the toner is not discharged outside from the frame opening 52. Also, the air discharge opening 336 is not adjacent to the frame opening 52 when the duct 330 is positioned at the second closed position.

When the toner cartridge 12113 is mounted to the image forming apparatus 100 as shown in part (b) of FIG. 41 and parts (a)-(c) of FIG. 44, the third duct member is moved to the open position by being pressed by the engaging portion 245 of the image forming apparatus 100. At least a portion of the duct 330, that is, the second duct member 332 has flexibility and elasticity. As the third duct member 333 moves, and the second duct member 332 deforms.

At this time, the air discharge opening 336 is adjacent to the frame opening 52 in the toner discharge direction (Y2 direction) of the frame opening 52. In other words, the air discharge opening 336 is disposed at a position downstream of the frame opening 52 in the discharge direction (Y2 direction) so as to overlap the frame opening 52 as viewed in the discharge direction (Y2 direction).

Therefore, the toner discharged from the frame opening 52 is discharged into the main assembly of the image forming apparatus 100 through the air discharge opening 336. Also, the air fed by the fan 158 passes through the pipe portions 333*a* of the first duct member 231, the second duct member 332, and the third duct member 333 and merges into the air discharge opening 336 through the communication hole 337.

In this embodiment, the air discharge opening 336 is periodically opened and closed by one of the shutter structures (closing member, airflow shut-off member) described in the foregoing. With this operation, the internal pressure (internal air pressure) of the duct 330 periodically changes, and a difference is produced between the external air pressure of the toner cartridge 12113 and the internal air pressure of the duct 330. In a state where the air discharge opening 336 is closed by the shutter mechanism positioned at the closed position, the air is fed into the duct 330 by the fan 158 so that the internal pressure of the duct 330 is positive, that is, it is higher than the atmospheric pressure outside the toner cartridge 12113.

Thereafter, when the shutter mechanism moves from the closed position to the open position, the air discharge opening 336 is opened, and therefore, compressed air is discharged through the air discharge opening 336 so that the internal pressure of the duct 330 lowers. At this time, the toner discharged through the air discharge opening 336 is mixed with the compressed air, and is urged thereby, so that the toner can be discharged into the main assembly 100B of the image forming apparatus 100 satisfactorily. In this embodiment, the frame opening 52 can be regarded as a toner discharge opening for discharging the toner stored in the toner accommodating chamber 49. In this embodiment, when the air discharge opening 336 of the duct 330 and the frame opening (toner discharge opening) 52 of the supply frame 50 are adjacent to each other, it can be considered that they are connected to each other in effect. In any case, in this embodiment as well, the toner feed path (movement path) from the toner accommodating chamber 49 to the toner discharge opening (frame opening 52) and the air feed path from the pump 58 to the air discharge opening 336 (paths of travel) are substantially separated. Therefore, the same effect as in Embodiment 9 can be provided.

It is preferable to use the sheet member 210 (see part (a) of FIG. 37) described in Embodiment 9, in the toner cartridge 12113 of this embodiment. This is because then the toner is transported from the toner discharge chamber 57 toward the frame opening 52 by the sheet member 210 as the screw 54 rotates.

Embodiment 11

Next, Embodiment 11 of the present invention will be described, in which the structure of the duct 680 of Embodiment 9 is modified. Therefore, the structure similar to that of Embodiment 9 will be omitted from illustration or will be assigned the same reference numerals in the Figure for explanation.

As shown in FIG. 45, the toner cartridge 13113 according to Embodiment 11 includes a supply frame 50C as a casing and a duct 430 for discharging air fed from the fan 158 through an air discharge opening 435. The supply frame 50C rotatably supports the screw 54, and the bottom surface 50*d* of the supply frame 50C is provided with a frame opening 52C for discharging toner from the inside of the supply frame 50C to outside. The screw 54 conveys the toner in the first direction DR1.

The duct 430 includes a fixed duct 431 in fluid communication with the fan 158, and a screw duct 432 which is in fluid communication with the fixed duct 431 and which is provided with an air discharge opening 435. The screw duct 432 is supported by the supply frame 50C so as to be rotatable about a rotation axis extending in the vertical direction (Y direction). The screw duct 432 includes a hollow pipe portion 432*a* and a screw portion 432*b* fixed to an outer peripheral surface of the pipe portion 432*a*. The screw portion 432*b* as the second feeding portion conveys toner toward the frame opening 52C in a second direction DR2 crossing the first direction DR1 by the rotation thereof.

The rotation of the screw 54 is transmitted to the screw duct 432 by way of a bevel gear or worm gear (not shown). Therefore, the feeding direction of the toner fed in the first direction DR1 parallel to the Z2 direction by the rotational screw 54 is switched to the second direction DR2 parallel to the Y2 direction by the rotating screw duct 432. The air discharge opening 435 overlaps the frame opening 52C as viewed in the toner discharge direction (Y2 direction) of the frame opening 52C. More specifically, the discharge opening 435 is disposed inside the frame opening 52C. Therefore, the toner fed in the Y2 direction by the screw duct 432 is discharged into the main assembly of the image forming apparatus 100 through the frame opening 52C. In this embodiment, the frame opening 50C can be regarded as a toner discharge opening.

As described above, in this embodiment, the toner can be smoothly fed to the frame opening 52C by the screw duct 432 rotated by the driving force of the screw 54, thereby improving the toner discharging property (feeding property). In addition, the toner discharged from the frame opening 52C is urged by the air which is intermittently discharged from the air discharge opening 435, so that the toner can be discharged into the inside of the image forming apparatus 100 satisfactorily.

Further, the duct 430 is placed only inside the supply frame 50C, and therefore, the size of the toner cartridge 13113 can be reduced. Also, in this embodiment, any one of the shutter members (closing member, airflow shut-off member) described above may be used to periodically shut off the airflow produced by the fan 158.

Embodiment 12

Next, Embodiment 12 of the present invention will be described in which use is made with a gas cylinder unit 800 in place of the fan 158 of Embodiment 2. Therefore, the structure similar to that of Embodiment 1 will be omitted from illustration or will be assigned the same reference numerals in the drawings for explanation.

As shown in part (a) of FIG. 46 to part (b) of FIG. 47, a toner cartridge 14113 according to Embodiment 12 includes a supply frame 50, a gas cylinder unit 800, and a drive train 160H. The drive train 160H as a drive transmission portion includes a drive input gear 59, a gas cylinder operating gear 790, and a screw gear 164. A driving force is inputted to the drive input gear 59 from the image forming apparatus 100. The gas cylinder operating gear 790 meshes with the drive input gear 59 and with the screw gear 164.

A cylindrical cam 801 is integrally mounted to the gas cylinder operating gear 790. The gas cylinder unit 800 includes the cylindrical cam 801, a gas cylinder 802 inserted into and held by the cylindrical cam 801, and a link member 803.

The cylindrical cam 801 has a first groove 801*a* and a second groove 801*b* which extend in a circumferential direction. The second groove 801*b* is positioned downstream, in the Z1 direction, of the first groove 801*a*, and the first groove 801*a* and the second groove 801*b* are smoothly connected to each other. In this embodiment, two first grooves 801*a* and two second grooves 801*b* are arranged with 180 degree phase differences, respectively.

The link member 803 has a connecting portion 803*a* which is connected to a connecting portion 802*e* of the gas cylinder 802, and the gas cylinder 802 is held between the cylindrical cam 801 and the link member 803. In addition, the link member 803 is provided with projections 803*b* and 803*c* which can be engaged with the first groove 801*a* and the second groove 801*b*, respectively. In this embodiment, two first grooves 801*a* and two second grooves 801*b* are arranged with phases different from each other by 180 degrees, respectively, and therefore, both of the projections 803*b* and 803*c* engage with only one of the first groove 801*a* and the second groove 801*b* at all times.

The link member 803 is restricted from rotating by the side cover 162. In addition, the link member 803 can press the gas cylinder 802 by rotation of the cylindrical cam 801.

As shown in part (a) of FIG. 48 and part (b) of FIG. 48, the gas cylinder 802 includes a gas container 802*a*, a spring seat 802*b*, a nozzle 802*c*, and a spring 802*d*. A safe gas such as nitrogen is contained in the gas container 802*a*. Nitrogen is preferred because it is non-flammable and does not adversely affect equipment, and so on, but other gases may be used. The spring seat 802*b* is fixed to the gas container 802*a* at an inward of the gas container 802*a*. The nozzle 802*c* is supported so as to be able to advance and retract with respect to the gas container 802*a*. Also, the pressure inside the gas cylinder is set higher than the atmospheric pressure.

The spring 802*d* is compressed between the nozzle 802*c* and the spring seat 802*b*, and in a free state of the cartridge, the nozzle 802*c* is urged in the Z1 direction by the urging force of the spring 802*d*. The stepped portion 802*f* of the nozzle 802*c* abuts against the gas container 802*a*, thereby providing a block between the nozzle 802*c* and the gas container 802*a*. At this time, the gas cylinder 802 is said to be in a closed state. When the gas cylinder 802 is closed, the projections 803*b* and 803*c* of the link member 803 are engaged with the first groove 801*a* as shown in part (a) of FIG. 47.

When the cylinder operating gear 790 rotates from the state in which the gas cylinder 802 is in the closed state, the projections 803*b* and 803*c* of the link member 803 are guided to the second groove 801*b* as shown in part (b) of FIG. 47. By this, the link member 803 moves in the Z1 direction and presses the gas container 802*a* of the gas cylinder 802.

By the link member 803 pressing the gas container 802*a*, the gas container 802*a* moves relative to the nozzle 802*c* in the Z1 direction against the urging force of the spring 802*b*. By this, a gap SP7 is provided between the gas container 802*a* and the nozzle 802*c*, and the gas is fed into the toner discharge chamber 57 through the gap SP7. That is, the gas cylinder 802 is structured to be capable of spewing the gas into the toner discharge chamber 57 by relative movement between the gas container b802*a* and the nozzle 802*c*. At this time, the gas cylinder 802 is said to be in an open state.

The gas container 802*a* and the nozzle 802*c* constitute a valve of the gas cylinder 802. As the drive input gear 59 rotates, the driving force is transmitted to the gas container 802*a* by way of the cylinder operating gear 790, the cylindrical cam 801, and the link member 803. The transmission of this driving force reciprocates the gas container 802*a*, so that the gas container 802*a* and the nozzle 802*c* move relative to each other. By this, the valve formed by the gas container 802*a* and the nozzle 802*c* is periodically opened and closed, so that the gas is spewed out of the gas cylinder 802, and the discharging of the gas is stopped. The cylindrical cam 801 and the link member 803 constitute a cam mechanism functioning as a drive converting portion for converting the rotary motion of the cylinder operating gear 790 into translational motion and reciprocating motion of the gas container 802*a*. That is, the cylindrical cam 801 and the link member 803 convert the rotational force into a force for opening and closing the valve. These are examples of drive converters, and known mechanical elements can also be used as drive converters.

As described above, the gas cylinder 802 periodically repeats the closed state and the open state by rotating the cylinder operating gear 790. When the gas cylinder 802 is open, the gas in the gas cylinder 802 is spewed out into the toner discharge chamber 57. Then, the toner in the toner discharge chamber 57 is fed into the frame opening 52 by this gas, and the toner is discharged with vigor through the frame opening 52 together with the gas and the air inside the toner discharge chamber 57. The pressure of the gas discharged from the gas cylinder 802 can satisfactorily discharge the toner into the apparatus main assembly 100B of the image forming apparatus 100 and feed the toner to the inside of the apparatus main assembly 100B.

In addition, since gas is intermittently fed from the gas cylinder 802 into the toner discharge chamber 57, the toner in the toner discharge chamber 57 can be stirred and the toner can be urged to discharge through the frame opening 52.

Further, the gas cylinder 802 can forcefully send the gas into the toner discharge chamber 57 even if the amount of relative movement in the Z direction between the nozzle 802*c* and the gas container 802*a* is small. Therefore, the size of the gas cylinder unit 800 can be reduced in the Z direction.

The gas cylinder 802 opens and closes in accordance with the rotation of the drive input gear (drive input member, drive receiving) member 59. In this embodiment, the number of times the gas cylinder 802 is opened per unit time, that is, the number of times the gas is discharged per unit time is selected to be greater than the number of times the drive input gear 59 rotates per unit time.

In this embodiment, instead of periodically blocking the airflow from the fan 158 with a shutter member (closing member, airflow shut-off member), the high-pressure gas contained in the gas cylinder 802 is periodically supplied, thereby producing a periodically changing gas flow. However, also in this embodiment, the various shutter structures described in the above embodiments may be provided.

The gas cylinder 802 or the gas cylinder unit 800 including the gas cylinder 802 in this embodiment is a blower portion (fan, blower, gas flow producing mechanism) structured to send the gas and produce the gas flow. The fan 158, which is the air-blowing unit described above, was structured to blow surrounding gases, that is, air. On the other hand, the gas cylinder 802 has a structure in which the gas contained inside itself, nitrogen, for example, is spewed out to the outside.

Embodiment 13

Next, Embodiment 13 of the present invention will be described in which the toner is fed in a manner different from that in Embodiment 1. Therefore, the structure similar to that of Embodiment 1 will be omitted from illustration or will be assigned the same reference numerals in the drawings.

As shown in FIG. 49, a toner cartridge 15113 according to Embodiment 13 includes a supply frame 50J, a rotatable container rotatably supported by the supply frame 50J, and a side cover 162. The rotatable container 810 is provided with a helical groove 811 on its outer peripheral surface, and as shown in FIG. 50, by the rotation thereof, the groove 811 can feed the toner in a direction Z2 in the rotatable container 810. By this, the toner in the rotatable container 810 can be discharged through the frame opening 52.

Part (a) of FIG. 51 is a side view illustrating the drive train 160J of the toner cartridge 15113, and part (b) of FIG. 51 is a sectional view illustrating the drive train 160J of the toner cartridge 15113. Part (c) of FIG. 51 is another sectional view illustrating the drive train 160J of the toner cartridge 15113.

As shown in parts (a) to (c) of FIG. 51, the drive train 160J includes a drive input gear 812, a fan input gear 813, an idler gear 814, and a container rotating gear 815. Drive is inputted to the drive input gear 812 from the drive output member 100*a* of the image forming apparatus 100 (see part (b) of FIG. 10). The drive input gear 812 is in meshing engagement with a small gear 813*a* of the fan input gear 813 and with the idler gear 814.

As the drive input gear 812 rotates, the fan input gear 813 rotates. The drive of the fan input gear 813 is transmitted to the fan 158 by way of the acceleration mechanism 161. Also, the idler gear 814 meshes with a container rotating gear 815 fixed to the rotatable container 810. Thus, the driving force of the driving input gear 812 is transmitted to the fan 158 and the rotatable container 810, respectively.

Embodiment 14

Next, Embodiment 14 of the present invention will be described, in which the toner is fed in a manner different from that of Embodiment 1. Therefore, the structure similar to that of Embodiment 1 will be omitted from illustration or will be assigned the same reference numerals in the drawings.

As shown in FIGS. 52 and 53, the toner cartridge 16113 according to Embodiment 14 includes supply frame 50, a slatted feeding member, and a crank 821. The crank 821 includes a rotational shaft 821*a* rotatably supported by the supply frame 50 and an arm portion 821*b* eccentric from the rotational shaft 821*a*. One end portion 820*a* of the feeding member 820 is mounted to the arm portion 821*b*.

The feeding member 820 is provided with a shaft portion 820*b* on the side opposite from the one end portion 820*a*, and the shaft portion 820*b* is engaged with a guide groove 827 of a guide member 826 fixed to an inner side of the supply frame 50.

A drive input gear 59 and a fan input gear 260 meshing with the drive input gear 59 are rotatably supported on a downstream side surface of the supply frame 50 in the mounting direction (Z2 direction), so that the driving force from the fan input gear 260 drives the fan 158.

A first gear 823 and a second gear 824 meshing with the first gear 823 are rotatably supported on the side (downstream side in the X2 direction) surface of the supply frame 50. These first gear 823 and second gear 824 are sandwiched and held between the supply frame 50 and a plate member 825. A rotational shaft 821*a* of a crank 821 is fixed to the center of the axis of the second gear 824, and the crank 821 rotates around the rotational shaft 821*a* as the second gear 824 rotates.

As shown in FIG. 54, the first gear 823 has a plurality of peak-shaped teeth 823*a*, and the teeth 823*a* are structured to mesh with the drive input gear 59 and the second gear 824. That is, as the drive input gear 59 rotates, the feeding member 820 moves with the rotation of the crank 821.

Next, referring to part (a) of FIG. 55 to part (d) of FIG. 55, the operation of the feeding member 820 will be described. The shaft portion 820*b* of the feeding member 820 is inserted into the guide groove 827 and is guided thereby. The guide groove 827 has a first groove 827*a* extending parallel to the Z direction, and a second groove 827*b* and a third groove 827*c* inclined with respect to the first groove 827*a*. The first groove 827*a*, the second groove 827*b* and the third groove 827*c* have a triangular shape as a whole, and the length of the first groove 827*a* is shorter than a sum of the lengths of the second groove 827*b* and the third groove 827*c*. A connecting portion between the first groove 827*a* and the second groove 827*b* is provided with a pressing spring 828 which can rotate around a rotation shaft 828*a*.

As shown in part (a) of FIG. 55, the shaft portion 820*b* of the feeding member 820 is disposed at the connecting portion between the first groove 827*a* and the third groove 827*c*. When the crank 821 rotates clockwise from this state, as shown in part (a) of FIG. 55 to part (c) of FIG. 55, the shaft portion 820*b* moves while being guided by the first groove 827*a*. By pressing the pressing spring 828, the shaft portion 820*b* can rotate the pressing spring 828 upward around the rotation shaft 828*a* and can pass through.

As shown in part (a) of FIG. 55 and part (b) of FIG. 55, when the shaft portion 820*b* is guided in the first groove 827*a*, the feeding member 820 moves in the Y2 direction, that is, in the direction approaching the frame opening 52.

On the other hand, when the shaft portion 828 passes by the pressing spring 828, the pressing spring 828 prevents the shaft portion 820*b* from returning to the first groove 827*a* and guides the shaft portion 820*b* to the second groove 827*b*. When the crank 821 rotates clockwise from this state, the shaft portion 820*b* is guided by the second groove 827*b* and the third groove 827*c* to be returned to the state shown in part (a) of FIG. 55, as shown in parts (c) and (d) of FIG. 55. When the shaft portion 820*b* is guided along the second groove 827*b* and the third groove 827*c*, the feeding member 820 is moved in the Z1 direction, that is, in the direction away from the frame opening 52.

Here, as described above, the length of the first groove 827*a* is shorter than the sum of the lengths of the second groove 827*b* and the third groove 827*c*. In addition, by rotation of the crank 821 about 180 degrees, the shaft portion 820*b* is moved from the starting end to the terminal end of the first groove 827*a*. Further, by the rotation of the crank 821 about 180 degrees, the shaft portion 820*b* is moved from the starting end of the second groove 827*b* to the terminal end of the third groove 827*c*.

With such a structure, the feeding member 820 advances relatively slowly when the shaft portion 820*b* passes along the first groove 827*a* and moves in the Z2 direction, and when the shaft portion 820*b* moves along the second groove 827*b* and the third groove 827*c* in the Z1 direction, it advances relatively quickly. With such a structure, the toner in the supply frame 50 stays on the feeding member 820 and is fed in the Z2 direction when the feeding member 820 moves slowly in the Z2 direction. More specifically, the feeding member 820 is provided with walls 820*c* forming a plurality of grooves, and the toner T is pushed by the walls 820*c* to move in the Z2 direction and the X2 direction. In this manner, the toner T in the toner accommodating chamber 49 moves toward the discharge opening 52.

Further, when the feeding member 820 advances quickly in the Z1 direction, the toner in the supply frame 50 does not stay on the feeding member 820, but passes through the grid hole of the slatted part, and is hardly fed in the Z1 direction. The toner is transported in the Z2 direction by the feeding member 820 due to the difference between the feed speed of the toner in the Z1 direction and the feed speed in the Z2 direction.

In this embodiment, the slatted feeding member 820 driven by the crank 821 has been described as an example, but the present invention is not limited to such, and, for example, a pendulum-like feeding member which advances slowly in the Z2 direction and advances quickly in the Z1 direction could be used. In other words, the feeding member 820 may have any structure as long as the feeding speeds of the toner in the Z1 direction and the Z2 direction by the feeding member 820 are utilized. Moreover, each of the above-described embodiments may be combined as appropriate.

Embodiment 15

Next, Embodiment 15 will be described. In this embodiment, as in Embodiment 9 described above, the toner cartridge has ducts (gas path, ventilation path, air feeding path), and the ducts provide air paths and toner paths separated from each other. In the above-described Embodiment 9, air is intermittently discharged by periodically blocking the air flow by the fan with the shutter member. On the other hand, the toner cartridge 13 disclosed in this embodiment includes a pump 58 (see FIG. 58) which produces periodic airflow, in place of the fan.

[Toner Cartridge]

Referring to FIGS. 57 to 59, the overall structure of the toner cartridge 13 mounted in the image forming apparatus 100 according to this embodiment will be described. FIG. 57 is a perspective view illustrating the toner cartridge 13. FIG. 58 is an exploded perspective view illustrating the toner cartridge 13. FIG. 59 is a sectional view illustrating the toner cartridge 13.

As shown in FIGS. 57 to 59, the toner cartridge 13 (13Y, 13M, 13C) of this embodiment includes a supply frame 50 as a casing. The supply frame 50 includes a container portion 50*a* and a lid portion 50*b*, and is structured by mounting the lid portion 50*b* to the container portion 50*a*. An internal space 51 is formed inside the supply frame 50 by the container portion 50*a* and the lid portion 50*b*. The lid portion 50*b* is positioned at an end of the toner cartridge 13 in the Y1 direction, and forms a top side of the toner cartridge 13 and the supply frame 50.

The supply frame 50 includes a partition member 55 provided in its internal space 51. The partition member 55 further divides the internal space 51 into a plurality of areas. That is, as shown in FIGS. 58 and 59, the internal space 51 is divided by the partition member 55 into a plurality of chambers including the toner accommodating chamber 49, the communication passage 48, and the toner discharge chamber 57. The toner accommodating chamber 49 is a chamber (storage chamber) for storing toner. The toner discharge chamber 57 is provided with a frame opening 52, which will be described hereinafter, and is in fluid communication with outside of the toner cartridge 13 the frame opening 52, and a hole 236, which will be described hereinafter (see part (c) of FIG. 68 and FIG. 74). The communication path 48 is a toner path which allows the toner accommodating chamber 49 and the toner discharge chamber 57 to be in fluid communication with each other. The partition member 55 can be regarded as a portion of the supply frame 50, and the partition member 55 can actually be formed integrally with the supply frame 50. The partitioning of the internal space 51 of the supply frame 50 as described above is merely an example, and the layout can be appropriately changed as required.

At the end (rear end, rear surface) of the supply frame 50 on the Z2 direction side, a drive train 160 comprising a drive input gear 59, a cam gear 60, and a screw gear 64, and a pump 58 as an air blower (fan, blower, airflow producing mechanism) are mounted. The drive train 160 and the pump 58 are covered by a side cover 62, which is mounted to the supply frame 50. In particular, the cam gear 60 is restricted from moving in the Z1 and Z2 directions by the side cover 62 and the supply frame 50.

A stirring member 53 and a screw 54 are rotatably supported by the supply frame 50. The stirring member 53 and the screw 54 are rotatable about a parallel axis extending in the Z direction, and the screw 54 is disposed downstream of the stirring member 53 in the X2 direction. The stirring member 53 is disposed in the toner accommodating chamber 49, and includes the rotational shaft 53*a* and a stirring sheet (not shown) having one end mounted to the rotational shaft 53*a* and the other end which is a free end. The stirring member 53 rotates to stir the toner in the toner accommodating chamber 49 with the stirring sheet and to feed the toner to the screw 54.

Inside the toner accommodating chamber 49, there is provided a wall 50*al* between the stirring member 53 and the screw 54, and the wall 50*al* projects upward from the floor surface of the toner accommodating chamber 49. The wall 50*al* is disposed close to the screw 54 and extends in the axial direction (Z direction) of the screw 54, that is, along the toner feeding direction. By being sandwiched between the wall 50*al* and the side surface of the toner accommodating chamber 49, the screw 54 can stably feed the toner around it. A space is provided between the wall 50*al* and the lid portion 50*b* of the supply frame 50. Therefore, the stirring member 53 can send the toner to the screw 54 through the space between the wall 50*al* and the lid portion 50*b*.

The communication path 48 is a space or opening which provides fluid communication between the toner accommodating chamber 49 and the toner discharge chamber 57, which will be described hereinafter, and it is a passage through which toner moves. The communication path 48 is formed by the partition member 55 and the supply frame 50. At least a portion of the screw 54 is placed in the communication passage 48. A portion of the screw 54 is exposed to the toner accommodating chamber 49, and conveys the toner in the toner accommodating chamber 49 along the rotation axis direction of the screw 54 by the rotation thereof.

The communication path 48 extends along the direction of the toner fed by the screw 54 and has a tunnel shape. In addition, the screw 54 is placed inside the communication passage 48 by partially covering the screw 54 with the partition member 55. The tunnel shape of the communication passage 48 is formed corresponding to the outer shape of the screw 54. In other words, the communication passage 48 has the role of scraping off the toner fed by the screw 54 to meter the toner in a predetermined amount.

A part of the toner fed by the screw 54 can enter the communication passage 48 and move into the toner discharge chamber 57, but the rest of the toner cannot enter the communication passage 48 and therefore cannot move into the toner storage chamber, thus remaining in the toner accommodating chamber. By appropriately selecting the ratio between the size of the tunnel opening formed by the communication passage 48 and the size of the screw 54, the amount of the toner entering the communication passage 48 can be appropriately determined. In other words, only the desired amount of the toner can be supplied to the toner discharge chamber 57 by extending the screw 54 through the communication passage 48.

The screw 54 conveys toner in a direction (Z2 direction) from the front side (front end) of the toner cartridge 13 to the rear side (rear end). That is, in this embodiment, the longitudinal direction of the screw 54, that is, the toner feeding direction of the screw 54 is the same as the longitudinal direction of the toner cartridge 13 (Z direction, front-rear direction).

The toner discharge chamber 57 is a space defined by the partition member 55 and the supply frame 50, and is disposed downstream of the communication passage 48 in the toner feed direction in which the screw 54 feeds toner.

The screw gear 64 is disposed adjacent to the toner discharge chamber 57, that is, adjacent to the rear surface (the end in the Z2 direction) of the supply frame 50. The toner discharge chamber 57 is provided with the frame opening 52 for discharging toner (developer) from the internal space 51 of the supply frame 50 to outside. Although the details will be described hereinafter, the frame opening 52 is an opening which permits fluid communication between the inside and outside of the supply frame 50 by way of a hole 236 (see part (c) of FIG. 68 and FIG. 74). The toner can be discharged to outside of the toner cartridge through the frame opening 51 through the hole 236.

The frame opening 52 is formed in the bottom surface 50*d* of the supply frame 50 and opens downward of the toner cartridge 13. That is, the toner moves downward through the frame opening 52. The frame opening 52 is disposed on the downstream side of the toner cartridge 13 in the toner feeding direction of the screw 54. That is, the distance between the frame opening 52 and the rear surface of the toner cartridge 13 (the end in the Z2 direction) is shorter than the distance between the frame opening 52 and the front surface of the toner cartridge 13 (the end in the Z1 direction).

The partition member 55 has a cut-away portion 55*a* on the downstream side of the screw 54 in the toner feeding direction, and the toner discharge chamber 57 is partially opened upward by the cut-away portion 55*a*. That is, the toner discharge chamber 57 is not a space sealed by the partition member 55 and the supply frame 50. For example, when the amount of the toner fed from the communication passage 48 by the screw 54 is larger than the amount of the toner discharged from the frame opening 52, the toner in the toner discharge chamber 57 flows through the cut-away portion 55*a*, so that the toner can escape into the toner accommodating chamber 49. By this, clogging of the toner in the toner discharge chamber 57 can be suppressed.

When the amount of the toner fed from the communication passage 48 by the screw 54 is set to be smaller than the amount of the toner discharged from the frame opening 52, the cut-away portion 55*a* may not be provided in the partition member 55, and the toner discharge chamber 57 may be sealed.

A pump 58 is provided adjacent to the rear surface of the toner cartridge 13 (the end in the direction of the arrow Z2). The pump 58 has bellows 58*a* contractable and expandable or reciprocable. The bellows portion 58*a* has flexibility and can be deformed by expanding and contracting (reciprocating motion). The bellows portion 58*a* is a portion having a volume variable by expanding and contracting deformation. The inside of the pump 58 is in fluid communication with a pump connection hole 231*b*1 (see FIG. 67) of the first duct member 231, which will be described hereinafter.

The pump 58 can change the internal volume of the bellows portion 58*a* by reciprocating, that is, expanding and contracting the bellows portion 58*a* by the drive train 160 and the link member 61, which will be described hereinafter. This allows the pump 58 to act on the first duct member 231 (see FIG. 67).

[Pump Expansion and Contraction, Reciprocating Motion]

Next, referring to part (a) of FIG. 60 to part (b) of FIG. 61, the expansion/contraction and reciprocating motion of the pump 58 will be described. Part (a) of FIG. 60 is a perspective view of the rear end of the toner cartridge 13 as viewed from below, and part (b) of FIG. 60 is a perspective view of the rear end of the toner cartridge 13 as viewed from above. Part (a) of FIG. 61 is a perspective view illustrating a state in which the pump 58 is expanded, and part (b) of FIG. 61 is a perspective view illustrating a state in which the pump 58 is contracted. In part (a) of FIG. 60 to part (b) of FIG. 61, the side cover 62 is shown shifted rearward in order to show the rotational drive transmission path.

As shown in part (a) of FIG. 60 to part (b) of FIG. 61, the drive train 160 is disposed on the rear side of the toner cartridge 13, that is, in the neighborhood of the rear surface. The drive train 160 of this embodiment includes a drive input gear 59, a cam gear 60, and a screw gear 64. The drive input gear 59 includes a drive receiving portion 59*a* and a gear portion 59*b*. The cam gear 60 is provided with a cam groove 60*a*. A cylindrical portion of the cam gear 60 in which the cam groove 60*a* is formed is sometimes called a cam portion. The cam groove 60*a* is formed in a snaking fashion, and has a peak portion 60*b* displaced rearward and a root portion 60*c* displaced forward. The direction of the axis of the cam gear 60 is parallel to the Z-axis.

The link member 61 as a reciprocating member has a cam projection 61*a*, and is provided in a state that the cam projection 61*a* is in engagement with the cam groove 60*a*. In addition, the link member 61 has a slide projection 61*b* and is provided in a state of being in engagement with the slide groove 62*b* of the side cover 62. Therefore, the link member 61 is supported by the side cover 62 so as to be movable in the front-rear direction (Z-direction) while the movement thereof in the rotational direction around the axis Z, which is the central axis of the pump 58, is restricted. That is, the link member 61 is reciprocable in the direction of the axis Z of the cam gear 60 (Z direction).

The side cover 62 is a cover member covering the pump 58 to protect the pump 58 and is disposed at an end portion of the toner cartridge 13 in the Z2 direction. The side cover 62 may be regarded as a part of the frame (casing) of the toner cartridge 13 with the supply frame 50. In this case, the supply frame 50 may be particularly called a frame body (casing body). The pump 58 described above is provided with a connecting portion 58*b*, and the link member 61 and the pump 58 are connected with each other at the connecting portion 58*b*.

A rotational drive transmission path will be described. As shown in part (a) of FIG. 60, a rotational drive is inputted to the toner cartridge 13 from a drive output member (coupling member on the main assembly side) 100*a* provided in the main assembly of the image forming apparatus 100. That is, the driving force receiving portion (coupling portion) 59*a* of the drive input gear 59 provided on the cartridge is connected to the drive output member 100*a*, so that the drive receiving portion 59*a* receives the rotational force (driving force). As a result, the drive input gear 59 rotates to transmit the driving force from the drive input gear 59 to each member of the toner cartridge 13.

When the toner cartridge 13 is mounted to the image forming apparatus 100, the first engaging portion 71 and the second engaging portion 72 of the side cover 62 shown in part (a) of FIG. 61 is engaged with an engaged portion (not shown). This determines the position of the cartridge 13 inside the image forming apparatus 100.

A storing element 70 is provided on the side cover 62, and the storing element 70 is an element which stores information regarding the toner cartridge 13. Examples of the information include the driving status of the toner cartridge 13 and the color of the toner stored in the toner cartridge 13. In this embodiment, the storing element 70 is an IC chip, and has a conductive contact on its surface for electrical connection with a contact (not shown) provided on the main assembly of the image forming apparatus 100. When the toner cartridge 13 is mounted to the image forming apparatus 100, the storing element 70 is electrically connected to contacts provided on the image forming apparatus 100.

As shown in FIG. 58, the drive input gear 59 is connected to the rotational shaft 53*a* of the stirring member 53, and by the rotation of the drive input gear 59, the stirring member 53 is rotated. As shown in part (a) of FIG. 60, the gear portion 59*b* of the drive input gear 59 is engaged with the gear portion 60*d* of the cam gear 60 to transmit rotational drive to the cam gear 60. In addition, the gear portion 60*d* of the cam gear 60 is engaged with the screw gear 64 to rotate the screw gear 64. The screw 54 (see FIG. 59) is connected to the screw gear 64, and the screw 54 is driven by rotational drive transmitted from the screw gear 64 to the screw 54. The diameter of the gear portion 60*d* of the cam gear 60 is smaller than the diameter of the cylindrical portion (cam portion) of the cam gear 60 in which the cam groove 60*a* is formed.

In this manner, the drive input gear 59 is a drive input member (drive receiving member, rotational force receiving member, rotational input member) to which a driving force (rotational force) is inputted from the outside of the toner cartridge 13 (that is, the main assembly of the image forming apparatus 100). In other words, the drive input gear 59 is a coupling member, on the toner cartridge (13) side, structured to be coupled with the drive output member (coupling member on the main assembly side) 100*a*.

The drive input gear 59 also functions as a drive transmission member (gear member) for transmitting the drive force to each member of the cartridge. That is, the drive input gear 59 has both a drive receiving portion 59*a* to which the driving force is inputted and a gear portion 59*b* for outputting the driving force to another member of the toner cartridge 13. The gear portion 59*b* is provided on the outer peripheral surface of the drive input gear 59.

The rotational force (driving force) inputted to the drive input gear 59 is used not only to drive the screw 54 and the stirring member 53 but also to drive the pump 58. Next, a structure for converting the rotational force (driving force) received by the drive input gear 59 into reciprocating motion and for expanding, contracting, and reciprocating the pump 58 will be described.

As shown in part (a) of FIG. 61 and part (b) of FIG. 61, the link member 61 is allowed to move in the direction of the axis Z by the slide projection 61*b* of the link member 61 and the slide groove 62*b* of the side cover 62, whereas rotational movement about Z axis is restricted. Therefore, when the cam gear 60 is rotated by being rotationally driven, the cam projection 61*a* of the link member 61 alternately passes by the peak portion 60*b* and the root portion 60*c* of the cam groove 60*a* of the cam gear 60, so that the link member 61 reciprocally moves forward and backward.

That is, the state of part (a) of FIG. 61 and the state of part (b) of FIG. 61 are alternately repeated. In interrelation with the reciprocating motion of the link member 61, the connecting portion 58*b* connected to the link member 61 also reciprocates. The reciprocating motion of the connecting portion 58*b* expands and contracts the bellows portion 58*a* of the pump 58, and the internal volume of the pump 58 changes periodically. The connecting portion 58*b* is a force receiving portion which receives the force from the link member 61 for expanding and contracting the pump 58.

In the manner described above, the rotational force received by the drive input gear 59 is converted by the link member 61 and the cam gear 60 into a force for expanding and contracting the bellows portion 58*a* of the pump 58 to drive the pump 58. The pump 58 is placed radially inward of the rotating cam gear 60. That is, the pump 58 is inside the cam gear 60 and surrounded by the cam gear 60. Therefore, the space required for expanding and contracting the pump 58 can be reduced, and the expansion and contraction amount (movement amount) of the pump 58 can be made larger in the limited space. The cam gear 60 and the link member 61 engaged therewith constitute a cam mechanism functioning as a drive converting portion for converting rotational force into force for reciprocating the pump 58. Other known mechanical elements such as cranks and links can be used as the drive converter.

[Sheet Member]

Next, referring to FIGS. 62 to 64, the sheet member 210 fixed to the screw 54 will be described. As described above, the sheet member 210 is fixed to the screw 54 driven by the screw gear 64, as shown in FIG. 62. The sheet member 210 is provided in the toner discharge chamber 57 and disposed so as to face the frame opening 52 formed in the bottom surface 50*d* of the supply frame 50.

More specifically, as shown in FIG. 63, the screw 54 has a rotational shaft 54*a* and a helical portion 54*b* formed integrally with the rotational shaft 54*a* for feeding toner, and the rotational shaft 53*a* is provided with the sheet support portion 54*c* projecting radially outward. In this embodiment, two sheet members 210 are fixed to the screw 54, and therefore, two seat support portions 54*c* are provided. These two seat support portions 54*c* project in opposite directions with respect to the rotational shaft 54*a*, and a sheet member 210 is fixed to each sheet support portion 54*c*. By this, the sheet member 210 rotates integrally with the screw 54.

The sheet member 210 is a sheet member made of a resin material such as polycarbonate, for example, and has free ends 210*a* and 210*b* on the respective sides which are tapered. As shown in FIG. 64, the tips 210*a* and 210*b* of the sheet member 210 can enter the frame opening 52 when the screw 54 rotates. In other words, the length D2 of the sheet member 210 is longer than twice the distance D1 between the rotation center 54*z* of the screw 54 and the frame opening 52 (D2>D1×2). By this, the sheet member 210 can push out the toner into the frame opening 52 while loosening the toner in the neighborhood of the frame opening 52. Therefore, clogging of the toner adjacent to the frame opening 52 can be suppressed. The toner pushed out toward the frame opening 52 by the sheet member 210 is discharged to outside of the toner cartridge 13 through a hole 236 (see FIG. 74, and so on) which will be described hereinafter.

Although the two sheet members 210 are fixed to the screw 54 in this embodiment, the present invention is not limited such an example. That is, the number of sheet members fixed to the screw 54 may be one or three or more. Furthermore, a plurality of sheet members may be stacked and mounted to one sheet support portion 54*c*. In addition, the material and shape of the sheet member 210 are not limited perpendicular ones.

[Duct]

Next, referring to part (a) of FIG. 65 to FIG. 69, the duct 230 provided on the toner cartridge 13 will be described. Part (a) of FIG. 65 is a perspective view illustrating the toner cartridge 13, and part (b) of FIG. 65 is a perspective view of the toner cartridge 13 taken along a plane including the rotation center of the screw 54. FIG. 66 is a bottom view of the toner cartridge 13. FIG. 67 is a perspective view illustrating the assembly of the duct 230 to the supply frame 50. Part (a) of FIG. 68 is a perspective view illustrating the second duct member 232 and the third duct member 233. Part (b) of FIG. 68 is a sectional view illustrating the second duct member 232 and the third duct member 233. Part (c) of FIG. 68 is a perspective view illustrating the air discharge opening 235 and the hole 236 provided in the third duct member 233.

As shown in part (a) of FIG. 65 to FIG. 69, the toner cartridge 13 is provided with duct 230 in fluid communication with the pump 58. The duct 230 constitutes a feeding path for feeding the air from the pump 58 toward the air discharge opening 235 which will be described hereinafter. That is, the inside of the duct 230 is a movement path along which the air moves. The duct 230 includes the first duct member 231, the second duct member, 232, and the third duct member 233, and is positioned with respect to the supply frame 50. The first duct member 231 communicates with the internal space of the pump 58 (see FIG. 62) through the air inlet hole 50*c* provided in the supply frame 50.

The third duct member 233 is provided with an air discharge opening 235 for discharging the air and a hole 236 in fluid communication with the frame opening 52, and the third duct member 233 is mounted on the bottom surface 50*d* of the toner cartridge 13 (see FIG. 62). Although the details will be described hereinafter, the toner falling from the frame opening 52 is discharged to outside of the toner cartridge 13 through the hole 236. The hole 236 is a toner discharge opening through which the toner contained in the toner cartridge 13 can be discharged to outside. The second duct member 232 is connected to the first duct member 231 and to the third duct member 233. That is, the air fed from the pump 58 to the first duct member 231 through the air inlet hole 50*c* of the supply frame 50 is guided by the first duct member 231, the second duct member 232 and the third duct member 233, and then is discharged through the air discharge opening 235.

As shown in FIG. 67, the first duct member 231 includes a hollow cylindrical pipe-shaped portion 231*a*, a pump connecting portion 231*b* provided at one end of the pipe portion 231*a*, and an external connecting portion 231*c* provided at the other end of the pipe portion 231*a*. The pipe portion 231*a* extends substantially in the Z direction. The pump connecting portion 231*b* is formed in a flange shape and is provided with a pump connection hole 231*b*1 communicating with the pipe portion 231*a*. The external connecting portion 231*c* is provided so as to face the side surface 50*e* of the supply frame 50 in the X1 direction, and is provided with the external communication hole 231*cl* communicating with the pipe portion 231*a*. A rectangular hole 50*f* is formed in the side surface 50*e*.

The first duct member 231 is bonded to the supply frame 50 with the pump connection hole 231*b*1, the air inlet hole 50*c*, the external communication hole 231*cl* and the hole portion 50*f* aligned with each other. More specifically, the first duct member 231 is mounted in the internal space 51 of the supply frame 50 by bonding the pump connecting portion 231*b*, and the external connecting portion 231*c* to the inner surface of the supply frame 50.

As shown in FIG. 67 and part (a) of FIG. 68 and part (b) of FIG. 68, the second duct member 232 includes a hollow square pipe-shaped portion 232*a*, a rectangular frame connecting portion provided at one end of the pipe portion 232*a*, and a duct connecting portion 232*c* provided at the other end of the pipe portion 232*a*. The pipe portion 232*a* extends in the vertical direction (Y direction). The frame connecting portion 232*b* is provided with a communication hole 232*b*1 in fluid communication with the pipe portion 232*a* and projects in the X1 direction. The duct connecting portion 232*c* is provided with a communication hole 232*cl* in fluid communication with the pipe portion 232*a*.

The second duct member 232 is bonded to the supply frame 50 with the frame connecting portion 232*b* engaged with the hole 50*f* of the supply frame 50. At this time, the external communication hole 231*cl* of the first duct member 231 and the communication hole 232*b*1 of the second duct member 232 are in fluid communication with each other.

As shown in FIG. 67 to part (c) of FIG. 68, the third duct member 233 includes a hollow square pipe-shaped portion 233*a*, a duct connecting portion 233*b* provided at one end of the pipe portion 233*a*, and an air discharge opening 235 and a hole 236 provided at the other end of the pipe portion 233*a*. The pipe portion 233*a* extends in the longitudinal direction (Z direction) of the toner cartridge 13. The duct connecting portion 233*b* is provided with a communication hole 233*b*1 in fluid communication with the pipe portion 233*a*.

The third duct member 233 is bonded to the supply frame 50 with the duct connecting portion 232*c* of the second duct member 232 and the duct connecting portion 233*b* of the third duct member 233 connected to each other. At this time, the communication hole 232*cl* of the second duct member 232 and the communication hole 233*b*1 of the third duct member 233 are in fluid communication with each other.

The air discharge opening 235 and the hole 236 are provided on the downstream end side of the pipe portion 233*a* of the third duct member 233 in the mounting direction (Z2 direction) of the toner cartridge 13. The air discharge opening 235 is provided in the bottom surface 233*d* of the third duct member 233, and the hole 236 is a circular through hole penetrating from the top surface of the third duct member 233 through the bottom surface 233*d*. The air discharge opening 235 is an annular hole which is in fluid communication with the pipe portion 233*a* and surrounds the hole 236, and it opens downward.

In this embodiment, the end surface 235*a* of the edge of the air discharge opening 235 and the end surface 236*a* of the edge of the hole 236 are flush with each other. Specifically, the end surface 235*a* and the end surface 236*a* are on the same plane perpendicular to the Y-axis. Namely, the end surface 235*a* and the end surface 236*a* are at the same position in a coordinate system parallel to the Y-axis. In other words, the end surface 235*a* and the end surface 236*a* are at the same height in the vertical direction. However, the arrangement of the end surface 235*a* and the end surface 236*a* is not limited to such an example. For example, one of the end surfaces 235*a* and 236*a* may be placed downward relative to the other. That is, the end surface 235*a* and the end surface 236*a* may be positioned at different positions in a coordinate system parallel to the Y-axis (vertical direction).

As shown in part (b) of FIG. 65, the air discharge opening 235 and the hole 236 are arranged adjacent to the frame opening 52 in the discharge direction (Y2 direction) of the toner discharged through the hole 236. Further, the air discharge opening 235 and the hole 236 are arranged downstream of the frame opening 52 in the toner discharge direction (Y2 direction). Therefore, the toner falling from the frame opening 52 is discharged into the image forming apparatus 100 through the holes 236. Thus, the hole 236 is a toner discharge opening for discharging toner to outside of the toner cartridge 13. Since the frame opening 52 and the hole 236 are openings communicating with each other, the frame opening 52 and the hole 236 may be integrally regarded as a toner discharge opening. In this case, the frame opening 52 is the portion of the toner discharge opening formed by the supply frame 50, and the hole 236 is the portion of the toner discharge opening formed by the duct 230. In addition, the discharge opening 235 is adjacent to the hole 236, which is the toner discharge opening, in the horizontal direction (X direction, Z direction). More specifically, the discharge opening 235 is provided so as to surround hole 236. Therefore, the air is discharged through the discharge opening 235 so as to surround the toner discharged from the hole 236.

The second duct member 232 and the third duct member 233 may be constituted by one member, or may be constituted by three or more members. Moreover, in this embodiment, the first duct member 231, the second duct member 232, and the third duct member 233 are mounted by bonding to the supply frame 50, but the present invention is not limited to such an example. For example, the first duct member 231, the second duct member 232 and the third duct member 233 may be jointed to the supply frame 50 using other methods such as welding or brazing. Also, the connecting positions of the first duct member 231, the second duct member 232 and the third duct member 233 and the supply frame 50 may be appropriately selected.

[Shutter Member]

Next, referring to FIGS. 69 to 72, the shutter member 241 mounted to the bottom surface 50*d* of the supply frame 50 will be described. As shown in FIGS. 69 to 70, the bottom surface 50*d* of the supply frame 50 is provided with the first support portion 50*g*, the second support portion 50*h*, the guide portion 50*i*, and a spring seat 50*j*. A barb portion 50*g*1 extending in the horizontal direction (X direction) is formed at the free end, that is, the lower end of the first support portion 50*g*, and a barb portion 50*h*1 extending in the horizontal direction (X direction) is formed at the free end, that is, the lower end of the second support portion 50*h*.

A shutter member 241 is supported by the first support portion 50*g* and the second support portion 50*h* so as to be movable in the mounting direction (Z direction) of the toner cartridge 13. The shutter member 241 is guided in the mounting direction (Z direction) of the toner cartridge 13 by a groove-shaped guide portion 50*i* extending in the mounting direction (Z direction) of the toner cartridge 13. The shutter member 241 is held by the barb portions 50*g*1 and 50*h*1 so as not to fall from the supply frame 50.

The shutter member 241 is provided with the sealing portion 241*a*, the spring support portion 241*b*, the barb portion 241*c*, and the engaged portion 241*d*. The sealing portion 241*a* extends in the horizontal direction (X direction) and is structured to be able to close the air discharge opening 235, the toner discharge opening 52, and the hole 236 (toner discharge opening). A flat-plate-shaped elastic shutter seal 242 is bonded to the sealing portion 241*a*. The spring support portion 241*b* extends in the Z1 direction and supports the shutter spring 243 at its base portion.

The shutter spring 243 is lightly press-fitted into the spring support portion 241*b* and compressed between the shutter member 241 and the spring seat 50*j* of the supply frame 50. The shutter member 241 is urged in the mounting direction (Z2 direction) of the toner cartridge 13 by the urging force of the shutter spring 243 as a first urging portion. The shutter member 241 urged by the shutter spring 243 abuts against the guide rib 62*a* of the side cover 62 to be positioned at the closing position.

The barb portion 241*c* of the shutter member 241 abuts against the first support portion 50*g* when the side cover 62 is removed from the supply frame 50 during assembly of the toner cartridge 13 or during maintenance operation. Therefore, even when the side cover 62 is dismounted from the supply frame 50, the shutter member 241 is not disengaged out of the supply frame 50, and the assembling operability and maintaining operability of the toner cartridge 13 can be improved.

The engaged portion 241*d* of the shutter member 241 is pressed by an engaging portion 245 (see FIG. 72) provided in the image forming apparatus 100 when the toner cartridge 13 is mounted to the image forming apparatus 100. By this, the shutter member 241 is moved from the closing position (first closing position) to the opening position (first opening position) against the urging force of the shutter spring 243.

Part (a) of FIG. 71 is a bottom view illustrating the shutter member 241 positioned at the closing position, and part (b) of FIG. 71 is a bottom view illustrating the shutter member 241 positioned at the opening position. As shown in part (a) of FIG. 71, when the toner cartridge 13 is not mounted to the image forming apparatus 100, the shutter member 241 is positioned at the closed position by the urging force of the shutter spring 243. At this time, the sealing portion 241*a* of the shutter member 241 shut off the frame opening 52, the air discharge opening 235 and the hole 236 to restrict the discharge of the toner and air from the toner cartridge 13. In other words, when the shutter member 241 is positioned at the closed position, the sealing portion 241*a* is disposed so as to overlap the toner discharge opening 52, the air discharge opening 235, and the hole 236 in bottom view.

When the toner cartridge 13 is mounted to the image forming apparatus 100, the engaged portion 241*d* is pressed by the engaging portion 245 (see FIG. 72), thereby moving the shutter member 241 from the closed position to the open position. At this time, the guide ribs 62*a* provided on the side cover 62 of the toner cartridge 13 guide the engaging portion 245. That is, the guide ribs 62*a*, 62*a* guide the engaging portion 245 to the engaged portion 241*d* and also function as guides when the toner cartridge 13 is mounted to the image forming apparatus 100. The engaged portion 241*d* has a tapered shape at its upstream end in the mounting direction (Z2 direction) of the toner cartridge 13.

By movement of the shutter member 241 to the open position, the sealing portion 241*a* opens the frame opening 52, the air discharge opening 235, and the hole 236 so that toner and air can be discharged from the toner cartridge 13. In other words, the sealing portion 241*a* is provided so as not to overlap the frame opening 52, the air discharge opening 235 and the hole 236 in bottom view, when the shutter member 241 is positioned at the opening open position.

[Toner Receiving Structure of Image Forming Apparatus]

Next, referring to FIGS. 72 to 74, the toner receiving structure of the image forming apparatus 100 for receiving the toner discharged from the toner cartridge 13 will be described. As shown in FIG. 72, inside the image forming apparatus 100, a cylindrical receiving portion 246 is provided at a position opposed to the toner cartridge 13 to be mounted. The receiving portion 246 comprises an elastic sealing member and is provided with a receiving opening 247 for receiving the toner and air discharged from the toner cartridge 13.

As shown in FIGS. 73 and 74, the toner having fallen through the frame opening 52 of the toner cartridge 13 is discharged toward the receiving opening 247 through the hole 236 of the third duct member 233, which is the toner discharge opening. The toner having passed through the receiving opening 247 and the air discharged through the air discharge opening 235 are mixed and flow into the L-shaped bent pipe portion 248 provided in the image forming apparatus 100. Then, the toner is supplied from the pipe portion 248 to the process cartridge 1 through the upstream feeding portion 110 and the downstream feeding portion 120. That is, the toner feeding device 14 as a supply portion includes a bent pipe portion 248.

In this embodiment, the toner discharged from the hole 236 which is the toner discharge opening can be vigorously flown into the pipe portion 248 by the air discharged through the air discharge opening 235. By this, the toner can smoothly pass through the interior of the pipe portion 248. Such a pipe portion 248 is an example of the layout of the toner feed passage inside the apparatus main assembly 100B. The pipe portion 248 may be structured in a thin tubular shape without being bent into an L shape, or may be structured to extend along a complicated curve. Even when such a toner feed passage is provided inside the apparatus main assembly 100B, the toner discharged through the frame opening 52 can be smoothly passed by the air discharged through the air discharge opening 235 of the toner cartridge 13. By using the toner cartridge 13 which discharges air from the air discharge opening 235, it is possible to increase the latitude in the layout of the toner feeding path inside the apparatus main assembly 100B, which in turn makes it easier to increase the latitude in designing the apparatus main assembly 100B.

[Toner and Air Discharge]

Next, referring to FIGS. 75 to 77, the discharge of the toner and air from the toner cartridge 13 will be described in more detail. As described above, the driving force is supplied to the toner cartridge 13 from the drive output member 100*a* (see part (a) of FIG. 60) provided in the image forming apparatus 100, so that the pump 58 and the screw are driven as shown in FIG. 54 is operated. In FIGS. 75 and 76, the solid line indicates the toner feed path, and the broken line indicates the air discharge path.

As shown in FIGS. 75 and 76, the toner in the toner cartridge 13 is fed into the toner discharge chamber 57 through the communication passage 48 by rotation of the screw 54. Then, the toner fed to the toner discharge chamber 57 moves downward toward the hole 236 from the frame opening 52 formed in the bottom surface 50*d* of the supply frame 50 in the toner discharge chamber 57.

At this time, at least a part of the sheet member 210 fixed to the screw 54 (that is, the free end portion of the sheet member 210) enters the frame opening 52 while rotating together with the screw 54. By this, it is possible to encourage the toner to move from the frame opening 52 toward the hole 236 while loosening the toner staying adjacent the frame opening 52. For example, if the screw 54 of the toner cartridge 13 is not driven for a long period of time, the toner in the toner cartridge 13 may tighten and it becomes difficult for the toner to fall through the frame opening 52 into the hole 236. Even in such a case, since the toner can be loosened by the sheet member 210, the toner can be discharged through the frame opening 52 satisfactorily. The toner having passed through the frame opening 52 flows into the main assembly (pipe portion 248) of the image forming apparatus 100 through the hole 236 of the third duct member 233.

On the other hand, by operation of the pump 58, the compressed air is intermittently fed from the pump 58 to the duct 230. The duct 230 comprises the first duct member 231, the second duct member 232, and the third duct member 233, and the air fed from the pump is supplied to the duct members. In other words, at least a part of the duct 230 extends through the inside of the supply frame 50. Also, the second duct member 232 and the third duct member 233 are provided along the outer surface of the supply frame 50. Therefore, by providing the duct 230, the toner cartridge 13 can be prevented from upsizing, and the toner cartridge 13 can be structured compactly.

The air fed through to outside of the supply frame 50 by the second duct member 232 and the third duct member 233 is discharged to outside through the air discharge opening 235 provided at the end of the third duct member 233. The air discharge opening 235 is formed in an annular shape so as to surround the hole 236 and is adjacent to the hole 236 in the horizontal direction (X direction, Z direction). Therefore, when the toner falls and is discharged through the hole 236, the toner is promoted by the air intermittently discharged through the air discharge opening 235, so that the toner can be discharged into the image forming apparatus 100 satisfactorily. The airflow intermittently discharged from the air discharge opening 235 by the reciprocating pump 58 changes periodically. Therefore, the toner inside the hole 236 is sucked out while being loosened by the periodically changing air flow. Furthermore, the toner discharged from the holes 236 is pushed out toward the inside of the image forming apparatus 100 by the air that is intermittently discharged through the air discharge opening 235.

In addition, the air that is vigorously discharged through the air discharge opening 235 creates a negative pressure around the hole 236, which has the effect of sucking the toner out of the hole 236. Since the end surface 235*a* of the edge of the air discharge opening 235 and the end surface 236*a* of the edge of the hole 236 are flush with each other, the toner can be effectively discharged through the hole 236.

Further, in the image forming apparatus 100, the toner is first discharged to the pipe portion 248 described above, in which the toner and the air mixed with each other reach the pipe portion 248, so that the pipe portion 248 is constrained from being clogged with the toner.

In addition, in the toner cartridge 13, the feed path for air fed from the pump 58 through the inside of the duct to the air discharge opening 235, and the feed path (movement path) for toner from the toner accommodating chamber 49 to the toner discharge opening (hole 236) are separated from each other. Therefore, the toner does not hinder the air flow from the pump 58, and air flow failure inside the toner cartridge 13 can be suppressed.

In particular, the pump 58 periodically alternates the airflow in different directions. The pump 58 is structured to repeatedly discharge the air toward the outside and suction the air toward the inside. If the gas (air) feeding path (ventilation path) by the duct is separated from the toner moving path, the toner does not enter inside of the pump 58 even if the pump 58 suctions the air into the inside thereof. Therefore, stagnation of the toner in the pump 58 can be suppressed.

Further, since the toner feeding path and the air feeding path are separated from each other, the operation test of the pump 58 can be easily performed when the toner cartridge 13 is assembled. This is because even if air passes through the interior of the duct 230 during the operation test of the pump 58, the air does not directly act on the toner stored in the toner accommodating chamber 49. That is, if the operation test of the pump 58 is performed without moving the screw 54, the toner is constrained from being discharged through the frame opening 52 and the hole 236. Therefore, the operation test of the pump 58 can be performed in a state in which scattering of the toner is suppressed, and the assembling operability of the toner cartridge 13 can be improved.

Referring to FIGS. 74 and 77, dimensions and arrangement of the frame opening 52, the air discharge opening 235, the hole 236 and the receiving opening 247 will be considered. In the figures, the inner diameter of the receiving opening 247 of the image forming apparatus 100 is D3, the inner diameter of the frame opening 52 is D4, the inner diameter of the hole 236 is D5, and the inner diameter of the air discharge opening 235 (inner The diameter of the circle) is D6, and the outer diameter of the air discharge opening 235 (the diameter of the outer circle) is D7.

At this time, in this embodiment, the following relationships are satisfied:

$$D3>D6>D5 \quad (1)$$

$$D4>1.0\ [\text{mm}] \quad (2)$$

$$D5>1.0\ [\text{mm}] \quad (3)$$

$$D7-D6>0.5\ [\text{mm}] \quad (4)$$

Inequalities (1) to (4) are relational expressions to satisfy in order that the toner and the air can be smoothly discharged through the frame opening 52, the hole 236, and the air discharge opening 235. For example, D4, which is the inner diameter of the frame opening 52 through which the toner passes, and D5, which is the inner diameter of the hole 236, are required to be 1.0 [mm] or more for smooth passage of the toner. Also, the difference (D7−D6), which is a difference between the inner diameter and the outer diameter of the air discharge opening 235, is required to be 0.5 [mm] or more. This is because if the difference (D7−D6) is made smaller, the air velocity increases, but an increase in torque required for operation results from increased pressure drop.

As can be understood from inequality (1) above, the inner diameter (dimension D5) of hole 236 is smaller than the outer diameter (dimension D7) of air discharge opening 235. Based on the above inequalities (1) to (4), the areas of the frame opening 52, the hole 236, and the air discharge opening 235 are preferably 0.78 [mm$^2$] or more. In consideration of the toner scattering and air flow speed, the areas of the frame opening 52, the hole 236, and the air discharge opening 235 are preferably 117 [mm$^2$] or less.

Further, in this embodiment, for example, D3=6.0 [mm], D4=6.5 [mm], D5=3.0 [mm], D6=4.5 [mm], and D7=6.5 [mm]. At this time, both the toner passing through the frame opening 52 and discharged from the hole 236 and the air discharged from the air discharge opening 235 are required to be supplied into the reception opening 247 on the image forming apparatus 100 side. For this reason, considering the inlet opening 247 as a reference, the hole 236 and the air discharge opening 235 are adjacent to each other with the closest distance therebetween of not more than 6 [mm] in the horizontal directions (X direction and Z direction) intersecting and perpendicular to the toner discharge direction (Y2 direction). That is, the minimum value of the distance measured along the horizontal direction for the thickness of the wall separating the hole 236 and the air discharge opening 235 is not more than 6 [mm].

In other words, assuming that the diameter (inner diameter) of the receiving opening 247 is D [mm], the closest distance between hole 236 and the air discharge opening 235 measured along the direction (horizontal direction) perpendicular to the discharge direction is DMIN, as viewed in the discharge direction (Y2 direction) of the toner discharged through the frame opening 52, the following is satisfied: DMIN≤D. [mm]. When this relationship is satisfied, the hole 236 and the air discharge opening 235 can be said to be adjacent to each other. The hole 236 and the air discharge opening 235 are adjacent to each other so as to discharge the toner and the air into the common inlet 247.

When the air discharge opening 235 and the hole 236 are arranged in this manner, the mixed toner and air can flow into the receiving opening 247 of the image forming apparatus 100 in a state that the toner and the air are mixed with each other. As a result, it is possible to improve the discharge ability of the toner.

More preferably, the air discharge opening 235 is arranged so that at least a part of the air discharge opening 235 overlaps the frame opening 52 as viewed in the discharge direction (Y2 direction) of the toner discharged through the hole 236.

Embodiment 16

Next, Embodiment 16 of the present invention will be described, in which the third duct member 233 of Embodiment 15 is given the function of the shutter member 241. Therefore, the structure similar to that of Embodiment 15 will be omitted from the illustration or assigned the same reference numerals in the Figures.

The toner cartridge 2013 according to Embodiment 16 includes a duct 330 for guiding the air fed from the pump 58 (see FIG. 59). As shown in FIG. 78, The duct 330 includes a first duct member 231, a second duct member 332, and a third duct member 333. The first duct member 231 is the same as that of Embodiment 15, and therefore, the description thereof is omitted.

The second duct member 332 has flexibility and elasticity, is formed in a pipe shape, and extends in a substantially vertical direction (Y direction). One end of the second duct member 332 is connected to the external connecting portion 231*c* of the first duct member 231, and the other end is connected to the duct connecting portion 333*b* of the third duct member 333.

A guide member 334 is fixed to the bottom surface 50*d* of the supply frame 50. The guide member 334 includes a horizontally extending flat plate portion 334*a*, a first support wall 334*b* erecting from the downstream end of the flat plate portion 334*a* in the X2 direction, and a second support wall 334*c* erecting from the downstream end of the flat plate portion 334*a* in the X1 direction. The third duct member 333 is supported by the supply frame 50 and the guide member 334 so as to be movable in the Z direction. More specifically, the movement of the third duct member 333 in the Y direction is restricted by the bottom surface 50*d* of the supply frame 50 and the flat plate portion 334*a*. Further, the third duct member 333 is restricted from moving in the X direction by the first support wall 334*b* and the second support wall 334*c* of the guide member 334, and is guided so as to be movable in the Z direction.

The third duct member 333 includes a hollow square pipe-shaped portion 333*a*, a duct connecting portion 333*b* connected to the second duct member 332, a sealing portion 333*c*, a stepped portion 333*d*, an air discharge opening 336, and an engaged portion 341*d*. An elastic sealing member 335 is bonded to the sealing portion 333*c*. A spring 343 is compressed between the third duct member 333 and the supply frame 50, and the third duct member 333 is urged in the Z2 direction by the urging force of the spring 343 as a second urging portion.

The third duct member 333 urged by the spring 343 is positioned at the closing position by abutting the stepped portion 333*d* thereof against the abutment surface 50*k* of the supply frame 50. As shown in part (a) of FIG. 79 and part (b) of FIG. 79, the air discharge opening 336 is provided at the downstream end of the third duct member 333 in the mounting direction (Z2 direction) of the toner cartridge 2013, and it is a circular through hole penetrating from the top surface to the bottom surface. That is, the air discharge opening 336 opens downward. In addition, the pipe portion 333*a* communicates with the air discharge opening 336 through a communication hole 337.

As shown in FIG. 80, the engaged portion 341*d* of the third duct member 333 is pressed by the engaging portion 245 provided in the image forming apparatus 100, when the toner cartridge 2013 is mounted to the image forming apparatus 100. By this, the third duct member 333 is moved from the closing position to the opening position against the urging force of the spring 343. In the state that the third duct member 333 is in the opening position, the air discharge opening 336 is in fluid communication with the receiving portion of the image forming apparatus.

Further, when a position of the duct 330 when the third duct member 333 is positioned at the closed position is referred to as second closed position, and a position of the duct 330 when the third duct member 333 is positioned at the open position is referred to as second open position, then the duct 330 is shiftable between a second closed position and a second open position. Further, the duct 330 is structured to be movable with respect to the frame 50, blocks the frame opening 52 at the second closed position, and opens the frame opening 52 at the second open position.

Part (a) of FIG. 81 is a front view illustrating the third duct member 333 positioned at the closed position, part (b) of FIG. 81 is a bottom view illustrating the third duct member 333 positioned at the closed position, and part (c) of FIG. 81 is a sectional view illustrating the third duct member 333 positioned at the closed position. Part (a) of FIG. 82 is a front view illustrating the third duct member 333 positioned at the open position, part (b) of FIG. 82 is a bottom view illustrating the third duct member 333 positioned at the open position, and part (c) of FIG. 82 is a sectional view illustrating the third duct member 333 positioned at the open position.

As shown in part (a) of FIG. 81 to part (c) of FIG. 81, when the toner cartridge 2013 is not mounted to the image forming apparatus 100, the third duct member 333 is positioned at the closed position by the function of the spring 343. At this time, the frame opening 52 is closed by the sealing portion 333*c* of the third duct member 333 and the sealing member 335. Therefore, the toner is not discharged outside through the frame opening 52. In addition, the air discharge opening 336 is not adjacent to the frame opening 52 when the duct 330 is positioned at the second closed position.

When the toner cartridge 2013 is mounted to the image forming apparatus 100 as shown in part (b) of FIG. 79 and parts (a) to (c) of FIG. 82, the third duct member 333 is moved to the open position by being pressed by the engaging portion of the image forming apparatus 100. At least a part of the duct 330, that is, the second duct member 332 has flexibility and elasticity. As the third duct member 333 moves, the second duct member 332 deforms.

At this time, the air discharge opening 336 is adjacent to the frame opening 52 in the toner discharge direction (Y2 direction) of the frame opening 52. In other words, the air discharge opening 336 is disposed downstream of the frame opening 52 in the discharge direction (Y2 direction) so as to overlap the frame opening 52 as viewed in the discharge direction (Y2 direction).

Therefore, the toner discharged from the frame opening 52 is discharged to the main assembly of the image forming apparatus 100 through the air discharge opening 336. The air fed by the pump 58 passes through the pipe portions 333*a* of the first duct member 231, the second duct member 332, and the third duct member 333, and merges into the air discharge opening 336 from the communication hole 337. Therefore, the toner discharged through the frame opening 52 is urged by the air intermittently discharged through the communication hole 337, so that the toner can be satisfactorily discharged inside the image forming apparatus 100. In this embodiment, the frame opening 52 can be regarded as a toner discharge opening for discharging the toner stored in the toner accommodating chamber 49. In this embodiment, when the air discharge opening 336 of the duct 330 and the frame opening (toner discharge opening) 52 of the supply frame 50 are adjacent to each other, they are considered as being connected to each other. In any case, in this embodiment as well, the toner feed path (movement path) from the toner accommodating chamber 49 to the toner discharge opening (frame opening 52) and the air feed path from the pump 58 to the air discharge opening 336 (paths of travel) are substantially separated from each other. Therefore, the same effect as in Embodiment 15 can be provided.

Further, according to this embodiment, the shutter member 241 of Embodiment 15 can be omitted, so the cost of the toner cartridge 2013 can be reduced.

Embodiment 17

Next, Embodiment 17 of the present invention will be described, in which Embodiment 17, the structure of the duct 230 of Embodiment 15 is modified. Therefore, the structure similar to that of Embodiment 15 will be omitted from the illustration or assigned the same reference numerals in the Figure.

As shown in FIG. 83, the toner cartridge 3013 according to Embodiment 17 includes a supply frame 50C as a casing and a duct 430 for discharging the air fed from the pump 58 through an air discharge opening 435. The supply frame 50C rotatably supports a screw 54 as a feeding section, and a frame opening 52C for discharging toner from the inside of the supply frame 50C to outside is formed in the bottom surface 50*d* of the supply frame 50C. In this embodiment, the frame opening 50C can be regarded as a toner discharge opening. In addition, the screw 54 as the first feeding portion conveys the toner in the first direction DR1.

The duct 430 includes a fixed duct 431 communicating with the pump 58 and a screw duct 432 communicating with the fixed duct 431 provided with the air discharge opening 435. The screw duct 432 is supported by the supply frame 50C rotatably about the rotation axis extending in the vertical direction (Y direction). The screw duct 432 includes a hollow pipe portion 432*a* and a screw portion 432*b* fixed to the outer peripheral surface of the pipe portion 432*a*. The screw portion 432*b* as the second feeding portion conveys, by the rotation thereof, the toner in a second direction DR2 crossing the first direction DR1 toward the frame opening 52C.

Rotation of the screw 54 is transmitted to the screw duct 432 by way of a bevel gear or worm gear (not shown). Therefore, the feeding direction of the toner fed in the first direction DR1 parallel to the Z2 direction by the rotational screw 54 is switched to the second direction DR2 parallel to the Y2 direction by the rotating screw duct 432. The air discharge opening 435 overlaps the frame opening 52C as viewed in the toner discharge direction (Y2 direction) of the frame opening 52C. More specifically, the air discharge opening 435 is disposed inside the frame opening 52C. Therefore, the toner fed in the Y2 direction by the screw duct 432 is discharged into the main assembly of the image forming apparatus 100 through the frame opening 52C.

As described above, in this embodiment, the toner can be smoothly fed to the frame opening 52C by the screw duct 432 rotated by the driving force of the screw 54, thereby improving the toner discharging property (feeding property). Further, the toner discharged through the frame opening 52C is promoted by the air which is intermittently discharged from the air discharge opening 435, so that the toner can be discharged to the inside of the image forming apparatus 100 satisfactorily.

Further, the duct 430 is provided only inside the supply frame 50C, and therefore, the size of the toner cartridge 3013 can be reduced.

Embodiment 18

Next, Embodiment 18 of the present invention will be described in which the duct 230 of Embodiment 15 is modified. Therefore, the structure similar to that of Embodiment 15 will be omitted from the illustration or assigned the same reference numerals in the Figure.

As shown in part (a) of FIG. 84 to part (c) of FIG. 85, the toner cartridge 4013 according to Embodiment 18 includes a supply frame 50 and a duct 530 for discharging the air fed from the pump 58, through an air discharge opening 235. The supply frame 50 rotatably supports the screw 54, and the bottom surface 50*d* of the supply frame 50 is provided with a frame opening 52 for discharging the toner from the inside of the supply frame 50 to the outside of the toner cartridge.

The duct 530 has a first duct member 531 in fluid communication with the pump 58 and a second duct member 532 in fluid communication with the first duct member 531 and provided with an air discharge opening 235 and a hole 236. The hole 236 is in fluid communication with frame opening 52. In this embodiment, the hole 236 is a toner discharge opening for discharging toner which has passed through frame the opening 52 to outside of the toner cartridge 4013. The first duct member 531 is provided outside the supply frame 50 without passing through the inside of the supply frame 50. The second duct member 532 is supported by the bottom surface 50*d* as the exterior surface of the supply frame 50, and the arrangement is such that the air discharge opening 235 is adjacent to the frame opening 52.

Therefore, the toner discharged through the frame opening 52 is urged by the air intermittently discharged from the air discharge opening 235, so that the toner can be discharged to the inside of the image forming apparatus 100 satisfactorily. In addition, since the duct 530 is provided only outside the supply frame 50, it is possible to improve assembly workability.

Other Embodiments

The frame opening (toner discharge opening) and an air discharge opening may be formed as shown in parts (a) to (d) of FIG. 86. That is, as shown in part (a) of FIG. 86 and part (b) of FIG. 86, the frame opening (toner discharge opening) 52 and the air discharge opening 235D may be offset, that is, not concentric, as viewed in the toner discharge direction (Y2 direction). The air discharge opening 235D is a circular opening. The frame opening 52 and the air discharge opening 235D at least partly overlap each other as viewed in the toner discharge direction (Y2 direction). Here, a diameter (inner diameter) of the receiving opening 247 is D [mm], and a closest distance between the exposed portion of the frame opening 52 and the air discharge opening 235D as viewed in the toner discharge direction (Y2 direction) is DMIN. DMIN is the shortest distance between the frame opening 52 and the air discharge opening 235D measured along the horizontal direction (X direction, Z direction). Then, DMIN≤D [mm] is satisfied in the distances measured along the horizontal direction intersecting the Y2 direction. In this case, the frame opening 52 and the air discharge opening 235D can be considered as being adjacent to each other.

As shown in part (c) of FIG. 86 and part (d) of FIG. 86, the structure may be such that the toner discharged from the frame opening 52 and the hole 236E may pass around the air discharged from the air discharge opening 235E. The air discharge opening 235E is a normal circular opening, and the hole 236E is a substantially C-shaped opening. In this embodiment, the hole 236E corresponds to the toner discharge opening. The hole 236E (toner discharge opening) and the air discharge opening 235E are adjacent to each other in the horizontal direction (X direction, Z direction). More specifically, the hole 236E, which is the toner discharge opening, is provided so as to surround the air discharge opening 235E. Here, the diameter (inner diameter) of the inlet 247 is D [mm], and the closest distance between the hole 236E and the air discharge opening 235E when viewed in the toner discharge direction (Y2 direction) is DMIN. Then, DMIN≤D [mm] is satisfied in the distances measured along the directions (X direction and Z direction) perpendicular to the Y2 direction. Also, in this structure, the toner discharged through the frame opening 52 and the hole 236E is urged by the air discharged intermittently from the discharge openings 235D and 235E, and the toner is smoothly discharged to the inside the image forming apparatus 100. That is, the toner and the air can be supplied into the receiving opening 247 from the toner cartridge. The frame opening 52 and the air discharge opening 235E at least partially overlap each other as viewed in the toner discharge direction (Y2 direction).

Further, the shapes and positions of the frame opening and the air discharge opening and the hole formed in the duct are not limited to the above-described examples. That is, the frame opening, the air discharge opening, and the hole may have any shapes and dispositions as long as the toner discharged from the frame opening is urged by the air discharged from the air discharge opening.

In addition, in Embodiment 15, the sheet member 210 is structured so as to be able to enter the inside of the frame opening 52 but not to enter the inside of the hole 236. However, the sheet member 210 may be structured to enter the hole 236.

In this embodiment, the pump 58 is a mechanism (air blower, airflow producing mechanism, air pump) which takes the gas (that is, air) around the toner cartridge in and applies pressure to the gas or moves the gas, thereby producing a gas flow (airflow) toward the discharge opening. In any of the above-described examples, the pump 58 is a bellows pump which alternately discharges and suctions the air and which is a positive displacement pump with volume change, more specifically a reciprocating pump. Other examples of reciprocating pumps include diaphragm pumps, piston pumps, and plunger pumps. The bellows pump may be regarded as a type of diaphragm pump. Such a pump can be suitably used because it can intermittently discharge high-pressure air suitable for feeding the toner, with use of a simple structure. However, instead of using a positive displacement pump or a reciprocating pump as the air blower (airflow producing mechanism, air pump), it is also possible to use another type of structure. As an example, in place of the pump 58 described above, an air blower (airflow producing mechanism) such as a fan may be applied. A fan is structured to move gas (air) by driving (rotating) an impeller, and can be regarded as a type of non-displacement-type pump. When a fan is used in place of the positive displacement pump 58, the toner discharged through the toner discharge opening is urged by the air discharged from the air discharge opening 235, and the toner discharging performance (toner feeding performance) is improved. Moreover, each of the above-described embodiments may be combined as appropriate.

INDUSTRIAL APPLICABILITY

According to the present invention, an image forming apparatus used to form an image on a recording material and a toner cartridge usable with the image forming apparatus are provided.

The present invention is not limited to the embodiments described above, and various modifications and variations are possible without departing from the spirit and scope of the present invention. Accordingly, the following claims are attached to publicize the scope of the invention.

This application claims priority based on Japanese Patent Application No. 2021-042969 filed on Mar. 16, 2021 and Japanese Patent Application No. 2021-042970 filed on Mar. 16, 2021, the entirety of each of which is incorporated herein.

The invention claimed is:

1. A toner cartridge comprising:

a casing accommodating toner and provided with a toner discharge opening through which the accommodated toner is capable of being discharged;

a fan configured to feed a gas around thereof by rotation thereof;

a closing member capable of shifting between a closed position for closing a flow path for the gas fed by the fan and an open position for opening the flow path; and a drive receiving member configured to receive a driving force from outside of the toner cartridge and to transmit the driving force toward the fan and the closing member by rotation thereof, wherein the closing member is configured to be periodically shifted between the closed position and the open position by receiving the driving force.

2. A toner cartridge according to claim 1, wherein when the closing member shifts from the closed position to the open position, the toner is discharged through the toner discharge opening together with the gas fed by the fan.

3. A toner cartridge according to claim 2, wherein the flow path is the toner discharge opening.

4. A toner cartridge according to claim 3, wherein the closing member is disposed on a downstream side of the toner discharge opening in a discharging direction of the toner discharged through the toner discharge opening.

5. A toner cartridge according to claim 4, further comprising a feeding portion rotatably supported in the casing and configured to feed the toner; and a gear member configured to transmit the driving force toward the feeding portion, wherein the gear member includes a cam portion pressing the closing member in a direction from the closed position toward the open position.

6. A toner cartridge according to claim 4, wherein the closing member is rotatable about a rotational axis extending in the direction in which the toner is discharged through the toner discharge opening, and the closing member is configured to periodically rotate between the closed position and the open position by receiving the driving force.

7. A toner cartridge according to claim 6, further comprising a feeding portion rotatably supported in the casing and configured to feed the toner; and a gear member for transmitting the driving force toward the feeding portion, wherein the gear member includes a plurality of projections for unidirectionally rotating the closing member to rotate it periodically between the closed position and the open position.

8. A toner cartridge according to claim 3, wherein the closing member is disposed on an upstream side of the toner discharge opening in a discharging direction in which the toner is discharged through the toner discharge opening.

9. A toner cartridge according to claim 8, wherein the closing member is supported so as to be rotatable about a rotational axis extending in a longitudinal direction of the toner cartridge and is periodically rotated between the closed position and the open position by receiving the driving force.

10. A toner cartridge according to claim 8, wherein the closing member is supported so as to be movable in a predetermined direction parallel to the discharging direction of the toner discharged through the toner discharge opening, and the closing member is periodically reciprocal in the predetermined direction between the closed position and the open position by receiving the driving force.

11. A toner cartridge according to claim 8, wherein the closing member is periodically rotatable between the closed position and the open position by receiving the driving force.

12. A toner cartridge according to claim 2, further comprising a duct connecting the fan and the casing to each other and configured to guide the gas fed from the fan, wherein the passage is a connecting portion between the duct and the casing.

13. A toner cartridge according to claim 1, wherein the closing member is configured to periodically slide between the closed position and the open position by receiving the driving force.

14. A toner cartridge according to claim 13, further comprising an urging portion for urging the closing member to the closed position.

15. A toner cartridge according to claim 1, wherein the casing includes a toner discharge chamber provided with a toner accommodation chamber for accommodating the toner and provided with the discharge opening.

16. A toner cartridge according to claim 15, wherein the gas fed by the fan is led into the toner discharge chamber.

17. A toner cartridge according to claim 15, wherein an air pressure in the toner discharge chamber is periodically changed when the fan and the closing member are driven.

18. A toner cartridge according to claim 1, wherein the closing member is configured to reciprocate between the closed position and the open position.

19. A toner cartridge according to claim 1, wherein the closing member is configured to reciprocate between the closed position and the open position by sliding movement.

20. A toner cartridge according to claim 1, wherein the closing member is configured to reciprocate between the closed position and the open position by up and down movement.

21. A toner cartridge according to claim 1, wherein the closing member is configured to reciprocate between the closed position and the open position by swing movement.

22. A toner cartridge according to claim 1, further comprising a cam configured to move the closing member.

23. A toner cartridge according to claim 1, further comprising a drive converting portion.

24. A toner cartridge according to claim 1, wherein the closing member is configured to move to the closed position and the open position by rotation.

25. A toner cartridge according to claim 1, wherein the closing member is configured to be rotatable about a rotational axis extending along a movement direction of the gas passing through the flow path.

26. A toner cartridge according to claim 1, wherein the closing member is configured to be rotatable about a rotational axis extending in a direction crossing a moving direction of the gas passing through the flow path.

27. A toner cartridge according to claim 1, wherein the closing member is provided with a hole permitting flow of the gas, and when the closing member is in the open position, the closing member opens the passage by overlaying the hole of the closing member with the passage.

28. A toner cartridge according to claim 1, further comprising an elastic member urging the closing member.

29. A toner cartridge according to claim 1, further comprising a duct for guiding the gas fed by the fan, wherein the duct is provided adjacent to the toner discharge opening and is provided with an air discharge opening for discharging the gas fed by the fan.

30. A toner cartridge according to claim 29, wherein a discharging direction of the toner discharged through the toner discharge opening is parallel to a discharging direction of the gas discharged through the air discharge opening.

31. A toner cartridge according to claim 1, further comprising a shutter member capable of shifting between a second closed position for closing the toner discharge opening and a second open position for opening the toner discharge opening; and an urging portion for urging the shutter member to the second closed position, wherein the shutter member does not shift between the second closed position and the second open position even when the drive receiving member is driven.

32. A toner cartridge according to claim 1, wherein a number of rotations of the fan per unit time is not less than 10 times a number of rotations of the drive receiving member per unit time.

33. A toner cartridge according to claim 1, wherein a number of rotations of the fan per unit time is not more than 500 times a number of rotations of the drive receiving member per unit time.

34. A toner cartridge according to claim 1, wherein a number of rotations of the closing member per unit time is larger greater than a number of rotations of the drive receiving member per unit time.

35. A toner cartridge according to claim 1, wherein a number of rotations of the fan per unit time is not less than 10 times a number of rotations of the closing member per unit time.

36. A toner cartridge according to claim 1, wherein a number of rotations of the fan per unit time is not more than 500 times a number of rotations of the closing member per unit time.

37. A toner cartridge according to claim 1, further comprising a drive transmitting portion for transmitting the driving force, wherein the drive receiving member transmits the driving force to the fan and the closing member through the drive transmitting portion.

* * * * *